(12) United States Patent
Isono et al.

(10) Patent No.: US 7,206,702 B2
(45) Date of Patent: Apr. 17, 2007

(54) DEVICE FOR DETECTING FORCE ACTING ON A TIRE

(75) Inventors: Hiroshi Isono, Toyota (JP); Yasuji Mizutani, Susono (JP); Takayuki Yamamoto, Aichi-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 24 days.

(21) Appl. No.: 10/483,978

(22) PCT Filed: Jul. 16, 2002

(86) PCT No.: PCT/IB02/02783

§ 371 (c)(1),
(2), (4) Date: Feb. 18, 2004

(87) PCT Pub. No.: WO03/008243

PCT Pub. Date: Jan. 30, 2003

(65) Prior Publication Data

US 2005/0012501 A1    Jan. 20, 2005

(30) Foreign Application Priority Data

Jul. 17, 2001  (JP) .............................. 2001-217104
Jul. 27, 2001  (JP) .............................. 2001-228409
May 29, 2002  (JP) .............................. 2002-156413

(51) Int. Cl.
    *G01L 1/00*    (2006.01)
(52) U.S. Cl. .......................................... 702/41; 701/70

(58) Field of Classification Search .................. 702/41
    See application file for complete search history.

(56) References Cited

U.S. PATENT DOCUMENTS 6,270,172 B1    8/2001   Shirai et al.
6,425,643 B2    7/2002   Shirai et al.
6,650,986 B1 *  11/2003  Burgdorf et al. ............... 701/70

FOREIGN PATENT DOCUMENTS

| DE | 198 46 352 A1 | 4/1999 |
|---|---|---|
| JP | B2 7-81923 | 9/1995 |
| JP | A 8-152370 | 6/1996 |
| JP | A 8-327480 | 12/1996 |
| JP | A 9-2240 | 1/1997 |
| JP | B2 2736392 | 1/1998 |
| JP | B2 2736395 | 1/1998 |
| JP | A 11-171004 | 6/1999 |
| WO | WO 00/46088 | 8/2000 |
| WO | WO 00/47458 | 8/2000 |
| WO | WO 01/19655 A1 | 3/2001 |

* cited by examiner

*Primary Examiner*—Michael Nghiem
*Assistant Examiner*—Stephen J. Cherry
(74) *Attorney, Agent, or Firm*—Oliff & Berridge, PLC

(57) ABSTRACT

A device for detecting force acting on a tire includes a detector provided with respect to vehicle wheels for detecting the force acting on a tire and a determining portion for determining a detection abnormality of force acting on the tire by the detector based on at least either the detected value or a temporal changing tendency of the detected value.

66 Claims, 59 Drawing Sheets

DISC WHEEL SIDE    HUB SIDE

DISC WHEEL SIDE          HUB SIDE

FIG. 23

| A1 UPWARD SHIFT OF GRADIENT | | | | A2 DOWNWARD SHIFT OF GRADIENT | | | | B1 |
|---|---|---|---|---|---|---|---|---|
| B2 ABNORMALITY IN FRONT WHEEL | | B3 ABNORMALITY IN REAR WHEEL | | B2 ABNORMALITY IN REAR WHEEL | | B3 ABNORMALITY IN FRONT WHEEL | | C1 |
| C2 *AB. IN OUTER WHEEL | C3 *AB. IN INNER WHEEL | C2 *AB. IN OUTER WHEEL | C3 *AB. IN INNER WHEEL | C2 *AB. IN OUTER WHEEL | C3 *AB. IN INNER WHEEL | C2 *AB. IN OUTER WHEEL | C3 *AB. IN INNER WHEEL | DOWNWARD SHIFT OF ZERO POINT |

| B1 | |
|---|---|
| C1 UPWARD SHIFT OF ZERO POINT | |

*AB = ABNORMALITY

FIG. 46

| DETECTING PORTION | | LONGITUDINAL FORCE | LATERAL FORCE | VERTICAL FORCE |
|---|---|---|---|---|
| | A | WHEN TRAVELING FORWARD (DRIVING FORCE) / WHEN TRAVELING BACKWARD (BRAKING FORCE) | WHEN ACTING OUTSIDE DIRECTION OF TURNING | WHEN ACTING |
| | B | WHEN TRAVELING BACKWARD (DRIVING FORCE) / WHEN TRAVELING FORWARD (BRAKING FORCE) | WHEN ACTING INSIDE DIRECTION OF TURNING | WHEN ACTING |
| | C | WHEN TRAVELING FORWARD (DRIVING FORCE) / WHEN TRAVELING BACKWARD (BRAKING FORCE) | WHEN ACTING OUTSIDE DIRECTION OF TURNING | WHEN ACTING |
| | D | WHEN TRAVELING BACKWARD (DRIVING FORCE) / WHEN TRAVELING FORWARD (BRAKING FORCE) | WHEN ACTING INSIDE DIRECTION OF TURNING | WHEN ACTING |

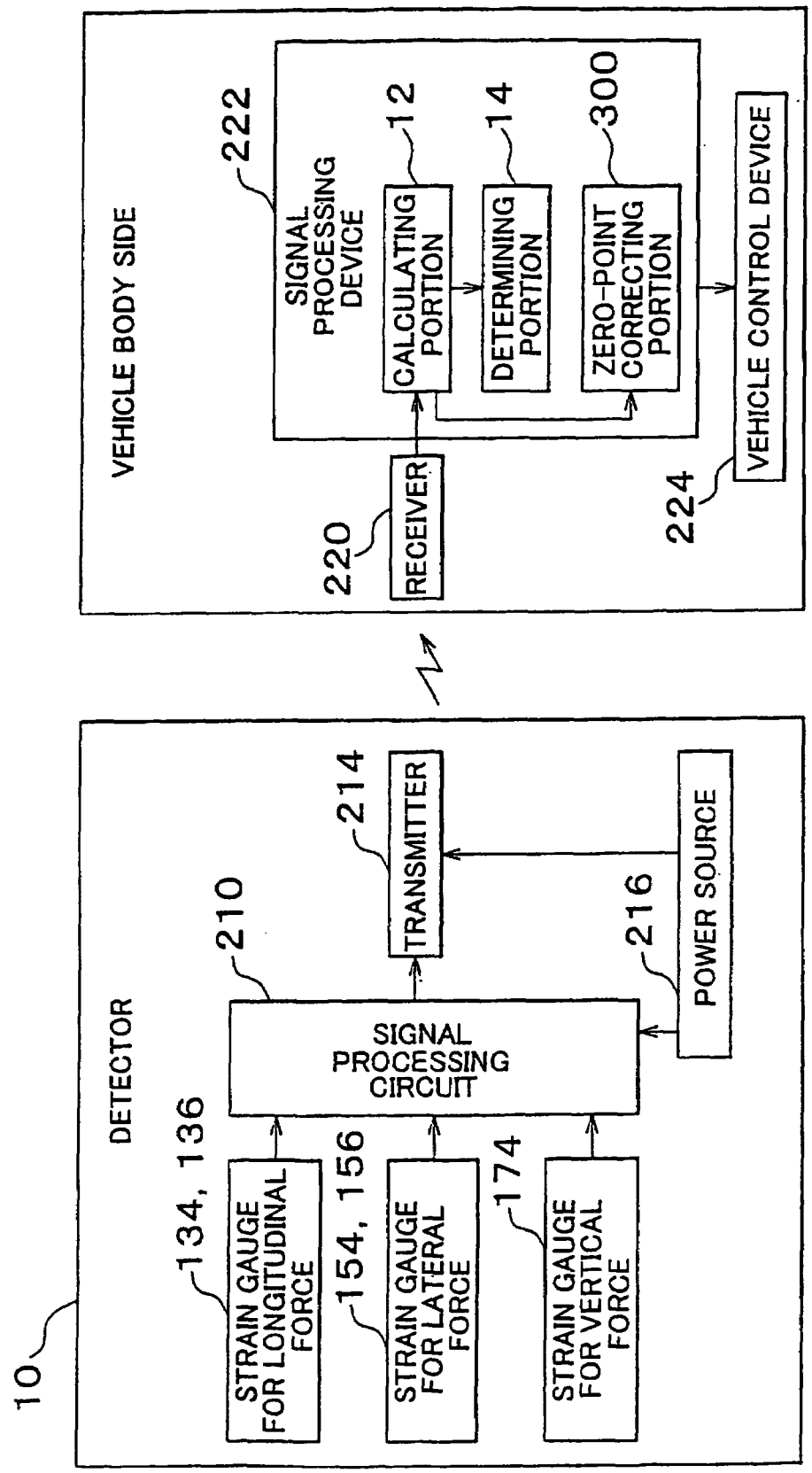

FIG. 65
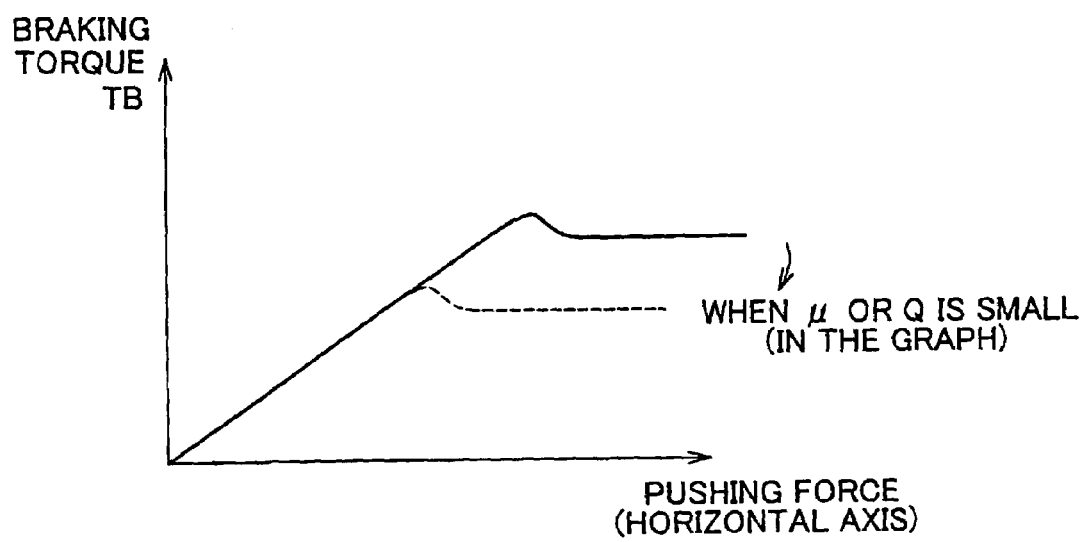
$$I \cdot \dot{\omega} = R \cdot \mu \cdot Q - r \cdot FB$$
Q GROUND LOAD
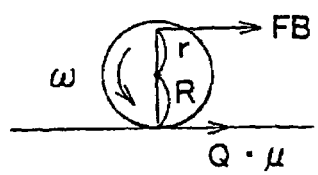

DEVICE FOR DETECTING FORCE ACTING ON A TIRE

FIELD OF THE INVENTION

The invention relates to technology for detecting force acting on a vehicle tire.

BACKGROUND OF THE INVENTION

One example of a conventional device for detecting force acting on a tire in a vehicle has been disclosed in Japanese Patent Application Laid-Open Publication No. 9-2240. In the conventional device, a stress sensor is inserted into a hole formed on a vehicle axis of the tire to detect the force acting on the tire. The stress sensor mainly comprises a strain gauge.

The device in the publication is mounted on a vehicle including a vehicle wheel in which the tire is mounted on the periphery of a disc wheel, and a vehicle body having a retaining body integrally retaining the vehicle wheel with the disc wheel for enabling rotation of the vehicle wheel by mounting the disc wheel on the same axis as that of the vehicle wheel. The retaining body in this case may be referred to as a hub, a hub carrier, a carrier, a spindle, a disc wheel support, or the like.

Abnormalities in detection of the device for detecting force acting on a tire may occur for some reason. Therefore, it is preferable that measures for avoiding the use of an abnormal detected value as a normal detected value be devised.

However, the publication does not include a configuration for detecting abnormalities in the device for detecting force acting on a tire.

On the other hand, a vehicular state variable sensor for detecting a state variable of a vehicle may be mounted on the vehicle in which the device for detecting force acting on a tire is mounted on. In this case, if the device for detecting force acting on a tire can be utilized to normalize detection of the vehicular state variable sensor, functions of the device for detecting force acting on a tire in the vehicle improve.

DISCLOSURE OF THE INVENTION

Considering the facts described above, the present invention has been made to provide a device for detecting force acting on a tire capable of achieving at least one of the following objects: 1) avoiding the use of an abnormal value of force acting on a tire, detected by the device for detecting force acting on a tire itself, as a normal detected value, and 2) avoiding the use of an abnormal value of a vehicular state variable, detected by a vehicular state variable sensor, as a normal detected value.

According to the invention, the following aspects can be obtained. The aspects described are divided into sections with individual section numbers. When appropriate, section numbers of other sections will be quoted.

This is to facilitate understanding of the technical characteristics disclosed in this specification as well as some combinations thereof. However, they should not be considered to be limited to the following aspects.

Further, when plural items are described in one section, it is not indispensable to employ all the items, so that some of the items can be employed instead.

(1) One aspect of the invention relates to a device for detecting force acting on a tire, which is mounted in a vehicle with plural vehicle wheels in which each vehicle wheel is configured by mounting the tire on the periphery of a disc wheel. The device includes at least one detector for detecting the force acting on a tire, which is provided on at least one of the plural vehicle wheels, and includes at least either a determining portion determining a detection abnormality of force acting on the tire by the detector with the use of a detected value of the detector or a zero-point correcting portion correcting a zero point of the detector with the use of the detected value of the detector.

According to this device, at least either a determination of the detection abnormality of the detector or correction of the zero point of the detector by the a zero-point correcting portion can be performed with the use of the detected value of each detector detecting the force action on each tire, that is, with the use of information on force acting on each tire obtained from the detector.

Therefore, according to the device embodied with an aspect including the detecting portion, if a detected value becomes abnormal, the abnormality is detected, enabling avoidance of the use of an abnormal detected value as a normal detected value.

On the other hand, according to the device embodied with an aspect including the zero-point correcting portion, the zero point of the detector is corrected, enabling avoidance of the use of the detected value of the detector whose zero point is abnormal as a normal detected value.

In this section, "determination of detection abnormality" can be considered to include, for example, a determination of whether or not the zero point of the detector is abnormal or a determination of whether or not a graph gradient indicating input/output characteristics of the detector (simply referred to "input/output gradient" hereafter) is abnormal.

In the present section, "zero-point correcting portion" can be embodied with an aspect in which the zero point of the detector is corrected if it is determined to be abnormal or with an aspect in which the zero point of the detector is corrected if a condition (e.g., a temporal condition) is met regardless whether or not the zero point of the detector is abnormal. In the first aspect, a zero-point abnormality determination can be performed according to the same principle as that of "determining portion" in the present section and each of the other corresponding sections.

In the present section and each of the other corresponding sections, "force action on a tire" can be considered to include vertical force acting on a tire in the vertical direction (also referred to ground load) or to include horizontal force acting on the tire in the horizontal direction. Further, "horizontal force" can be considered to include longitudinal force acting on the tire in the longitudinal direction (including at least either driving force or braking force) or to include lateral force acting on the tire in the lateral direction.

In the present section and each of the other corresponding sections, "lateral force" can be considered to represent lateral force in a narrow sense or to include cornering force in a narrow sense.

The device relating to the present section can be embodied with an aspect including a portion which prohibits the use of an abnormal detected value or which corrects the abnormal detected value after detection of the detector is determined to be abnormal by the determining portion.

(2) Another aspect of the present invention relates to the device for detecting force acting on a tire described in the section (1) including the determining portion performing determination based on at least either the detected value or a temporal changing tendency of the detected value.

If an abnormality occurs in detection of force acting on a tire by the detector, the abnormality may affect the detected value or the temporal changing tendency of the detected value.

Based on the information above, in the device relating to the present section, a detection abnormality of force acting on a tire by the detector is determined based on at least either the detected value or the temporal changing tendency of the detected value.

In the present section, "determination of abnormality" includes at least either a determination of whether or not detection of force acting on a tire by the detector is abnormal or estimation of a mode of abnormality if the detection is determined to be abnormal.

(3) Another aspect of the present invention relates to the device for detecting force acting on a tire described in the section (1) with the detector provided with respect to all or some of the plural vehicle wheels in which, based on at least either plural detected values of the plural detectors or temporal changing tendencies of the plural detected values, the determining portion performs at least one of the following steps: 1) a determination of whether or not detection of force acting on a tire by at least one of plural detectors is abnormal, 2) identification of a mode of the abnormality if the detection is determined to be abnormal, and 3) identification of a particular detector with a detection abnormality of force acting on a tire out of the plural detectors if the detection is determined to be abnormal.

If the detector is provided with respect to plural vehicle wheels, it may be necessary to identify a particular detector with a detection abnormality of force acting on a tire out of the plural detectors.

On the other hand, as described previously, if an abnormality occurs in detection of force acting on a tire by the detector, the abnormality may affect a detected value or the temporal changing tendency of the detected value.

Based on the information above, the device relating to the present section performs at least one of the following steps: 1) a determination of whether or not detection of force acting on a tire by at least one of plural detectors is abnormal based on at least either plural detected values of the plural detectors or temporal changing tendencies of the plural detected values, 2) identification of the mode of abnormality if the detection is determined to be abnormal, and 3) identification of a particular detector with the detection abnormality of force acting on a tire out of the plural detectors if the detection is determined to be abnormal.

(4) Another aspect of the present invention relates to the device for detecting force acting on a tire described in the section (2) or (3), in which the determining portion includes a first abnormality determining means determining that detection of force acting on a tire is abnormal if the detected value has deviated from a limit value of the detected value that can be detectable under normal detection of the force acting on a tire.

If detection of force acting on a tire by the detector is normal, a range of the detected value is limited in general. Accordingly, if the detected value has deviated from the limit value while detection of force acting on a tire by the detector is normal, it is possible that detection of force acting on a tire is abnormal. Based on this information, the device relating to the present section has been provided.

(5) Another aspect of the present invention relates to the device for detecting force acting on a tire described in the section (4) with the detector provided with respect to all or some of the plural vehicle wheels, in which the first abnormality determining means includes a means determining that detection of force acting on a tire by at least one of the plural detectors is abnormal if a total value of the plural detected values has deviated from a limit value of the total value that can be detectable under normal detection of force acting on a tire by all the plural detectors.

If the detector is provided with respect to plural vehicle wheels, a detection abnormality can be determined over each detector individually by giving attention to each detected value of the plural detectors. Further, in this case, a detection abnormality over the plural detectors can be determined generally by giving attention to a total value of the plural detected values of the plural detectors.

In the latter case, as described previously, if detection of force acting on a tire with respect to all the detectors is normal, a range of the total value of the plural detected values is limited in general. Accordingly, if the total value has deviated from the limit value while detection of force acting on a tire with respect to all the detectors is normal, it is possible that detection of force acting on a tire with respect to at least one of the plural detectors is abnormal. Based on this information, the device relating to the present section has been provided.

(6) Another aspect of the present invention relates to the device for detecting force acting on a tire described in the section (2) or (5), in which the determining portion includes a second abnormality determining means determining that detection of the force acting on a tire is abnormal if the temporal changing tendency disconforms to generated load movement in a load movement generation state where the load movement is being generated in the vehicle based on movement of the vehicle.

In some cases, it may not be possible to determine a detection abnormality of the detector by giving attention only to the detected value of the detector in order to determine whether or not detection of force acting on a tire by the detector is abnormal. Among some cases above is a case where the mode of detection abnormality is that the input/output gradient has been deviated from a normal gradient. In this case, it is effective to provide variations of input of the detector and to observe the temporal change of output corresponding to the input, that is, the temporal changing tendency of the detected value in order to determine the mode of detection abnormality.

Among the states where variation of input of the detector is provided is the load movement generation state where the load movement is being generated in the vehicle based on movement of the vehicle. More specifically, when the vehicle is being braked, vertical force as a load apparently moves from a rear wheel to a front wheel. On the other hand, when the vehicle is turning, vertical force as a load apparently moves from an inner turning wheel to an outer turning wheel.

Based on the information above, according to the device relating to the present section, detection of force acting on a tire by the detector is determined to be abnormal if the temporal changing tendency of the detected value does not conform to generated load movement in the load movement generation state.

(7) Another aspect of the present invention relates to the device for detecting force acting on a tire described in the section (6) with the detector, which is provided with respect to all or some of the plural vehicle wheels and has a function of detecting vertical force acting on the tire in the vertical direction as the force acting on a tire, and in which the second abnormality determining means includes a means determining that detection of vertical force by at least one of the plural detectors is abnormal if a total value of plural vertical forces detected by the plural detectors temporally changes in the load movement generation state.

As it is well known, when the vehicle is being braked, vertical force of a front wheel temporally increases while that of a rear wheel temporally decreases. However, the total value of vertical forces does not temporally change. Likewise, when the vehicle is turning, vertical force of an outer turning wheel temporally increases while that of an inner turning wheel temporally decreases. However, the total value of vertical forces does not temporally change.

The reason of no change in total value of vertical forces when the vehicle is being braked and/or the vehicle is turning is that a movable load and distribution of the vehicle generally do not change temporally in the above vehicular states.

Accordingly, if detection of force acting on a tire with respect to all the detectors of the plural vehicle wheels is normal while the total value of plural vertical forces detected by the plural detectors temporally changes, it is possible that detection of at least one of the plural detectors is abnormal.

Based on the information above, in the device relating to the present section, detection of vertical force by at least one of the plural detectors is determined to be abnormal if the total value of plural vertical forces detected by the plural detectors temporally changes in the load movement generation state.

(8) Another aspect of the present invention relates to the device for detecting force acting on a tire described in the section (2) or (7), in which the determining portion includes an abnormality mode identifying means identifying the mode of detection abnormality of the force acting on a tire by determining the zero point to be abnormal if the detected value has deviated from the limit value that can be detectable under normal detection of the force acting on a tire by the detector and if the temporal changing tendency conforms to generated load movement in the load movement generation state where the load movement is being generated in the vehicle based on movement of the vehicle, and by determining a graph gradient indicating input/output characteristics of the detector to be abnormal if the detected value has deviated from the limit value and if the temporal changing tendency does not conform to the generated load movement in the load movement generation state.

When the zero point of the detector is abnormal, the temporal changing tendency has a strong tendency to conform to the generated load movement if the detected value has deviated from the limit value in the load movement generation state. In contrast, when the input/output gradient of the detector is abnormal, the temporal changing tendency of the detected value has a strong tendency not to conform to the generated load movement if the detected value has deviated from the limit value in the load movement generation state.

Based on the information above, according to the device relating to the present section, the zero point of the detector is determined to be abnormal if the detected value has deviated from the limit value and if the temporal changing tendency of the detected value conforms to the generated load movement in the load movement generation state. On the other hand, the graph gradient indicating the input/output characteristics of the detector is determined to be abnormal if the detected value has deviated from the limit value and if the temporal changing tendency of the detected value does not conform to the generated load movement in the load movement generation state.

In the device, as explained above, the mode of detection abnormality of the force acting on a tire by the detector is identified based on the detected value and the temporal changing tendency thereof.

(9) Another aspect of the present invention relates to the device for detecting force acting on a tire described in the section (2) or (8) with the detector, which is provided with respect to all or some of the plural vehicle wheels and has a function of detecting vertical force acting on the tire in the vertical direction as the force acting on a tire, in which a plurality of the forces acting on a tire to be detected by the plural detectors is affected by load movement in the opposite direction to each other in the load movement generation state where the load movement is being generated in the vehicle based on movement of the vehicle, and in which the determining portion includes an abnormal detector identifying means identifying a particular detector with abnormal vertical force detection out of the plural detectors based on a direction of load movement and the temporal changing tendency of the total value of plural vertical forces detected by the plural detectors if the total value has deviated from a limit value that can be detectable under normal detection of the force action on a tire and if the temporal changing tendency of the total value does not conform to the generated load movement in the load movement generation state.

When the vehicle is provided with plural detectors, it may be necessary to identify a particular detector with detection abnormality as an abnormal detector.

On the other hand, if a total value of detected values of the plural detectors has deviated from its limit value, it is possible that at least one of the plural detectors has detection abnormality.

In this case, in the load movement generation state, a particular detector with real detection abnormality can be identified out of at least one of the detectors whose detection has determined to be abnormal through the comparison between the total value and the limit value, if the direction of the load movement (e.g., whether the direction is from a rear wheel to a front wheel or from an inner turning wheel to an outer turning wheel) and the direction of the temporal changing tendency of the total value (e.g., whether the temporal changing tendency is on the increase or on the decrease) are both determined.

If the direction of the load movement is determined, a particular detector with the temporal changing tendency of its detected value being affected by the load movement is determined out of the plural detectors.

The plural detectors may be provided to the plural detectors so that each of the force acting on a tire to be detected by each of the detector is affected by the load movement in the opposite direction to each other in the load movement generation state.

For example, if the detector is provided with respect to a front wheel and a rear wheel of the vehicle, vertical force to be detected by the detector of the front wheel temporally increases while vertical force to be detected by the detector of the rear wheel temporally decreases when the vehicle is being braked, that is, a load on the front wheel increases while that on the rear wheel decreases.

If the two detectors are both normal in this case, a total value of the two vertical forces detected by the two detectors does not change temporally even though the vehicle is being braked.

In contrast, if detection abnormality, which is abnormality of the input/output gradient, occurs to only the detector of the front wheel, the detection abnormality significantly reflects on the temporal changing tendency of the total value.

If the input/output gradient is assumed to be larger than a normal gradient in this case, the total value increases temporally.

On the other hand, if detection abnormality which is abnormality of the input/output gradient occurs to only the detector of the rear wheel, the detection abnormality significantly reflects on the temporal changing tendency of the total value. If the input/output gradient is assumed to be larger than a normal gradient in this case, the total value decreases temporally.

As clear from the explanation above, if the direction of the load movement and that of the temporal changing tendency of the total value are determined, it may be possible to identify a particular detector with detection abnormality out of the plural detectors with certain accuracy even though whether or not detection abnormality over the plural detectors is present is generally determined from the total value.

Based on the information explained above, in the device relating to the present section, a particular detector with abnormal vertical force detection is identified out of the plural detectors based on relation between the direction of the load movement and that of the temporal changing tendency of the load movement if the total value the plural vertical forces detected by the plural detectors has deviated from the limit value and if the temporal changing tendency of the total value does not conform to the generated load movement in the load movement generation state.

(10) Another aspect of the present invention relates to the device for detecting force acting on a tire described in the section (9) with the detector provided with respect to a front wheel and a rear wheel of the plural vehicle wheels, in which the abnormal detector identifying means includes a means determining that: (a) vertical force detection of the detector of the front wheel is abnormal if the total value is larger than the limit value and if the total value increases temporally in a vehicle braking state where the load movement is being generated, (b) vertical force detection of the detector of the rear wheel is abnormal if the total value is larger than the limit value and if the total value decreases temporally in the vehicle braking state, (c) vertical force detection of the detector of the rear wheel is abnormal if the total value is smaller than the limit value and if the total value increases temporally in the vehicle braking state, and (d) vertical force detection of the detector of the front wheel is abnormal if the total value is smaller than the limit value and if the total value decreases temporally in a vehicle braking state.

If the total value of the plural vertical forces, detected by the plural detectors with respect to the front wheel and the rear wheel, is larger than the limit value, it is possible that the input/output gradient of at least one of the detectors is larger than the normal gradient.

Conversely, if the total value is smaller than the limit value, it is possible that the input/output gradient of at least one of the detectors is smaller than the normal gradient.

If it is possible that the input/output gradient is larger than the normal gradient when the total value increases temporally in the vehicle braking state, it is possible that vertical force detection of the detector of the front wheel is abnormal as clear from the previous explanation. In contrast, when the total value decreases temporally under the same condition, it is possible that vertical force detection of the detector of the rear wheel is abnormal.

To the contrary, if it is possible that the input/output gradient is smaller than the normal gradient when the total value increases temporally in the vehicle braking state, it is possible that vertical force detection of the detector of the rear wheel is abnormal. In contrast, when the total value decreases temporally under the same condition, it is possible that vertical force detection of the detector of the front wheel is abnormal. Based on the information above, the device relating to the present section has been provided.

(11) Another aspect of the present invention relates to the device for detecting force acting on a tire described in the section (9) or (10) with the detector provided with respect to a right wheel and a left wheel of the plural vehicle wheels, in which the abnormal detector identifying means includes a means determining that: (a) vertical force detection of the detector of an outer turning wheel out of the left and right wheels is abnormal if the total value is larger than the limit value and if the total value increases temporally in a vehicle turning state where the load movement is being generated, (b) vertical force detection of the detector of an inner turning wheel out of the left and right wheels is abnormal if the total value is larger than the limit value and if the total value decreases temporally in the vehicle turning state, (c) vertical force detection of the detector of the inner turning wheel is abnormal if the total value is smaller than the limit value and if the total value increases temporally in the vehicle turning state, and (d) vertical force detection of the detector of the outer turning wheel is abnormal if the total value is smaller than the limit value and if the total value decreases temporally in a vehicle turning state.

As it can be easily estimated from the previous explanation, if the total value of the plural vertical forces, detected by the plural detectors with respect to the left wheel and the right wheel, is larger than the limit value, it is possible that the input/output gradient of at least one of the detectors is larger than the normal gradient.

Conversely, if the total value is smaller than the limit value, it is possible that the input/output gradient of at least one of the detectors is smaller than the normal gradient.

If it is possible that the input/output gradient is larger than the normal gradient when the total value increases temporally in the vehicle turning state where lateral force is acting on the vehicle wheels, it is possible that vertical force detection of the detector of the outer turning wheel, on which larger vertical force is acting than on the inner turning wheel, out of the left and right wheels is abnormal. In contrast, when the total value decreases temporally under the same condition, it is possible that vertical force detection of the detector of the inner turning wheel is abnormal.

To the contrary, if it is possible that the input/output gradient is smaller than the normal gradient when the total value increases temporally in the vehicle turning state, it is possible that vertical force detection of the detector of the inner turning wheel is abnormal. In contrast, when the total value decreases temporally under the same condition, it is possible that vertical force detection of the detector of the outer turning wheel is abnormal. Based on the information above, the device relating to the present section has been provided.

(12) Another aspect of the present invention relates to the device for detecting force acting on a tire described in the section (6) or (11) with the detector, which is provided with respect to all or some of the plural vehicle wheels and has a function of detecting vertical force acting on the tire in the vertical direction as the force acting on a tire, in which the determining portion includes a means determining the load movement generation state based on relation among the plural detected values of the plural detectors.

The device described in the section (6) or (11) can be so embodied as to determine the load movement generation state by utilizing not the detectors but other sensors in the vehicle.

In contrast, according to the device relating to the present section, the load movement generation state can be determined by utilizing the detectors, eliminating the dependence on the other sensors.

(13) Another aspect of the present invention relates to the device for detecting force acting on a tire described in the section (1) or (12), besides which the vehicle includes a vehicular state variable sensor, and in which the determining portion is actuated without the use of the vehicular state variable sensor.

With this device, determination with respect to detection abnormality of the detectors can be performed without the dependence on other vehicular state variable sensors in the vehicle.

(14) Another aspect of the present invention relates to the device for detecting force acting on a tire described in the section (1) or (12), besides which the vehicle includes a vehicular state variable sensor, and in which the determining portion is actuated with the use of the vehicular state variable sensor.

(15) Another aspect of the present invention relates to the device for detecting force acting on a tire described in the section (2) or (14), in which the detector has a function of detecting horizontal force acting on the tire in the horizontal direction as the force acting on a tire, and in which the determining portion includes a third abnormality determining means determining whether or not detection of the horizontal force is abnormal with the use of a value of the horizontal force, detected by the detector, divided by vertical force acting on the tire in the vertical direction.

Generation of horizontal force acting on a vehicle wheel is attributed to friction force between a tire and a road surface. This friction force can be calculated from the product of vertical force acting on the road surface from the tire and a friction coefficient between the tire and the road surface. In other words, horizontal force is a physical quantity depending on vertical force.

On the other hand, when horizontal force is divided by vertical force, a physical quantity not depending on vertical force can be obtained as a value equivalent to road friction coefficient $\mu$, which is also equivalent to the friction coefficient. Therefore, the use of the value equivalent to road friction coefficient $\mu$ enables determination of whether or not horizontal force detection of the detector is abnormal regardless of vertical force.

Based on the information above, in the device relating to the present section, whether or not horizontal force detection is abnormal is determined with the use of the quotient of horizontal force, which is detected by the detector, divided by vertical force.

Meanwhile, "road friction coefficient $\mu$" in the explanation above denotes not only peak value of the friction coefficient on $\mu$-s curve indicating relation between the friction coefficient $\mu$ and a slip rate s plotted on a coordinate plane with the slip rate s on the horizontal axis and the friction coefficient $\mu$ between the tire and the road surface on the vertical axis but the friction coefficient $\mu$ temporally changing on the same kind of load surface.

(16) Another aspect of the present invention relates to the device for detecting force acting on a tire described in the section (15), in which the detector is provided with respect to all or some of the plural vehicle wheels, and in which the third abnormality determining means includes a means determining whether or not horizontal force detection of the detector with respect to at least one vehicle wheel is abnormal based on an individual value equivalent to road friction coefficient $\mu$ with respect to each of the vehicle wheels which is the quotient of horizontal force detected by each of the detector of each of the vehicle wheels divided by individual vertical force with respect to each of the vehicle wheels, and based on a general value equivalent to road friction coefficient $\mu$ with respect to the entire vehicle which is the quotient of a total value of the plural horizontal forces detected by the plural detectors divided by general vertical force with respect to the entire vehicle.

Experientially speaking, it is extremely infrequent for detection abnormality over all the plural detectors to occur simultaneously. In most cases, detection abnormality occurs over some of the detectors and the number of detectors with detection abnormality is less than that of detectors with no detection abnormality.

Meanwhile, the general value equivalent to road friction coefficient $\mu$ with respect to the entire vehicle can be calculated by dividing the total value of plural horizontal forces detected by the plural detectors provided to the plural vehicle wheels by the general vertical force with respect to the entire vehicle, that is, the total value of vertical forces with respect to the plural vehicle wheels.

According to the above-mentioned empirical rule with respect to the number of detectors in which detection abnormality occurs, the general value equivalent to road friction coefficient $\mu$ (detected value) is likely to reflect on a normal value of the individual value equivalent to road friction coefficient $\mu$ (detected value) with respect to each of the vehicle wheels, that is, an actual value of the friction coefficient $\mu$ between the tire and the road surface. Based on this information, the device relating to the present section has been provided.

(17) Another aspect of the present invention relates to the device for detecting force acting on a tire described in the section (16), in which the means includes a means determining that horizontal force detection by the detector with respect to at least one of the vehicle wheels is abnormal if a graph gradient indicating corresponding relation between the individual value equivalent to road friction coefficient $\mu$ with respect to each of the vehicle wheels and the general value equivalent to road friction coefficient $\mu$ with respect to the entire vehicle has deviated from a normal gradient with respect to at least that one of the vehicle wheels.

According to the device relating to the section (16), it is possible that horizontal force detection by the detector with respect to at least one of the vehicle wheels is abnormal if the graph gradient indicating the corresponding relation between the individual value equivalent to road friction coefficient $\mu$ with respect to each of the vehicle wheels and the general value equivalent to road friction coefficient $\mu$ with respect to the entire vehicle has deviated from the normal gradient with respect to at least that one of the vehicle wheels. Based on this information, the device relating to the present section has been provided.

(18) Another aspect of the present invention relates to the device for detecting force acting on a tire described in the section (15) or (17), with which the vehicle includes an acceleration sensor detecting acceleration acting on the vehicle in the same direction as the horizontal force, in which the detector is provided with respect to all or some of the plural vehicle wheels, and in which the third abnormality determining means includes a means determining that detection of the horizontal force is abnormal if the general value equivalent to road friction coefficient $\mu$ with respect to the entire vehicle, which is the quotient of a total value of the plural horizontal forces detected by the plural detectors divided by the general vertical force with respect to the entire vehicle, and the acceleration detected by the acceleration sensor do not conform to each other.

From the viewpoint of vehicle dynamics, the general value equivalent to road friction coefficient $\mu$ (theoretical value) and the acceleration to be detected by the acceleration sensor (theoretical value) conform to each other. Accordingly, if a detected value of the general value equivalent to road friction coefficient $\mu$ and that of the acceleration do not conform to each other, it is possible that the detected value of the general value equivalent to road friction coefficient $\mu$ is abnormal. This abnormality is caused by at least one of the plural detectors with detection abnormality.

Based on the information above, in the device relating to the present section, horizontal force detection by the detector is determined to be abnormal if the general value equivalent to road friction coefficient $\mu$ with respect to the entire vehicle, which is the quotient of the total value of the plural horizontal forces detected by the plural detectors divided by the general vertical force with respect to the entire vehicle, and the acceleration detected by the acceleration sensor do not conform to each other.

Explaining specifically about the relation between a type of "horizontal force" and a type of "acceleration" in the present section, if horizontal force means longitudinal force, acceleration means longitudinal acceleration, and if horizontal force means lateral force, acceleration means lateral acceleration.

(19) Another aspect of the present invention relates to the device for detecting force acting on a tire described in the section (18), in which the determining portion further includes an acceleration sensor abnormality determining means determining that detection of the acceleration sensor is abnormal if the general value equivalent to road friction coefficient $\mu$ and the acceleration detected by the acceleration sensor do not conform to each other and if a graph gradient indicating corresponding relation between the individual value equivalent to road friction coefficient $\mu$ with respect to each of the vehicle wheels, which is the quotient of horizontal force detected by each of the detector of each of the vehicle wheels divided by the individual vertical force with respect to each of the vehicle wheels, and the acceleration detected by the acceleration sensor has deviated from a normal gradient in the same direction with respect to all the vehicle wheels.

The conceivable causes of nonconformance of the general value equivalent to road friction coefficient $\mu$ to the acceleration detected by the acceleration sensor and of deviation of the graph gradient indicating corresponding relation between the general value equivalent to road friction coefficient $\mu$ and the acceleration detected by the acceleration sensor from the normal gradient are: 1) an abnormality in horizontal force detection of the detector and 2) an abnormality in acceleration detection of the acceleration sensor.

In contrast, the conceivable causes of deviation of the graph gradient indicating corresponding relation between the individual value equivalent to road friction coefficient $\mu$ and the acceleration from the normal gradient in the same direction with respect to all the vehicle wheels are: 1) a first cause by which an abnormality with the same characteristic occurs with respect to all the vehicle wheels and 2) a second cause by which a detection abnormality of the acceleration sensor occurs. Judging from an empirical theory of probability, the probability of occurrence of the first cause is lower than that of the second cause.

Based on this information, in the device relating to the present section, detection of the acceleration sensor is determined to be abnormal if the general value equivalent to road friction coefficient $\mu$ and the acceleration do not conform to each other and if the graph gradient indicating corresponding relation between the individual value equivalent to road friction coefficient $\mu$ and the acceleration has deviated from the normal gradient in the same direction with respect to all the vehicle wheels.

(20) Another aspect of the present invention relates to the device for detecting force acting on a tire described in the section (18) or (19), in which the determining portion further includes a tire abnormality determining means determining that a particular tire, which is a part of a particular vehicle wheel out of the plural vehicle wheels, is abnormal if a graph gradient indicating corresponding relation between the individual value equivalent to road friction coefficient $\mu$, which is the quotient of horizontal force detected by each of the detector of each of the vehicle wheels divided by the individual vertical force with respect that particular vehicle wheel, and the general value equivalent to road friction coefficient $\mu$ has deviated from a normal gradient and if the general value equivalent to road friction coefficient $\mu$ and the acceleration detected by the acceleration sensor conform to each other.

The graph gradient indicating the corresponding relation between the individual value equivalent to road friction coefficient $\mu$ and the general value equivalent to road friction coefficient $\mu$ changes depending on not only whether or not each detector is abnormal but a state of each tire of each vehicle wheel. If each detector is not abnormal and tires of some of the vehicle wheels are abnormal, the general value equivalent to road friction coefficient $\mu$ and the acceleration detected by the acceleration sensor tend to conform to each other. Also, under the same condition, the graph gradient indicating the corresponding relation between the individual value equivalent to road friction coefficient $\mu$ and the general value equivalent to road friction coefficient $\mu$ tends to deviate from the normal gradient with respect to the some of the vehicle wheels not all the vehicle wheels.

Based on the information above, in the device relating to the present section, if the graph gradient indicating the corresponding relation between the individual value equivalent to road friction coefficient $\mu$ and the general value equivalent to road friction coefficient $\mu$ has deviated from the normal gradient with respect to a particular vehicle wheel, a particular tire of that particular vehicle wheel is determined to be abnormal.

(21) Another aspect of the present invention relates to the device for detecting force acting on a tire described in the section (15) or (20), in which the detector further has a function of detecting the vertical force as the force acting on a tire, and in which the third abnormality determining means includes a means calculating the value equivalent to road friction coefficient $\mu$ with the use of the vertical force detected by the detector.

The device described in the section (15) or (20) can be so embodied as to detect vertical force by utilizing other sensors of the vehicle without utilizing the detector.

On the other hand, according to the device relating to present section, the vertical force can be detected by utilizing the detector thereof without the dependence on other sensors.

(22) Another aspect of the present invention relates to the device for detecting force acting on a tire described in the section (1) or (21), besides which the vehicle includes a vehicular state variable sensor detecting a state variable of the vehicle, and in which the determining portion includes a fourth abnormality determining means determining whether or not detection of the detector is abnormal based on a detected value of the vehicular state variable sensor and that of the detector.

According to this device, whether or not detection of the detector is abnormal is determined by utilizing not only the detected value of the detector subject to the abnormality determination but that of the vehicular state variable sensor.

Therefore, with this device, a flexibility when designing determination regulations of detection abnormality is improved compared with a case where only the detected value of the detector is utilized, which in turn improves, for example, reliability of determination results of detection abnormality without difficulty.

(23) Another aspect of the present invention relates to the device for detecting force acting on a tire described in the section (22), in which the fourth abnormality determining means includes a means determining whether or not detection of the detector is abnormal based on relation between the detected value of the vehicular state variable sensor and that of the detector.

In the vehicle, constant relation between an actual value of the vehicular state variable to be detected by the vehicular state variable sensor and that of the force acting on a tire to be detected by the detector may be established. Likewise, if both detection of the vehicular state variable sensor and that of the detector are normal, the same relation can be established between both the detected values. Further, if the same relation cannot be established between both the detected values in a state where detection of the vehicular state variable sensor should assumed to be normal, detection of the detector is estimated to be abnormal.

Based on the information above, in the device relating to the present section, whether or not detection of the detector is abnormal is determined by giving attention to the relation between the detected value of the vehicular state variable sensor and that of the detector.

This device can be embodied, for example, with an aspect in which detection of the detector is determined to be abnormal if the relation between the detected value of the vehicular state variable sensor and that of the detector is not normal, that is, if the relation does not conform to relation to be established in a case that detection of the detector is normal.

(24) Another aspect of the present invention relates to the device for detecting force acting on a tire described in the section (22) or (23), in which the fourth abnormality determining means includes a means determining that the detector is abnormal if the detected value of the vehicular state variable sensor and that of the detector do not conform to each other.

In the vehicle, the actual value of the vehicular state variable to be detected by the vehicular state variable sensor and that of the force acting on a tire to be detected by the detector may conform to each other from the viewpoint of dynamics or physics. Likewise, if both detection of the vehicular state variable sensor and that of the detector are normal, both the detected values conform to each other.

Based on the information above, in the device relating to the present section, detection of the detector is determined to be abnormal if the detected value of the vehicular state variable sensor and that of the detector do not conform to each other.

(25) Another aspect of the present invention relates to the device for detecting force acting on a tire described in the section (22) or (24), in which the vehicular state variable sensor includes a manipulation state variable sensor detecting a state variable of manipulation carried out by a driver for changing the vehicular state, and in which the fourth abnormality determining means includes a means determining whether or not detection of the detector is abnormal based on the detected value of the vehicular state variable sensor and that of the detector.

When the vehicle is manipulated by the driver, in general, the force acting on a tire is affected by the manipulation, and constant relation between an actual value of the state variable of the manipulation and that of the force acting on a tire may be established. If both detection of the manipulation state variable sensor and that of the detector are assumed to be normal in this case, the same relation can be established between both the detected values.

Furthermore, if both the detected value of the detector and that of the manipulation state variable sensor having the constant relation with the detected value of the detector are utilized as long as the detector and the manipulation state variable sensor are normal, the amount of information, to be referred to for determining whether or not the detector is abnormal, effectively increases compared with the case where only the detected value of the detector is utilized.

Based on the information above, in the device relating to the present section, whether or not detection of the detector is abnormal is determined based on the detected value of the manipulation state variable sensor and that of the detector.

(26) Another aspect of the present invention relates to the device for detecting force acting on a tire described in the section (22) or (25), with which the vehicle includes a brake actuated for inhibiting rotation of at least one of the plural vehicle wheels, in which the manipulation state variable sensor includes a brake action-related quantity obtaining device obtaining a quantity relating to action of the brake, in which the detector includes a braking torque detecting device detecting a braking torque, generated in a vehicle wheel corresponding to the actuated brake, as a physical quantity relating to the force acting on a tire, and in which the fourth abnormality determining means includes a braking torque detecting device abnormality determining means determining whether or not detection of the braking torque detecting device is abnormal based on the brake action-related quantity obtained by the brake action-related quantity obtaining device and the braking torque detected by the braking torque detecting device.

Meanwhile, the same fact explained in the section (22) or (25) applies to the brake action-related quantity and the braking torque of a vehicle wheel.

Based on the information above, in the device relating to the present section, whether or not detection of the braking torque detecting device is abnormal is determined based on the brake action-related quantity obtained by the brake action-related quantity obtaining device and the braking torque detected by the braking torque detecting device.

(27) Another aspect of the present invention relates to the device for detecting force acting on a tire described in the section (26), in which the braking torque detecting device abnormality determining means includes a means determining whether or not detection of the braking torque detecting device is abnormal based on relation between the brake action-related quantity obtained by the brake action-related quantity obtaining device and the braking torque detected by the braking torque detecting device.

In the device relating to the present section, action effects common to those in a section (72) later explained can be realized according to a principle common to that of a device relating to the same section.

(28) Another aspect of the present invention relates to the device for detecting force acting on a tire described in the section (26) or (27), in which the brake includes a friction brake inhibiting rotation of a corresponding vehicle wheel by pushing a friction engaging member against a brake rotating body rotating with the corresponding vehicle wheel, in which the brake action-related quantity obtaining device includes a pushing force-related quantity obtaining device obtaining a pushing force-related quantity relating to pushing force of the friction engaging member against the brake rotating body, and in which the braking torque detecting device abnormality determining means includes a means determining whether or not detection of the braking torque detecting device is abnormal with the use of the pushing force-related quantity obtained by the pushing force-related quantity obtaining device as the brake action-related quantity.

In the device relating to the present section, action effects common to those in a section (78) later explained can be realized according to a principle common to that of a device relating to the same section.

(29) Another aspect of the present invention relates to the device for detecting force acting on a tire described in the section (26) or (28), in which the brake includes a pushing device pushing the friction engaging member against the brake rotating body through actuation of the brake based on manipulation of a brake manipulating member by the driver, in which the brake action-related quantity obtaining device includes a manipulation state variable detecting device detecting a manipulation state variable indicating a manipulation state of the brake manipulating member by the driver, and in which the braking torque detecting device abnormality determining means includes a means determining whether or not detection of the braking torque detecting device is abnormal with the use of the manipulation state variable detected by the manipulation state variable detecting device as the brake action-related quantity.

In the device relating to the present section, action effects common to those in a section (79) later explained can be realized according to a principle common to that of a device relating to the same section.

(30) Another aspect of the present invention relates to the device for detecting force acting on a tire described in the section (26) or (29), with which the vehicle includes a pushing force control device controlling the pushing force of the friction engaging member against the brake rotating body, in which the brake includes a pushing device pushing the friction engaging member against the brake rotating body through actuation of the brake based on controls of the pushing force control device regardless of manipulation of the brake manipulating member by the driver, and in which the braking torque detecting device abnormality determining means includes a means determining whether or not detection of the braking torque detecting device is abnormal with the use of a control-related quantity relating to the controls of the pushing force control device as the brake action-related quantity.

In the device relating to the present section, action effects common to those in a section (80) later explained can be realized according to a principle common to that of a device relating to the same section.

(31) Another aspect of the present invention relates to the device for detecting force acting on a tire described in the section (26) or (30), in which the brake action-related quantity obtaining device includes an acceleration state detecting device detecting an acceleration state of the vehicle, and in which the braking torque detecting device abnormality determining means includes a means determining whether or not detection of the braking torque detecting device is abnormal with the use of an acceleration state variable indicating the acceleration state detected by the acceleration state detecting device as the brake action-related quantity.

In the device relating to the present section, action effects common to those in a section (81) later explained can be realized according to a principle common to that of a device relating to the same section.

(32) Another aspect of the present invention relates to the device for detecting force acting on a tire described in the section (26) or (31), with which the vehicle includes a driving torque-related quantity obtaining device obtaining a driving torque-related quantity relating to a driving torque applied to at least one of the plural vehicle wheels, and in which the braking torque detecting device abnormality determining means includes a means determining whether or not detection of the braking torque detecting device is abnormal in consideration of the driving torque-related quantity detected by the driving torque-related quantity obtaining device.

In the device relating to the present section, action effects common to those in a section (82) later explained can be realized according to a principle common to that of a device relating to the same section.

(33) Another aspect of the present invention relates to the device for detecting force acting on a tire described in the section (26) or (32), with which the vehicle includes a braking environmental variable detecting device detecting a braking environmental variable indicating an environment under which a particular vehicle wheel out of the plural vehicle wheels are being braked, and in which the braking torque detecting device abnormality determining means includes a means determining whether or not detection of the braking torque detecting device is abnormal based on relation between an obtained value of the brake action-related quantity and the detected value of the braking torque and the braking environmental variable detected by the braking environmental variable detecting device.

In the device relating to the present section, action effects common to those in a section (83) later explained can be realized according to a principle common to that of a device relating to the same section.

(34) Another aspect of the present invention relates to the device for detecting force acting on a tire described in the section (26) or (33), in which the braking torque detecting device abnormality determining means includes a means determining whether or not detection of the braking torque detecting device is abnormal if the brake is acting while the vehicle is traveling straight.

In the device relating to the present section, action effects common to those in a section (84) later explained can be realized according to a principle common to that of a device relating to the same section.

(35) Another aspect of the present invention relates to the device for detecting force acting on a tire described in the section (1) or (34) with the detector provided with respect to all or some of the plural vehicle wheels, in which the determining portion includes a means determining whether or not detection of at least one of the plural detectors is abnormal based on relation among detected values of the force acting on a tire with respect to the plural detectors.

If all of plural detectors provided to plural vehicle wheels respectively are normal, constant relation among plural detected values of these detectors can be established. However, if at least one of the plural detectors is abnormal, the same relation may not be established among the plural detected values.

Based on the information above, in the device relating to the present section, whether or not detection of at least one of plural detectors is abnormal based on the relation of detected values of the force acting on a tire among the plural detectors.

(36) Another aspect of the present invention relates to the device for detecting force acting on a tire described in the section (1) or (35), in which the determining portion includes a means determining whether or not detection of the detector is abnormal provided that a set condition, which has been so set as to be met in order to change the vehicular state, is met.

If the vehicular state has changed as a result of a change in manipulation state caused by the driver or of automatic actuation of vehicle control equipment including the brake, an actual value of the force acting on a tire also changes. Accordingly, if the detected value of the detector has not changed even though the vehicular state has changed, it can be estimated that the detector is abnormal.

Based on the information above, in the device relating to the present section, whether or not detection of the detector is abnormal is determined provided that the set condition, which is so set as to be met in order to change the vehicular state, is met.

(37) Another aspect of the present invention relates to the device for detecting force acting on a tire described in the section (36), in which the set condition is a condition which is so set as to be met if the driver has changed the manipulation state of at least one of the following members: 1) an accelerator manipulating member, 2) the brake manipulating member, 3) a steering manipulating member, 4) a changing gear member manipulated by the driver in order to change gears of a driving force transmitting device of the vehicle, and 5) a direction switching member manipulated by the driver in order to change a traveling direction of the vehicle from forward to backward and vice versa.

(38) Another aspect of the present invention relates to the device for detecting force acting on a tire described in the section (1) or (3), in which the detector is provided in a position close to a corresponding vehicle wheel where the force acting on a tire to be detected is dynamically transmitted.

(39) Another aspect of the present invention relates to the device for detecting force acting on a tire described in the section (1) or (38), in which the force acting on a tire includes tire ground force acting on a tire at a contact point where the tire is in contact with a road surface.

(40) Another aspect of the present invention relates to the device for detecting force acting on a tire described in the section (1) or (39), in which the detector has a function of detecting plural types of forces acting on a corresponding tire as the force acting on a tire, and in which the determining portion includes a means determining whether or not detection of force acting on a tire by the detector is abnormal based on relation among the plural types of forces detected by the detector.

If the same detector detects plural types of forces acting on a corresponding tire as the force acting on a tire, constant relation among the plural types of forces may be established. In this case, if the detector is normal, the constant relation among the plural types of force detected by the detector is established. On the other hand, if the detector is abnormal, the constant relation among the plural types of force detected by the detector is not established.

Based on the information above, in the device relating to the present section, whether or not detection of the force acting on tire is abnormal based on the relation among the plural types of forces detected by the detector.

(41) Another aspect of the present invention relates to the device for detecting force acting on a tire described in the section (1) or (40), in which the determining portion is actuated at least either while the vehicle is moving or while the vehicle is at a stop.

(42) Another aspect of the present invention relates to the device for detecting force acting on a tire described in the section (41), in which the determining portion includes a means determining whether or not detection of the force acting on a tire by the detector is abnormal based on the detected value of the detector and according to different rules depending on whether the vehicle is moving or it is at a stop.

(43) Another aspect of the present invention relates to the device for detecting force acting on a tire described in the section (41) or (42), in which the determining portion includes a means determining whether or not detection of the force acting on a tire by the detector is abnormal provided that an abnormality determination permitting condition, preset with respect to a traveling state of the vehicle when at least the vehicle is moving, is met.

According to this device, when it is not appropriate to determine whether or not detection of the detector is abnormal, it is possible not to perform the determination. Therefore, in the device, it is easy to prevent reliability of results of the determination from deteriorating by, for example, restricting and optimizing the traveling state in which the determination is performed.

(44) Another aspect of the present invention relates to the device for detecting force acting on a tire described in the section (1) or (43), in which the detector has a function of detecting at least either one of the following forces: 1) at least one of the following forces; longitudinal force acting on the tire in the longitudinal direction, lateral force acting on the tire in the lateral direction, and vertical force acting on the tire in the vertical direction, 2) at least one of resultant forces of any two of the above-mentioned three forces.

(45) Another aspect of the present invention relates to the device for detecting force acting on a tire described in the section (44), in which the detector has a function of detecting the longitudinal force, the lateral force, and the vertical force as the force acting on a tire respectively.

(46) Another aspect of the present invention relates to the device for detecting force acting on a tire described in the section (45), in which the determining portion includes a means determining whether or not detection of the detector is abnormal based on dynamic relation among the longitudinal force, the lateral force, and the vertical force which have been detected by the detector virtually at the same time.

(47) Another aspect of the present invention relates to the device for detecting force acting on a tire described in the section (46), in which the means includes a means determining that detection of the detector is abnormal if set relation, which is so preset as to be met if horizontal force as resultant force of the longitudinal force and the lateral force and the vertical force with respect to a tire corresponding to the detector share the same circle of friction, and the dynamic relation do not virtually correspond to each other.

With respect to the same tire, as it is well known, relation indicated by a circle of friction is established among resultant force of longitudinal force and lateral force, vertical force, and the friction coefficient between the tire and the road surface.

If the friction coefficient between the tire and the road surface is identified through assumption, detection, or estimation according to the relation above, resultant force, theoretically established under the conditions above, can be estimated through calculation from the identified friction coefficient and the vertical force.

Accordingly, whether detected values of longitudinal force, lateral force, and vertical force are all normal or at least one of them is abnormal can be determined by giving attention to the relation indicated by the circle of friction. Based on the information above, the device relating to the preset section has been provided.

(48) Another aspect of the present invention relates to the device for detecting force acting on a tire described in the section (1) or (47), besides which the vehicle includes the vehicular state variable sensor detecting the state variable of the vehicle, in which the determining portion includes a fifth abnormality determining means obtaining the same physical quantity as a physical quantity detected by the detector as a comparison physical quantity and determining that detection of the detector is abnormal if the obtained comparison physical quantity and the detected value of the detector do not conform to each other.

According to this device, whether or not detection of the detector is abnormal can be determined with the use of the vehicular state variable sensor in the vehicle.

Therefore, in the device, if a vehicular state variable sensor with high reliability is present in the vehicle, for example, whether or not detection of the detector is abnormal can be determined with the use of the vehicular state variable sensor, enabling an easy improvement of accuracy of the determination.

(49) Another aspect of the present invention relates to the device for detecting force acting on a tire described in the section (48) with the detector provided with respect to a front wheel and a rear wheel of the plural vehicle wheels, in which each detector has a function of detecting longitudinal force acting on the tire in the longitudinal direction as the force acting on a tire, in which the vehicular state variable sensor has a function of detecting a physical quantity relating to a moving distance of vertical force between the front wheel and the rear wheel which acts on the tire in the vertical direction as a related physical quantity, and in which the fifth abnormality determining means includes a means estimating the comparison physical quantity based on the detected related physical quantity, and a height of gravitational center and the length of a wheel base of the vehicle.

It is possible to estimate longitudinal force acting on a tire based on the physical quantity relating to the moving distance of vertical force between a front wheel and a rear wheel which acts on a tire in the vertical direction and based on a height of gravitational center and the length of a wheel base of a vehicle. By comparing the estimated value and a detected value of the detector, whether or not detection of the detector is abnormal can be determined. Based on the information above, the device relating to the present section has been provided.

(50) Another aspect of the present invention relates to the device for detecting force acting on a tire described in the section (48) or (49) with the detector provided with respect to a right wheel and a left wheel of the plural vehicle wheels, in which each detector has a function of detecting lateral force acting on the tire in the lateral direction as the force acting on a tire, in which the vehicular state variable sensor has a function of detecting a physical quantity relating to a moving distance of vertical force between the right wheel and the left wheel which acts on the tire in the vertical direction as the related physical quantity, and in which the fifth abnormality determining means includes a means esti-mating the comparison physical quantity based on the detected related physical quantity, and the height of gravitational center and the length of a tread of the vehicle.

It is possible to estimate lateral force acting on a tire based on the physical quantity relating to the moving distance of vertical force between a right wheel and a left wheel which acts on a tire in the vertical direction and based on a height of gravitational center and the length of a wheel base of a vehicle. By comparing the estimated value and a detected value of the detector, whether or not detection of the detector is abnormal can be determined. Based on the information above, the device relating to the present section has been provided.

(51) Another aspect of the present invention relates to the device for detecting force acting on a tire described in the section (48) or (50), in which the detector has a function of detecting lateral force acting on the tire in the lateral direction and vertical force acting on the tire in the vertical direction as the force acting on a tire respectively, in which the vehicular state variable sensor has a function of detecting a physical quantity relating to a steering angle of the vehicle and a physical quantity relating to a rotating speed of the vehicle wheel as the related physical quantity respectively, and in which the fifth abnormality determining means includes a means estimating the comparison physical quantity to be compared with the lateral force detected by the detector based on the vertical force detected by the detector and the related physical quantities detected by the vehicular state variable sensor.

It is possible to estimate lateral force acting on a tire based on vertical force acting on the tire, the physical quantity relating to the steering angle of a vehicle, and the physical quantity relating to the rotating speed of a vehicle wheel. For example, if the vertical force and the rotating speed of the vehicle wheel are equal to reference values thereof respectively, that is, if they are in a reference state, the steering angle and the lateral force correspond to each other one-on-one. On the other hand, if at least either the vertical force or the rotating speed of the vehicle wheel is not equal to each of the reference values, corresponding relation between the steering angle and the lateral force can be obtained by correcting the corresponding relation in the reference state with the vertical force and the rotating speed of the vehicle wheel since cornering power of the tire depends on the rotating speed of the vehicle wheel and the vertical force.

By comparing the estimated value obtained as explained above and a detected value of the lateral force of the detector, whether or not detection of the detector is abnormal can be determined. Based on the information above, the device relating to the present section has been provided.

(52) Another aspect of the present invention relates to the device for detecting force acting on a tire described in the section (48) or (51) with the detector provided with respect to a front wheel and a rear wheel of the plural vehicle wheels, in which each detector has a function of detecting vertical force acting on the tire in the vertical direction and longitudinal force acting on the tire in the longitudinal direction as the force acting on a tire respectively, in which the vehicular state variable sensor has a function of detecting a longitudinal acceleration acting on the vehicle in the longitudinal direction, and in which the fifth abnormality determining means includes a means estimating the comparison physical quantity to be compared with the vertical force detected by the detector from the quotient of a total value of the longitudinal force detected by the detector with respect to the front and rear wheels divided by the longitudinal acceleration detected by the vehicular state variable sensor.

Longitudinal force is equivalent to the friction force between a tire and a road surface, and longitudinal acceleration is equivalent to the friction coefficient between the tire and the road surface. Accordingly, the vertical force acting on the tire can be obtained from the quotient of the longitudinal force divided by the longitudinal acceleration.

Based on the information above, in the device relating to the present section, the comparison physical quantity to be compared with the vertical force detected by the detector is estimated from the quotient of the total value of the longitudinal force detected by the detector with respect to the front and rear wheels divided by the longitudinal acceleration detected by the vehicular state variable sensor.

(53) Another aspect of the present invention relates to the device for detecting force acting on a tire described in the section (48) or (51) with the detector provided with respect to a right wheel and a left wheel of the plural vehicle wheels, in which each detector has a function of detecting vertical force acting on the tire in the vertical direction and lateral force acting on the tire in the lateral direction as the force acting on a tire respectively, in which the vehicular state variable sensor has a function of detecting a lateral acceleration acting on the vehicle in the lateral direction, and in which the fifth abnormality determining means includes a means estimating the comparison physical quantity to be compared with the vertical force detected by the detector from the quotient of a total value of the lateral force detected by the detector with respect to the right and left wheels divided by the lateral acceleration detected by the vehicular state variable sensor.

As it can be easily estimated from the explanation of longitudinal force, lateral force is equivalent to the friction force between a tire and a road surface, and lateral acceleration is equivalent to the friction coefficient between the tire and the road surface. Accordingly, the vertical force acting on the tire can be obtained from the quotient of the lateral force divided by the lateral acceleration.

Based on the information above, in the device relating to the present section, the comparison physical quantity to be compared with the vertical force detected by the detector is estimated from the quotient of the total value of the lateral force detected by the detector with respect to the right and left wheels divided by the lateral acceleration detected by the vehicular state variable sensor.

(54) Another aspect of the present invention relates to the device for detecting force acting on a tire described in the section (1) or (53), in which the zero-point correcting portion includes a setting means setting the zero point of the detector to a position indicating that the force acting on a tire is 0 in a reference vehicular state where an actual value of the force acting on a tire is expected to be 0.

According to this device, the zero point of the detector is so corrected as to be in the position indicating that the force acting on a tire is 0 in the reference vehicular state where the actual value of the force acting on a tire is expected to be 0.

(55) Another aspect of the present invention relates to the device for detecting force acting on a tire described in the section (54), in which the detector has a function of detecting horizontal force acting on the tire in the horizontal direction as the force acting on a tire, and in which the setting means includes a reference vehicular state determining means determining that the vehicle is in the reference vehicular state if the vehicle is at a stop with horizontal posture.

If the vehicle is at a stop with horizontal posture, horizontal force (at least either longitudinal force or lateral force) does not act on a tire from the vehicle, and horizontal force does not act on the tire by the gravity either.

Accordingly, in the device relating to the present section, the zero point of the detector is set when the vehicle is at a stop with horizontal posture.

(56) Another aspect of the present invention relates to the device for detecting force acting on a tire described in the section (55) with the detector provided with respect to a front wheel and a rear wheel of the plural vehicle wheels, in which each detector has a function of detecting vertical force acting on the tire in the vertical direction as the force acting on a tire, and in which the reference vehicular state determining means includes a means determining whether or not the vehicle is in the reference vehicular state where posture of the vehicle is horizontal with respect to the longitudinal direction thereof based on relative relation between the vertical forces detected with respect to the front and rear vehicle wheels.

The device in the section (55) can be so embodied as to determine the reference vehicular state where posture of the vehicle is horizontal with respect to the longitudinal direction thereof by not utilizing the detector but other sensors of the vehicle.

In contrast, according to the device relating to the present section, the reference vehicular state can be determined with the use of the detector, eliminating the dependence on other sensors.

(57) Another aspect of the present invention relates to the device for detecting force acting on a tire described in the section (55) or (56) with the detector provided with respect to a right wheel and a left wheel of the plural vehicle wheels, in which each detector has a function of detecting vertical force acting on the tire in the vertical direction as the force acting on a tire, and in which the reference vehicular state determining means includes a means determining whether or not the vehicle is in the reference vehicular state where posture of the vehicle is horizontal with respect to the lateral direction thereof based on relative relation between the vertical forces detected with respect to the right and left vehicle wheels.

The device in the section (55) or (56) can be so embodied as to determine the reference vehicular state where posture of the vehicle is horizontal with respect to the lateral direction thereof by not utilizing the detector but other sensors of the vehicle.

In contrast, according to the device relating to the present section, the reference vehicular state can be determined with the use of the detector, eliminating the dependence on other sensors.

(58) Another aspect of the present invention relates to the device for detecting force acting on a tire described in the section (54) or (57), with which the vehicle includes plural brakes provided to the plural vehicle wheels respectively and actuated for inhibiting rotation of the plural vehicle wheels individually, in which each of the detectors is provided to each of the plural vehicle wheels and has a function of detecting braking force acting on the tire as the force acting on a tire, and in which the setting means includes a means setting the zero points of some of the plural detectors in order when the vehicle is at a stop and causing a state where braking force does not act on a vehicle wheel provided with a particular detector subject to zero-point correction as the reference vehicular state by not actuating the brake on the vehicle wheel provided with the particular detector subject to zero-point correction and by actuating the brake on at least one of the other vehicle wheels not subject to zero-point correction at each zero-point correction.

When posture of a vehicle is on a tilt, it is necessary to actuate a brake of the vehicle to stop the vehicle. This causes it impossible to set the zero point of a detector with respect to braking force when the vehicle is at a stop without a specific contrivance.

On the other hand, if zero point correction over some of plural detectors is performed in order, and if the brake is not actuated on a vehicle wheel provided with a particular detector subject to zero-point correction and the brake is actuated on at least one of the other vehicle wheels not subject to zero-point correction at each zero-point correction, it is possible to cause the state where braking force does not act on the vehicle wheel provided with the particular detector subject to zero-point correction as the reference vehicular state regardless of whether or not posture of the vehicle is horizontal, that is, whether or not it is necessary to stop the vehicle with the brake. Based on the information above, the device relating to the present section.

In the present section, "some of plural detectors" means one detector or plural detectors.

(59) Another aspect of the present invention relates to the device for detecting force acting on a tire described in the section (54) or (58), in which the detector has a function of detecting lateral force acting on the tire in the lateral direction as the force acting on a tire, and in which the setting means includes a means setting the zero point when the vehicle is traveling straight.

When a vehicle is traveling straight, lateral force is not generated in a tire, enabling the zero point of a detector to be set to a position indicating that lateral force is 0. Based on the information above, the device relating to the present section has been provided.

In the present section, whether or not the vehicle is traveling straight can be determined with the use of the following detected values: a detected value of a yaw rate sensor detecting a yaw rate of the vehicle, a detected value of a lateral acceleration sensor detecting lateral acceleration of the vehicle, a detected value of a sensor detecting a steering angle of a steering wheel manipulated by the driver or a physical quantity relating thereto (e.g., steering torque), and so on.

(60) Another aspect of the present invention relates to the device for detecting force acting on a tire described in the section (54) or (59), in which the detector has a first portion detecting driving force not braking force and a second portion detecting braking force not driving force, in which the two portions are provided independently to each other to detect driving force and braking force acting on the tire as the force acting on a tire, and in which the setting means includes means setting the zero point with respect to the first portion when the vehicle is traveling and braking force is being generated in a vehicle wheel provided with the detector.

In general, driving force and braking force do not act on the same tire simultaneously. Therefore, to set the zero point of a detector with respect to driving force, it is preferable that the zero point be set with a state where braking force is acting on the same tire detected. Based on the information above, the device relating to the present section has been provided.

In the present section, a state where braking force is acting on a vehicle wheel can be determined with the use of the following detected values: a detected value of the longitudinal acceleration sensor detecting longitudinal acceleration of the vehicle, a detected value of a sensor detecting longitudinal force acting on a tire, a detected value of a sensor detecting actuating force of the brake inhibiting rotation of a vehicle wheel or a physical quantity relating thereto (e.g., hydraulic pressure of a hydraulic cylinder of the brake), and so on.

(61) Another aspect of the invention relates to a device for detecting force acting on a tire, which is mounted in a vehicle in which each vehicle wheel is configured by having plural vehicle wheels and by mounting the tire on the periphery of a disc wheel. The device includes at least one detector for detecting vertical force and horizontal force acting the tire as the force acting on a tire, which is provided on at least one of the plural vehicle wheels, and a first abnormality determining portion determining whether or not detection of vertical force by the detector is abnormal based on vertical force rather than horizontal force detected by the detector.

As it is well known, motion of a vehicle is realized by friction force between a tire and a road surface. On the other hand, force acting on the tire can be classified into vertical force and horizontal force. Vertical force is a physical quantity not directly relating to friction force, while horizontal force is a physical quantity directly relating to that. In addition, friction force depends on a friction coefficient between the tire and the road surface and vertical force.

Therefore, vertical force depends on neither horizontal force nor the friction coefficient, while horizontal force depends on both the friction coefficient and vertical force.

Accordingly, a determination of whether or not detection of vertical force by the detector is abnormal strongly tends to be performed by not referring to a detected value of horizontal force of the detector, while a determination of whether or not detection of horizontal force by the detector is abnormal strongly tends to be performed by referring to a detected value of vertical force of the detector.

Based on the information above, in the device relating to the present section, whether or not detection of vertical force by the detector is abnormal is determined based on vertical force not horizontal force detected by the detector.

Consequently, according to the device relating to the present section, whether or not detection of vertical force by the detector is abnormal can be determined regardless of whether or not detection of horizontal force by the detector is abnormal.

(62) Another aspect of the present invention relates to the device for detecting force acting on a tire described in the section (61), which includes a second abnormality determining portion determining whether or not detection of horizontal force by the detector is abnormal based on vertical force and horizontal force detected by the detector if detection of vertical force by the detector has been determined not to be abnormal by the first abnormality determining portion.

According to this device, if detection of vertical force by the detector has been determined not to be abnormal, whether or not detection of horizontal force by the detector is abnormal is determined based on vertical force and horizontal force detected by the detector.

(63) Another aspect of the present invention relates to the device for detecting force acting on a tire described in the section (62), in which the second abnormality determining portion includes means determining whether or not detection of horizontal force by the detector is abnormal with the use of the quotient of horizontal force detected by the detector divided by vertical force detected by the same detector.

In this device, whether or not detection of horizontal force by the detector is abnormal can be determined according to a principle similar to that of the device in the section (15).

(64) Another aspect of the present invention relates to the device for detecting force acting on a tire described in the section (63), with which the vehicle includes an acceleration sensor detecting acceleration acting on the vehicle in the same direction as the horizontal force, in which the detector is provided with respect to all or some of the plural vehicle wheels, and in which the determining means includes a means determining that detection of horizontal force by at least one of plural detectors is abnormal if the quotient of a total value of plural horizontal forces detected by the plural detectors divided by a total value of plural vertical forces detected by the plural detectors and acceleration detected by the acceleration sensor do not conform to each other.

In this device, whether or not detection of horizontal force by the detector is abnormal can be determined according to a principle similar to that of the device in the section (18).

(65) Another aspect of the invention relates to a device for detecting force acting on a tire, which is mounted in a vehicle in which a vehicular state variable sensor detecting a state variable of the vehicle is provided and each vehicle wheel is configured by having plural vehicle wheels and by mounting the tire on the periphery of a disc wheel. The device includes at least one detector for detecting force acting on the tire, which is provided on at least one of the plural vehicle wheels, and at least either a sensor determining portion determining a detection abnormality of the vehicular state variable sensor with the use of a detected value of the detector or a sensor zero-point correcting portion correcting a zero point of the vehicular state variable sensor with the use of the detected value of the detector.

According to this device, if the vehicle includes the device for detecting force acting on a tire and a vehicular state variable sensor, at least either a determination of detection abnormality of the vehicular state variable sensor or a correction of the zero point of the vehicular state variable sensor can be performed.

Further, in the device, at least either a determination of detection abnormality or a correction of zero point can be performed with respect to other sensor of the vehicle by utilizing a detected value of the detector as an absolute reference.

Accordingly, in the device, if the vehicle includes plural vehicular state variable sensors, at least either a determination of detection abnormality or a correction of zero point can be performed with respect to the plural vehicular state variable sensors generally not individually with the use of the device common to the plural vehicular state variable sensors.

In the present section, a determination of detection abnormality can be considered in the same manner as that in the section (1).

According to one aspect of this device, whether or not detection of the vehicular state variable sensor is abnormal is determined with comparison of a detected value of the vehicular state variable sensor and that of the detector performed by the sensor determining portion over each vehicle wheel. Further, according to an example of this aspect, the determination above is performed over plural vehicle wheels in order.

(66) Another aspect of the present invention relates to the device for detecting force acting on a tire described in the section (65), in which the vehicular state variable sensor has a function of detecting a physical quantity relating to the force acting on a tire as the vehicular state variable, and in which the sensor zero-point correcting portion includes a setting means setting the zero point of the vehicular state variable sensor in a position indicating that the vehicular state variable is 0 if the force acting on a tire detected by the detector is 0.

According to this device, the zero point of the vehicular state variable sensor is so corrected as to be in the position indicating that the vehicular state variable is 0 if the force acting on a tire detected by the detector is 0.

(67) Another aspect of the present invention relates to the device for detecting force acting on a tire described in the section (65) or (66), in which the vehicular state variable sensor has a function of detecting a physical quantity relating to the force acting on a tire as the vehicular state variable, and in which the sensor zero-point correcting portion includes a setting means setting the zero point of the vehicular state variable sensor based on an error between an ideal value of the physical quantity detected by the vehicular state variable sensor and the force acting on a tire detected by the detector if the force acting on a tire is equal to a reference value which is not 0.

According to this device, the zero point of the vehicular state variable sensor can be corrected if the force acting on a tire detected by the detector is not 0.

More specifically, the zero point of the vehicular state variable sensor is corrected based on an error between the ideal value of the physical quantity detected by the vehicular state variable sensor and the force acting on a tire detected by the detector if the force acting on a tire is equal to the reference value which is not 0.

(68) Another aspect of the present invention relates to the device for detecting force acting on a tire described in the section (65) or (67), which includes at least either the determining portion or the zero-point correcting portion described in the section (1) or (64).

According to this device, at least either a determination of detection abnormality or a correction of zero point can be performed with respect to the vehicular state variable sensor with the use of the device for detecting force acting on a tire whose detection performance has been normalized by at least either the determining portion or the zero-point correcting portion described in the section (1) or (64).

(69) Another aspect of the present invention relates to the device for detecting force acting on a tire described in the section (68), in which at least either the determining portion or the zero-point correcting portion is actuated without utilizing the vehicular state variable sensor.

(70) Another aspect of the present invention relates to the device for detecting force acting on a tire described in the section (1) or (69), with which the vehicle includes a vehicle body with a retaining body over each vehicle wheel for retaining the vehicle wheel integrally with the disc wheel and for enabling rotation of the vehicle wheel by mounting the disc wheel on the same axis as that of the vehicle wheel, and in which the detector is so provided between the disc wheel and the retaining body as to transmit force between them.

According to this device, the force acting on a tire can be detected without being restricted not only by the disc wheel but by the retaining body.

Accordingly, unlike a device for detecting force acting on a tire with a detector mounted on a vehicle wheel or on an existing member rotating with the vehicle wheel, that is, a direct detection type device, parts necessary for detecting the force acting on a tire can easily be designed with high flexibility with respect to their arrangements, structures, shapes, and so on in the device.

Consequently, detection accuracy of the force acting on a tire can easily be improved according to the device.

Moreover, in the device, versatility of the device in different plural service environments can easily improved by, for example, standardizing parts necessary for detecting the force acting on a tire with respect to their arrangements, structures, shapes, and so on.

Further, in the device, the force acting on a tire is detected at a portion where force is transmitted between the disc wheel and the retaining body.

Therefore, in the device, unlike a device for detecting force acting on a tire with a detector mounted on an existing member being independent from a vehicle wheel and another existing member rotating with the vehicle wheel and receiving force from them without rotating with them, that is, an indirect detection type device, a sufficient amount of information necessary for accurately detecting the force acting on a tire can easily be obtained with accuracy.

Accordingly, in the device, the detection accuracy of the force acting on a tire can easily be improved as well by depending on the information above.

In the present section, "force" includes both axial force meaning force in a narrow sense and rotating force equivalent to moment, that is, torque.

In addition, in the present section, "vehicle wheel" can be considered as a drive vehicle wheel driven by a drive source of the vehicle or a non-driven vehicle wheel not driven by the drive source of the vehicle.

Furthermore, in the present section, "detector" can be so configured at to detect one type of the force acting on a tire or to detect plural types thereof.

According to one aspect of the device relating to the present section, the detector is so mounted on the disc wheel and the retaining body as to be detached therefrom. In addition, the detector can be mounted on a vehicle with no detector mounted, and a detector in another vehicle can be replaced by the detector.

(71) Another aspect of the present invention relates to an abnormality detecting device detecting an abnormality of a braking torque detecting device detecting braking torque generated by action of a brake inhibiting rotation of a vehicle tire, which includes a brake action-related quantity obtaining device obtaining a quantity relating to action of the brake and an abnormality detecting portion detecting an abnormality of the braking torque detecting device based on a brake action-related quantity obtained by the brake action-related quantity obtaining device and braking torque detected by the braking torque detecting device.

According to the abnormality detecting device relating to the present section, an abnormality of the braking torque detecting device is detected based on a brake action-related quantity and a detected value of the braking torque detecting device.

(72) Another aspect of the present invention relates to the abnormality detecting device described in the section (71), in which the abnormality detecting portion detect an abnormality of the braking torque detecting device based on relation between the brake action-related quantity and the detected value of the braking torque detecting device.

Braking torque is generated by action of the brake, so that constant relation between a brake action-related quantity relating to actuation of the brake and braking torque can be established. Accordingly, an abnormality of the braking torque detecting device can be detected based on the relation between the brake action-related quantity and a detected value of braking torque. The abnormality detecting portion can be embodied with an aspect in which the braking torque detecting device is determined to be abnormal if, for example, the relation above does not correspond to predetermined relation (determined uniquely).

If the brake is in action by a friction engaging member being pushed against a brake rotating body, pushing force of the friction engaging member against the brake rotating body can be considered as the brake action-related quantity. In this case, as described later, the brake action-related quantity not only includes pushing force itself but a quantity relating to pushing force. In addition, when the brake acts (actuated to be in action), a vehicle is decelerated, so that deceleration of the vehicle, traveling speed, and so on can considered to be the brake action-related quantity.

As described above, it is conceivable that quantities such as a quantity causing action of the brake and a quantity indicating a result of action of the brake correspond to the brake action-related quantity. Moreover, not only do a vehicle traveling state variable but an estimate value of braking torque correspond to the quantity indicating a result of action of the brake since braking torque is generated as a result of action of the brake.

(73) Another aspect of the present invention relates to the abnormality detecting device described in the section (71) or (72), in which the braking torque detecting device includes an associated rotation force detecting portion detecting associated rotation force generated by action of the brake and a calculation processing portion calculating braking torque based on associated rotation force detected by the associated rotation force detecting portion, and which determines that at least either the associated rotation force detecting portion or the calculation processing portion is abnormal.

The associated rotation force detecting portion may be so embodied as to detect associated rotation force mechanically or as to convert associated rotation force to a physical quantity such as a hydraulic pressure to detect the physical quantity.

Among the aspects for detecting associated rotation force mechanically are: 1) an aspect in which associated rotation force itself (pushing force) applied to a brake body through the friction engaging member is detected, 2) an aspect in which force acting on a suspension arm provided between the vehicle wheel and a vehicle body is detected as strain, and 3) an aspect in which force acting on an anchor bracket is detected as strain.

In contrast, among the aspects for detecting converted associated rotation force as a hydraulic pressure is an aspect in which a hydraulic pressure detecting portion detecting a hydraulic pressure of a hydraulic pressure generating device is used if the braking torque detecting device includes the hydraulic pressure generating device generating a hydraulic pressure corresponding to associated rotation force. Aspects for detecting braking torque based on a hydraulic pressure will be explained in the section (74) or (77).

The calculation processing portion calculates a component of a detected value of the associated rotation force detecting portion in the direction of the tangent line (associated rotation force) to calculate braking torque from the product of the calculated component and a distance from the center of the brake rotating body to a line of action of the component in the direction of the tangent line.

If associated rotation force itself is detected by the associated rotation force detecting portion, braking torque can be calculated with the direct use of a detected value of associated rotation force. Associated rotation force is both friction force between the friction engaging member and the brake rotating body and braking force.

As explained above, braking torque is equal to the product of braking force and an equivalent radius (a distance from the center of the brake rotating body to a point on which the entire friction force is considered to act). Accordingly, hereinafter in the present specification, braking force and braking torque will be considered to be virtually equal to each other, and the abnormality detecting device of the braking torque detecting device will be considered to be that of a braking force detecting device.

(74) Another aspect of the present invention relates to the abnormality detecting device described in the section (71) or (73), in which the braking torque detecting device includes a brake body retaining device for retaining the brake body with a vehicle body side fixing member near the brake rotating body and for enabling movement of the brake body substantially along the direction of the circumference of the brake rotating body, a hydraulic pressure generating device generating a hydraulic pressure based on movement of the brake body, a hydraulic pressure detecting device detecting a hydraulic pressure of the hydraulic pressure generating device, and a braking torque obtaining device obtaining braking torque applied to the vehicle wheel based on a detected hydraulic pressure of the hydraulic pressure detecting device.

Compared with the case where braking torque is detected mechanically, detection accuracy can be improved in the case where the braking torque detecting device is so configured as to detect braking torque based on a hydraulic pressure.

When the friction engaging member is pushed against the brake rotating body that is rotating, friction force is generated between them, causing the friction engaging member to inhibit rotation of the brake rotating body. In addition, associated rotating force acts on the brake body in the same direction as that of rotation of the brake rotating body. This associated rotating force is equal to the friction force between the friction engaging member and the brake rotating body in strength, and the direction thereof is opposite to that of the friction force.

The friction force is equal to the product of pushing force of the friction engaging member against a disc rotor and a friction coefficient μ between them, and is also equal to force in the direction of the tangent line of the brake rotating body (in the direction opposite to that of rotation thereof). Hereinafter, "in the direction of tangent line" is included in "substantially in the direction of circumference" in the present specification.

In the braking torque detecting device in the present section, the brake body is retained by the vehicle body side fixing member to be capable of relative movement substantially in the direction of the circumference of the brake rotating body. Accordingly, the brake body is moved relatively to the vehicle body side fixing member substantially in the direction of the circumference of the brake rotating body by associated rotating force in the direction of rotation of the brake rotating body caused by action of the brake. Based on the movement of the brake body, a hydraulic pressure, which corresponds to associated force, that is, friction force, is generated in the hydraulic pressure generating device.

The vehicle body side fixing member can be embodied, for example, as a component member of a suspension device not rotating with a vehicle wheel, or as a member which is so mounted as to not be capable of rotating relatively to the component member. The component member can be embodied as a steering knuckle when the brake is provided to a front wheel, and as a rear axle housing when the brake is provided to a rear wheel. Furthermore, it is preferable that the vehicle body side fixing member be located in the proximity of the brake rotating body.

(75) Another aspect of the present invention relates to the abnormality detecting device described in the section (74), in which the braking torque detecting device includes a hydraulic pressure generating device retaining device for retaining a body of the hydraulic pressure generating device with the vehicle body side fixing member and for prohibiting relative movement of the body of the hydraulic pressure generating device substantially in the direction of the circumference of the brake rotating body.

The body of the hydraulic pressure generating device is so retained by the vehicle body side fixing member as not to be capable of relative movement in the direction of the circumference, while the brake body is so retained by the vehicle body side fixing member as to be capable of relative movement in the direction of the circumference. Therefore, if the brake body moves relatively in the direction of the circumference, relative positional relation between the brake body and the hydraulic pressure generating device changes, that is, the brake body and the hydraulic pressure generating device come closer to each other or draw apart, causing tensile force or pushing force to be applied to the hydraulic pressure generating device.

In the hydraulic pressure generating device, a hydraulic pressure is corresponding to these tensile force and pushing force is generated. In addition, these tensile force and pushing force are proportional to friction force between the friction engaging member and the brake rotating body. Accordingly, both friction force and braking force can be detected based on a hydraulic pressure of the hydraulic pressure generating device.

Meanwhile, the vehicle body side fixing member, by which the hydraulic pressure generating device is retained, and the one, by which the brake body is retained, may be the same member or may be different ones. In either case, relative positional relation between the brake body and the hydraulic pressure generating device changes as a result of movement of the brake body in the direction of the circumference.

(76) Another aspect of the present invention relates to the abnormality detecting device described in the section (74) or (75), in which the braking torque detecting device is provided between the brake body and the hydraulic pressure generating device and includes a drive transmitting device transmitting driving force generated by movement of the brake body to the hydraulic pressure generating device.

The drive transmitting device transmitting driving can be so embodied as to include a link device between the brake body and the hydraulic pressure generating device.

Among the aspects for linking the brake body and the hydraulic pressure generating device if the hydraulic pressure generating device includes a variable volume chamber and a volume changing member (moving member) changing the volume thereof are: 1) an aspect in which the brake body and the volume changing member are directly linked, and 2) an aspect in which the brake body and the volume changing member are linked via a link member.

No matter which aspect above is adopted, relation of friction between the friction engaging member and the brake rotating body and a hydraulic pressure of the hydraulic pressure generating device (e.g., proportionality constant) is determined depending on structural features of the link device.

For example, if the brake body and the volume changing member are linked with a moving distance ΔL of the brake body and a moving distance ΔM of the volume changing member being equal to each other, force Fp generated by a hydraulic pressure of the variable volume chamber and friction force Fb between the friction engaging member and the brake rotating body become equal to each other. Further, in this case, a rate of the moving distance ΔL of the brake body to the moving distance ΔM of the volume changing member (transmission rate: ΔL/ΔM) and a rate of force Fp generated by a hydraulic pressure of the variable volume chamber to friction force Fb (Fp/Fb) become equal to each other as well.

As described in the part of "detailed description of the preferred embodiments" in this specification, if a hydraulic cylinder as the hydraulic pressure generating device is disposed so that the axis thereof is parallel to the tangent line of the brake rotating body in a position where the friction engaging member is pushed against the brake rotating body, the rates mentioned above become 1.

(77) Another aspect of the present invention relates to the abnormality detecting device described in the section (74) or (76), in which the hydraulic pressure generating device includes the variable volume chamber stored with a working fluid without leakage whose volume changes based on movement of the brake body, and in which the hydraulic pressure generating device detects a hydraulic pressure of the variable volume chamber.

The volume of the variable volume chamber changes based on movement of the brake body in the direction of the circumference. In the variable volume chamber, a hydraulic pressure corresponding to friction force is generated. The hydraulic pressure generating device with the variable volume chamber can be embodied as the hydraulic cylinder.

In the embodiment above, a piston, which has been so fitted as to slide in the hydraulic cylinder without leakage of the working fluid, moves based on movement of the brake body substantially in the direction of the circumference, changing the volume of the variable volume chamber. This causes a hydraulic pressure corresponding to the change to be generated.

Moreover, the hydraulic pressure generating device can be so embodied as to include a bellows. In this embodiment, the bellows expands and contracts based on movement of the brake body, changing the volume in the bellows, which causes a hydraulic pressure corresponding to friction to be generated. Meanwhile, the variable volume chamber may be provided inside of or outside of the bellows.

(78) Another aspect of the present invention relates to the abnormality detecting device described in the section (71) or (77), in which the brake is a friction brake inhibiting rotation of the vehicle wheel by pushing the friction engaging member against the brake rotating body, in which the brake action-related quantity obtaining device includes a pushing force-related quantity obtaining device obtaining a pushing force-related quantity relating to pushing force against the brake rotating body of the friction engaging member, and in which the abnormality detecting portion includes a pushing force-based abnormality detecting portion detecting an abnormality of the braking torque detecting device based on the pushing force-related quantity obtained by the pushing force-related quantity obtaining device as the brake action-related quantity.

The brake is actuated by pushing force. This pushing force, as described later, may be applied as a result of manipulation of a brake manipulating member by a driver, or it may be applied without the brake manipulating member being manipulated. Furthermore, pushing force corresponding to a manipulated variable of the brake manipulating member by the driver may be applied. Moreover, it may be applied based on a traveling state or a traveling environment of the vehicle regardless the manipulated variable in controls such as antilock controls, traction controls, vehicle stability controls, and cruise controls.

In any cases above, predetermined relation between the pushing force-related quantity relating to pushing force and braking torque can be established. In addition, not only do pushing force but a physical quantity from which pushing force can be estimated, force in proportion to pushing force, and so on correspond to the pushing force-related quantity.

The brake can be embodied as a hydraulic brake including a hydraulic pushing device with which the friction engaging member is pushed against the brake rotating body by a hydraulic pressure, or as an electric brake including an electric actuator as an electric pushing device.

If the brake is the hydraulic brake, pushing force can be expressed as a hydraulic pressure of a brake cylinder as the pushing device. A hydraulic pressure of the brake cylinder, that of a device connected to the brake cylinder or a fluid channel, and so on correspond to the pushing force-related quantity. On the other hand, if the brake acts through transmission of a hydraulic pressure of a master cylinder as a result of connecting the master cylinder to the brake cylinder, a hydraulic pressure of the master cylinder and brake manipulating force correspond to the pushing force-related quantity.

If a hydraulic pressure of the brake cylinder is controlled by a hydraulic pressure control device, the pushing force-related quantity can be obtained based on a controlled variable of the hydraulic pressure control device. For example, if a hydraulic pressure of the brake cylinder is so controlled by the hydraulic pressure control device as to correspond to a manipulated state variable of the brake manipulating member with the brake cylinder shut off from the master cylinder, the controlled variable itself can be considered to be the pushing force-related quantity.

Further, if a hydraulic pressure of the brake cylinder is so controlled by the hydraulic pressure control device as to be higher than a hydraulic pressure corresponding to brake manipulating force caused by the driver (if assisting force is added by the hydraulic pressure control device), the hydraulic pressure of the brake cylinder can be obtained based on brake manipulating force by the driver and the controlled variable of the hydraulic pressure control device, that is, the pushing force-related quantity can be obtained based on a brake manipulation state variable and the controlled variable.

Moreover, if the brake is the electric brake, the pushing force-related quantity can be obtained as in the case where a hydraulic pressure of the brake cylinder is controlled by the hydraulic pressure control device. Furthermore, is this case, pushing force can be expressed by supply current to an electric actuator.

(79) Another aspect of the present invention relates to the abnormality detecting device described in the section (71) or (78), in which the brake includes the pushing device actuated based on manipulation of the brake manipulating member by the driver in order to push the friction engaging member against the brake rotating body, in which the brake action-related quantity obtaining device includes a manipulation state variable detecting device detecting a manipulation state variable indicating a state of manipulation of the brake manipulating member by the driver, and in which the abnormality detecting portion includes a manipulation state-based abnormality detecting portion detecting an abnormality of the braking torque detecting device based on a manipulation state variable obtained by the manipulation state variable detecting device as the brake action-related quantity.

For example, if the pushing device of the brake includes an actuating device linked to the brake manipulating member or another actuating device actuated through transmission of manipulating force of the brake manipulating member, or if pushing force is so controlled by a pushing force control device as to correspond to manipulation force of the brake manipulating member or a manipulated stroke, the brake acts as a result of actuation thereof based on manipulation of the brake manipulating member by the driver.

For example, in a parking brake, a cable is pulled by manipulation of a parking brake manipulating member such as a parking lever, pushing the friction engaging member against the brake rotating body.

Further, if the brake is actuated by a hydraulic pressure of the brake cylinder, a hydraulic pressure is generated in the master cylinder by manipulation of the brake manipulating member with the brake cylinder connected to the master cylinder. Then the hydraulic pressure is transmitted to the brake cylinder to move the piston forward, pushing the friction engaging member against the brake rotating body.

Furthermore, an actual value of pushing force may be so controlled by the pushing force control device as to come close to a target value thereof determined based on manipulation force of the brake manipulating member and a manipulated stroke both of which have been detected. Also in this case, pushing force corresponds to a brake manipulation state variable by the driver.

To a brake manipulation state variable, manipulation force of the brake manipulating member and a manipulated stroke correspond. However, predetermined strength of pushing force may be generated when the parking brake manipulating member is being manipulated. In this case, a variable indicating whether or not the parking brake manipulating member is being manipulated (e.g., 0 or 1) also correspond to a brake manipulation state variable because, though in rare cases, the parking brake manipulating member is manipulated.

Meanwhile, a manipulating member of a service brake and the parking brake manipulating member correspond to the brake manipulating member. Further, a manipulated variable and manipulation force of these members can be considered to be a manipulation state variable.

(80) Another aspect of the present invention relates to the abnormality detecting device described in the section (71) or (79), in which the brake includes the pushing device actuated based on controls by the pushing force control device regardless of manipulation of the brake manipulating member by the driver, and in which the abnormality detecting portion includes a controlled variable-based abnormality detecting portion detecting an abnormality of the braking torque detecting device based on a control-related variable relating to the controls by the pushing force control device as the brake action-related quantity.

The brake in the present section acts through the controls by the pushing force control device to generate braking torque corresponding to a controlled variable. For example, if actual pushing force or braking torque is so controlled by the pushing force control device as to come close to a target value, a controlled variable is so determined as to correspond to the target value. Therefore, the controlled variable and the target value can be considered to be the brake action-related quantity.

The pushing force control device controls pushing force regardless of whether or not the brake manipulating member is being manipulated by the driver. Instead, the device controls pushing force based on a traveling state of the vehicle or an environment which the vehicle is in. One example of this is a cruise control device in which the pushing force control device controls pushing force so that relative positional relation between the vehicle and a preceding vehicle is maintained to predetermined relation.

In this cruise control device, pushing force is controlled according to the relative positional relation if a distance between the vehicle and the preceding vehicle is smaller than a set distance, or if it shows a tendency to decrease stronger than a set tendency.

(81) Another aspect of the present invention relates to the abnormality detecting device described in the section (71) or (80), in which the brake action-related quantity obtaining device includes an acceleration state detecting device detecting an acceleration state of the vehicle with the abnormality detecting device, and in which the abnormality detecting portion includes an acceleration state correspondence abnormality detecting portion detecting an abnormality of the braking torque detecting device based on an acceleration state variable indicating an acceleration state of the vehicle detected by the acceleration state detecting device as the brake action-related quantity.

When the brake acts, the vehicle is decelerated, so that, for example, deceleration of the vehicle can be considered to be the brake action-related quantity.

(82) Another aspect of the present invention relates to the abnormality detecting device described in the section (71) or (81), in which the abnormality detecting device includes a driving torque-related quantity obtaining device obtaining a driving torque-related quantity relating to driving torque applied to the vehicle wheel, and in which the abnormality detecting portion includes a driving torque-considered abnormality detecting portion detecting an abnormality of the braking torque detecting device in consideration of a driving torque-related quantity obtained by the driving torque-related quantity obtaining device.

When driving torque is applied to the vehicle including the vehicle wheel, relation between the brake action-related quantity and a detected value of the braking torque detecting device may change. Accordingly, it is preferable that driving torque be considered to detect an abnormality of the braking torque detecting device.

If the brake acts with the vehicle traveling on a flat road surface without manipulation of an accelerator pedal by the driver, braking torque corresponding to pushing force is generated as long as the vehicle wheel does not slip on the road surface excessively. Then the vehicle is decelerated at deceleration corresponding to the braking torque. Braking torque detected by the braking torque detecting device corresponds to pushing force.

In contrast, if the brake acts with the vehicle traveling on an inclined road surface or with driving torque of a drive source applied to the vehicle without manipulation of the accelerator pedal by the driver (e.g., during the cruise controls), additional driving torque not depending on manipulation of the accelerator pedal is applied to the vehicle instead of basic driving torque depending on manipulation of the accelerator pedal.

More specifically, driving torque based on the gravity (apparent driving torque) is applied to the vehicle in the first case, and driving torque from the drive source not depending on manipulation of the accelerator pedal (automatic driving torque) is applied to the vehicle in the latter case.

In any cases above, braking torque detected by the braking torque detecting device corresponds to pushing force as long as the vehicle wheel does not slip on the road surface excessively. However, deceleration of the vehicle does not correspond to pushing force. Hereinafter, braking torque corresponding to deceleration of the vehicle will be referred to effective braking torque when it needs to be distinguished from braking torque corresponding to pushing force.

As explained above, when driving torque is applied to the vehicle, relation between pushing force and a detected value of braking torque does not change while relation between deceleration of the vehicle and a detected value of braking torque changes. In this case, deceleration of the vehicle corresponds to a resultant value of a detected value of braking torque and driving torque.

More specifically, if the brake acts with the vehicle traveling on the road surface of a downslope without manipulation of the accelerator pedal to decelerate the vehicle, driving torque based on the gravity is applied to the vehicle in the direction opposite to that of braking torque corresponding to pushing force. As a result, effective braking torque becomes smaller than braking torque corresponding to pushing force. In this case, it is usual for the driver to obtain larger brake manipulating force to obtain desired deceleration compared with the case where the vehicle is traveling on the flat road surface.

On the other hand, if the brake acts with the vehicle traveling on the road surface of an upslope without manipulation of the accelerator pedal, driving torque based on the gravity is applied to the vehicle in the direction same as that of braking torque corresponding to pushing force. As a result, effective braking torque becomes larger than braking torque corresponding to pushing force. In this case, brake manipulating force by the driver may be smaller than in the case where the vehicle is traveling on the flat road surface.

Further, for example, driving torque from the drive source acts in the direction opposite to that of braking torque corresponding to pushing force when the cruise controls are being performed. Therefore, effective braking torque becomes smaller than braking torque corresponding to pushing force.

In any cases above, effective braking torque is determined based on braking torque corresponding to pushing force and additional driving torque. More specifically, if braking torque corresponding to pushing force and additional driving torque act in the directions opposite to each other, effective braking torque can be estimated to be a value calculated by subtracting additional driving torque from braking torque corresponding to pushing force. In contrast, if braking torque corresponding to pushing force and additional driving torque act in the same direction, effective braking torque can be estimated to be a value calculated by adding additional driving torque to braking torque corresponding to pushing force.

Meanwhile, effective torque can be estimated based on not only braking torque corresponding to pushing force and additional driving torque but, for example, pushing force and an additional driving torque-related quantity. If the friction coefficient between the brake rotating body and the friction engaging member is constant, pushing force is in proportion to braking torque corresponding to pushing force and is uniquely determined. Because of a fact similar to the fact above, the additional driving torque-related quantity is determined to be a physical quantity with which additional driving torque can be obtained uniquely.

Driving torque from the drive source can be obtained based on, for example, a state of operation of the drive source or a state of manipulation of the accelerator pedal by the driver. Accordingly, an operation state variable of the drive source and a manipulation state variable of an accelerator manipulating member can be considered to be the additional driving torque-related quantity.

More specifically, if the drive source includes an engine, a fuel injection quantity, a throttle opening, and so on correspond to the additional driving torque-related quantity. On the other hand, if the drive source includes an electric motor, supply current to the electric motor, a control state variable thereof, and so on correspond to the additional driving torque-related quantity. To obtain the additional driving torque-related quantity, it is preferable that an operation state of a driving force transmitting device of the vehicle (e.g., change gear ratio) be considered.

Driving torque based on the gravity can be estimated based on an inclination state of the road surface (e.g., inclining direction, inclining angle, and so on), so that an inclination state variable can be considered to be obtain the additional driving torque-related quantity.

Meanwhile, if the braking torque detecting device is capable of detecting force in the horizontal direction (e.g., capable of detecting strain of the suspension arm), a detected value of the braking torque detecting device becomes effective braking torque based on deceleration of the vehicle.

In this case, an abnormality of the braking torque detecting device can be detected by comparing effective braking torque estimated based on the pushing force related-quantity and the driving torque-related quantity and a detected value of braking torque detecting device.

(83) Another aspect of the present invention relates to the abnormality detecting device described in the section (71) or (82), in which the abnormality detecting device includes a braking environmental variable detecting device detecting the braking environmental variable indicating an environment which the vehicle is in, and in which the abnormality detecting portion includes a braking environmental variable-considered abnormality detecting portion detecting an abnormality of the braking torque detecting device based on relation between the brake action-related quantity and a detected value of braking torque and the braking environmental variable detected by braking environmental variable detecting device.

The relation between the brake action-related quantity and braking torque detected by the braking torque detecting device is not necessarily constant, and is affected by the braking environmental variable such as a state of the road surface, a ground load, and so on.

As shown in FIG. 65, relation of braking force FB corresponding to braking torque TB and friction force Fb between a road surface and the vehicle wheel can be expressed by the following formula.

$$I^*(d\omega/dt) = R^*Fb - r^*FB$$

I: second moment of inertia
(dω/dt): rotation angle acceleration ("vehicle wheel acceleration" if the sign is positive, "vehicle wheel deceleration" if the sign is negative)
R: rotation radius of vehicle wheel
r: radius of concentric circle passing a position where the braking force FB is applied to the brake rotating body (equivalent radius)

In this case, the friction force Fb can be expressed by the product of a ground load Q of the vehicle wheel and a utilized road friction coefficient μ (=Q*μ).

If pushing force is not excessive to a maximum road friction coefficient μ, the braking force FB increases as pushing force increases, causing the friction force Fb to increase as well. In contrast, if pushing force is excessive to a maximum road friction coefficient μ, the friction force Fb does not increase as pushing force increases, causing the vehicle wheel deceleration (−dω/dt) and a braking slip to increase. In this case, the braking force FB does not increase either because the friction force Fb does not increase.

If the maximum road friction coefficient μ or the ground load Q is small in this case, a linear area where the friction Fb increases as pushing force increases becomes smaller, that is, a non-linear area, where the friction Fb does not increase as pushing force increases, appears even when pushing force is small, causing the braking slip to increase unlike the case where the maximum road friction coefficient μ or the ground load Q is large.

As described above, relation between pushing force and the braking force FB (virtually equal to the relation between pushing force and braking torque as described previously) changes depending on the maximum road friction coefficient μ and the ground load Q.

The maximum road friction coefficient μ can be indirectly detected based on pushing force when the antilock controls are initiated. Moreover, it can be directly detected based on a detected value of a road surface state detecting device.

A ground load changes depending on weight of the entire vehicle, that is, a movable load or the number of persons on board. However, if posture of the vehicle (e.g., roll rate, pitch rate, and yaw rate) changes even though the weight of the vehicle does not change, the ground load changes with respect to each vehicle wheel because of load movement in the vehicle.

The ground load with respect to each vehicle wheel can be estimated based on, for example, strain of the suspension arm provided to each vehicle wheel. It can also be estimated based on posture of the vehicle detected based on detected values of sensors such as a yaw rate sensor, a roll rate sensor, and pitch rate sensor or a detected value of a vehicle height sensor provided to each vehicle wheel. An actual value of the ground load with respect to each vehicle wheel can be defined as, for example, a relative value of the ground load to a standard value thereof (deviation or ratio).

(84) Another aspect of the present invention relates to the abnormality detecting device described in the section (71) or (83), which includes an abnormality detecting portion during straight traveling detecting an abnormality of the braking torque detecting device if the brake acts when the vehicle with the abnormality detecting device is traveling straight.

If the brake acts when the vehicle is traveling straight, effects from the braking environmental variable are small. Accordingly, reliability of abnormality detection results of the braking torque detecting device can be improved. Meanwhile, conditions met when the brake acts while the vehicle is traveling straight can be referred to abnormality detection permitting conditions.

In addition, if conditions met when the antilock controls are not being performed or the braking slip is equal to or smaller than a set value are added to the abnormality detection permitting conditions, effects from the braking environmental variable can be even smaller.

Moreover, if conditions met when the vehicle is traveling on a flat road surface are added to the abnormality detection permitting conditions, the necessity of considering effects from driving torque decreases because the accelerator manipulating member is manipulated in rare cases when the brake is acting and because apparent driving torque does not act on the vehicle on the flat road surface.

(85) Another aspect of the present invention relates to the braking torque detecting device described in the section (71) or (84), in which the abnormality detecting portion includes an abnormality detecting portion during absence of brake action detecting an abnormality of the braking torque detecting device when the brake is not acting.

When the brake is not acting, a detected value of the braking torque detecting device should be 0 or it should correspond to a value based on brake drag. By utilizing this fact, an abnormality of the braking torque detecting device can be detected based on a detected value of the braking torque detecting device when the brake is not acting.

(86) Another aspect of the present invention relates to the abnormality detecting device described in the section (1) or (85), in which the abnormality detecting portion includes an abnormality detecting portion upon change in manipulation detecting an abnormality of the braking torque detecting device if a manipulation state of at least either the accelerator manipulating member or the brake manipulating member is changed by the driver.

For example, if pushing force changes while the vehicle is decelerating or if driving torque is applied while the vehicle is at a stop, a detected value of the braking torque detecting device should change as long as the device is normal.

Based on the information above, according to the abnormality detecting device relating to the present section, an abnormality can be detected based on changes in detected value at least in either one of the following cases: 1) a case where pushing force changes, and 2) a case where driving torque is applied. Changes in manipulation state include a change to a state under manipulation from a state not under manipulation, or a change in manipulation state variable.

Meanwhile, if driving torque is applied when the vehicle is decelerating, effective braking torque changes, causing deceleration to change as well. By considering this, as abnormality of the braking torque detecting device can also be detected.

(87) Another aspect of the present invention relates to an abnormality detecting device detecting an abnormality of at least one of plural braking torque detecting devices corresponding to brakes of plural vehicle wheels based on relation among detected values of braking torque detected by the plural braking torque detecting devices.

Among detected values of braking torque of the plural braking torque detecting devices, predetermined relation due to various factors determined when designing the brake (e.g., design of a friction engaging portion pushing device of each vehicle wheel, and an equivalent radius of the vehicle wheel to which pushing force is applied) is established as long as all the braking torque detecting devices are normal. In general, the brake is designed so that braking torque and maximum braking torque, which can be generated, becomes larger in a front wheel than in a rear wheel. In any case, an abnormality of the braking torque detecting device with respect to the front and rear wheels based on the normal relation explained above.

Meanwhile, the technical characteristics described in the section (1) or (86) can be employed in the abnormality detecting device relating to the present section.

(88) Another aspect of the present invention relates to the abnormality detecting device described in the section (87), in which the abnormality detecting portion includes a braking environmental variable correspondence abnormality detecting portion detecting an abnormality of at least one of braking torque detecting devices corresponding to at least two of the plural vehicle wheel if relation among detected values of braking torque, which have been detected by the braking torque detecting devices corresponding to at least two of the brakes provided to at least two of the plural vehicle wheels with different braking environmental variables, does not reflect on differences in braking environmental variable.

As shown in FIG. 65, relation between pushing force and the braking torque TB, which is, for example, the braking torque TB corresponding to the same pushing force, significantly depend on the road friction coefficient μ and the ground load Q both of which are examples of the braking environmental variable in an area where the relation between them is not linear.

On the other hand, plural vehicle wheels with different braking environmental variables may exist out of plural vehicle wheels of the vehicle. For example, a front wheel and a rear wheel are different with respect to the ground load Q, so that they are different with respect to the braking torque TB as well.

Therefore, according to the plural vehicle wheels with different braking environmental variables, relation among detected values of braking torque with respect to the plural vehicle wheels should reflect on the differences in braking environmental variable as long as all the braking torque detecting devices corresponding to the plural vehicle wheels are normal.

Giving attention to this fact eliminates the indispensability to detect the braking environmental variable with respect to each vehicle wheel individually, which also eliminates the necessity of detecting an absolute value of the braking environmental variable with respect to each vehicle wheel. This means only detection of relation among the braking environmental variables with respect to the plural vehicle wheels is required.

For example, only differences in friction coefficient among portions of the road surface with which plural vehicle wheels are in contact or differences in ground load (e.g., moving distances of loads in the plural vehicle wheels) are required to be detected.

When to detect relation among the braking environmental variables with respect to the plural vehicle wheels, the detection tends to be easier compared to the detection of an absolute value of the braking environmental variable with respect to each vehicle wheel.

Based on the information above, in the device relating to the present section, an abnormality of at least one of braking torque detecting devices corresponding to at least two of the plural vehicle wheels under different braking environments during braking is detected if the relation among detected values of braking torque, which have been brakes provided to at least two of the plural vehicle wheels, does not reflect on the differences in braking environmental variable.

In addition, the device relating to the present section has been embodied by employing the technical characteristics described in the section (83).

BRIEF DESCRIPTION OF THE DRAWINGS

The invention will be described with reference to the accompanying drawings, wherein:

FIG. 23 is a table showing the contents of a vertical force detection abnormality determining program in FIGS. 15 and 16;

FIG. 46 is a table showing the conditions by which each detecting portion in FIG. 44 detects longitudinal force, lateral force, and vertical force, respectively, on the tire;

FIG. 47 is a block diagram showing an electrical configuration of a device for detecting force acting on a tire according to the fifth preferred embodiment of the invention;

FIG. 65 is a graph for explaining relation between the pushing force toward the disk rotor from the friction engaging member and the braking torque generated on the vehicle wheel corresponding to the disk rotor;

DETAILED DESCRIPTION OF THE PREFERRED EMBODIMENTS

The following explains the preferred embodiments of the invention in detail with reference to the accompanying drawings.

Figure 1:
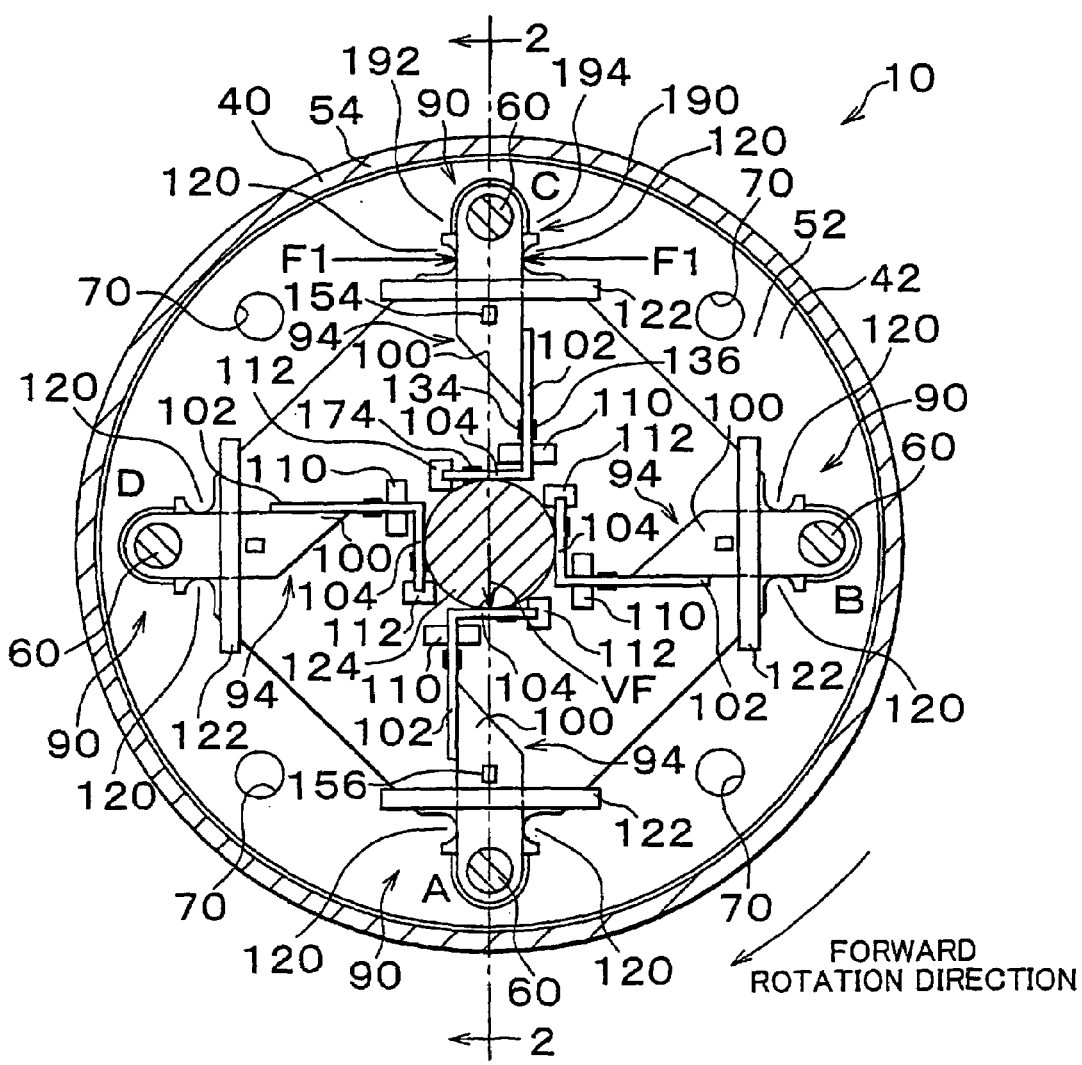
FIG. 1 is a front view showing an internal structure of a detector in a device for detecting force acting on a tire according to a first preferred embodiment of the invention.
Figure 2:
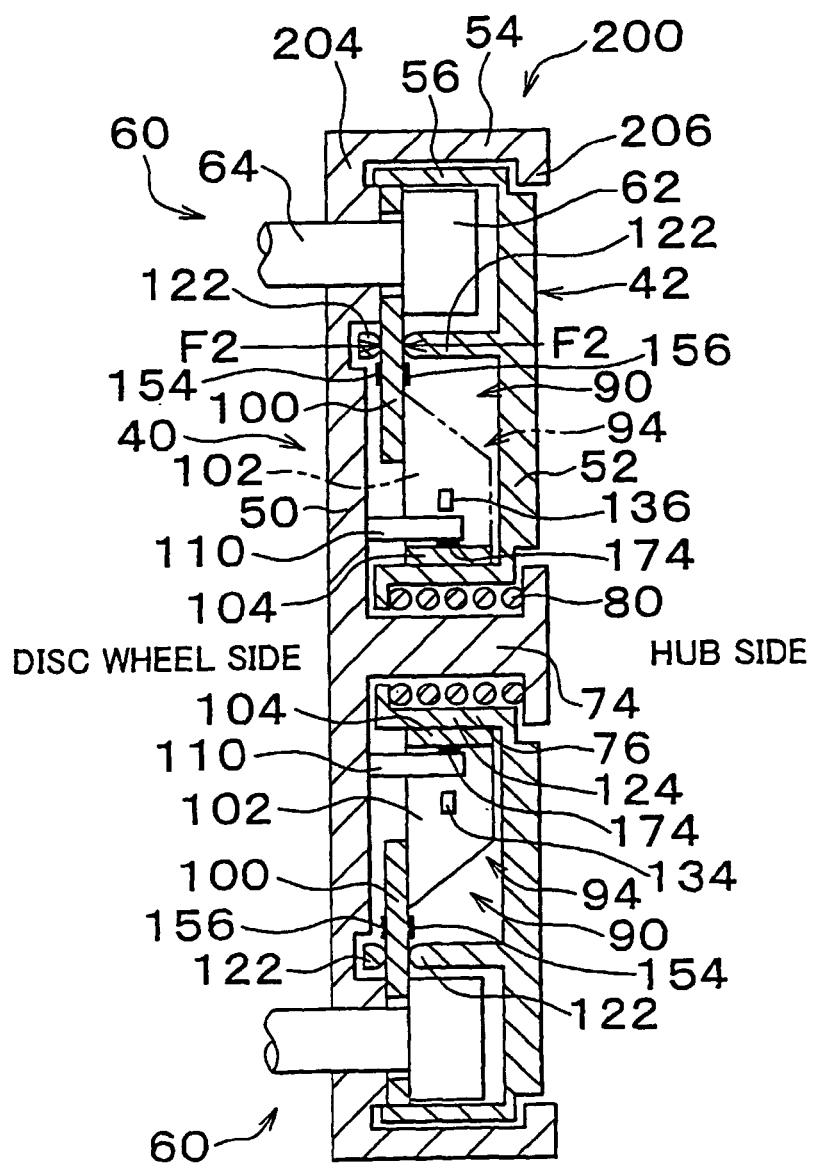
FIG. 2 is a sectional view taken along line 2—2 in FIG. 1.

FIG. 1 shows a front view and FIG. 2 shows a sectional view of the device for detecting force acting on a tire according to the first embodiment of the invention. The device for detecting force acting on a tire is so configured as to include a detector 10, a calculating portion 12, a determining portion 14, and a zero-point correcting portion 16 (see FIG. 12). FIGS. 1 and 2 only show the detector 10.

Figure 3:
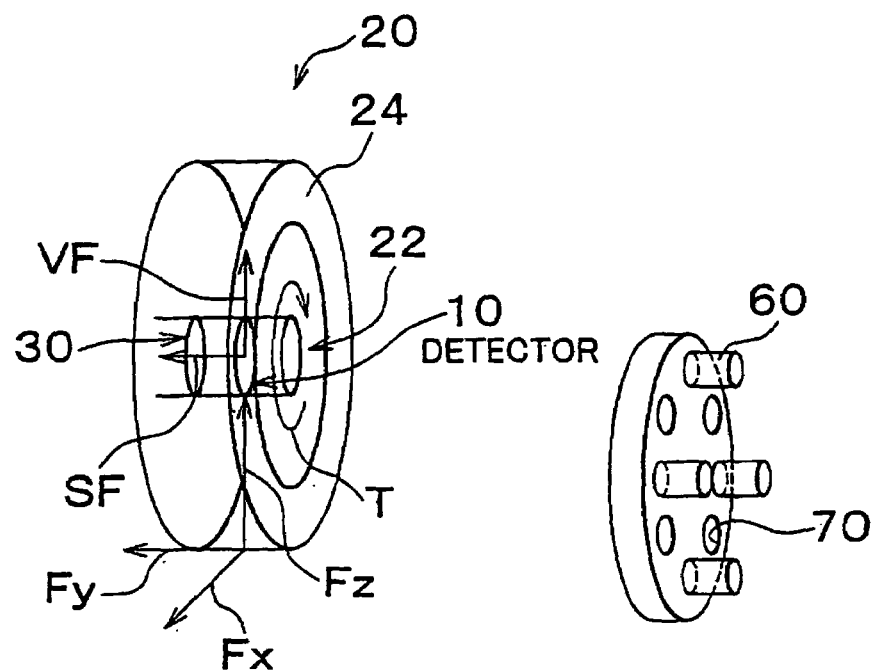
FIG. 3 is a perspective view showing relative positional relation between the detector, a disc wheel of a vehicle wheel and a hub on the vehicle body side in FIG. 1.

The device for detecting force acting on a tire is used with the device mounted on a vehicle provided with a plurality of vehicle wheels. The plurality of vehicle wheels includes right front and left front wheels FR and FL, and right rear and left rear wheels FR and FL. As shown in FIG. 3, each vehicle wheel 20 is configured with a rubber tire 24 mounted on the periphery of a metal disc wheel 22. The plurality of these vehicle wheels 20 includes at least one drive vehicle wheel that is driven by a power source of the vehicle and at least one non-driven vehicle wheel that rotates but is not driven by the power source of the vehicle.

Though not shown, each vehicle wheel 20 is provided with a brake and an actuator for electrically actuating the brake. Because of the combination of the brake and the actuator, each vehicle wheel can independently be braked.

Each vehicle wheel 20 of the vehicle has a hub 30 serving as a retaining body retaining the vehicle wheel 20 integrally with the disc wheel 22 and enabling rotation of the vehicle wheel 20 by mounting the disc wheel 22 on the same axis as that of the vehicle wheel 20. As shown in FIG. 3, the detector 10 is mounted between the hub 30 and the disc wheel 22 of each vehicle wheel 20 of the vehicle so that it is detachable. Furthermore, the detector 10 is mounted on the vehicle with force transmitted between the hub 30 and the disc wheel 22 through the detector 10.

FIG. 3 also shows the types of force, detected by the detector 10, acting on the tire. The types of force include a rotational torque T based on longitudinal force (a component $F_X$ in X-direction of road surface reaction force) on the tire 24, lateral force SF (a component $F_Y$ in Y-direction of road surface reaction force) on the tire 24, and vertical force VF (component $F_Z$ in Z-direction of road surface reaction force) on the tire 24. In this case, the rotational torque T includes both driving torque and braking torque. Accordingly, the longitudinal force includes both driving force and braking force.

The detector 10 is so configured as to detect each force to be detected as a value discretely or continuously changing according to an actual value of each force.

As shown in FIG. 2, the detector 10 is configured by fitting together two partition housings 40 and 42 that can be relatively displaced. Both of the partition housings 40 and 42 also have a cup shape in which the diameter of bottom portions 50 and 52 is longer than the height of cylindrical portions 54 and 56. These two partition housings 40 and 42 are fitted together to be oriented toward the inside faces of the bottom faces 50 and 52 facing each other.

In the present preferred embodiment, of the two partition housings 40 and 42, the one with the larger diameter is referred to as the first partition housing 40 which is mounted on the disc wheel 22 with four tire mounting bolts 60 (see FIG. 1) to be detachable and be on the same axis as that of the disc wheel 22. The other with the smaller diameter, on the other hand, is referred to as the second partition housing 42 which is mounted on the hub 30 with four hub mounting bolts 60 (not shown) to be detachable and be on the same axis as that of the hub 30.

As shown in FIG. 2, each of head portions 62 of the four tire mounting bolts 60 is inserted into the second partition housing 42 to pierce the first partition housing 40 with each of shaft portions 64, causing the shaft portions 64 to protrude from the first partition housing 40 and to face the disc wheel 22 side. However, each of the tire mounting bolts 60 is used to firmly mount the first partition housing 40 on the disc wheel 22 with relative displacement of each tire mounting bolt 60 to the first housing prevented and relative displacement thereof to the second partition housing 42 permitted.

Conversely, each of the four hub mounting bolts, not shown, is inserted into the hub 30 to pierce the second partition housing 42 with each of shaft portions, causing the shaft portions to be located inside of the second partition housing 42. FIG. 1 shows through-holes 70 in the second partition housing 42 through which the four hub mounting bolts are fitted. The four hub mounting bolts are used to firmly attach the second partition housing 42 to the hub 30.

Moreover, FIG. 1 is a view showing the detector 10 seen from the disc wheel 22 side toward the hub 30 side with the bottom portion 50 of the first partition housing 40 removed. To the contrary, FIG. 2 is a sectional view taken along line 2—2 in FIG. 1. In FIG. 1, in addition, the rotation direction of the detector 10, accompanied with rotation of the tire 24 when the vehicle is moving forward, is expressed as "forward rotation direction".

As shown in FIG. 2, a center shaft portion 74 extends outward from the inside face of the bottom portion 50 of the first partition housing 40. A center cylindrical portion 76 also extends outward from the inside face of the bottom portion 52 of the second partition housing 42 to be opposite to the center shaft portion 74. The center shaft portion 74 so fitted to the center cylindrical portion 76 as to be on the same axis as that of the center cylindrical portion 76 and to slide in the center cylindrical portion 76.

As shown in FIG. 2, a coil spring 80, which serves as an elastic member, is disposed between the two partition housings 40 and 42. This coil spring 80 urges the two partition housings 40 and 42 toward the direction in which the partition housings 40 and 42 get closer to each other. Accordingly, a preload is applied between the two partition housings 40 and 42.

As clear from the explanation above, according to the present preferred embodiment, the two partition housings 40 and 42 fit together at the corresponding two cylindrical portions 54 and 56 and at the center shaft portion 74 and the center cylindrical portion 76. Relative rotation around the common rotational axis (which substantially matches or is substantially parallel to the rotational axis of the tire 24) of the two partition housings 40 and 42, relative movement in a direction parallel to the rotational axis, and relative movement in a direction perpendicular to the rotation axis are all permitted. Relative movement in the direction perpendicular to the rotational axis is permitted by radial clearance between the center shaft portion 74 and the center cylindrical portion 76.

As shown in FIG. 1, the detector 10 includes four detecting portions 90. The four detecting portions 90 are disposed radially and at evenly spaced intervals around the common rotational axis (hereinafter referred to as "detector axis") of the two partition housings 40 and 42. As a result, two adjacent detecting portions 90 are spaced 90 degrees apart around the detector axis.

Each detecting portion 90 includes a detecting member 94 engaged with the two partition housings 40 and 42. The two partition housings 40 and 42 reduce the rigidity of the detecting member 94, i.e., resistance to elastic deformation of the detecting member 94.

According to the present preferred embodiment, the detecting member 94 is so formed as to have three structural portions 100, 102 and 104 by bending a single, flat, steel plate. Of these structural portions 100, 102 and 104, both the first and second structural portions 100 and 102 extend parallel to the radial direction of the detector axis. The remaining third structural portion 104 extends at right angles to both the first and second structural portions 100 and 102.

All of the structural portions 100, 102 and 104 are so shaped as to function as beams having directionality in a section modulus of the lateral cross-section. According to the present preferred embodiment, they are plates having a long rectangular cross-section and extending straight. As a result, all of the structural portions 100, 102 and 104 function as members bending in one of two directions perpendicular to each other on a plane crossing the neutral axes of the structural portions 100, 102 and 104, not bending in the other direction, and transmitting force without elastic deformation.

As shown in FIG. 2, the detecting member 94 is engaged with the first partition housing 40. The first partition housing 40 is separated from a brake friction material, not shown, of a brake, also not shown, inhibiting rotation of the vehicle wheel 20 by the second partition housing 42. As a result, the first partition housing 40 is less prone to effects from heat of the brake friction material. More specifically, the detecting member 94 is engaged with the first partition housing 40 by means of the tire mounting bolts 60 firmly secured to the first partition housing 40, and first and second support members 110 and 112 firmly secured to the first partition housing 40. According to the present preferred embodiment, the detecting member 94 is so supported by the tire mounting bolts 60 as to slide around it.

In the present preferred embodiment, as described above, the detecting member 94 is engaged with the first partition housing 40 with the use of the tire mounting bolts 60. Therefore, it is easy to reduce the number of parts of the detector 10 compared with a case where the detecting member 94 is engaged with the first partition housing 40 with the use of a special engagement member.

Furthermore, the detecting member 94 is also engaged with the second partition housing 42. More specifically, the detecting member 94 is engaged with the second partition housing 42 by means of: i) a first transmitting portion 120 extending from the second partition housing 42 in a direction perpendicularly and three-dimensionally crossing the detector axis, as shown in FIG. 1, ii) a second transmitting portion 122 extending from a position, shifted from the detector axis, of the second partition housing 42 in a direction parallel with the detector axis, as shown in FIG. 2, and iii) a third transmitting portion 124 formed at a peripheral portion of the center cylindrical portion 76 of the second partition housing 42, as also shown in FIG. 2.

Figure 4:
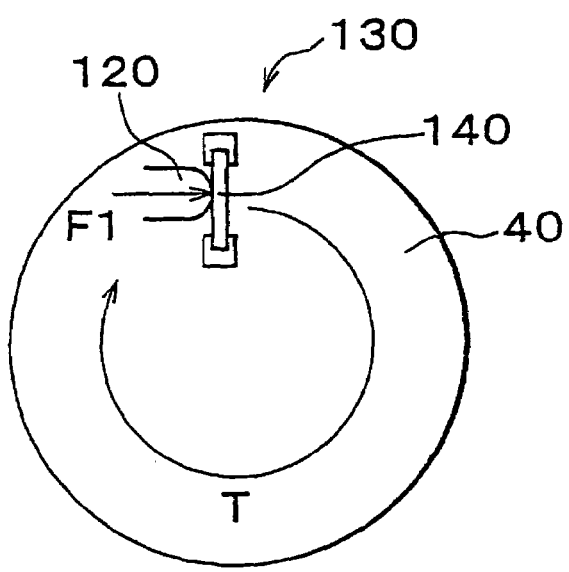
FIG. 4 is a front view conceptually showing a longitudinal force detecting portion, which is for detecting longitudinal force of a tire, of the detector in FIG. 1.
Figure 5:
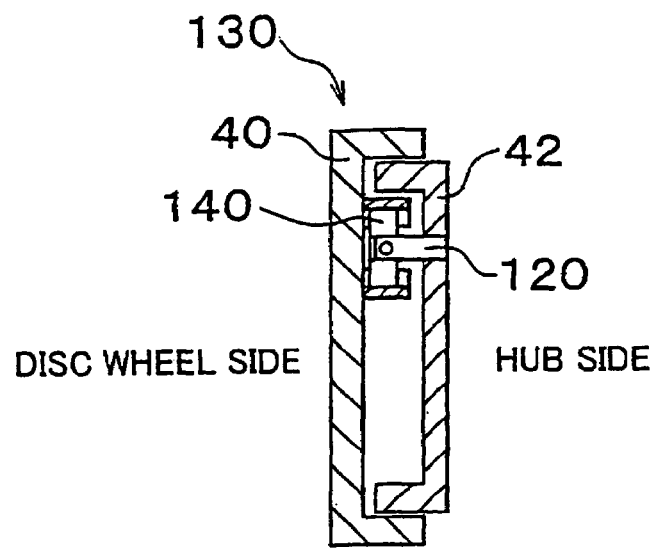
FIG. 5 is a side sectional view conceptually showing the longitudinal force detecting portion in FIG. 4.

Of each detecting portion 90, the first and second structural portions 100 and 102, the tire mounting bolts 60, the first support member 110 and the first transmitting portion 120 constitute a longitudinal force detecting portion 130 (see FIG. 4 and FIG. 5). The longitudinal force detecting portion 130 detects longitudinal force acting on the tire 24 by converting the rotational torque T of the tire 24 to a first axial force F1 acting in a direction of a given tangent line of a given circle around the detector axis.

Of the first and second structural members 100 and 102, as shown in FIG. 1, only the second structural member 102 bends if the first transmitting portion 120 is pushed against the detecting member 94. This bending causes both opposing faces of the second structural portion 102 to strain in the direction of its thickness. Strain gauges 134 and 136 are attached to both of these faces. These strain gauges 134 and 136 detect the strain of each face and convert it into an electrical signal.

According to the present preferred embodiment, the pair of strain gauges 134 and 136 are used to according to the combination of moving direction of the vehicle (forward and backward) and the direction of longitudinal force to be detected (driving force and braking force). Both braking force when moving forward and driving force when moving backward generate strain in a first direction in each of the strain gauges 134 and 136. Conversely, both driving force when moving forward and braking force when moving backward generate strain in a second direction opposite to the first direction in each of the strain gauges 134 and 136.

More specifically, the strain gauge 134, in which a tensile strain is generated when driving force acts on the tire 24 as the vehicle moves forward and when braking force acts on the tire 24 as the vehicle moves backward, is used only for detecting driving force when the vehicle is moving forward and for detecting braking force when the vehicle is moving backward.

In contrast, the strain gauge 136, in which a tensile strain is generated when driving force acts on the tire 24 as the vehicle moves backward and when braking force acts on the tire 24 as the vehicle moves forward, is used only for detecting driving force when the vehicle is moving backward and for detecting braking force when the vehicle is moving forward.

FIG. 4 and FIG. 5 conceptually show a front view and a side sectional view, respectively, of the principle by which the longitudinal force detecting portion 130 detects longitudinal force (equivalent to the rotational moment T).

In FIGS. 4 and 5, reference numeral 140 denotes a first beam function portion of the detecting member 94, which functions as a beam in order to detect longitudinal force of the tire 24. Both ends of the first beam function portion 140 are supported by the first partition housing 40. The first beam function portion 140 comprises a first portion functioning as a beam not bending by longitudinal force on the tire 24, which is equivalent to the first structural portion 100, and a second portion functioning as a beam bending by longitudinal force on the tire 24, which is equivalent to the second structural portion 102 so that the both portions are coupled together in series. The first support member 110 prevents longitudinal force from transmitting between the first and second structural portions 100 and 102 and the third structural portion 104.

As shown in FIG. 4, the first transmitting portion 120 is engaged with the first beam function portion 140. As a result, the rotational torque T is converted into the first axial force F1 by the first transmitting portion 120, causing the converted first axial force F1 to act on the first beam function portion 140 in a shearing direction thereof. Accordingly, strain corresponding to the rotational torque T is generated in the first beam function portion 140.

As shown in FIG. 1, it is also possible to consider the longitudinal force detecting portion 130 with the first and second structural portions 100 and 102 as constituting a lever including: i) the attached point of the tire mounting bolt 60 and the first structural portion 100 as the fulcrum, ii) the contact point between the first transmitting portion 120 and the first structural portion 100 as the power point, and iii) the attached point of the first support member 110 and the second structural portion 102 as the point of application. According to this principle of leverage, strain, reduced from the first axial force F1, is generated in the strain gauges 134 and 136.

Figure 6:
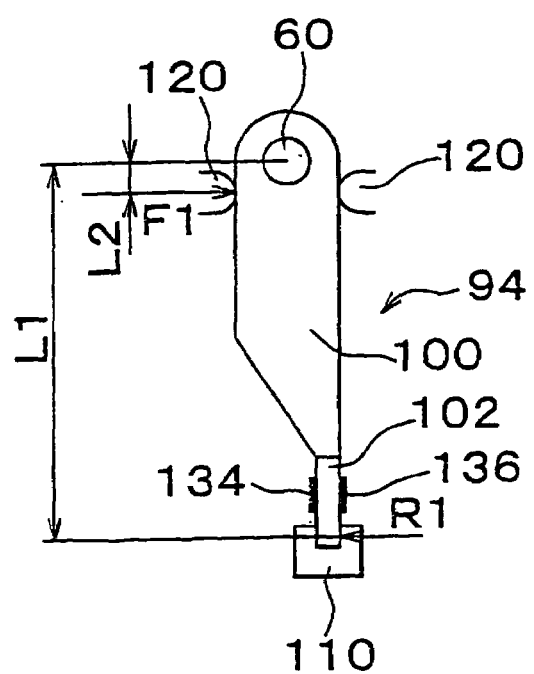
FIG. 6 is a front view for conceptually explaining a principle of leverage employed by the longitudinal force detecting portion in FIG. 4.
Figure 7:
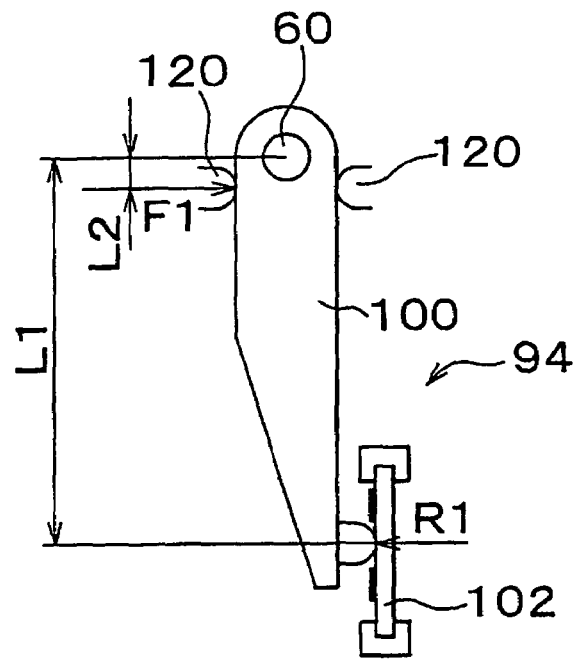
FIG. 7 is a front view for conceptually explaining another principle of leverage, which can be employed by the longitudinal force detecting portion in FIG. 4.

FIG. 6 conceptually shows the principle of leverage. In the figure, a reference numeral L1 denotes the distance between the fulcrum and the point of application, a reference numeral L2 denotes the distance between the fulcrum and the power point, and a reference numeral R1 denotes a first reaction force generated at the point of application against the first axial force F1. Considering equilibrium of the moment around the fulcrum of this lever, the first reaction force R1 can be obtained from the following formula.

$$R1 = F1 \times (L2/L1)$$

Because the value of (L2/L1), which represents the lever ratio, is less than 1, the reaction force R1 is less than the first reaction force F1, preventing the bending moment acting on the strain gauges 134 and 136 from increasing. Therefore, the strain generated in the strain gauges 134 and 136 is also prevented from increasing.

In addition, according to the present preferred embodiment, while the first structural portion 100 and the second structural portion 102 can be coupled together in series by being integrally formed together, this coupling together in series is also possible by forming the first structural portion 100 and the second structural portion 102 independently and then engaging them to each other in series. This is also possible for the lateral force detecting portion described later.

Moreover, according to the present preferred embodiment, the preload from the coil spring 80 is applied between the two partition housings 40 and 42. Accordingly, a preload is also applied to the detecting member 94 and a strain gauge for detecting lateral force described later.

As a result of applying the preload, as described above, play between the two partition housings 40 and 42 is suppressed. Further, when the output signal from the strain gauge for detecting lateral force is 0, it is possible to determine some sort of abnormalities in a part (a mechanical or electrical part) relating to the detection of lateral force.

Heretofore, the construction, in principle, of the longitudinal force detecting portion 130 of each detecting portion 90 detecting longitudinal force on the tire 24 has been described. Next, the following explains the construction, in principle, of the lateral force detecting portion that detects the lateral force SF on the tire 24.

As shown in to FIG. 2, similar to the lateral force detecting portion 130, of each detecting portion 90, the first and second structural portions 100 and 102, the tire mounting bolts 60, the first support member 110 and a second transmitting portion 122 constitute a lateral force detecting portion 150 (see FIG. 8) detecting the lateral force SF acting on the tire 24.

Of the first and second structural members 100 and 102, as shown in FIG. 2, only the first structural member 100 bends when the second transmitting portion 122 is pushed against the detecting member 94. This bending causes both opposing faces of the first structural portion 100 to strain in the direction of its thickness. Strain gauges 154 and 156 are attached to both of these faces. These strain gauges 154 and 156 detect the strain of each face and convert it into an electrical signal.

According to the present preferred embodiment, the pair of strain gauges 154 and 156 is distinctively used depending on whether the lateral force SF on the tire 24 is acting toward the outside of turning (to the left in FIG. 2) or it is acting toward the inside of turning (to the right in FIG. 2). The strain gauge 154, in which tensile strain is generated when lateral force acts toward the outside, is used to detect the lateral force SF only when that lateral force acts toward the outside. Conversely, the strain gauge 156, in which tensile strain is generated when lateral force acts toward the inside, is used to detect the lateral force SF only when lateral force acts toward the inside.

Figure 8:
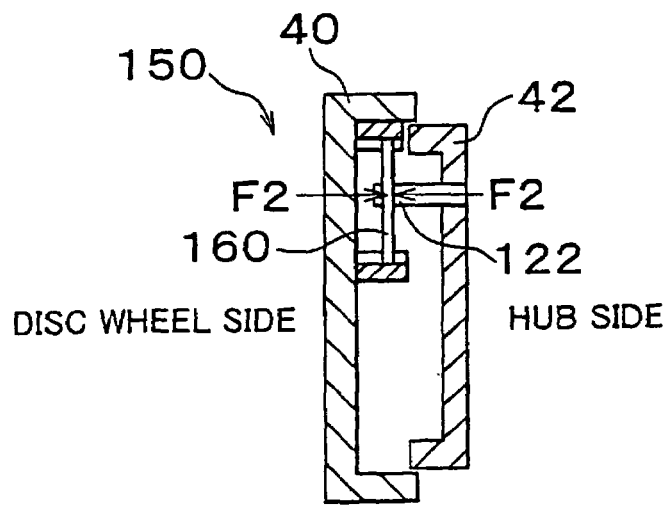
FIG. 8 is a side sectional view conceptually showing a lateral force detecting portion, which is for detecting portion detecting lateral force on the tire, of the detector in FIG. 1.

FIG. 8 conceptually shows a side sectional view of the principle by which the lateral force detecting portion 150 detects the lateral force SF.

In FIG. 8, a reference numeral 160 denotes a second beam function portion of the detecting member 94 which functions as a beam for detecting lateral force SF. Both ends of the second beam function portion 160 are supported by the first partition housing 40. The second beam function portion 160 comprises a first portion functioning as a beam bending by the lateral force SF, which is equivalent to the first structural portion 100, and a second portion functioning as a beam not bending by the lateral force SF, which is equivalent to the second structural portion 102 so that the both portions are coupled together in series. The first support member 110 prevents the lateral force SF from transmitting between the first and second structural portions 100 and 102 and the third structural portion 104.

As shown in FIG. 8, the second transmitting portion 122 is engaged with the second beam function portion 160. As a result, a second axial force F2 based on the lateral force SF acts on the second beam function portion 160 in a shearing direction thereof through the second transmitting portion 122. Accordingly, strain corresponding to the lateral force SF is generated in the second beam function portion 160.

As shown in FIG. 2, similar to the longitudinal force detecting portion 130, it is also possible to consider the lateral force detecting portion 150 with the first and second structural portions 100 and 102 as constituting a lever including: i) the attached point of the tire mounting bolt 60 and the first structural portion 100 as the fulcrum, ii) the contact point between the second transmitting portion 122 and the first structural portion 100 as the power point, and iii) the attached point of the first support member 110 and the second structural portion 102 as the point of application. According to this principle of leverage, strain, reduced from the second axial force F2, is generated in gauges 154 and 156.

Next, the following explains the construction, in principle, of the vertical force detecting portion of each detecting portion 90 which detects the vertical force VF on the tire 24.

As shown in FIG. 1, of each detecting portion 90, the third structural portion 104, the first and second support members 110 and 112, and a third transmitting portion 124 constitute a vertical force detecting portion 170 (see FIGS. 9 and 10) detecting the vertical force VF. The first support member 110 prevents vertical force from transmitting between the first and second structural portions 100 and 102 and the third structural portion 104.

As shown in FIG. 1, when the third transmitting portion 124 is pushed against the detecting member 94, only the third structural portion 104 bends. This bending causes both opposing faces of the third structural portion 104 to strain in the direction of its thickness. A strain gauge 174 is attached to a face of the third structural portion 104 opposite to the third transmitting portion 124. The strain gauge 174 converts the strain of the face into an electrical signal. That is, the strain gauge 174 is attached to a face of the third structural portion 104 in which tensile strain is generated by bending of the third transmitting portion 124 as a result of being pushed.

In addition, according to the present preferred embodiment, as described above, the detecting member 94 is so formed as to have the three structural portions 100, 102 and 104 by bending a single, flat, steel plate. Furthermore, a plurality of strain gauges 134, 136, 154, 156 and 174 is attached to each face of the three structural portions 100, 102 and 104.

Therefore, according to the present preferred embodiment, it is possible to attach a plurality of strain gauges at selected locations on each face of a plain plate before bending the plain plate, and then to bend the plain plate with a pressing machine or the like to complete the detecting member 94.

According to the present preferred embodiment, both the longitudinal force detecting portion 130 and the lateral force detecting member 150 are configured so that each of the transmitting portions 120 and 122 have two opposing portions which sandwich the detecting member 94, as shown in FIGS. 1 and 2. Those two portions transmit force to the detecting member 94 in opposite directions to each other. However, each portion only transmits force to the detecting member 94 in a single direction, which is the direction of compression. Therefore, compression force is generated when the portions push against the detecting member 94, but no tensile force is generated when the portions are separated from detecting member 94.

In contrast, according to the present preferred embodiment, the vertical force detecting portion 170 is configured so that the third transmitting portion 124 thereof has only one portion only transmitting force to the detecting member 94 in one direction, which is the direction of compression. The four detecting portions 90 comprise two pairs of two detecting portions 90 with one detecting portion 90 of one pair opposing the other detecting portion 90 of the same pair across the third transmitting portion 124. Accordingly, even if each detecting portion 90 is so configured as to only detect compression force, one of the two detecting portions 90 of each pair detects the vertical force VF in a case that the direction, in which the vertical force VF acts on the two detecting portions 90, changes.

When the vehicle is traveling, a rotational position of each of the four detecting portions 90 around the detector axis changes because the disc wheel 22 rotates together with the hub 30. As a result, longitudinal force and lateral force are generated in each detecting portion 90 at all rotational positions, while vertical force is only generated in each detecting portion 90 at a limited number of rotational positions.

With regard to vertical force, more specifically, when only vertical force is transmitted from the third transmitting portion 124 to the third structural portion 104, each detecting portion 90 can detect vertical force only at a plurality of rotational positions within a range from 90 degrees in the clockwise direction to 90 degrees in the counterclockwise direction from a straight line in which the vertical force from the third transmitting portion 124 is transmitted to the third structural portion 104. In contrast, as described later, when the resultant force of vertical force and longitudinal force from the third transmitting portion 124 is transmitted to the third structural portion 104, each detecting portion 90 can detect the resultant force only at a plurality of rotational positions within a range from 90 degrees in the clockwise direction to 90 degrees in the counterclockwise direction from a straight line (a straight line slanting from a straight line extending straight down from the third transmitting portion 124) in which the resultant force from the third transmitting portion 124 is transmitted to the third structural portion 104.

Figure 9:
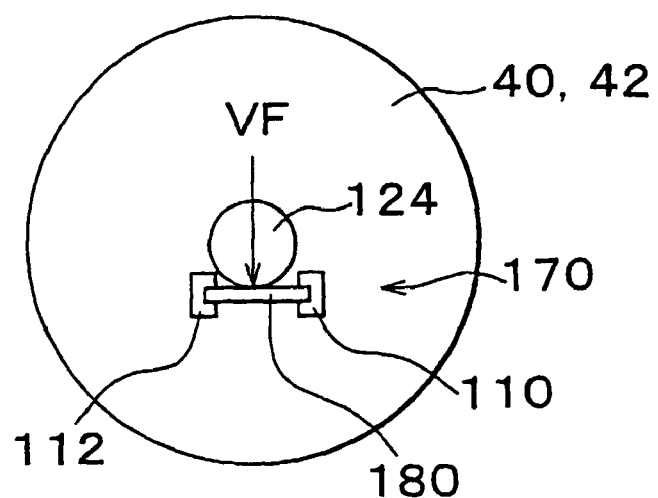
FIG. 9 is a front view conceptually showing a vertical force detecting portion, which is for detecting portion detecting vertical force on the tire of the detector in FIG. 1.
Figure 10:
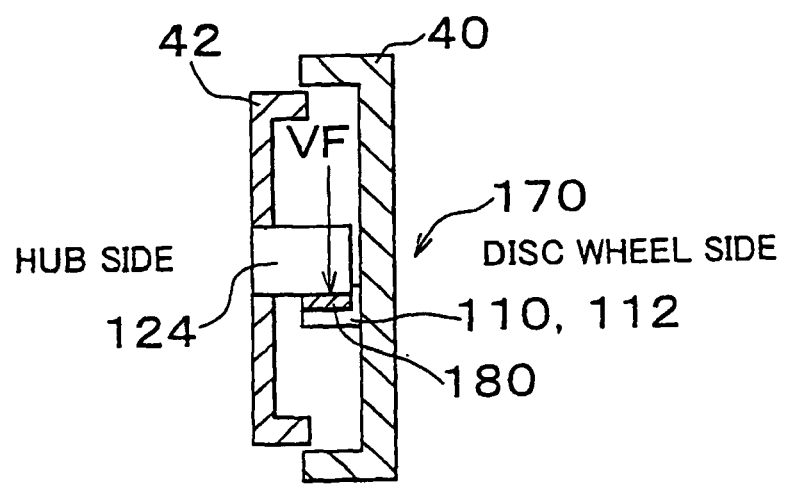
FIG. 10 is a side sectional view conceptually showing the vertical force detecting portion in FIG. 9.

FIG. 9 and FIG. 10 conceptually show a front view and a side sectional view, respectively, of the principle by which the vertical force detecting portion 170 detects the vertical force VF. In these figures, a reference numeral 180 denotes a third beam function portion of the detecting portion 94, which functions as a beam for detecting the vertical force VF. Both ends of the third beam function portion 180 are supported by the first partition housing 40. The third beam function portion 180 has a portion functioning as a beam bending when the vertical force VF is applied, which is equivalent to the third structural portion 104.

As shown in FIG. 9, the third transmitting portion 124 is engaged with the third beam function portion 180. As a result, the vertical force VF acts on the third beam function portion 180 in the shearing direction thereof through the third transmitting portion 124. Accordingly, strain is generated in the third beam function portion 180 corresponding to the vertical force VF.

Similar to the longitudinal force detecting portion 130 and the lateral force detecting portion 150, as shown in FIG. 1, it is also possible to consider the vertical force detecting portion 170 with the third structural portion 104 as constituting a lever including: i) the attached point of the first support member 110 and the third structural portion 104 as the fulcrum, ii) the contact point between the third transmitting portion 124 and the third structural portion 104 as the power point, and iii) the attached point of the second support member 112 and the third structural portion 104 as the point of application. According to this principle of leverage, strain, reduce from the vertical force VF, is generated in the strain gauge 174.

As clear from the explanation above, according to the present preferred embodiment, the longitudinal force detecting portion 130, the lateral force detecting portion 150, and the vertical force detecting portion 170 are all designed so that strain, which has been mechanically reduced from load transmitted from each transmitting portion 120, 122 and 124 to the detecting member 94, is generated in each of the strain gauges 134, 136, 154, 156 and 174 serving as detecting elements. As a result, a load capacity that each of the strain gauges 134, 136, 154, 156 and 174 must withstand is reduced.

According to the present preferred embodiment, a limiting function can also reduce the load capacity of each strain gauge 134, 136, 154, 156 and 174. In the present preferred embodiment, the limiting mechanism is provided for the longitudinal force detecting portion 130 and the lateral force detecting portion 150.

As shown in FIG. 1, a first limiting mechanism 190 for the longitudinal force detecting portion 130 is so configured as to include a pair of stoppers 192 and 194 near the tire mounting bolt 60 in the second partition housing 42. One of the stoppers 192 functions when the vehicle moving forward. The other stopper 194 functions when the vehicle moving backward.

Before the first axial force F1, transmitted from the first transmitting portion 120 to the detecting member 94, exceeds a set limit, there is a clearance in the circumferential direction of the second partition housing 42 between the stoppers 192 and 194 and the detecting member 94. As the first axial force F1 approaches the set limit, however, the clearance is reduced, and is vanished when the set limit is reached. When there is no more clearance, the first axial force F1 is transmitted from the second partition housing 42 through one of the two stoppers 192 and 194, whichever corresponds, and the tire mounting bolt 60 to the first partition housing 40. As a result, the first axial force F1 transmitted to the detecting member 94 does not increase from the set limit. That is, the first axial force F1 increases in accordance with the rotational torque T until the set limit is reached before being maintained at the set limit.

A second limiting mechanism 200 for the lateral force detecting portion 150 is so configured as to include a pair of stoppers 204 and 206 near the tire mounting bolt 60 in the first partition housing 40. One of the stoppers 204 functions when lateral force acts on the tire 24 in the direction of the outside of turning. The other stopper 206 functions when lateral force acts on the tire 24 in the direction of the inside of turning.

Before the lateral force SF, which is transmitted from the second transmitting portion 122 to the detecting member 94, exceeds a set limit, there is a clearance in the direction parallel to the detector axis between the stoppers 204 and 206 and the detecting member 94. As the lateral force SF approaches the set limit, however, the clearance is reduced, and is vanished when the set limit is reached. When there is no more clearance, the lateral force SF is transmitted from the second partition housing 42 through one of the two stoppers 204 and 206, whichever corresponds, to the first partition housing 40. As a result, the second axial force F2 transmitted to the detecting member 94 does not increase from the set limit. That is, the second axial force F2 matches the lateral force SF until the set limit is reached before being maintained at the set limit.

Further, the stopper 206 ultimately also functions to prevent the two partition housings 40 and 42 from separating from one another beyond a set limit in a direction parallel to the detector axis, i.e., in the lateral direction of the tire 24.

Figure 11:
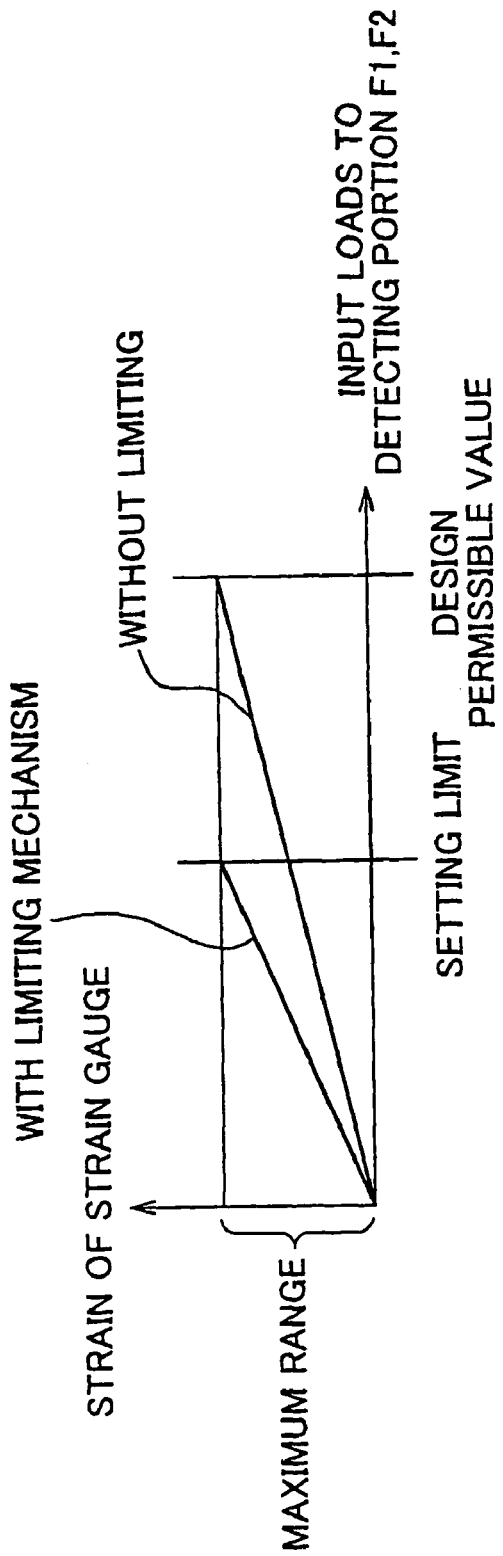
FIG. 11 is a graph showing relation between loads F1 and F2 input to each detecting portion in FIG. 1 and strain of a strain gauge in each detecting portion.

FIG. 11 is a graph showing relation between: i) input loads to the detecting portion 90, which are the first axial force F1 of the longitudinal force detecting portion 130 having a limiting mechanism and the second axial force F2 of the lateral force detecting portion 150 also having a limiting mechanism, and ii) strain generated in the strain gauges 134, 136, 154 and 156 in accordance with those input loads. A comparative example, in which the limiting mechanisms are not provided, is also shown in the figure.

When designing the detector 10, in order to allow a margin of safety for the load predicted to be generated under actual service conditions, a design permissible value is generally set larger than the predicted load, similar to other ordinary devices. Also, the detector 10 is designed to clear the set design permissible value.

In case of not providing the limiting mechanisms, the strain gauges 134, 136, 154 and 156 are used so that strain therein does not exceed its maximum range width when the input load matches the design permissible value.

Conversely, in case of providing the limiting mechanisms, the strain gauges 134, 136, 154 and 156 can be used so that strain thereof does not exceed its maximum range width when the input load matches the set limit since the input load does not exceed the set limit smaller than the design permissible value.

Therefore, according to the present preferred embodiment, a gradient of the graph in FIG. 11 is steeper in case of providing the limiting mechanisms for detecting longitudinal force and lateral force compared with the case of not providing them, which means that detection sensitivity of the strain gauges 134, 136, 154 and 156 to longitudinal force and lateral force is intensified.

Heretofore, the mechanical configuration of the detector 10 has been described. Next, the following explains the electrical configuration of the detector 10.

Figure 12:
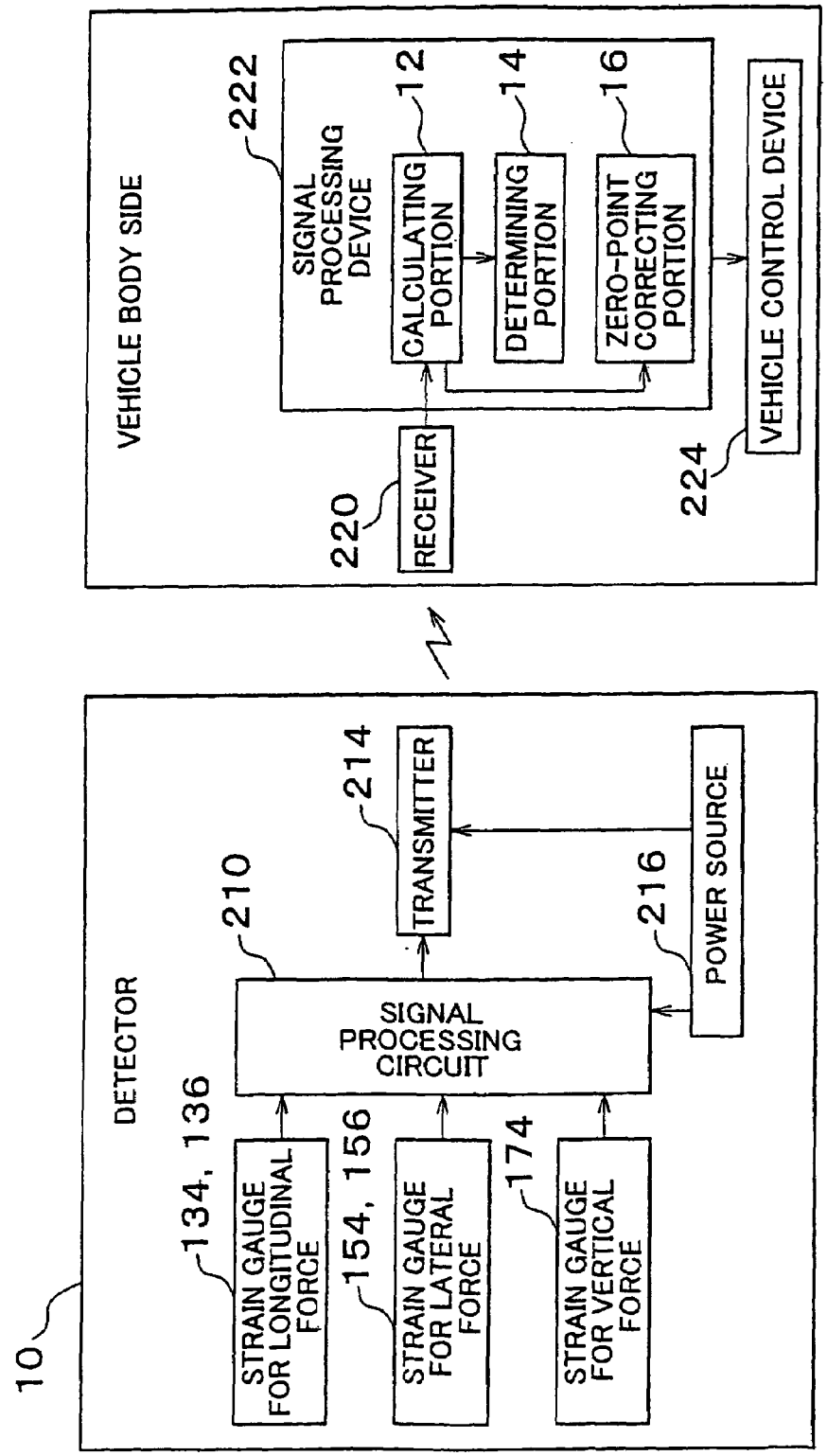
FIG. 12 is a block diagram showing an electrical configuration of the device for detecting force acting on a tire according to the first preferred embodiment of the invention.

FIG. 12 is a block view conceptually showing the electrical configuration of the detector 10. In the detector 10, a signal processing circuit 210, connected to the strain gauges 134, 136, 154, 156 and 174, is connected to a transmitter 214.

The signal processing circuit 210 picks out electrical signals indicating strain generated in the strain gauges 134, 136, 154, 156 and 174, and supplies them to the transmitter 214.

The transmitter 214 then transmits the supplied electrical signals as electrical waves. The signal processing circuit 210 and the transmitter 214 operate with the use of power supplied from a power source 216 provided in the detector 10. The power source 216 may be a consumable type which cannot be recharged while in use, such as a direct current battery.

The block diagram in FIG. 12 also conceptually shows electrical equipment mounted on the side of a vehicle body of the vehicle. A receiver 220 is mounted on the vehicle body side in a position near the transmitter 214. A vehicle control unit 224 is connected to the receiver 220 through a signal processing unit 222.

Signals sent from the transmitter 214 are received by the receiver 220 and supplied to the signal processing unit 222. The signal processing unit 222 then carries out the necessary processing of these signals and then supplies the processed signals to the vehicle control unit 224.

The vehicle control unit 224 is so configured as to include an actuator, not shown, for controlling a state of the vehicle, and a controller, also not shown, for driving the actuator and for controlling a driving state of the actuator. The controller is so designed as to control the state of the vehicle by controlling the actuator based on, for example, signals received from the signal processing unit 222, which indicate detection results of the detector 10.

The signal processing unit 222 includes a calculating portion 12 for calculating longitudinal force, lateral force and vertical force based on output signals from the detector 10. That is, according to the present preferred embodiment, the entire device for detecting force acting on the tire 24 comprises the detector 10 provided between the disc wheel 22 and the hub 30, and the receiver 220 and the calculating portion 12 provided on the vehicle body side.

According to the present preferred embodiment, the calculating portion 12, provided on the vehicle body side, calculates force acting on the tire based on the output signals from the strain gauges 134, 136, 154, 156 and 174, regardless of whether the force acting on the tire to be detected is longitudinal force, lateral force, or vertical force.

As described previously, longitudinal force and lateral force are generated in each detecting portion 90 at all the rotational positions around the detector axis, while vertical force is only generated in each detecting portion 90 at a limited number of rotational positions.

Figure 13:
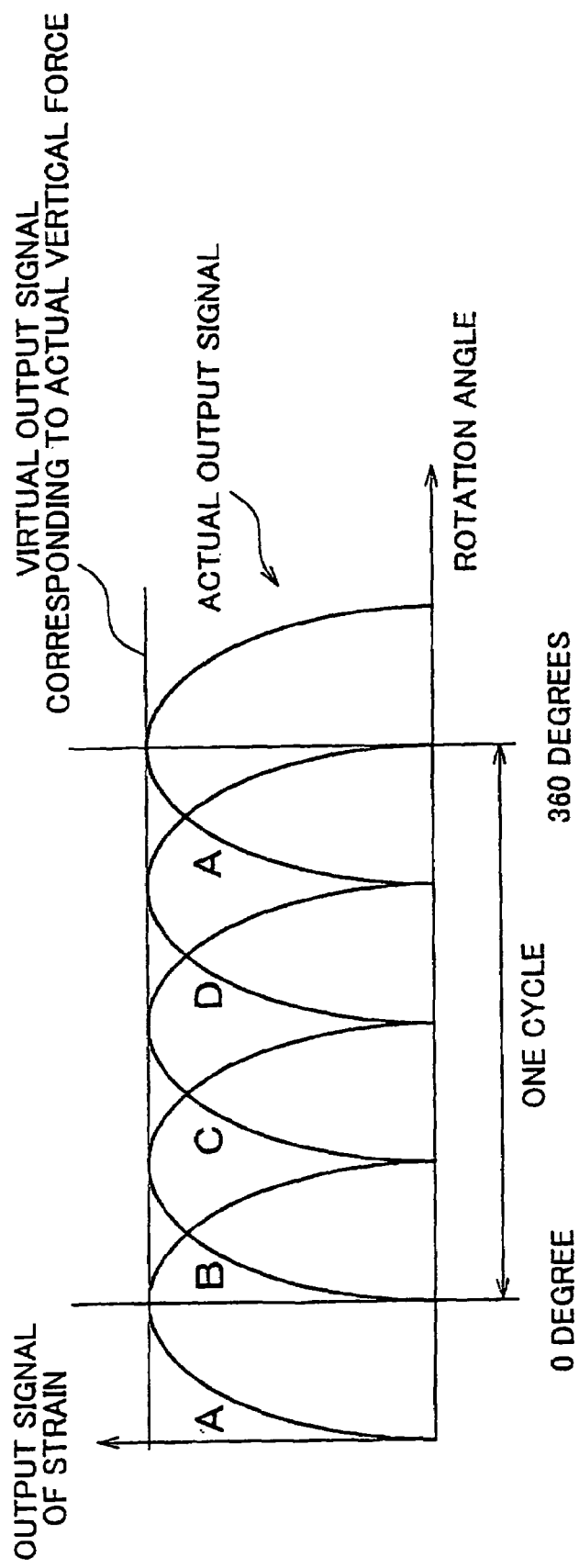
FIG. 13 is a graph showing how an output signal from the strain gauge of each detecting portion in FIG. 1 changes as a rotation angle of the detector in the same figure changes.

FIG. 13 is a graph showing, with a plurality of individual curves, the change in output signal from each strain gauge 174 in the third structural portion 104 of the four detecting portions 90 at four rotational positions at intervals of 90 degrees, along with the change in rotation angle of the detector 10. As apparent from FIG. 13, the size of the component of the vertical force VF acting at right angles to each strain gauge 174 changes cyclically in accordance with the rotational position of each detecting portion 90, i.e., in accordance with the rotation angle of the tire 24, even though an actual vertical force VF does not change over time. This cyclic change appears as a cyclic change in output signal of each strain gauge 174.

FIG. 13 is a graph in which a virtual output signal corresponding to the actual vertical force VF is expressed with a horizontal, straight line. As evident from the graph, the output signal of each strain gauge 174 is indicated with a single curve expressed as an upwardly convex sine wave for each cycle, i.e., for every one rotation of the tire 24. The maximum value in each individual curve matches the virtual output signal corresponding to the actual vertical force VF.

According to the present preferred embodiment, any two adjacent detecting portions 90 are separated 90 degrees from one another around the detector axis. As a result, as shown in FIG. 1, any two adjacent third structural portions 104 form right angles. The cylindrical face of the third transmitting portion 124 is in contact with both of the two third structural portions 104.

Accordingly, when the vertical force VF acts straight down from the third transmitting portion 124 and one of the two third structural portions 104 is positioned directly below the third transmitting portion 124, force from the third transmitting portion 124 is transmitted only to the third structural portion 104. However, as the third structural portion 104 is rotated from the position directly below the third transmitting portion 124, the third transmitting portion 124 also transmits force to the other third structural portion 104. In this state, the actual vertical force VF is distributed to the two third structural portions 104. If force, transmitted in a perpendicular direction to the face of each third structural portion 104 from the third transmitting portion 124, is divided to component forces f1 and f2, then the actual vertical force VF is expressed by the square root of the sum of squared component force f1 and squared component force f2.

Meanwhile, when force is being transmitted from the third transmitting portion 124 to the two third structural portions 104, force is not being transmitted from the third transmitting portion 124 to the remaining two of the four third structural portions 104. However, as rotation continues, force is transmitted from the third transmitting portion 124 to one of the first two third structural portions 104 and an adjacent one of the remaining two third structural portions 104, like the case with the first two third structural portions 104.

As clear from the fact that this type of shift in force transmitting state is repeated as the detector 10 rotates, the vertical force VF can ultimately be calculated without relying on the rotational position of the detector 10 by utilizing the square root of the sum of squared output signals from each strain gauge 174 of the four detecting portions 90.

As shown in FIG. 1, according to the present preferred embodiment, both longitudinal force and vertical force act on the second partition housing 42. As a result, both the forces also act on the third transmitting portion 124, causing both the forces to be transmitted through the third transmitting portion 124 to the third structural portion 104. This means that not only vertical force but also longitudinal force are transmitted to the third structural portion 104 because while the direction of lateral force does not contribute to bending of the third structural portion 104, the directions of longitudinal force and vertical force do contribute to bending of the third structural portion 104.

Figure 14:
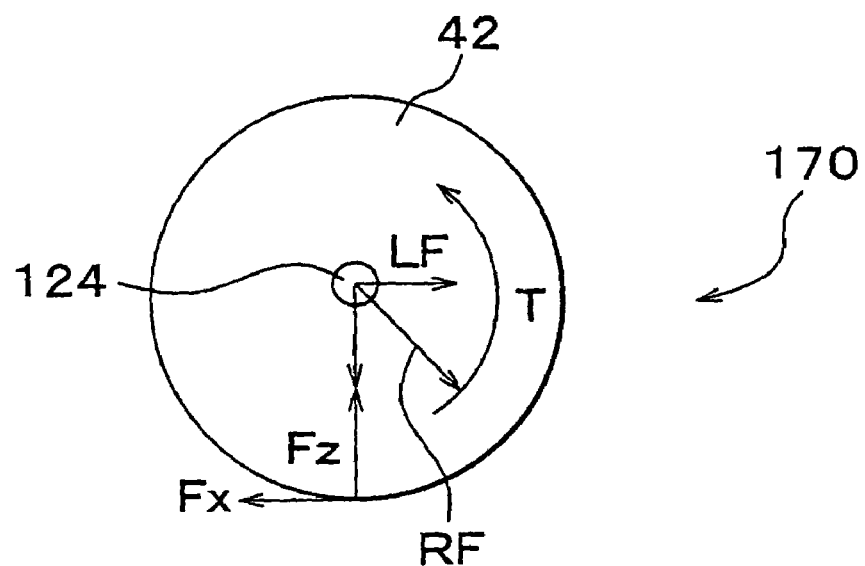
FIG. 14 is a front view for explaining the types of force acting on the strain gauge of the vertical force detecting portion in FIG. 9.

Therefore, according to the present preferred embodiment, resultant force RF of the longitudinal force LF and the vertical force VF acts on each of the third structural portions 104, as shown in FIG. 14. As a result, the output signal from the strain gauge 174 of the third structural portion 104 indicates the resultant force RF, not the vertical force VF. That is, the output signal includes not only the component reflecting vertical force but also the component reflecting longitudinal force.

Therefore, according to the present preferred embodiment, the component reflecting longitudinal force is eliminated from the output signal of the strain gauge 174 of the third structural portion 104 in the calculating portion 12.

More specifically, the calculating portion 12 first calculates the square of the resultant force of the longitudinal force and the vertical force based on a raw output signal from the strain gauge 174 of each of the third structural portions 104 in the four detecting portions 90. This calculation is performed using the sum of squared output signals of the four strain gauges 174, as described above. Next, the calculation portion 12 calculates the longitudinal force based on the output signals from the strain gauges 154 and 156 of the second structural portion 102. Then, the calculation portion 12 calculates, from the square of the calculated resultant force, the vertical force as the square root of a value obtained by subtracting the square of the calculated longitudinal force from the calculated square of the resultant force.

Further, according to the present preferred embodiment, the detecting member 94 is configured so that the first through third structural portions 100, 102 and 104 are formed integrally together. However, the detecting member 94 can also be configured so that one of those structural portions can be separated from the remaining two structural portions. This embodiment makes it easy to prevent a specific type of force acting on the tire from transmitting between two separated portions. For example, the third structural portion 104 can be selected as the one structural portion, and the first and second structural portions 100 and 102 can be selected as the remaining two structural portions.

Heretofore, the operation of the calculation portion 12 has been explained. Meanwhile the signal processing unit 222, to which the calculation portion 12 belongs, mainly comprises a computer having a processor and a memory. The calculation portion 12 is actuated by the computer.

The determining portion 14 and the zero-point correcting portion 16 are connected to the calculation portion 12, and are also actuated by the computer of the signal processing unit 222.

Figure 15:
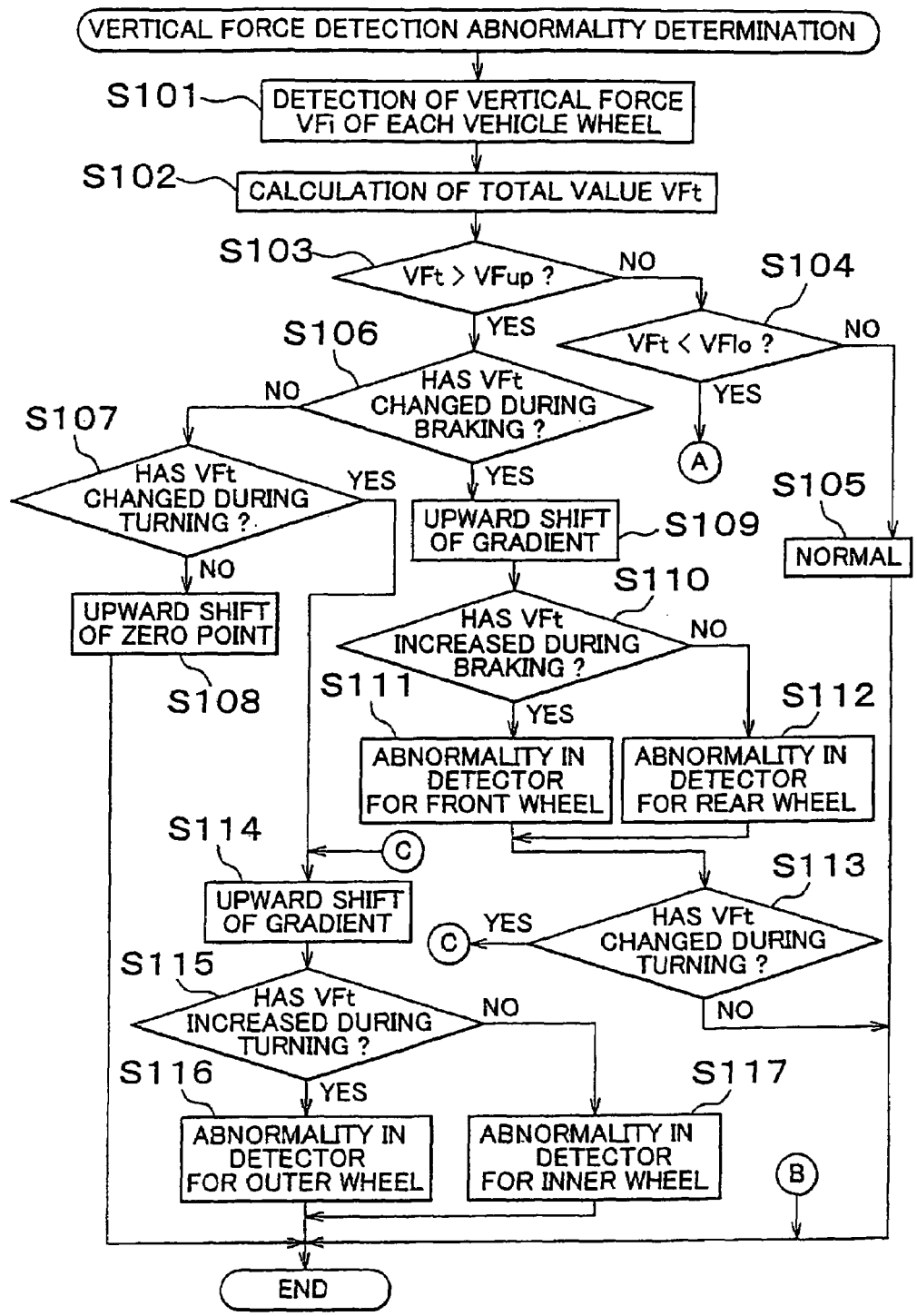
FIG. 15 is a flow chart conceptually showing a part of a vertical force detection abnormality determining program performed by a determining portion in FIG. 12.
Figure 16:
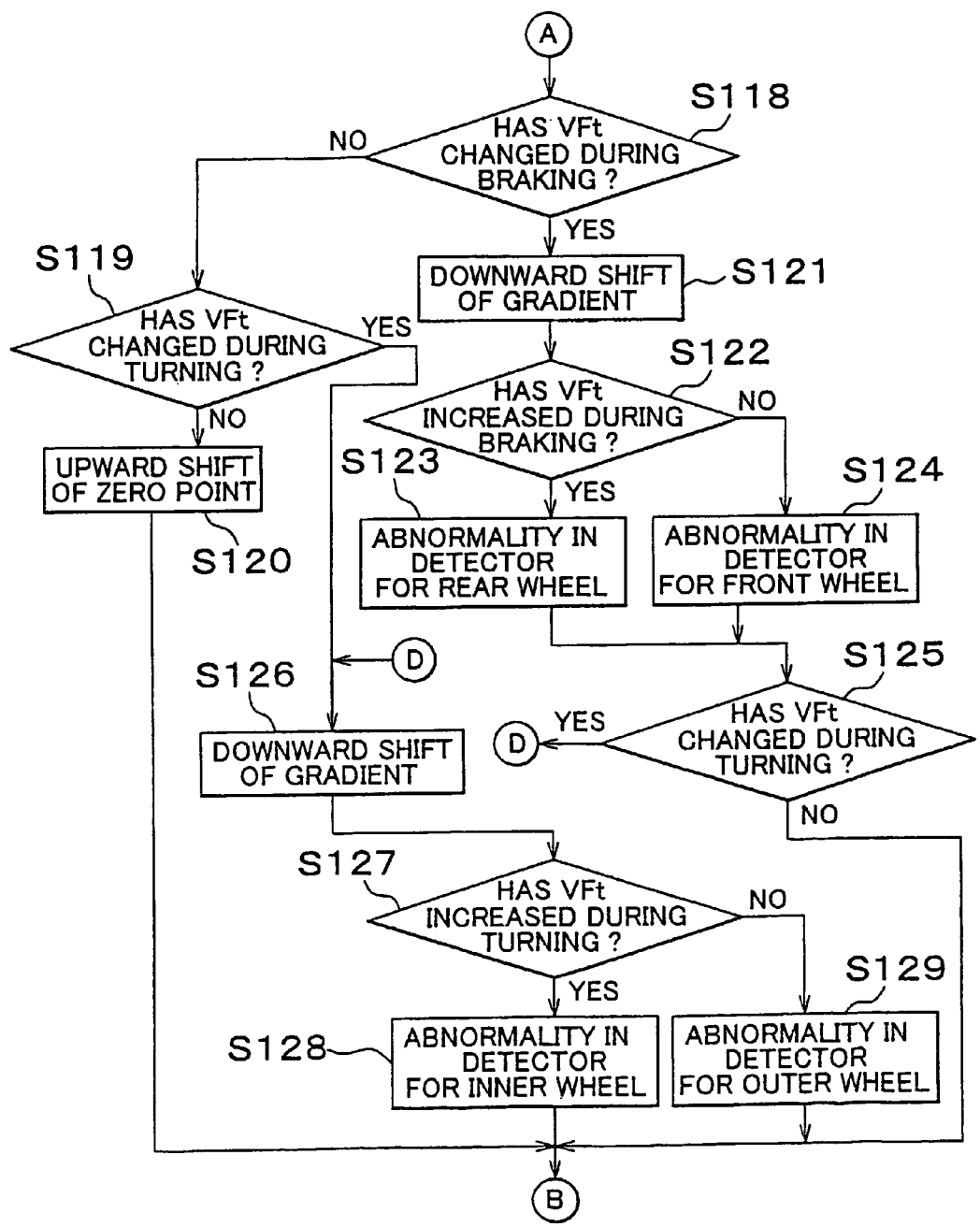
FIG. 16 is a flow chart conceptually showing the rest of the vertical force detection abnormality determining program.
Figure 17:
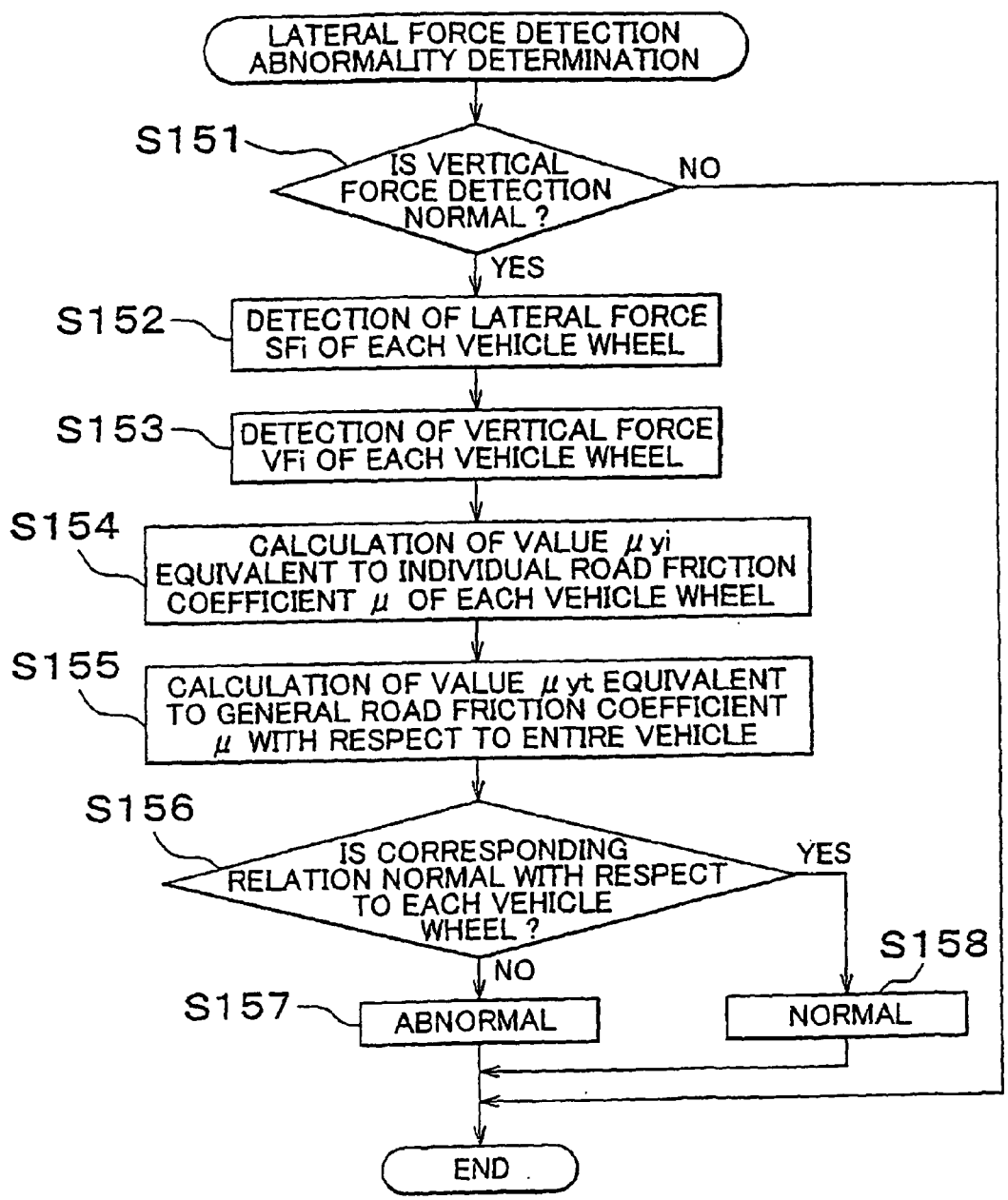
FIG. 17 is a flow chart conceptually showing a lateral force detection abnormality determining program performed by the determining portion in FIG. 12.
Figure 18:
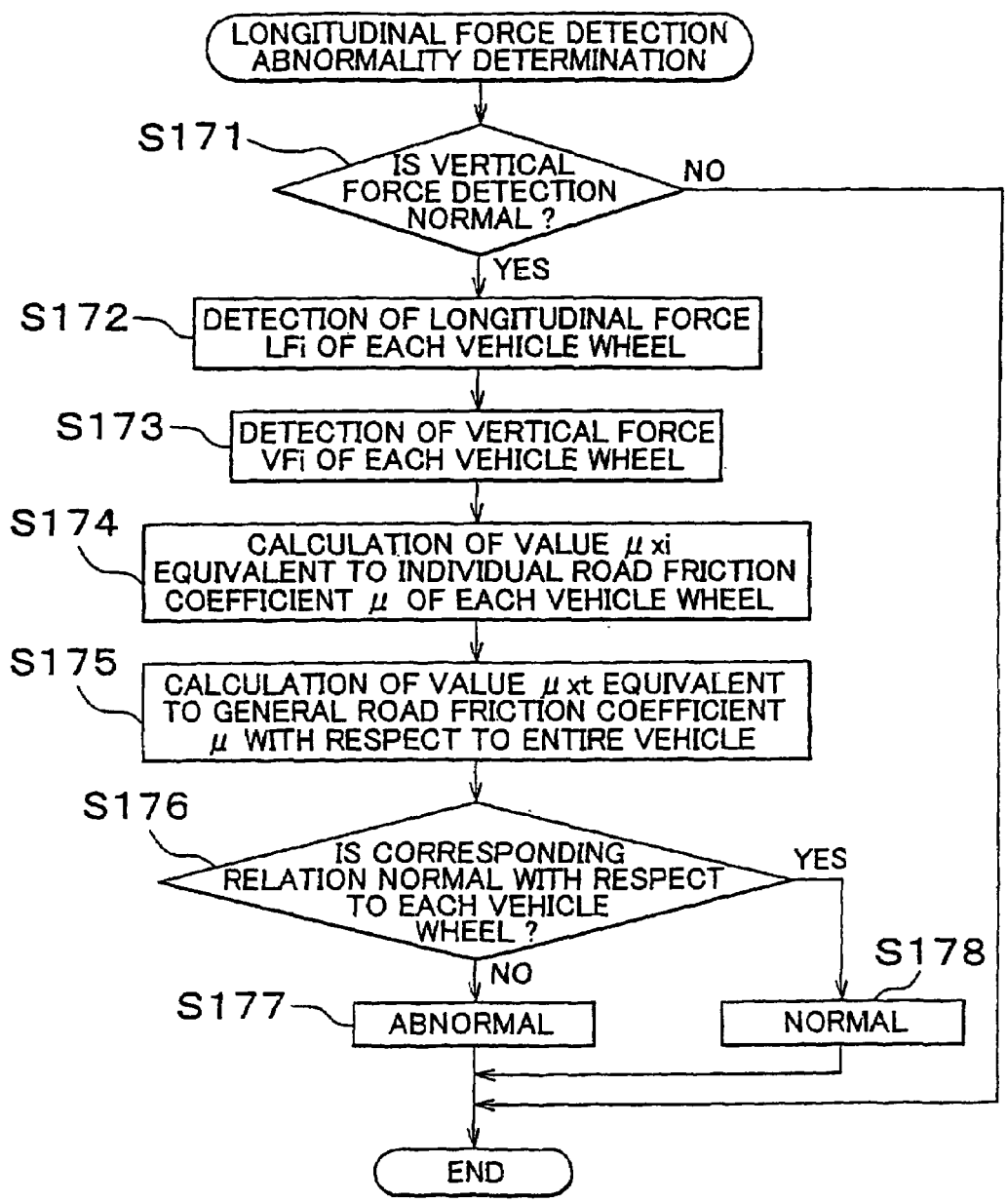
FIG. 18 is flow chart conceptually showing a longitudinal force detection abnormality determining program performed by the determining portion in FIG. 12.

More specifically, the determining portion 14 is actuated by the following programs performed by the computer: the vertical force detection abnormality determining program conceptually showed in the flow charts of FIGS. 15 and 16, the lateral force detection abnormality determining program conceptually showed in the flow chart of FIG. 17, and the longitudinal force detection abnormality determining program conceptually showed in the flow chart of FIG. 18.

Figure 19:
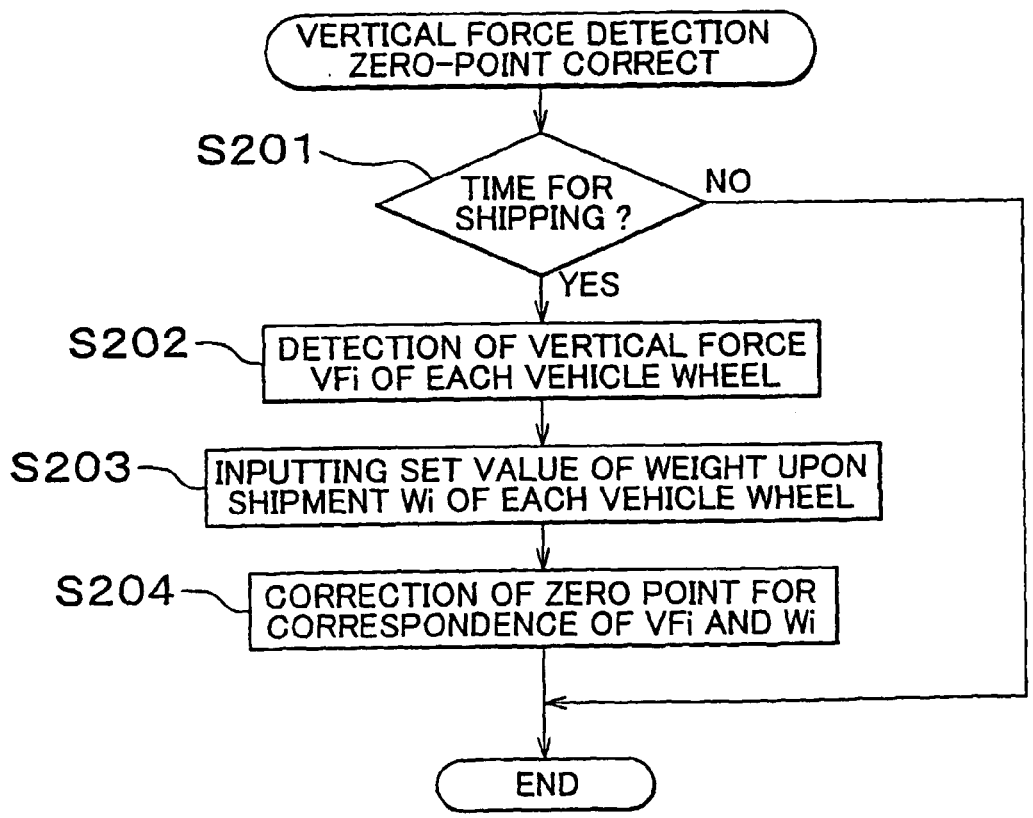
FIG. 19 is a flow chart conceptually showing a vertical force detection zero-point correction program performed by a zero-point correcting portion in FIG. 12.
Figure 20:
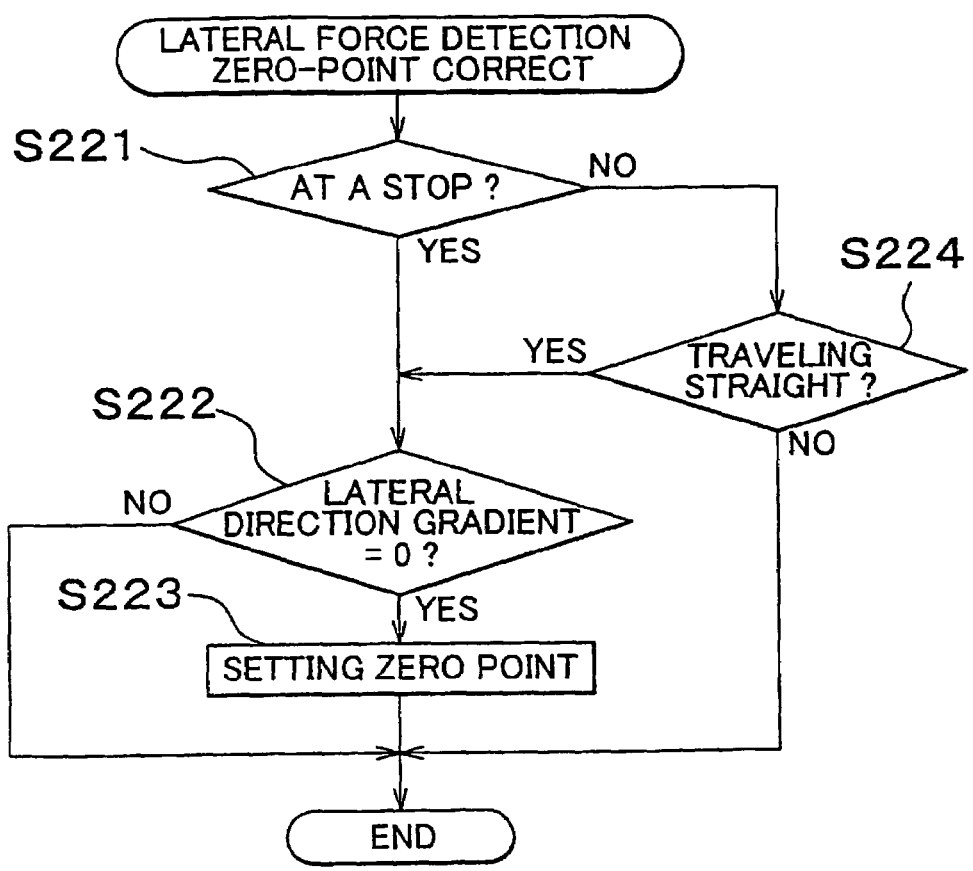
FIG. 20 is a flow chart conceptually showing a lateral force detection zero-point correction program performed by the zero-point correcting portion in FIG. 12.
Figure 21:
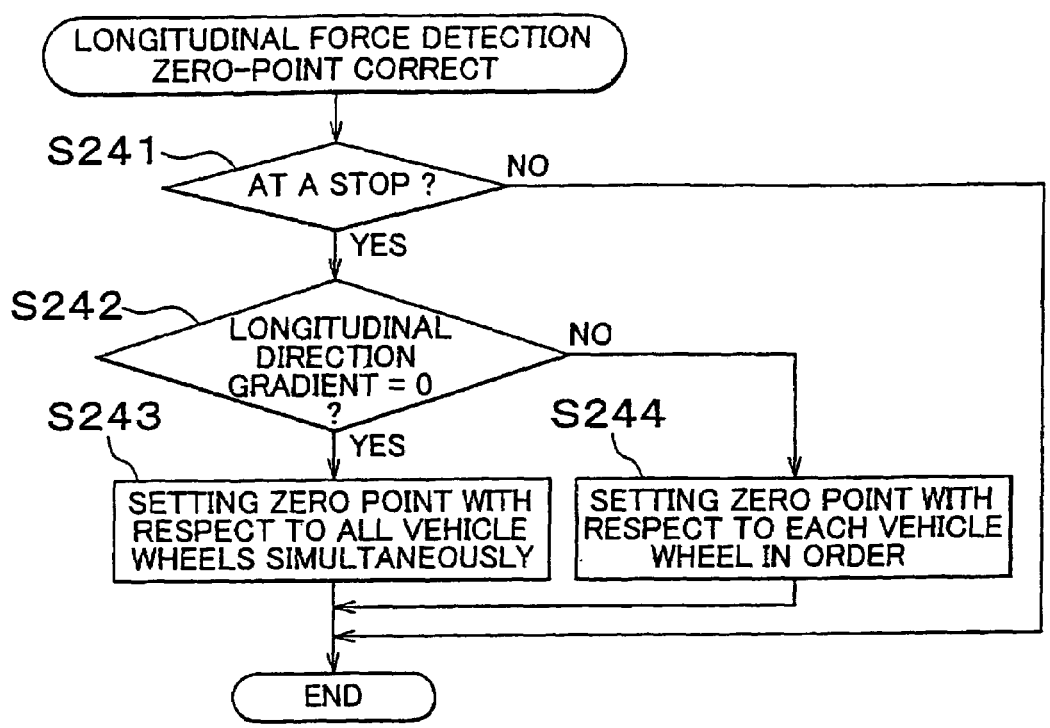
FIG. 21 is a flow chart conceptually showing a longitudinal force detection zero-point correction program performed by the zero-point correcting portion in FIG. 12.

On the other hand, the zero-point correcting portion 16 is actuated by the following programs performed by the computer: the vertical force detection zero-point correction program conceptually showed in the flow chart of FIG. 19, the lateral force detection zero-point correction program conceptually showed in the flow chart of FIG. 20, and the longitudinal force detection zero-point correction program conceptually showed in the flow chart of FIG. 21.

In addition, calculation portion 12 calibrates a raw detected value indicated by signals received by the detector 10 before outputting them.

The following explains the contents of the above-mentioned programs in order. The vertical force detection abnormality determining program in FIG. 15 is performed to determine whether or not detecting the vertical force VF, detected by the vertical force detecting portion 170 of each detector 10 mounted on each vehicle wheel 20, is abnormal.

If detecting the vertical force VF is abnormal, the vertical force detection abnormality determining program is also performed to determine an abnormal mode from the following two modes: a mode in which a zero point of the vertical force detecting portion 170 is abnormal (in which the zero point has upwardly or downwardly shifted from the normal zero point), and a mode in which a gradient of a graph (referred to a gradient hereafter) showing input/output characteristics of the vertical force detecting portion 170 has shifted from the normal gradient (in which the gradient has upwardly shifted from the normal gradient, i.e., the gradient is steeper, or in which the gradient has downwardly shifted from the normal gradient, i.e., the gradient is less steeper).

In addition, the vertical force detection abnormality determining program is also performed to identify the detector 10 in the abnormal mode out of the four detectors mounted on the four vehicle wheels 20 respectively.

Figure 22:
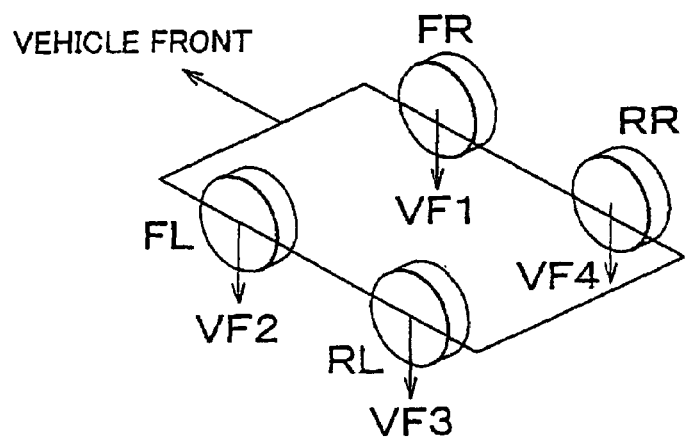
FIG. 22 is a perspective view for explaining step S101 in FIG. 15.

More specifically, when the vertical force detection abnormality determining program is initiated each time, first of all, vertical forces VFi (i=1~4) of each vehicle wheel 20 are detected by each detector 10 mounted on each vehicle wheel 20 at step S101 (referred to "S101" hereafter, the other steps are no exception). The vertical forces VF1, VF2, VF3, and VF4 are forces acting on the right front wheel, the left front wheel, the left rear wheel, and the right rear wheel respectively, as shown in FIG. 22.

Next, a total value VFt of the four vertical forces VFi, detected at each of the four vehicle wheels 20, is calculated at S102. Then whether or not the calculated total value VFt is larger than an upper limit of vertical force VFup is determined. The upper limit of vertical force VFup is the largest value which the total value VFt can become when all the detectors 10 are normal, and constitutes an example of "limit value" in the section (4).

At this time, if the total value VFt is assumed to not be larger than the upper limit of vertical force VFup, the determination at S103 becomes "NO" to proceed to S104. At S104, whether or not the calculated total value VFt is smaller than a lower limit of vertical force VFlo is determined. The lower limit of vertical force VFlo is the smallest value which the total value VFt can become when all the detectors 10 are normal, and constitutes an example of "limit value" in the section (4).

At this time, if the total value VFt is assumed to not be smaller than the lower limit of vertical force VFlo, the determination at S104 becomes "NO". Then detection of the vertical force VF by all the detectors 10 is determined to be normal at S105. This terminates a single routine of the vertical force detection abnormality determining program.

On the other hand, if the total value VFt is assumed to be larger than the upper limit of vertical force VFup, the determination at S103 becomes "YES". Then whether or not the total value VFt has changed while braking the vehicle is determined at S106.

The determination of whether the vehicle is being braked is performed by determining whether or not the vertical force VF acting on the front wheels, detected by the vertical force detecting portion 170, is increasing while the vertical force VF acting on the rear wheels, detected by the vertical force detecting portion 170, is decreasing.

At this time, if the total value VFt is assumed to have not changed, the determination at S106 becomes "NO". Then whether the total value VFt has changed while the vehicle is turning is determined at S107.

The determination of whether the vehicle is turning is performed by determining whether or not the vertical force VF acting on an outer turning wheel, detected by the vertical force detecting portion 170, is increasing while the vertical force VF acting on an inner turning wheel, detected by the vertical force detecting portion 170, is decreasing. The determination of whether each vehicle wheel 20 is the outer turning wheel or the inner turning wheel can be performed by, for example, referring to the turning direction of a steering wheel manipulated by a driver with a need to steer the vehicle.

At this time, if the total value VFt is assumed to have not changed, the determination at S107 becomes "NO". Then, with respect to detecting the vertical force VF, the zero point of at least one of the plural detectors 10 is determined to have upwardly shifted from the normal zero point at S108. This terminates a single routine of the vertical force detection abnormality determining program.

FIG. 23 is a table showing how the abnormal mode of the detector 10, in which a detection abnormality is being generated, is determined, and how the position of the vehicle wheel 20, on which the detector 10 with the detection abnormality is mounted, is identified, depending on the combination of the total value VFt and its tendency to change temporally.

In this table, the following symbols are used with the following definitions:

A1; condition where the total value VFt is larger than the upper limit of vertical force VFup, A2; condition where the total value VFt is smaller than the lower limit of vertical force VFlo, B1; condition where the total value VFt has not changed while braking, B2; condition where the total value VFt has increased while braking, B3; condition where the total value VFt has decreased while braking, C1; condition where the total value VFt has not changed while turning, C2; condition where the total value VFt has increased while turning, and C3; condition where the total value VFt has decreased while turning.

Therefore, as described above, if the total value VFt is larger than the upper limit of vertical force VFup, and if the total value VFt has not changed while braking, and if the total value VFt has not changed while turning, this means the conditions A1, B1, and C1 have been met. As a result, with respect to detecting the vertical force VF, the zero point of at least one of the plural detectors 10 is determined to have upwardly shifted from the normal zero point.

On the other hand, if the total value VFt is assumed to have changed while braking the vehicle, the determination at S106 becomes "NO". In this case, the conditions A1 and B2 or B3 have been met. As a result, with respect to detecting the vertical force VF, the gradient of at least one of the plural detectors 10 is determined to have upwardly shifted from the normal gradient at S109, as shown in FIG. 23.

Next, whether the total value VFt has increased or decreased while braking the vehicle is determined at S110. If the total value VFt has increased, the determination becomes "YES". In this case, the conditions A1 and B2 have been met. As a result, with respect to detecting the vertical force VF, the gradient of at least one of the detectors 10, mounted on the right and left front vehicle wheels, is determined to have upwardly shifted from the normal gradient at S111, which is one of the abnormal modes, as shown in FIG. 23.

In contrast, if the total value VFt has decreased while braking the vehicle, the determination at S110 becomes "NO". In this case, the conditions A1 and B3 have been met. As a result, with respect to detecting the vertical force VF, the gradient of at least one of the detectors 10, mounted on the right and left rear vehicle wheels, is determined to have upwardly shifted from the normal gradient at S112, which is one of the abnormal modes, as shown in FIG. 23.

Then, in any case, whether or not the total value VFt has changed while turning the vehicle is determined at S113. If the total value VFt has not changed, the determination becomes "NO", which immediately terminates a single routine of the vertical force detection abnormality determining program. On the other hand, if the total value VFt has changed, the determination becomes "YES" to proceed to S114.

If the total value VFt has not changed while braking and if it has changed while turning, the determination at S106 becomes "NO" and the determination at S107 becomes "YES", proceeding to S114. On the other hand, if the total value VFt has changed while braking and if it has changed while turning, the determination at S106 becomes "YES" and the determination at S107 becomes "YES" to proceed to S114.

In any case, at this time, the conditions A1 and C2 or C3 have been met. As a result, with respect to detecting the vertical force VF, the gradient of at least one of the plural detectors 10 is determined to have upwardly shifted from the normal gradient at S114, as shown in FIG. 23.

Next, whether the total value VFt has increased or decreased while turning the vehicle is determined at S115. If the total value VFt has increased, the determination becomes "YES". In this case, the conditions A1 and C2 have been met. As a result, with respect to detecting the vertical force VF, the gradient of at least one of the detectors 10, mounted on front and rear outer turning vehicle wheels, is determined to have upwardly shifted from the normal gradient at S116, which is one of the abnormal modes, as shown in FIG. 23.

In contrast, if the total value VFt has decreased while turning the vehicle, the determination at S115 becomes "NO". In this case, the conditions A1 and C3 have been met. As a result, with respect to detecting the vertical force VF, the gradient of at least one of the detectors 10, mounted on front and rear inner turning vehicle wheels, is determined to have upwardly shifted from the normal gradient at S117, which is one of the abnormal modes, as shown in FIG. 23.

Any of the cases above, at this time, lead to termination of a single routine of the vertical force detection abnormality determining program.

In the vertical force detection abnormality determining program, if either the fact that the total value VFt has changed while braking the vehicle or the fact that it has changed while turning the vehicle is determined, and if, for example, a detection abnormality is generated in only one of the four detectors 10, the one detector cannot be identified. In contrast, if both of the above-mentioned facts are determined, and if, for example, a detection abnormality is generated in only one of the four detectors 10, the one detector can be identified by considering both a result of abnormality determination of S111 or S112 and that of S116 and S117.

Heretofore, the processes, in the vertical force detection abnormality determining program when the total value VFt is larger than the upper limit of vertical force VFup, have been explained. In contrast, if the total value VFt is smaller than the lower limit of vertical force VFlo, the determination at S103 becomes "NO" and the determination at S104 becomes "YES", proceeding to S118 or S129 in FIG. 16.

S118 or S129 is performed according to performance of S106 or S107 in FIG. 15. More specifically, first of all, whether or not the total value VFt has changed while braking the vehicle is determined at S118. If the total value VFt assumed not to have changed at this time, the determination becomes "NO". Then whether or not the total value VFt has changed while turning the vehicle is determined at S119. If the total value VFt assumed not to have changed at this time, the determination becomes "NO". In this case, the conditions A2, B1, and C1 have been met. As a result, with respect to detecting the vertical force VF, the zero point of at least one of the plural detectors 10 is determined to have downwardly shifted from the normal zero point at S120, as shown in FIG. 23. This terminates a single routine of the vertical force detection abnormality determining program.

On the other hand, if the total value VFt is assumed to have changed while braking the vehicle, the determination at S118 becomes "YES". In this case, the conditions A2 and B2 or B3 have been met. As a result, with respect to detecting the vertical force VF, the gradient of at least one of the plural detectors 10 is determined to have downwardly shifted from the normal gradient at S121, as shown in FIG. 23.

Next, whether the total value VFt has increased or decreased while braking the vehicle is determined at S122. If the total value VFt has increased, the determination becomes "YES". In this case, the conditions A2 and B2 have been met. As a result, with respect to detecting the vertical force VF, the gradient of at least one of the detectors 10, mounted on the right and left rear vehicle wheels, is determined to have downwardly shifted from the normal gradient at S123, which is one of the abnormal modes, as shown in FIG. 23.

In contrast, if the total value VFt has decreased while braking the vehicle, the determination at S122 becomes "NO". In this case, the conditions A2 and B3 have been met. As a result, with respect to detecting the vertical force VF, the gradient of at least one of the detectors 10, mounted on the right and left front vehicle wheels, is determined to have downwardly shifted from the normal gradient at S124, which is one of the abnormal modes, as shown in FIG. 23.

Then, in any case, whether or not the total value VFt has changed is determined at S125. If the total value VFt has not changed, the determination becomes "NO", which immediately terminates a single routine of the vertical force detection abnormality determining program. On the other hand, if the total value VFt has changed, the determination becomes "YES", proceeding to S126.

If the total value VFt has not changed while braking and if it has changed while turning, the determination at S118 becomes "NO" and the determination at S119 becomes "YES", proceeding to S126. On the other hand, if the total value VFt has changed while braking and if it has changed while turning, the determination at S118 becomes "YES" and the determination at S119 becomes "YES" to proceed to S126.

In any case, at this time, the conditions A2 and C2 or C3 have been met. As a result, with respect to detecting the vertical force VF, the gradient of at least one of the plural detectors 10 is determined to have downwardly shifted from the normal gradient at S126, as shown in FIG. 23.

Next, whether the total value VFt has increased or decreased while turning the vehicle is determined at S127. If the total value VFt has increased, the determination becomes "YES". In this case, the conditions A2 and C2 have been met. As a result, with respect to detecting the vertical force VF, the gradient of at least one of the detectors 10, mounted on front and rear inner turning vehicle wheels, is determined to have downwardly shifted from the normal gradient at S128, which is one of the abnormal modes, as shown in FIG. 23.

In contrast, if the total value VFt has decreased while turning the vehicle, the determination at S127 becomes "NO". In this case, the conditions A2 and C3 have been met. As a result, with respect to detecting the vertical force VF, the gradient of at least one of the detectors 10, mounted on front and rear outer turning vehicle wheels, is determined to have downwardly shifted from the normal gradient at S129, which is one of the abnormal modes, as shown in FIG. 23.

Any of the cases, at this time, lead to termination of a single routine of the vertical force detection abnormality determining program.

Heretofore, the vertical force detection abnormality determining program has been explained. Next, the following explains the lateral force detection abnormality determining program while referring to FIG. 17.

The lateral force detection abnormality determining program is performed by the computer to determine whether or not there is a detection abnormality of the lateral force detecting portion 150 with the use of the vertical force VF detected by the vertical force detecting portion 170. In order to ensure its detection accuracy, the lateral force detection abnormality determining program is performed under a condition where the vertical force detecting portion 170 with respect to all the vehicle wheels 20 is determined to be normal as a result of performing the vertical force detection abnormality determining program.

When the lateral force detection abnormality determining program is initiated each time, first of all, whether or not detection of the vertical force VF by the detector 10 with respect to all the vehicle wheels 20 has been determined to be normal as a result of performing the vertical force detection abnormality determining program is determined at S151. If detection of the vertical force VF by the detector 10 with respect to all the vehicle wheels 20 has not been determined to be normal, the determination at S151 becomes "NO", which immediately terminates a single routine of the lateral force detection abnormality determining program.

In contrast, if detection of the vertical force VF by the detector 10 with respect to all the vehicle wheels 20 has been determined to be normal, the determination at S151 becomes "YES" to proceed to S152.

Figure 24:
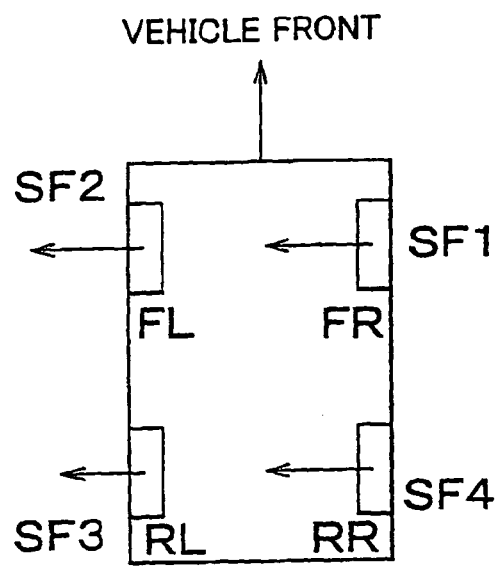
FIG. 24 is a perspective view for explaining step S152 in FIG. 17.

At S152, lateral forces SFi (i=1~4) of each vehicle wheel 20 are detected by the lateral force detecting portion 150 of each detector 10 mounted on each vehicle wheel 20. The lateral forces SF1, SF2, SF3, and SF4 are forces acting on the right front wheel, the left front wheel, the left rear wheel, and the right rear wheel respectively, as shown in FIG. 24.

Then, at S153, the vertical forces VFi (i=1~4) of each vehicle wheel 20 are detected by the vertical force detecting portion 170 of each detector 10 mounted on each vehicle wheel 20.

Next, at S154, an individual value μyi equivalent to road friction coefficient μ of each vehicle wheel 20 is calculated by dividing the detected lateral force SFi by the detected vertical force VFi, i.e., the individual value μyi equivalent to road friction coefficient μ is defined by the following formula:

$$\mu yi = SFi/VFi.$$

Then a general value μyt equivalent to road friction coefficient μ with respect to the entire vehicle is calculated at S155. More specifically, it is calculated by dividing a total value SFt of the four lateral forces SFi, detected in the four vehicle wheels 20, by a total value VFt of the four vertical forces VFi, detected in the four vehicle wheels 20, i.e., the general value μyt equivalent to road friction coefficient μ is defined by the following formula:

$$\mu yt = SFt/VFt.$$

Next off, whether or not corresponding relation between the calculated individual value μyi equivalent to road friction coefficient μ of each vehicle wheel 20 and the calculated general value μyt equivalent to road friction coefficient μ (e.g., a graph gradient showing proportionally relation between both of them) has sifted either from normal corresponding relation (e.g., proportionally relation showed by a graph with the gradient of 45 degrees) or from a permissible range thereof is determined at S156.

This corresponding relation is obtained as a graph gradient made on the assumption that data on the individual value μyi equivalent to road friction coefficient μ of each vehicle wheel 20 and data on the general value μyt equivalent to road friction coefficient μ are plotted on a coordinate plane.

Figure 25:
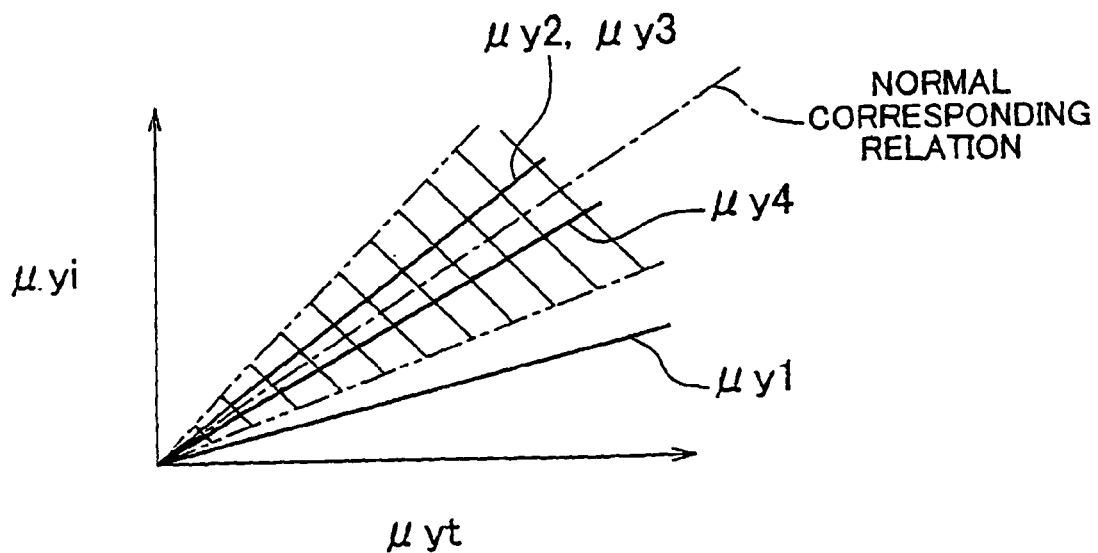
FIG. 25 is a graph for explaining step S156 or step S158 in FIG. 17.

FIG. 25 is a graph showing an example of how the corresponding relation between the individual value μyi equivalent to road friction coefficient μ of one vehicle wheel 20 and the general value μyt equivalent to road friction coefficient μ shifts from the normal corresponding relation.

In this example, the permissive range is set on both sides of the graph showing the normal corresponding relation (the area with hatching in FIG. 25). Within the permissible range, the individual values μy2, μy3, and μy4 equivalent to road friction coefficient μ are located, while the individual value μy1 equivalent to road friction coefficient μ is located outside of the permissible range. Therefore, with respect to detecting the lateral force SF, three detectors 10 corresponding to the individual values μy2, μy3, and μy4 equivalent to road friction coefficient μ are determined to be normal, while the remaining detector 10 corresponding to the individual value μy1 equivalent to road friction coefficient μ is determined to be abnormal.

Regarding the vehicle wheel 20 whose corresponding relation is not normal, detection of the lateral force SF of the detector 10 (especially, input/output gradient of the detector 10), mounted on the vehicle wheel 20, is determined to be abnormal at S157. In contrast, regarding the vehicle wheel 20 whose corresponding relation is normal, detection of the lateral force SF of the detector 10, mounted on the vehicle wheel 20, is determined to be normal at S158.

Any of the cases above, at this time, lead to termination of a single routine of the lateral force detection abnormality determining program.

In addition, while the individual value μyi equivalent to road friction coefficient μ is compared to the general value μyt equivalent to road friction coefficient μ at S156 of the lateral force detection abnormality determining program, it can be compared to the total value μyt or a lateral acceleration Gy of the vehicle to embody the present invention.

Heretofore, the lateral force detection abnormality determining program has been explained. Next, the following explains the longitudinal force detection abnormality determining program while referring to FIG. 18.

The longitudinal force detection abnormality determining program is performed according to performance of the lateral force detection abnormality determining program. More specifically, when the longitudinal force detection abnormality determining program is initiated each time, first of all, whether or not detection of the vertical force VF by the detector 10 with respect to all the vehicle wheels 20 has been determined to be normal as a result of performing the vertical force detection abnormality determining program is determined at S171. If detection of the vertical force VF by the detector 10 with respect to all the vehicle wheels 20 has not been determined to be normal, the determination at S171 becomes "NO", which immediately terminates a single routine of the longitudinal force detection abnormality determining program.

In contrast, if detection of the vertical force VF by the detector 10 with respect to all the vehicle wheels 20 has been determined to be normal, the determination at S171 becomes "YES" to proceed to S172.

Figure 26:
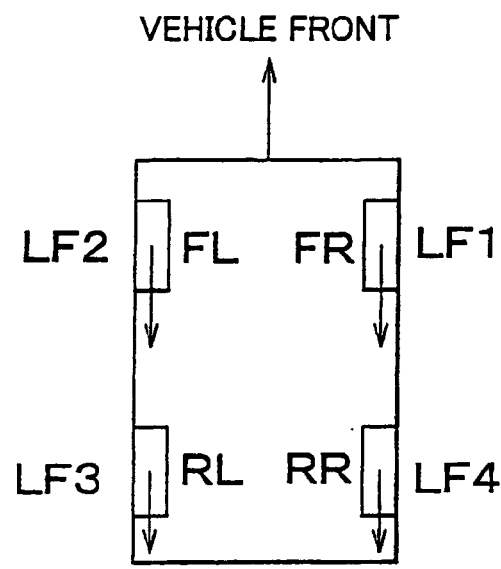
FIG. 26 is a perspective view for explaining step S172 in FIG. 18.

At S172, longitudinal forces LFi (i=1~4) of each vehicle wheel 20 are detected by the longitudinal force detecting portion 130 of each detector 10 mounted on each vehicle wheel 20. The longitudinal forces LF1, LF2, LF3, and LF4 are forces acting on the right front wheel, the left front wheel, the left rear wheel, and the right rear wheel respectively, as shown in FIG. 26.

Then the vertical forces VFi (i=1~4) of each vehicle wheel 20 are detected by the vertical force detecting portion 170 of each detector 10 mounted on each vehicle wheel 20 at S173.

Next, at S174, an individual value μxi equivalent to road friction coefficient μ of each vehicle wheel 20 is calculated by dividing the detected longitudinal force LFi by the detected vertical force VFi, i.e., the individual value μxi equivalent to road friction coefficient μ is defined by the following formula:

$$\mu xi = LFi/VFi.$$

Then a general value μxt equivalent to road friction coefficient μ with respect to the entire vehicle is calculated at S175. More specifically, it is calculated by dividing a total value LFt of the four lateral forces LFi, detected in the four vehicle wheels 20, by a total value VFt of the four vertical forces VFi, detected in the four vehicle wheels 20, i.e., the general value μxt equivalent to road friction coefficient μ is defined by the following formula:

$$\mu xt = LFt/VFt.$$

Next off, based on S156, whether or not corresponding relation between the calculated individual value μxi equivalent to road friction coefficient μ of each vehicle wheel 20 and the calculated general value μxt equivalent to road friction coefficient μ (e.g., a graph gradient showing proportionally relation between both of them) has sifted from normal corresponding relation is determined at S176.

Figure 27:
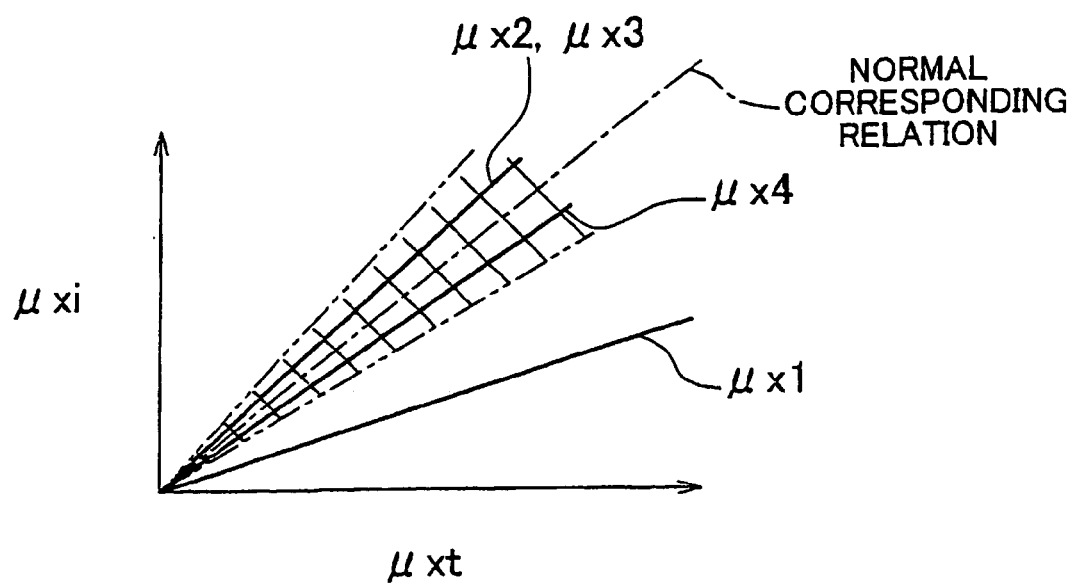
FIG. 27 is a graph for explaining step S176 or step S178 in FIG. 18.

FIG. 27, based on FIG. 25, shows an example of how the corresponding relation between the individual value μxi equivalent to road friction coefficient μ of one vehicle wheel 20 and the general value μxt equivalent to road friction coefficient μ shifts from the normal corresponding relation.

Regarding the vehicle wheel 20 whose corresponding relation is not normal, detection of the longitudinal force LF of the detector 10 (especially, the input/output gradient of the detector 10), mounted on the vehicle wheel 20, is determined to be abnormal at S177. In contrast, regarding the vehicle wheel 20 whose corresponding relation is normal, detection of the longitudinal force LF of the detector 10, mounted on the vehicle wheel 20, is determined to be normal at S178.

Any of the cases above, at this time, lead to termination of a single routine of the longitudinal force detection abnormality determining program.

In addition, while the individual value μxi equivalent to road friction coefficient μ is compared to the general value μxt equivalent to road friction coefficient μ at S176 of the longitudinal force detection abnormality determining program, it may be compared the total value μxt or a longitudinal acceleration Gx of the vehicle to embody the present invention.

Next, the following explains the vertical force detection zero-point correction program while referring to FIG. 19.

The vertical force detection zero-point correction program is performed by the computer to correct the zero point of the vertical force detecting portion 170. When this program is initiated each time, first of all, whether or not it is time for shipping the vehicle, provided with the detector 10 for performing zero-point correction with respect to detecting the vertical force VF, from an assembly plant is determined at S201. This determination can be performed, for example, by determining whether or not a worker has input the fact that it is time for shipping to the computer.

If it is assumed not to be time for shipping, the determination at S201 becomes "NO", which immediately terminates a single routine of the vertical force detection zero-point correction program.

On the other hand, if it is assumed to be time for shipping, the determination at S201 becomes "YES" to proceed to S202. At S202, the vertical force VFi of each vehicle wheel 20 is detected by the vertical force detecting portion 170 of the detector mounted on each vehicle wheel 20.

Next, at S203, the memory of the computer inputs set values of weight upon shipment Wi (i=1~4) of each vehicle wheel 20.

Then, at S204, the zero point of the vertical force detecting potion 170 is corrected so that a detected value of the vertical force VFi upon shipment of each vehicle wheel 20 matches the input weight upon shipment Wi, which in turn terminates a single routine of the vertical force detection zero-point correction program.

In addition, in the vertical force detection zero-point correction program, zero-point correction of each detector 10 with respect to detecting the vertical force VF is performed with the vehicle wheel 20 mounted on the hub 30 when shipping the vehicle. However, for example, the present invention can be embodied by setting the zero point of each detector 10 mounted on each hub 30 to a position indicating the vertical force VF is 0 when the vehicle is being jacked up and the vehicle wheel 20 has been disconnected from the hub 30.

Next off, the following explains the lateral force detection zero-point correction program while referring to FIG. 20.

The lateral force detection zero-point correction program is performed by the computer to correct the zero point with respect to detecting the lateral force SF. When the program is initiated each time, first of all, whether or not the vehicle is at a stop is determined at S221. The determination can be performed, for example, by referring to detected values of a vehicle wheel speed sensor, mounted on the vehicle, for detecting a rotating speed of each vehicle wheel 20 as a vehicle wheel speed.

If the vehicle is assumed to be at a stop, the determination at S221 becomes "YES". Then whether or not a lateral gradient of road surface in contact with the vehicle wheel 20 is 0 is determined. The determination is performed by determining whether or not two vertical forces VF of the right and left vehicle wheels detected by each vertical force detecting portion 170 match to each other.

If the lateral gradient is assumed to be 0, the determination at S222 becomes "YES". Then, at S223, the zero points of the lateral force detecting portions 150 of all the vehicle wheels are set to positions indicating the lateral force SF is 0, which in turn terminates a single routine of the lateral force detection zero-point correction program.

In contrast, if the lateral gradient is assumed not to be 0, the determination at S222 becomes "NO", skipping S223, which in turn terminates a single routine of the lateral force detection zero-point correction program.

Heretofore, the processes, in the lateral force detection zero-point correction program when the vehicle is at a stop, have been explained. On the other hand, if the vehicle is not at a stop, the determination at S221 becomes "NO". Then whether or not the vehicle is traveling straight is determined at S224. This determination can be performed by referring to, for example, the following detected values: a detected value of a steering angle sensor for detecting a steering angle of the steering wheel manipulated by the driver with a need to steer the vehicle, and a detected value of a yaw rate sensor for detecting a yaw rate of the vehicle or a detected value of a lateral acceleration sensor for detecting the lateral acceleration.

If the vehicle is assumed to not be traveling straight, the determination becomes "NO", which immediately terminates a single routine of the lateral force detection zero-point correction program.

On the other hand, if the vehicle is assumed to be traveling straight, the determination at S224 becomes "YES", proceeding to S222 to terminate a single routine of the lateral force detection zero-point correction program.

Next off, the following explains the longitudinal force detection zero-point correction program while referring to FIG. 21.

The longitudinal force detection zero-point correction program is performed by the computer to correct the zero point of the longitudinal force detecting portion 130. When the program is initiated each time, first of all, whether or not the vehicle is at a stop is determined at S241 based on S221.

If the vehicle is assumed to be at a stop, the determination at S241 becomes "YES". Then whether or not a longitudinal gradient of road surface in contact with the vehicle wheel 20 is 0 is determined. The determination is performed by determining whether or not two vertical forces VF of the front and rear vehicle wheels detected by each vertical force detecting portion 170 match to each other.

If the longitudinal gradient is assumed to be 0, the determination at S242 becomes "YES". Then, at S243, the zero points of the longitudinal force detecting portions 130 of all the vehicle wheels are set to positions indicating the longitudinal force LF is 0, which in turn terminates a single routine of the longitudinal force detection zero-point correction program.

In contrast, if the longitudinal gradient is assumed not to be 0, the determination at S242 becomes "NO", proceeding to S223.

At S244, zero-point correction for detecting the longitudinal force LF is performed over some of the four detectors 10 of the four vehicle wheels 20 in order.

In each zero-point setting, the brake is not actuated on vehicle wheels 20 provided with the detectors 10 whose zero points are to be corrected, while the brake is actuated on at least one of the remaining vehicle wheels, to cause a state as a reference vehicular state where braking force does not act on the vehicle wheels with the detectors 10 whose zero point are to be corrected.

In each zero-point setting, further, the zero points of detectors 10 are set to positions indicating the longitudinal force LF is 0 in the reference vehicular state caused. This terminates a single routine of the longitudinal force detection zero-point correction program.

In addition, in the present preferred embodiment, if at least one of the four detectors 10 with respect to detecting the vertical force VF, the lateral force SF, and the longitudinal force LF is determined to be abnormal, the driver is notified of the abnormality visually and acoustically, and the use of a detected value of the abnormal detector 10 in the vehicle controls is prohibited.

Moreover, in the present preferred embodiment, if the detector 10 is determined to be normal after performing the vertical force detection abnormality determining program, the lateral force detection abnormality determining program, and the longitudinal force detection abnormality determining program, performing a corresponding program among the vertical force detection zero-point correction program, the lateral force detection zero-point correction program, and the longitudinal force detection zero-point correction program over the detector 10 is permitted. On the other hand, if the detector 10 is determined to be abnormal, performing any of the zero-point correction programs over the detector 10 is prohibited.

As clear from the explanation above, in the present preferred embodiment, portions of the determining portion 14 for performing S103 or S105, S108, S109, and S114 in FIG. 15, and S120, S121, and S126 in FIG. 16 constitute an example of "first abnormality determining means" in the section (4).

Furthermore, in the present preferred embodiment, portions of the determining portion 14 for performing S101 or S105, S108, S109, and S114 in FIG. 15, and S120, S121, and S126 in FIG. 16 constitute an example of "means" in the section (5).

Furthermore, in the present preferred embodiment, portions of the determining portion 14 for performing S106, S107, S111 or S113, and S115 or S117 in FIG. 15, and S118, S119, S122 or S125, and S127 or S129 in FIG. 16 constitute an example of "second abnormality determining means" in the section (6).

Furthermore, in the present preferred embodiment, portions of the determining portion 14 for performing S101, S102, S106, S107, S110 or S113, and S115 or S117 in FIG. 15, and S118, S119, S122 or S125, and S127 or S129 in FIG. 16 constitute an example of "means" in the section (7).

Furthermore, in the present preferred embodiment, portions of the determining portion 14 for performing S103, S104, S106 or S109, S113, and S114 in FIG. 15, and S118 or S121, S125, and S126 in FIG. 16 constitute an example of "abnormal mode identifying means" in the section (8).

Furthermore, in the present preferred embodiment, portions of the determining portion 14 for performing all steps in FIGS. 15 and 16 except S105, S108, S109, S114, S120, S121, and S126 constitute an example of "abnormal detector identifying means" in the section (9).

Furthermore, in the present preferred embodiment, portions of the determining portion 14 for performing S106 and S107 in FIG. 15, and S118 and S119 in FIG. 16 constitute an example of "means" in the section (12).

Furthermore, in the present preferred embodiment, portions of the determining portion 14 for performing all steps in FIG. 17 and those for performing all steps in FIG. 18 respectively constitute an example of "third abnormality determining means" in the section (15).

Furthermore, in the present preferred embodiment, portions of the determining portion 14 for performing S152 or S158 in FIG. 17 and those for performing S172 or S178 in FIG. 18 respectively constitute examples of "means" in the sections (16) and (17).

Furthermore, in the present preferred embodiment, portions of the zero-point correcting portion 16 for performing all steps in FIG. 20 and those for performing all steps in FIG. 21 respectively constitute an example of "setting means" in the section (54).

Furthermore, in the present preferred embodiment, portions of the zero-point correcting portion 16 for performing S221 and S222 in FIG. 20 and those for performing S241 and S242 in FIG. 21 respectively constitute an example of "reference vehicular state determining means" in the section (55).

Furthermore, in the present preferred embodiment, a portion of the zero-point correcting portion 16 for performing S242 in FIG. 21 constitutes an example of "means" in the section (56).

Furthermore, in the present preferred embodiment, a portion of the zero-point correcting portion 16 for performing S222 in FIG. 20 constitutes an example of "means" in the section (57).

Furthermore, in the present preferred embodiment, a portion of the zero-point correcting portion 16 for performing S244 in FIG. 21 constitutes an example of "means" in the section (58).

Furthermore, in the present preferred embodiment, portions of the zero-point correcting portion 16 for performing S221, S223, and S224 in FIG. 20 constitute an example of "means" in the section (59).

Furthermore, in the present preferred embodiment, portions of the determining portion 14 for performing all steps in FIGS. 15 and 16 constitute an example of "first abnormality determining portion" in the section (61).

Furthermore, in the present preferred embodiment, portions of the determining portion 14 for performing all steps in FIG. 17 and those for performing all steps in FIG. 18 respectively constitute an example of "second abnormality determining portion" in the section (62).

Next, the following explains the second preferred embodiment of the present invention. However, the present preferred embodiment has a lot of elements common to those of the first preferred embodiment, and only elements with respect to abnormality determination of lateral and longitudinal force detection by the detector are different from those of the first preferred embodiment. Therefore, the different elements will be explained in detail, and the explanation of the common elements will be omitted by using the same reference numerals.

Figure 28:
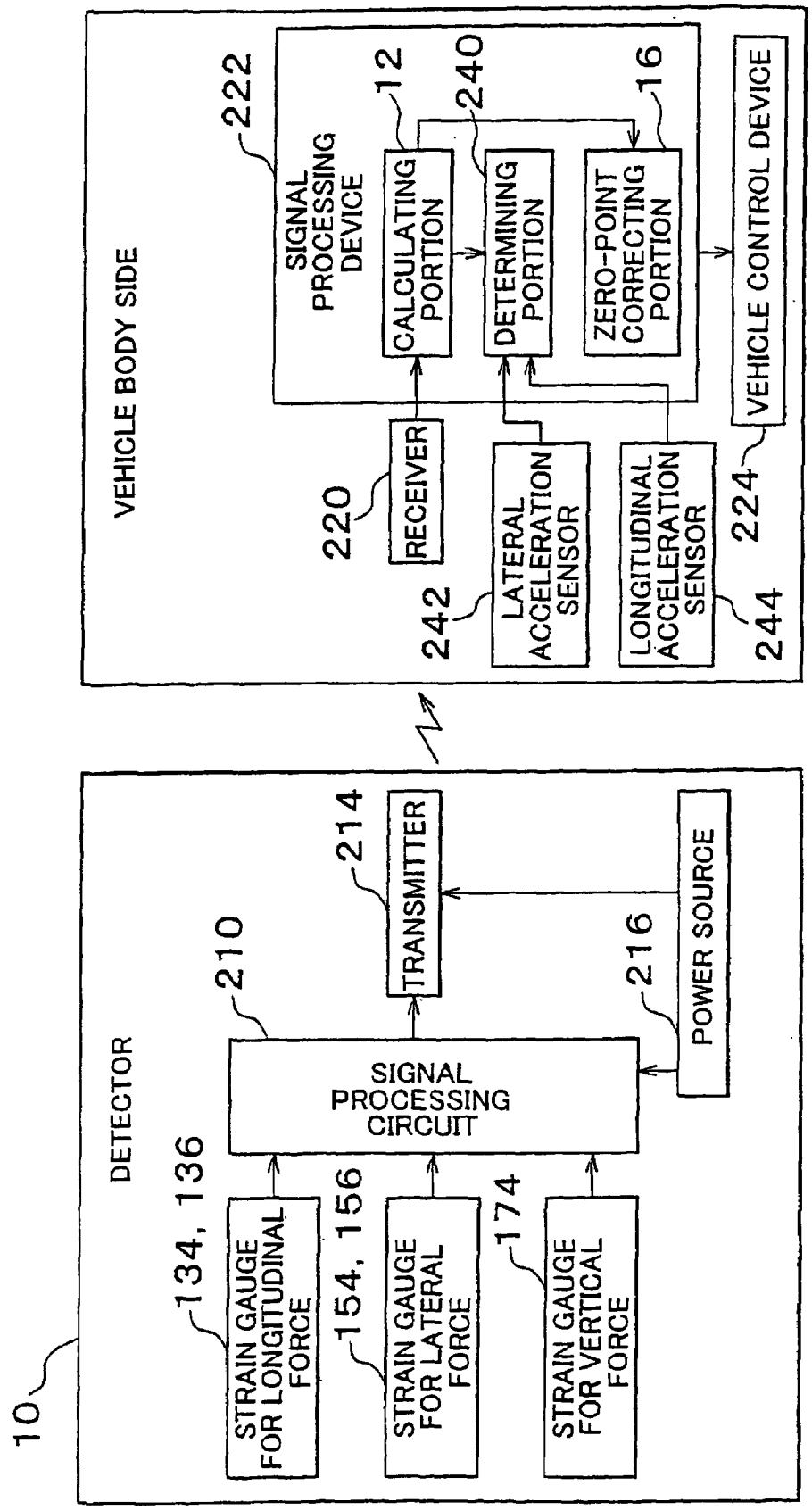
FIG. 28 is a block diagram showing an electrical configuration of a device for detecting force acting on a tire according to a second preferred embodiment of the invention.

As shown in FIG. 28, in the present preferred embodiment, a determining portion 240 is provided instead of the determining portion 14 of the first preferred embodiment. The determining portion 240 is so designed as to perform abnormality determination with the following programs: a program same as the vertical force detection abnormality determining program, shown in FIGS. 15 and 16, for abnormality determination with respect to detecting the vertical force VF by the detector 10, the lateral force detection abnormality determining program, conceptually shown in the flow chart of FIG. 29, for abnormality determination with respect to detecting the lateral force SF by the detector 10, and the longitudinal force detection abnormality determining program, conceptually shown in the flow chart of FIG. 30, for abnormality determination with respect to detecting the longitudinal force LF by the detector 10.

In the present preferred embodiment, as shown in FIG. 28, a lateral acceleration sensor 242 and a longitudinal acceleration sensor 244 are further provided to a vehicle body. The lateral acceleration sensor 242 detects the lateral acceleration Gy acting on the vehicle, and the longitudinal acceleration sensor 244 detects the longitudinal acceleration Gx acting on the vehicle. Furthermore, independently from the device for detecting force acting on a tire, those sensors 242 and 244 constitute examples of a vehicular state variable sensor, which detects a state variable of the vehicle.

Figure 29:
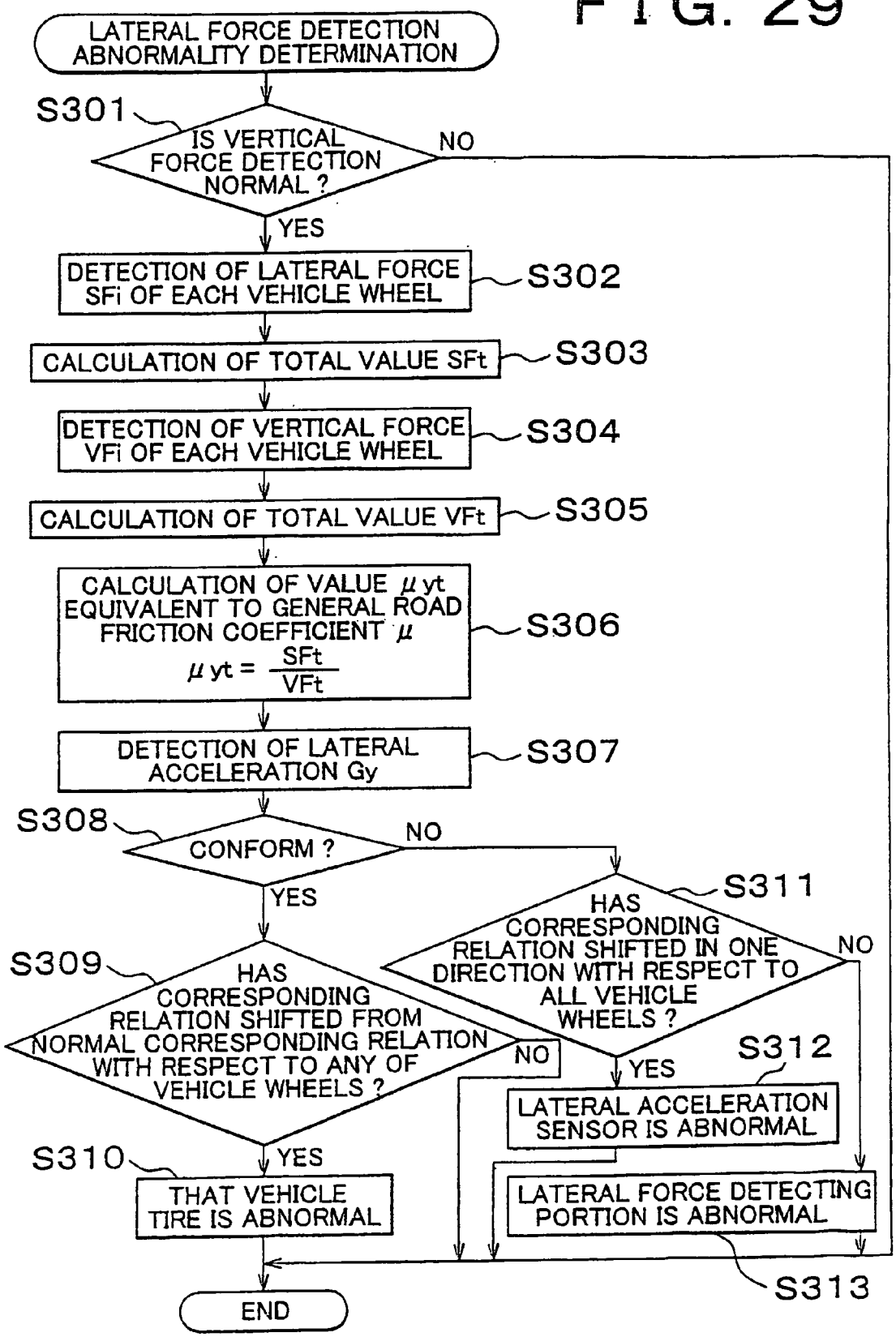
FIG. 29 is a flow chart conceptually showing a lateral force detection abnormality determining program performed by a determining portion in FIG. 28.

Next, the following explains the lateral force detection abnormality determining program while referring to FIG. 29.

When the lateral force detection abnormality determining program is initiated each time, first of all, whether or not detection of the vertical force VF by the detector 10 with respect to all the vehicle wheels 20 has been determined to be normal as a result of performing the vertical force detection abnormality determining program is determined at S301. If detection of the vertical force VF by the detector 10 with respect to all the vehicle wheels 20 has not been determined to be normal, the determination at S301 becomes "NO", which immediately terminates a single routine of the lateral force detection abnormality determining program.

In contrast, if detection of the vertical force VF by the detector 10 with respect to all the vehicle wheels 20 has been determined to be normal, the determination at S301 becomes "YES" to proceed to S302.

At S302, the lateral forces SFi (i=1~4) of each vehicle wheel 20 are detected by the lateral force detecting portion 150 of each detector 10 mounted on each vehicle wheel 20. Then, at S303, the total value SFt of the four lateral forces SFi, detected in the four vehicle wheels 20, is calculated.

Next, at S304, the vertical forces VFi (i=1~4) of each vehicle wheel 20 are detected by the vertical force detecting portion 170 of each detector 10 mounted on each vehicle wheel 20. Then, at S305, the total value VFt of the four vertical forces VFi, detected in the four vehicle wheels 20, is calculated.

Then the general value μyt equivalent to road friction coefficient μ with respect to the entire vehicle is calculated at S306. More specifically, it is calculated by dividing the total value SFt by the total value VFt. Next off, the lateral acceleration Gy is detected by the lateral acceleration sensor 242.

Next off, at S308, whether or not the calculated general value μyt equivalent to road friction coefficient μ and the detected lateral acceleration Gy conform to each other is determined. In the view of vehicle dynamics, they uniquely correspond to each other. Accordingly, if detection of the lateral force SF by the detector 10 and of the lateral acceleration Gy by the lateral acceleration sensor 242 is normal, the detected values should conform to each other (they match or are in proportion to each other under a constant coefficient). According to this information, whether or not the calculated general value μyt equivalent to road friction coefficient μ and the detected lateral acceleration Gy conform to each other is determined at S308.

If they are assumed to conform to each other, the determination at S308 becomes "YES". Then whether or not corresponding relation between them (e.g., a graph gradient showing proportionally relation between them) with respect to some of the vehicle wheels 20 has shifted from normal corresponding relation is determined at S309.

Based on the corresponding relation between the individual value $\mu yi$ equivalent to road friction coefficient $\mu$ and the general value $\mu yt$ equivalent to road friction coefficient $\mu$, this corresponding relation is obtained as a graph gradient made on the assumption that data on the individual value $\mu yi$ equivalent to road friction coefficient $\mu$ of each vehicle wheel 20 and data on the lateral acceleration Gy are plotted on a coordinate plane.

With respect to some of the vehicle wheels 20, if actual corresponding relation between the individual value $\mu yi$ equivalent to road friction coefficient $\mu$ and the lateral acceleration Gy is assumed to have shifted from the normal corresponding relation, the determination at S309 becomes "YES". As a result, the some of the vehicle wheels 20 are determined to be abnormal at S310, terminating a single routine of the lateral force detection abnormality determining program.

Heretofore, the processes, in the lateral force detection abnormality determining program when the general value $\mu yt$ equivalent to road friction coefficient $\mu$ and the lateral acceleration Gy conform to each other, have been explained. In contrast, if they do not conform to each other, the determination at S308 becomes "NO". As causes of their nonconformance to each other, the following can be conceivable: the lateral force detecting portion 150 is abnormal, or the lateral acceleration sensor 242 is abnormal. Then S311 is performed to identify the cause of their nonconformance to each other.

At S311, with respect to all the vehicle wheels 20, whether or not the actual corresponding relation between the general value $\mu yt$ equivalent to road friction coefficient $\mu$ and the lateral acceleration Gy has shifted in one direction from the normal corresponding relation is determined.

Figure 31:
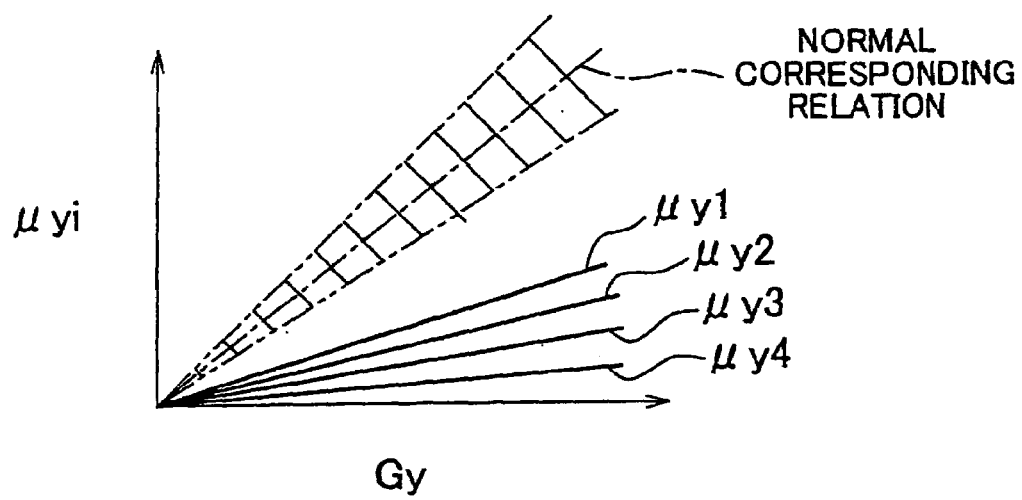
FIG. 31 is a graph for explaining step S311 or step 313 in FIG. 29.

FIG. 31 is a graph showing an example of the case where the actual corresponding relation, mentioned above, has shifted in one direction from a permissible range (the area with hatching in the figure) of the normal corresponding relation. In this example, the actual corresponding relation has shifted from the normal corresponding relation in the direction where the gradient of the graph is less steeper.

With respect to all the vehicle wheels 20, if the actual corresponding relation between the general value $\mu yt$ equivalent to road friction coefficient $\mu$ and the lateral acceleration Gy is assumed to have shifted to one direction from the normal corresponding relation, the determination of S311 becomes "YES". Then the lateral acceleration sensor 242 is determined to be abnormal at S312. On the other hand, if the actual corresponding relation with respect to all the vehicle wheels 20 is assumed not to have shifted to one direction from the normal corresponding relation, the determination of S311 becomes "NO". Then the lateral force detecting portion 150 is determined to be abnormal at S313.

Any of the cases above, at this time, lead to termination of a single routine of the lateral force detection abnormality determining program.

Figure 30:
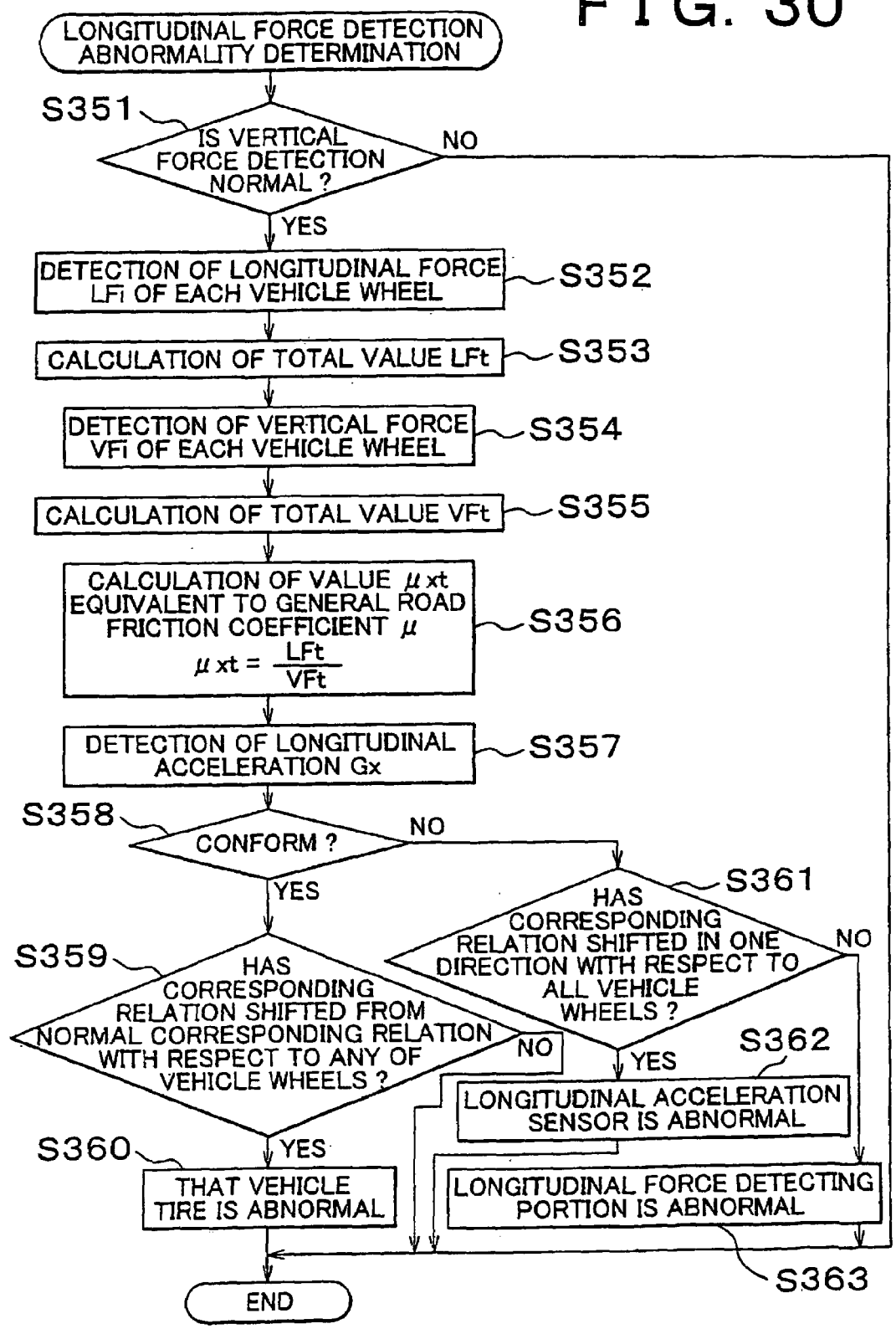
FIG. 30 is a flow chart conceptually showing a longitudinal force detection abnormality determining program performed by the determining portion in FIG. 28.

Next off, the following explains the longitudinal force detection abnormality determining program while referring to FIG. 30.

The longitudinal force detection abnormality determining program is performed according to performance of the lateral force detection abnormality determining program. More specifically, when the longitudinal force detection abnormality determining program is initiated each time, whether or not detection of the vertical force VF by the detector 10 with respect to all the vehicle wheels 20 has been determined to be normal as a result of performing the vertical force detection abnormality determining program is determined at S351. If detection of the vertical force VF by the detector 10 with respect to all the vehicle wheels 20 has not been determined to be normal, the determination at S351 becomes "NO", which immediately terminates a single routine of the longitudinal force detection abnormality determining program.

In contrast, if detection of the vertical force VF by the detector 10 with respect to all the vehicle wheels 20 has been determined to be normal, the determination at S351 becomes "YES" to proceed to S352.

At S352, the longitudinal forces LFi (i=1~4) of each vehicle wheel 20 are detected by the longitudinal force detecting portion 130 of each detector 10 mounted on each vehicle wheel 20. Then the total value LFt of the four lateral forces LFi detected in the four vehicle wheels 20 is calculated at S353.

Next, the vertical forces VFi (i=1~4) of each vehicle wheel 20 are detected by the vertical force detecting portion 170 of each detector 10 mounted on each vehicle wheel 20 at S354. Then the total value VFt of the four vertical forces VFi detected in the four vehicle wheels 20 is calculated at S355.

Next off, the general value $\mu xt$ equivalent to road friction coefficient $\mu$ with respect to the entire vehicle is calculated at S356. More specifically, it is calculated by dividing the total value LFt by the total value VFt. After this, the longitudinal acceleration Gx is detected by the longitudinal acceleration sensor 244 at S357.

Next off, at S358, whether or not the calculated general value $\mu xt$ equivalent to road friction coefficient $\mu$ and the detected longitudinal acceleration Gx conform to each other is determined. In the view of vehicle dynamics, they uniquely correspond to each other. Accordingly, if detection of the longitudinal force LF by the detector 10 and of the longitudinal acceleration Gx by the longitudinal acceleration sensor 244 is normal, the detected values should conform to each other. According to this information, whether or not the calculated general value $\mu xt$ equivalent to road friction coefficient $\mu$ and the detected longitudinal acceleration Gx conform to each other is determined at S358.

If they are assumed to conform to each other, the determination at S358 becomes "YES". Then whether or not corresponding relation between them (e.g., a graph gradient showing proportionally relation between them) with respect to some of the vehicle wheels 20 has shifted from normal corresponding relation is determined at S359.

With respect to some of the vehicle wheels 20, if actual corresponding relation between the individual value $\mu xi$ equivalent to road friction coefficient $\mu$ and the longitudinal acceleration Gx is assumed to have shifted from the normal corresponding relation, the determination at S359 becomes "YES". As a result, the some of the vehicle wheels 20 are determined to be abnormal at S360, terminating a single routine of the longitudinal force detection abnormality determining program.

Heretofore, the processes, in the longitudinal force detection abnormality determining program when the general value $\mu xt$ equivalent to road friction coefficient $\mu$ and the longitudinal acceleration Gx conform to each other, have been explained. In contrast, if they do not conform to each other, the determination at S358 becomes "NO". As causes of their nonconformance to each other, the following can be conceivable: the longitudinal force detecting portion 130 is abnormal, or the longitudinal acceleration sensor 244 is abnormal. Then S361 is performed to identify the cause of their nonconformance to each other.

Figure 32:
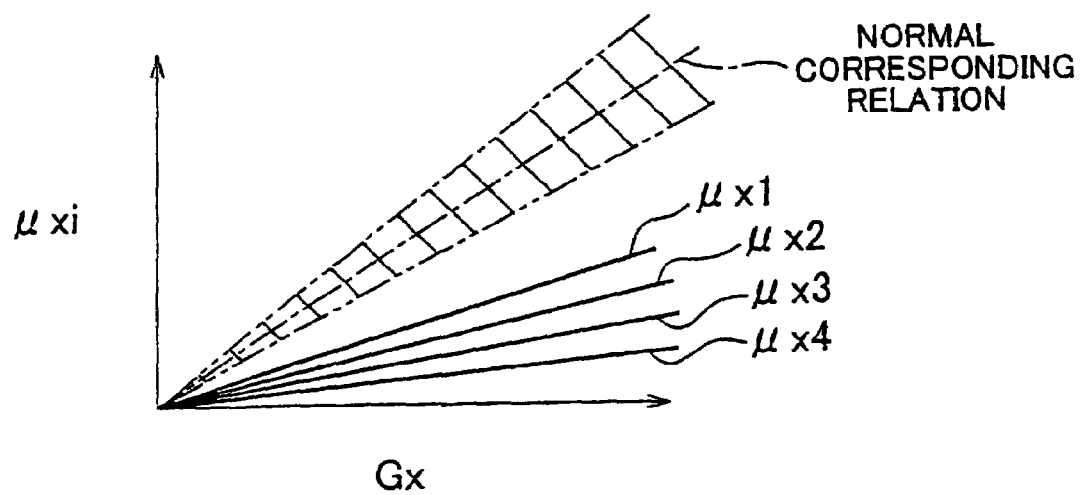
FIG. 32 is a graph for explaining step S361 or step 363 in FIG. 30.

At S361, with respect to all the vehicle wheels 20, whether or not the actual corresponding relation between the general value μxt equivalent to road friction coefficient μ and the longitudinal acceleration Gx has shifted in one direction from the normal corresponding relation is determined. FIG. 32, based on FIG. 31, is a graph showing an example of the case where the actual corresponding relation, mentioned above, has shifted in one direction from a permissible range (the area with hatching in the figure) of the normal corresponding relation. In this example, the actual corresponding relation has shifted from the normal corresponding relation in the direction where the gradient of the graph is less steeper.

With respect to all the vehicle wheels 20, if the actual corresponding relation between the general value μxt equivalent to road friction coefficient μ and the longitudinal acceleration Gx is assumed to have shifted to one direction from the normal corresponding relation, the determination of S361 becomes "YES". Then the longitudinal acceleration sensor 244 is determined to be abnormal at S362. On the other hand, if the actual corresponding relation with respect to all the vehicle wheels 20 is assumed not to have shifted to one direction from the normal corresponding relation, the determination of S361 becomes "NO". Then the longitudinal force detecting portion 130 is determined to be abnormal at S363.

Any of the cases above, at this time, lead to termination of a single routine of the longitudinal force detection abnormality determining program.

As clear from the explanation above, in the present preferred embodiment, the lateral acceleration sensor 242 and the longitudinal acceleration sensor 244 constitute an example of "acceleration sensor" in the section (18). In addition, portions of the determining portion 240 for performing S306 or S308 and S313 in FIG. 29, and those for performing S356 or S358 and S363 in FIG. 30 respectively constitute an example of "means" in the same section.

Moreover, in the present preferred embodiment, portions of the determining portion 240 for performing S311 and S312 in FIG. 29, and those for performing S361 and S362 in FIG. 30 respectively constitute an example of "acceleration sensor abnormality determining means" in the section (19).

Further, in the present preferred embodiment, portions of the determining portion 240 for performing S308 or S310 in FIG. 29, and those for performing S358 or S360 in FIG. 30 respectively constitute an example of "tire abnormality determining means" in the section (20).

Next, the following explains the third preferred embodiment of the present invention. However, the present preferred embodiment has a lot of elements common to those of the first preferred embodiment, and only elements with respect to abnormality determination of vertical, lateral, and longitudinal force detection by the detector are different from those of the first preferred embodiment. Therefore, the different elements will be explained in detail, and the explanation of the common elements will be omitted by using the same reference numerals.

Figure 33:
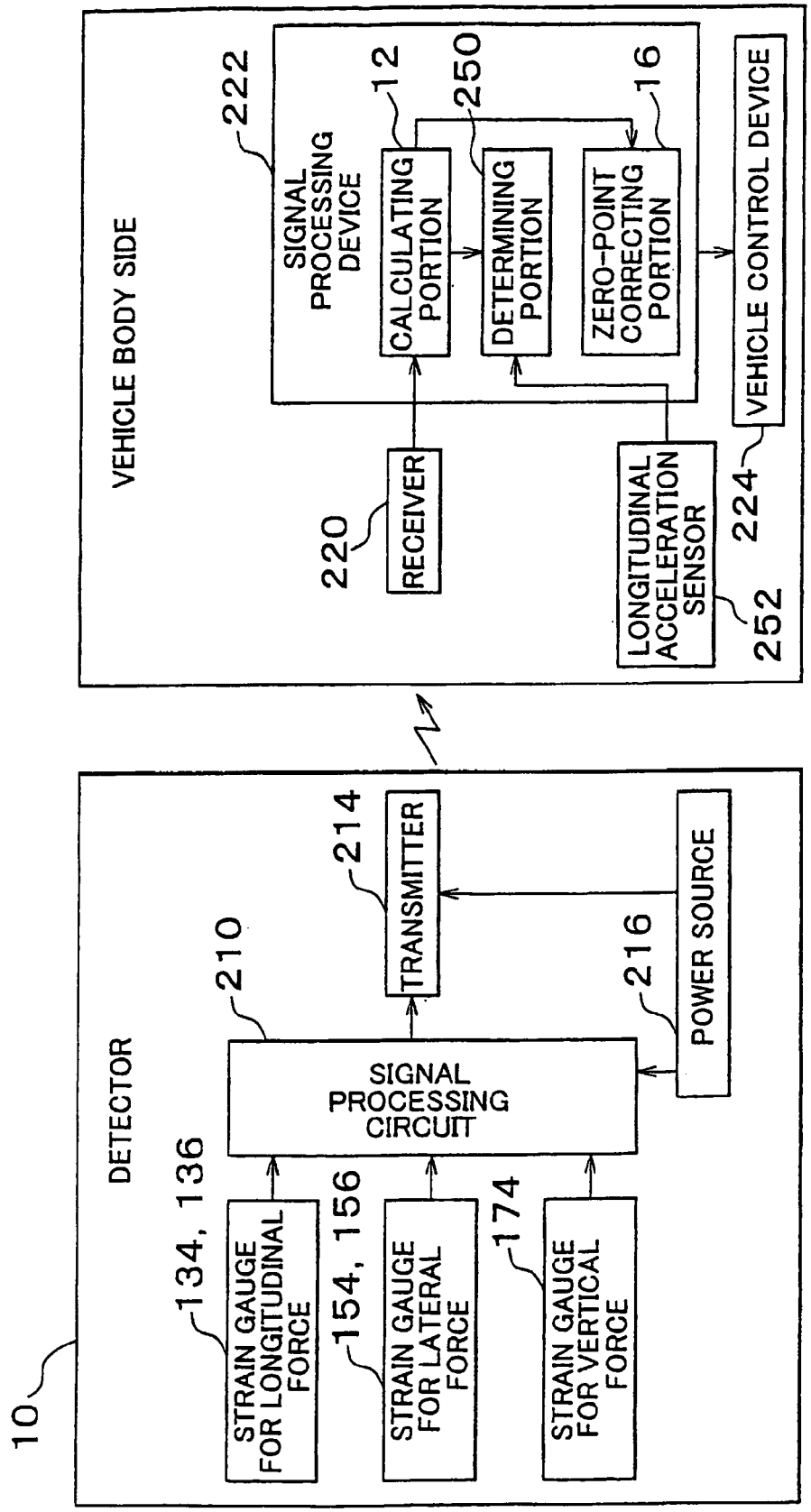
FIG. 33 is a block diagram showing an electrical configuration of a device for detecting force acting on a tire according to a third preferred embodiment of the invention.

As shown in FIG. 33, in the present preferred embodiment, a determining portion 250 is provided instead of the determining portion 14 of the first preferred embodiment. The determining portion 250 is so designed as to perform abnormality determination with the following programs: the vertical force detection abnormality determining program, conceptually shown in the flow chart of FIG. 34, for abnormality determination with respect to detecting the vertical force VF by the detector 10, the lateral force detection abnormality determining program, conceptually shown in the flow chart of FIG. 35, for abnormality determination with respect to detecting the lateral force SF by the detector 10, and the longitudinal force detection abnormality determining program, conceptually shown in the flow chart of FIG. 36, for abnormality determination with respect to detecting the longitudinal force LF by the detector 10.

In the present preferred embodiment, as shown in FIG. 33, a longitudinal acceleration sensor 252 is further provided to the vehicle body. The longitudinal acceleration sensor 252 detects the longitudinal acceleration Gx acting on the vehicle, and independently from the device for detecting force acting on a tire, it constitutes an example of the vehicular state variable sensor detecting the state variable of the vehicle.

Figure 34:
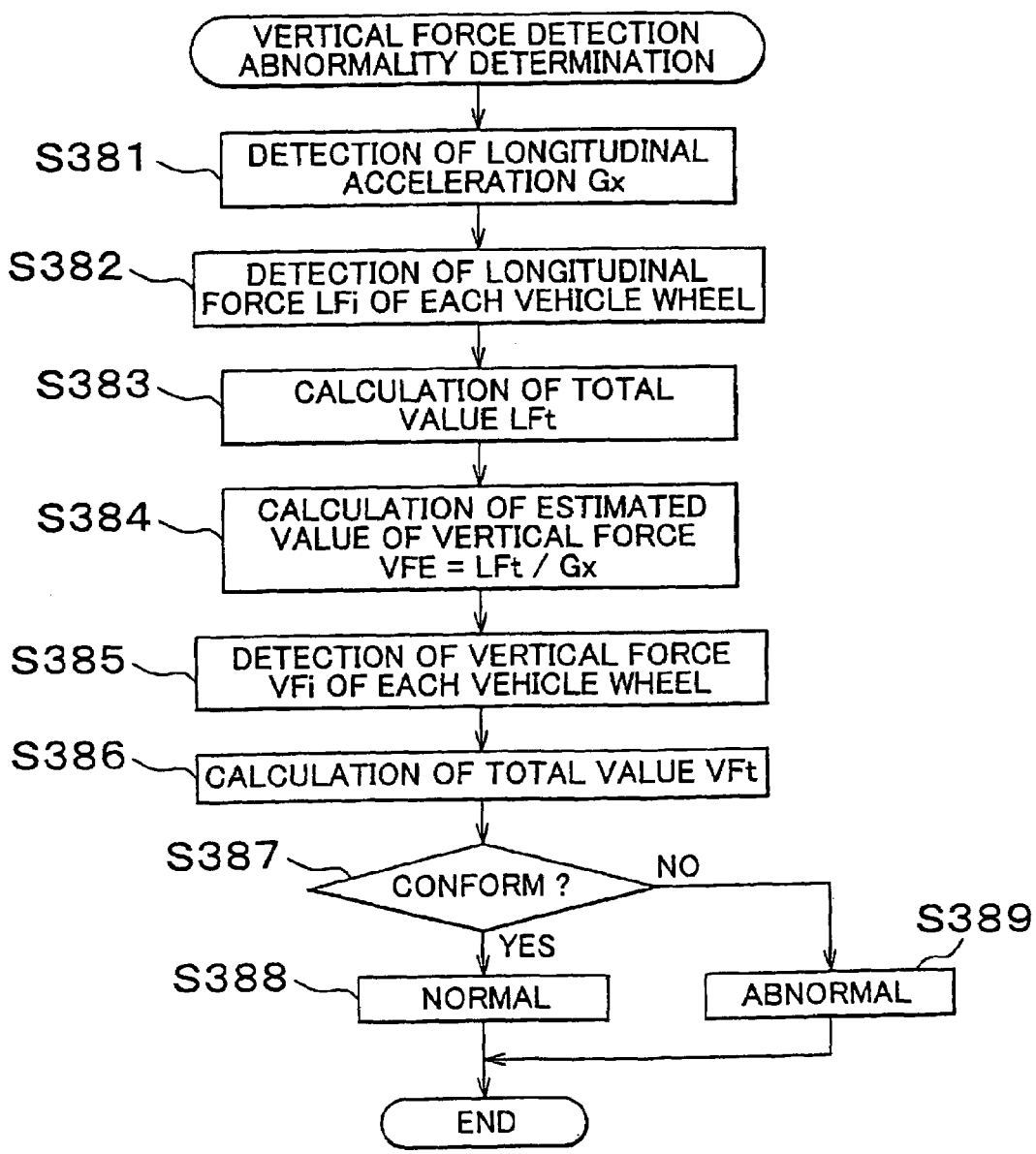
FIG. 34 is a flow chart conceptually showing a vertical force detection abnormality determining program performed by a determining portion in FIG. 33.

Next, the following explains the vertical force detection abnormality determining program while referring to FIG. 34.

When the vertical force detection abnormality determining program is initiated each time, first of all, the longitudinal acceleration Gx is detected by the longitudinal acceleration sensor 252 at S381. Next, at S382, the longitudinal forces LFi (i=1~4) of each vehicle wheel 20 are detected by the longitudinal force detecting portion 130 of each detector 10 mounted on each vehicle wheel 20. Then, at S383, the total value LFt of the four longitudinal forces LFi, detected in the four vehicle wheels 20, is calculated.

Next off, at S384, an estimated vertical force VFE is calculated by dividing the calculated the total value LFt by the longitudinal acceleration Gx. The longitudinal acceleration Gx is a physical quantity equivalent to the friction coefficient μ between the vehicle wheel 20 and road surface, so that dividing the total value LFt by the longitudinal acceleration Gx is equivalent to dividing the total value LFt by the friction coefficient μ, enabling obtainment of the estimated value VFE of the vertical force VF independently from the vertical force detecting portion 170.

Then, at S385, the vertical forces VFi (i=1~4) of each vehicle wheel 20 are detected by the vertical force detecting portion 170 of each detector 10 mounted on each vehicle wheel 20 followed by calculation at S386 of the total value VFt of the four vertical forces VFi detected in the four vehicle wheels 20.

Then, at S387, whether or not the calculated total value VFt and the obtained estimated vertical force VFE conform to each other is determined. In the view of vehicle dynamics, they uniquely correspond to each other. Accordingly, if detection of the vertical force VF by the detector 10 and of the longitudinal acceleration Gx by the longitudinal acceleration sensor 252 is normal (detection of the longitudinal force LF by the detector 10 is assumed to be normal), the detected values should conform to each other. According to this information, whether or not the calculated total value VFt and the obtained estimated vertical force VFE conform to each other is determined at S387.

If they are assumed to conform to each other, the determination at S387 becomes "YES". Then all the vertical force detecting portions 170 of all the vehicle wheels 20 are determined to be normal at S388. To the contrary, if they are assumed not to conform to each other, the determination at S387 becomes "NO". Then at least one of the vertical portions 170 of the vertical wheels 20 is determined to be abnormal at S389.

Any of the cases above, at this time, lead to termination of a single routine of the vertical force detection abnormality determining program.

Moreover, according to the vertical force detection abnormality determining program, whether or not detection of the vertical force VF is abnormal is determined by giving attention to the longitudinal acceleration Gx and the longitudinal force LF. However, the present invention can be embodied so that whether or not detection of the vertical force VF is abnormal is determined by giving attention to the lateral acceleration Gy and the lateral force SF.

Figure 35:
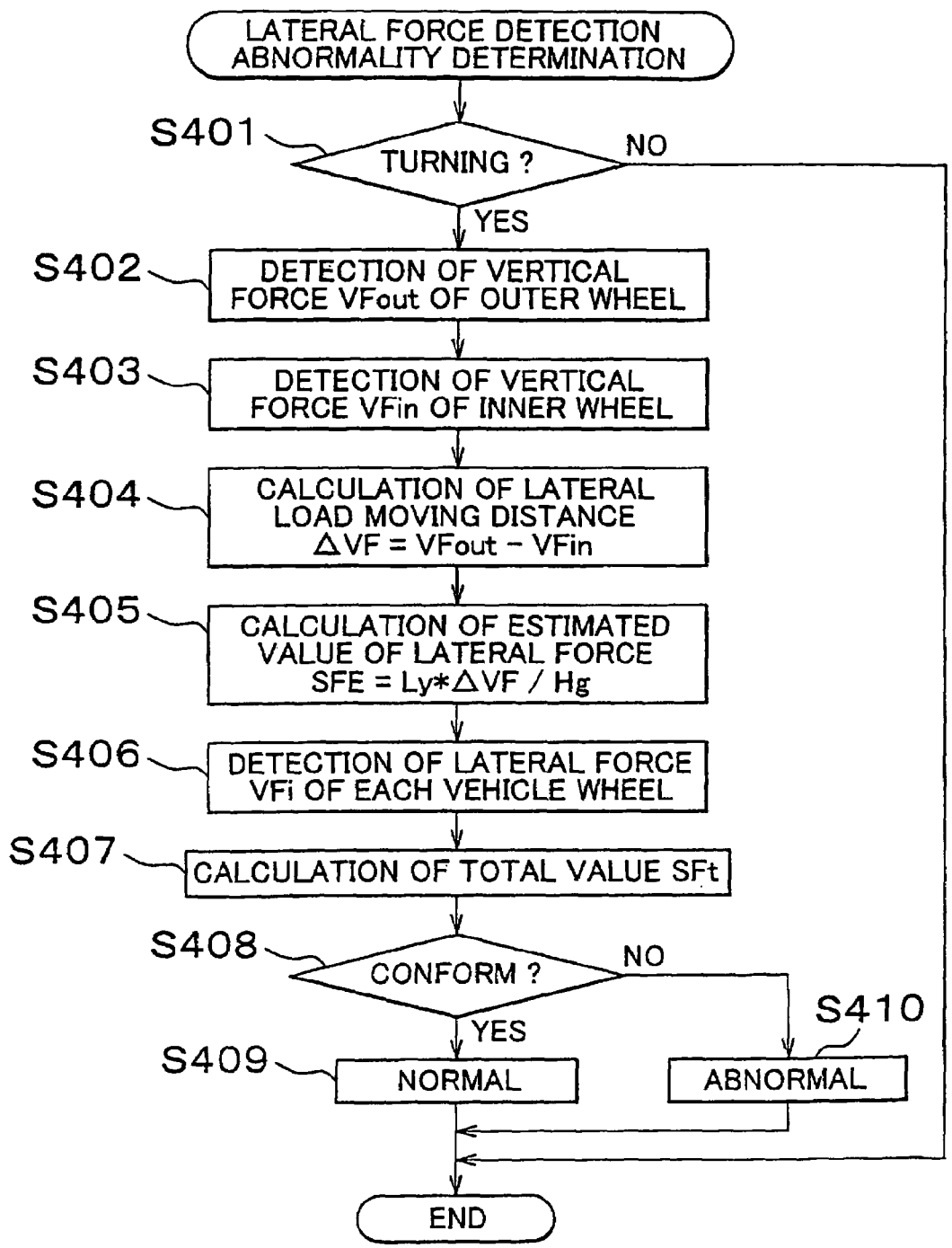
FIG. 35 is a flow chart conceptually showing a lateral force detection abnormality determining program performed by the determining portion in FIG. 33.
Figure 36:
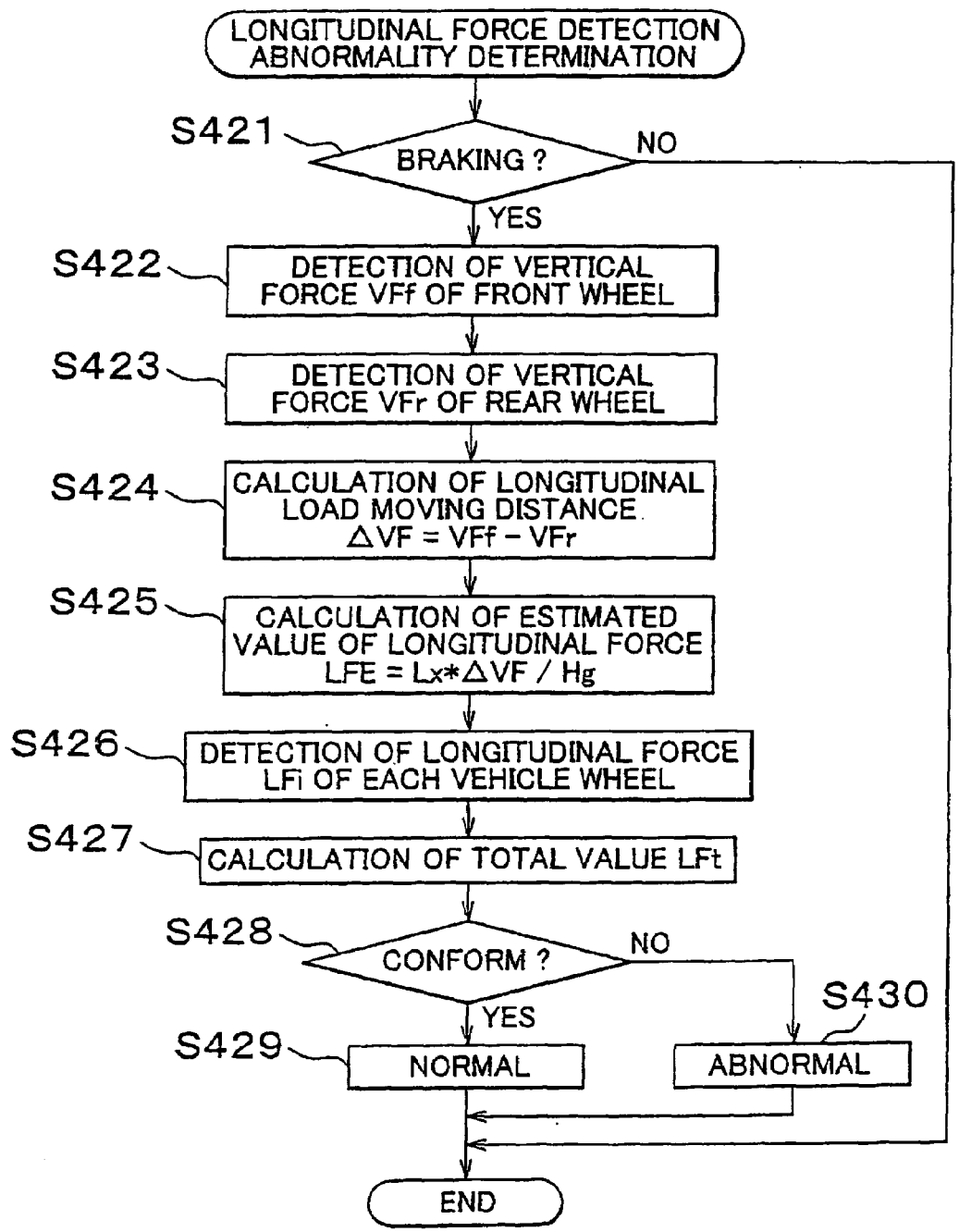
FIG. 36 is a flow chart conceptually showing a longitudinal force detection abnormality determining program performed by the determining portion in FIG. 33.

Next off, the following explains the lateral force detection abnormality determining program while referring to FIG. 35.

When the lateral force detection abnormality determining program is initiated each time, first of all, whether or not the vehicle is turning is determined at S401. This determination can be performed by referring to, for example, the following detected values: a detected value of the steering angle sensor detecting the steering angle of the steering wheel manipulated by the driver with a need to steer the vehicle, a detected value of the lateral acceleration sensor detecting the lateral acceleration of the vehicle, and a detected value of the yaw rate sensor detecting the yaw rate of the vehicle.

If the vehicle is assumed not to be turning, the determination at S401 becomes "NO", terminating a single routine of the lateral force detection abnormality determining program. To the contrary, if the vehicle is assumed to be turning, the determination at S401 becomes "YES" to proceed to S402.

At S402, with respect to an outer turning wheel of the right front and left front steering vehicle wheels, the vertical force VF as a vertical force VFout is detected by the vertical force detecting portion 170. Next, at S403, with respect to an inner turning wheel of the right front and left front steering vehicle wheels, the vertical force VF as a vertical force VFin is detected by the vertical force detecting portion 170.

Then, at S404, a lateral load moving distance ΔVF is calculated by subtracting the vertical force VFin from the vertical force VFout.

Next, at S405, an estimated lateral force SFE is obtained by dividing the product of a known tread length of the vehicle Ly and the calculated lateral load moving distance ΔVF by a known height of gravitational center Hg, enabling obtainment of the estimated lateral force SFE independently from the lateral force detecting portion 150.

Then, at S406, the lateral forces SFi (i=1~4) of each vehicle wheel 20 are detected by the lateral force detecting portion 150 of each detector 10 mounted on each vehicle wheel 20 followed by calculation at S407 of the total value SFt of the four lateral forces SFi detected in the four vehicle wheels 20.

Then, at S408, whether or not the calculated total value SFt and the obtained estimated lateral force SFE conform to each other is determined. In the view of vehicle dynamics, they uniquely correspond to each other. Accordingly, if detection of the lateral force SF by the detector 10 is normal (detection of the vertical force VF by the detector 10 is assumed to be normal), the detected values should conform to each other. According to this information, whether or not the calculated total value SFt and the obtained estimated lateral force SFE conform to each other is determined at S408.

If they are assumed to conform to each other, the determination at S408 becomes "YES". Then all the lateral force detecting portions 150 of all the vehicle wheels 20 are determined to be normal at S409. To the contrary, if they are assumed not to conform to each other, the determination at S408 becomes "NO". Then at least one of the lateral portions 150 of the vertical wheels 20 is determined to be abnormal at S410.

Any of the cases above, at this time, lead to termination of a single routine of the lateral force detection abnormality determining program.

Next off, the following explains the longitudinal force detection abnormality determining program while referring to Fit. 36.

The longitudinal force detection abnormality determining program is performed based on performance of the lateral force detection abnormality determining program. More specifically, when the longitudinal force detection abnormality determining program is initiated each time, first of all, whether or not the vehicle is being braked is determined at S421. This determination can be performed by referring to, for example, the following detected values: a detected value of the brake manipulating variable sensor detecting a manipulated variable of brake manipulating members manipulated by the driver with a need to brake the vehicle, a detected value of the longitudinal acceleration sensor 252, and a detected value of a brake actuating force sensor (e.g., a wheel cylinder pressure sensor detecting a pressure of a wheel cylinder of the brake) detecting a physical quantity relating to brake actuating force of the brake.

If it is assumed that the vehicle is not being braked, the determination at S421 becomes "NO", terminating a single routine of the longitudinal force detection abnormality determining program. To the contrary, if it is assumed that the vehicle is being braked, the determination at S421 becomes "YES" to proceed to S422.

At S422, the vertical force VF of each front wheel is detected by the vertical force detecting portion 170, and the sum of the two vertical forces VF as vertical force of the front wheels VFf is calculated.

Next, at S423, the vertical force VF of each rear wheel is detected by the vertical force detecting portion 170, and the sum of the two vertical forces VF as vertical force of the rear wheels VFr is calculated.

Then, at S424, a longitudinal load moving distance ΔVF is calculated by subtracting the vertical force VFr from the vertical force VFf.

Next, at S425, an estimated longitudinal force LFE is obtained by dividing the product of a known tread length of the vehicle Lx and the calculated longitudinal load moving distance ΔVF by the known height of gravitational center Hg, enabling obtainment of the estimated longitudinal force LFE independently from the longitudinal force detecting portion 130.

Then, at S426, the longitudinal forces LFi (i=1~4) of each vehicle wheel 20 are detected by the longitudinal force detecting portion 130 of each detector 10 mounted on each vehicle wheel 20 followed by calculation at S427 of the total value LFt of the four longitudinal forces LFi detected in the four vehicle wheels 20.

Then, at S428, whether or not the calculated total value LFt and the obtained estimated longitudinal force LFE conform to each other is determined. In the view of vehicle dynamics, they uniquely correspond to each other. Accordingly, if detection of the longitudinal force LF by the detector 10 is normal (detection of the vertical force VF by the detector 10 is assumed to be normal), the detected values should conform to each other. According to this information, whether or not the calculated total value LFt and the obtained estimated longitudinal force LFE conform to each other is determined at S428.

If they are assumed to conform to each other, the determination at S428 becomes "YES". Then all the longitudinal force detecting portions 130 of all the vehicle wheels 20 are determined to be normal at S429. To the contrary, if they are assumed not to conform to each other, the determination at S428 becomes "NO". Then at least one of the longitudinal portions 130 of the vertical wheels 20 is determined to be abnormal at S430.

Any of the cases above, at this time, lead to termination of a single routine of the longitudinal force detection abnormality determining program.

As clear from the explanation above, in the present preferred embodiment, the longitudinal acceleration sensor 252 constitutes an example of "vehicular state variable sensor" in the section (48). In addition, portions of the determining portion 250 for performing all steps in FIG. 34, those for performing all steps in FIG. 35, and those for performing all steps in FIG. 36 respectively constitute an example of "fifth abnormality determining means" in the same section.

Next, the following explains the fourth preferred embodiment of the present invention. However, the present preferred embodiment has a lot of elements common to those of the first preferred embodiment, and only elements with respect to abnormality determination of lateral force detection by the detector are different from those of the first preferred embodiment. Therefore, the different elements will be explained in detail, and the explanation of the common elements will be omitted by using the same reference numerals.

Figure 37:
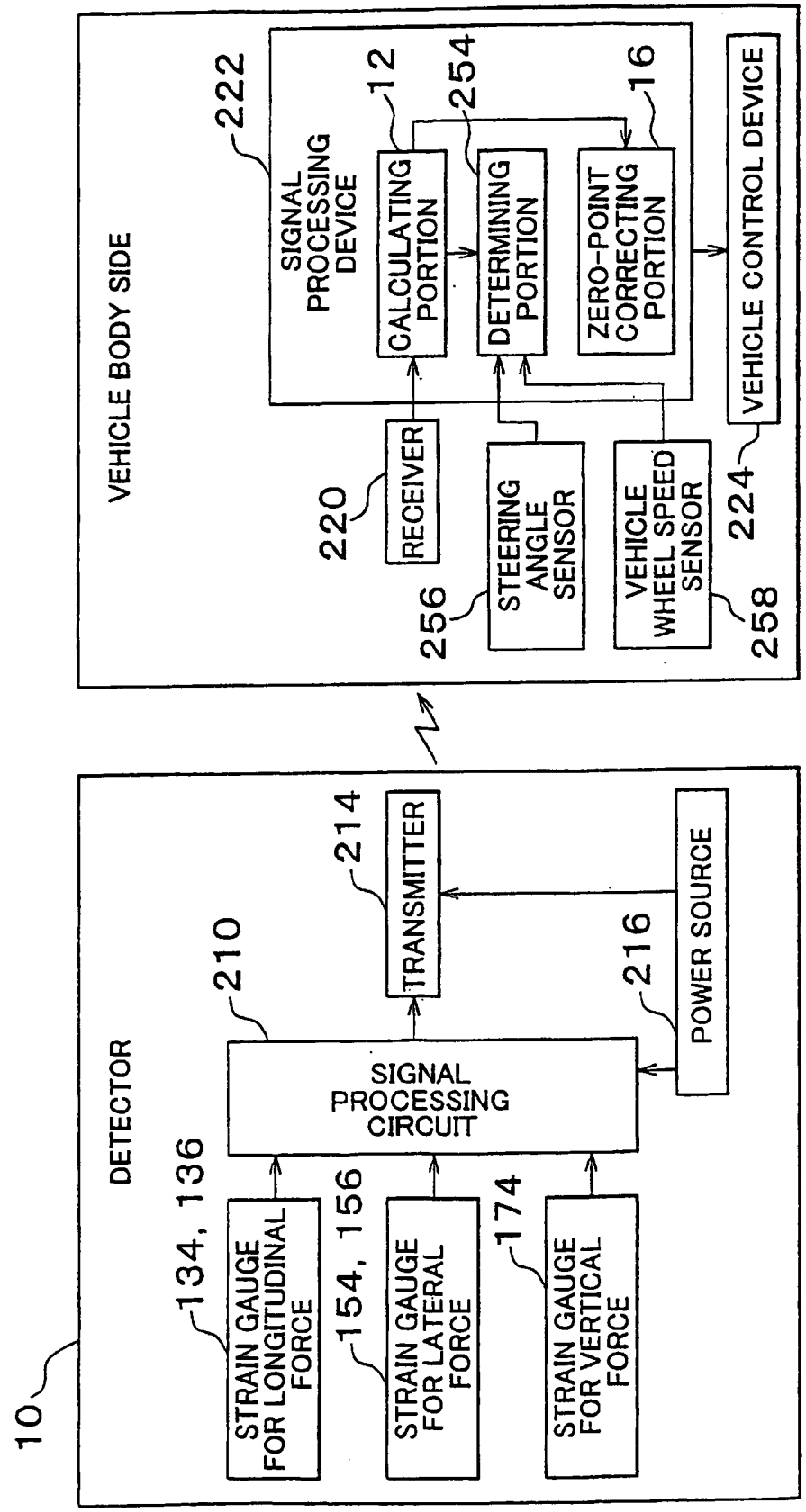
FIG. 37 is a block diagram showing an electrical configuration of a device for detecting force acting on a tire according to a fourth preferred embodiment of the invention.

As shown in FIG. 37, in the present preferred embodiment, a determining portion 254 is provided instead of the determining portion 14 of the first preferred embodiment. The determining portion 254 is so designed as to perform abnormality determination with the following programs: a program same as the vertical force detection abnormality determining program, shown in FIGS. 15 and 16, for abnormality determination with respect to detecting the vertical force VF by the detector 10, the lateral force detection abnormality determining program, conceptually shown in the flow chart of FIG. 38, for abnormality determination with respect to detecting the lateral force SF by the detector 10, and a program same as the longitudinal force detection abnormality determining program, shown in FIG. 18, for abnormality determination with respect to detecting the longitudinal force LF by the detector 10.

In the present preferred embodiment, as shown in FIG. 37, a steering angle sensor 256, which detects a steering angle θ of the steering wheel manipulated by the driver with a need to steer the vehicle, is further provided. Moreover, each vehicle wheel 20 is provided with a vehicle wheel speed sensor 258 detecting a rotating speed of each vehicle wheel 20 as a vehicle wheel speed VW. Furthermore, independently from the device for detecting force acting on a tire, those sensors 256 and 258 respectively constitute an example of the vehicular state variable sensor, which detects the state variable of the vehicle.

Figure 38:
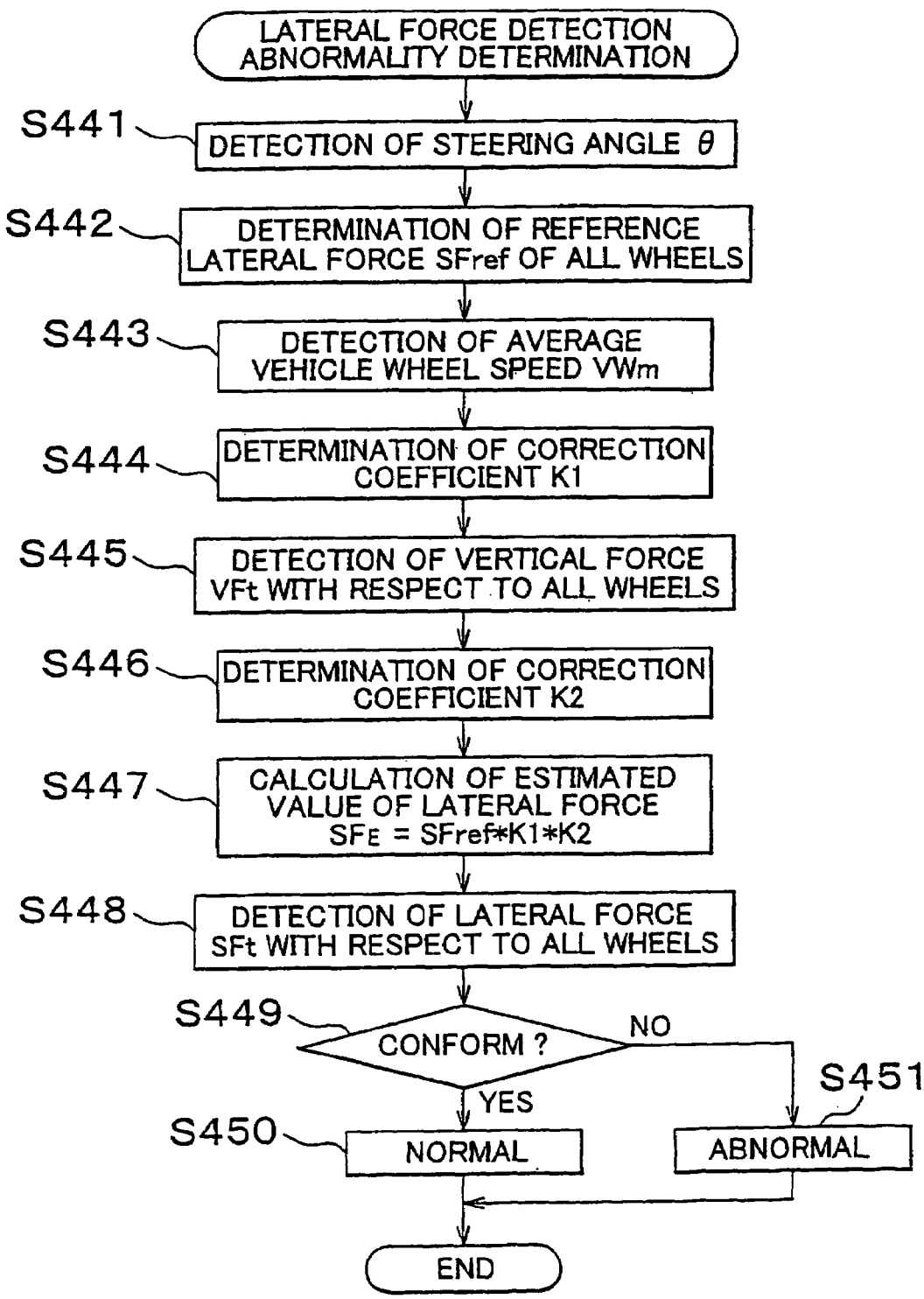
FIG. 38 is a flow chart conceptually showing a lateral force detection abnormality determining program performed by a determining portion in FIG. 37.

The following explains the lateral force determination abnormality determining program while referring to FIG. 38.

When the lateral force determination abnormality determining program is initiated each time, first of all, the steering angle e is detected by the steering angle sensor 256 at S441.

Figure 39:
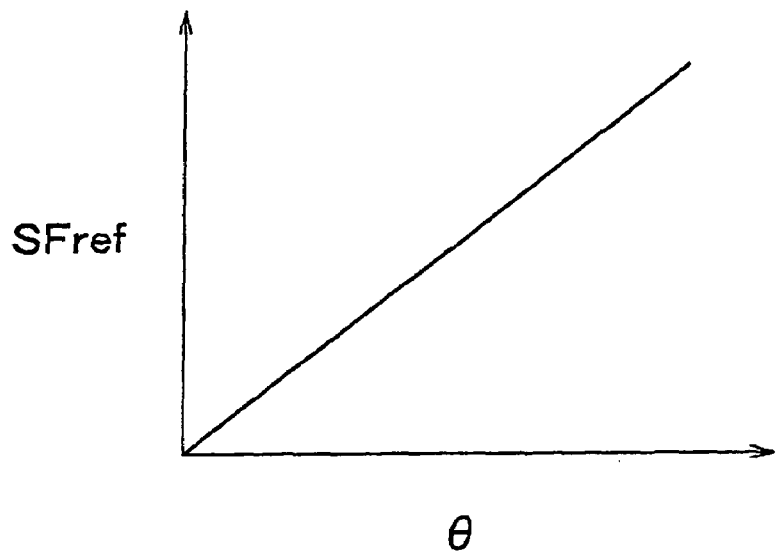
FIG. 39 is a graph for explaining step S442 in FIG. 38.

Next, at S442, based on a reference vehicle wheel speed VW0 and a reference vertical force VF0, the lateral force (total value) expected to generate in all the vehicle wheels is determined as a reference lateral force SFref depending on the detected steering angle θ. Relation between the steering angle θ and the reference lateral force SFref such as that shown in FIG. 39 is prestored in the memory of the computer. Therefore, the reference lateral force SFref corresponding to a detected value of the steering angle θ is determined according to this relation.

Next off, at S443, an average of the vehicle wheel speeds VW, detected by the vehicle wheel speed sensors 258 of all the vehicle wheels, is detected as an average vehicle wheel speed VWm.

Then, at S444, a correction coefficient K1 corresponding to the detected average vehicle wheel speed VWm is determined. According to the present preferred embodiment, an estimated value of the lateral forces SF of all the wheels (total value) is estimated as the product of the reference lateral force SFref with the steering angle θ as a variable, the correction coefficient K1 with the average vehicle wheel speed VWm as a variable, and a correction coefficient K2 with the vertical forces VFt (total value) of all the wheels as a variable. At S444, either one of the correction coefficients K1 and K2 is determined.

Figure 40:
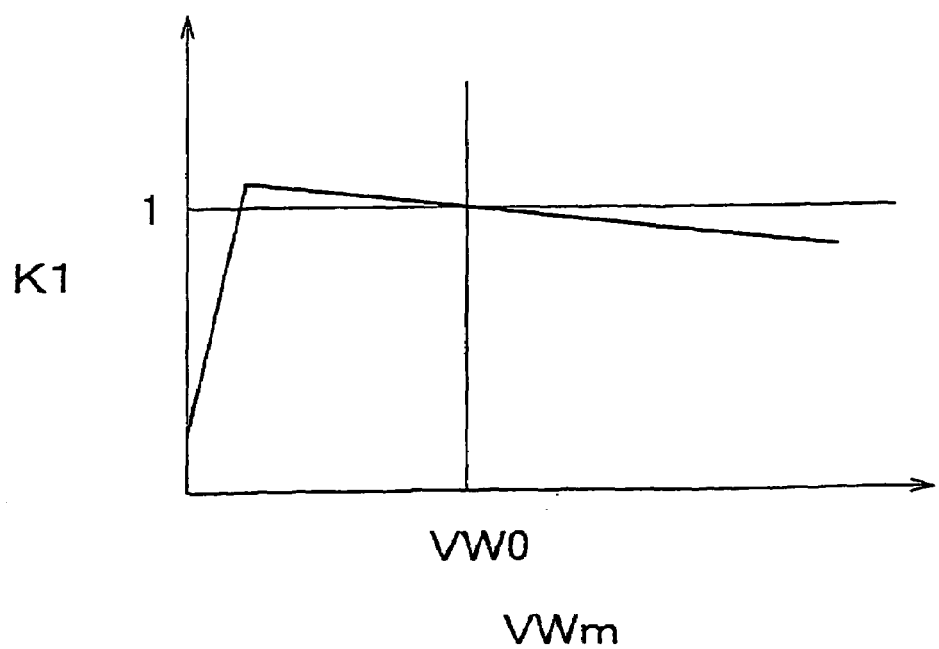
FIG. 40 is a graph for explaining step S444 in FIG. 38.
Figure 41:
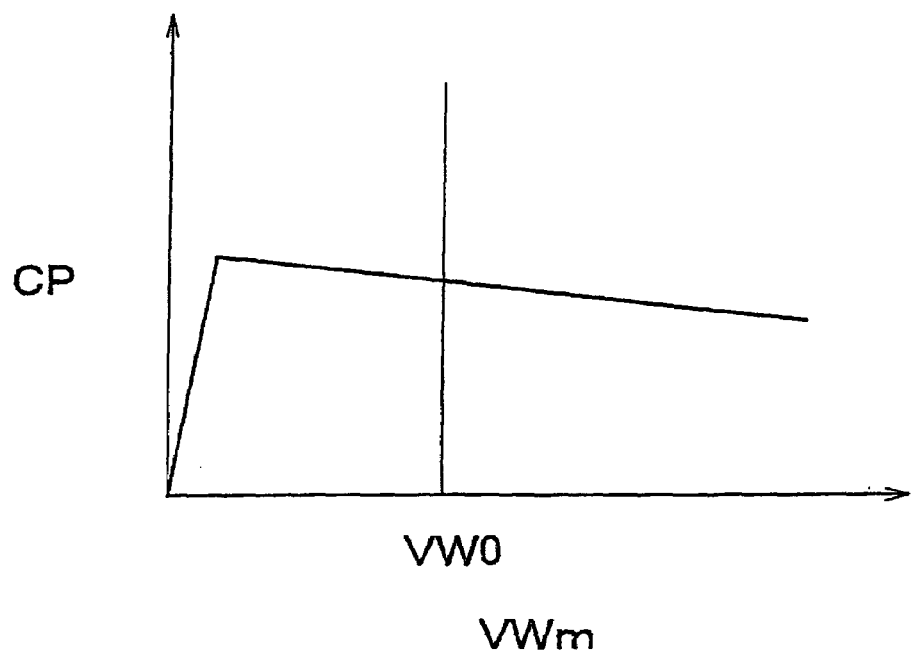
FIG. 41 is a graph for explaining the graph in FIG. 40.

Relation between the average vehicle wheel speed VWm and the correction coefficient K1 such as that shown in FIG. 40 is prestored in the memory of the computer. Therefore, the correction coefficient K1 corresponding to a detected value of the average vehicle wheel speed VWm is determined according to this relation. The relation is set by giving attention to the fact that a cornering power CP depending on the vehicle wheel speed VW changes in such a way shown in FIG. 41.

Next off, at S445, the total value of the vertical forces VF detected by the vertical force detecting portions 170 of all the wheels is detected as the vertical force VFt.

Figure 42:
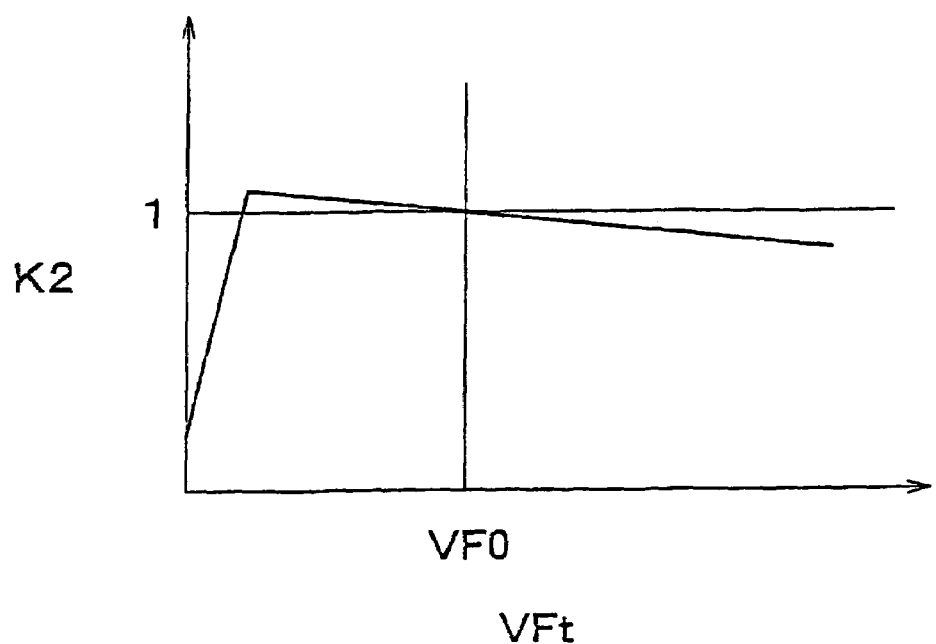
FIG. 42 is a graph for explaining step S446 in FIG. 38.
Figure 43:
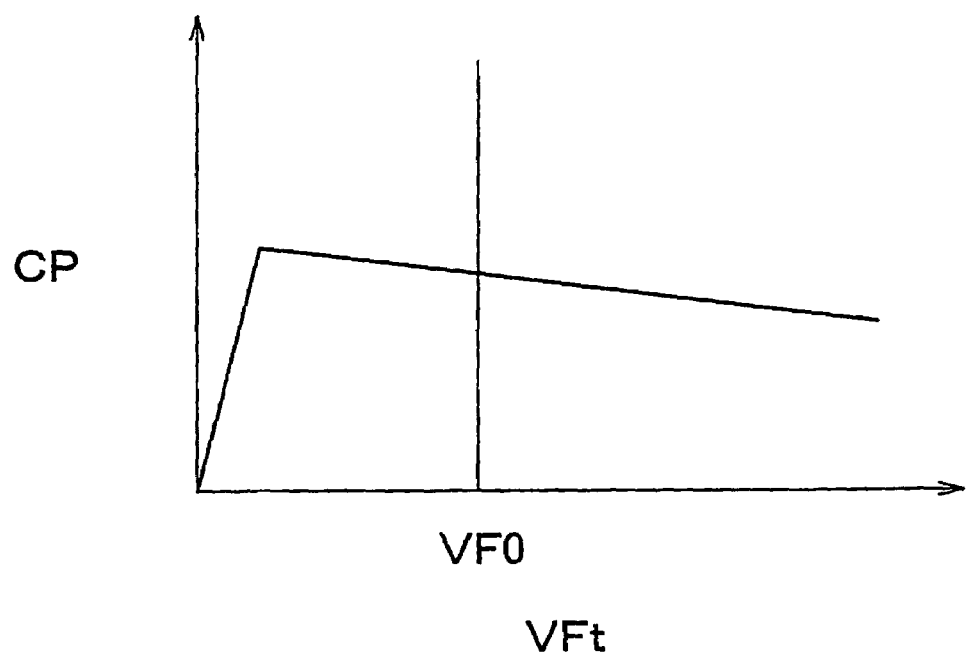
FIG. 43 is a graph for explaining the graph in FIG. 42.

Then, at S446, the correction coefficient K2 corresponding to the detected vertical force VFt is determined. Relation between the vertical force VFt and the correction coefficient K2 such as that shown in FIG. 42 is prestored in the memory of the computer. Therefore, the correction coefficient K2 corresponding to a detected value of the vertical force VFt is determined according to this relation. The relation is set by giving attention to the fact that the cornering power CP depending on the vertical force VFt changes in such a way shown in FIG. 41.

Next, at S447, the estimated lateral force SFE with respect to all the wheels is obtained by the product of the determined reference lateral force SFref, correction coefficient K1, and correction coefficient K2.

Then, at S448, the total value of the lateral forces SF detected by the lateral force detecting portions 150 of all the wheels is detected as the lateral force SFt.

Next off, at S449, whether or not the calculated lateral force SFt and the obtained estimated lateral force SFE conform to each other is determined. In the view of vehicle dynamics, they uniquely correspond to each other. Accordingly, if detection of the lateral force SF by the detector 10 is normal (detection of the vertical force VF by the detector 10 is assumed to be normal), the detected values should conform to each other. According to this information, whether or not the calculated lateral force SFt and the obtained estimated lateral force SFE conform to each other is determined at S449.

If they are assumed to conform to each other, the determination at S449 becomes "YES". Then all the lateral force detecting portions 150 of all the wheels are determined to be normal at S450. To the contrary, if they are assumed not to conform to each other, the determination at S449 becomes "NO". Then at least one of the lateral portions 150 of the wheels is determined to be abnormal at S451.

Any of the cases above, at this time, lead to termination of a single routine of the lateral force detection abnormality determining program.

As clear from the explanation above, in the present preferred embodiment, the steering angle sensor 256 and the vehicle wheel speed sensor 258 respectively constitute an example of "vehicular state variable sensor" in the section (22). In addition, portions of the determining portion 254 for performing all steps in FIG. 38 constitute an example of "fourth abnormality determining means" in the same section.

Moreover, in the present preferred embodiment, the steering angle sensor 256 constitutes an example of "manipulation state variable sensor" in the section (25). In addition, portions of the determining portion 254 for performing all steps in FIG. 38 constitute an example of "means" in the same section.

Furthermore, in the present preferred embodiment, the steering angle sensor 256 and the vehicle wheel speed sensor 258 respectively constitute an example of "vehicular state variable sensor" in the section (48). In addition, portions of the determining portion 254 for performing all steps in FIG. 38 constitute an example of "fifth abnormality determining means" in the same section.

Next, the following explains the fifth preferred embodiment of the present invention. However, the present preferred embodiment has a lot of elements common to those of the first preferred embodiment, and only elements with respect to the structure of a longitudinal force detecting portion and a lateral force detecting portion, and zero-point correction are different from those of the first preferred embodiment. Therefore, the different elements will be explained in detail, and the explanation of the common elements will be omitted by using the same reference numerals in the first preferred embodiment.

As previously described in the first preferred embodiment, the longitudinal force detecting portion 130 is designed so that the strain gauge 134 is used when driving force or force is acting on the tire 24 while the vehicle is moving forward and when braking force is acting on the tire 24 while the vehicle is moving backward, and the different strain gauge 136 is used when braking force is acting on the tire 24 while the vehicle is moving forward and when driving force is acting on the tire 24 while the vehicle is moving backward.

Moreover, in the first preferred embodiment, the lateral force detecting portion 150 is designed so that the strain gauge 154 is used when lateral force is acting on the tire 24 in the direction of the outside of turning and the different gauge 156 is used when lateral force is acting on the tire 24 in the direction of the inside of turning.

Accordingly, in the first preferred embodiment, the strain gauges 134 and 136 are attached to both faces of the first structural portion 100, and the strain gauges 154 and 156 are attached to both faces of the second structural portion 102.

Figure 44:
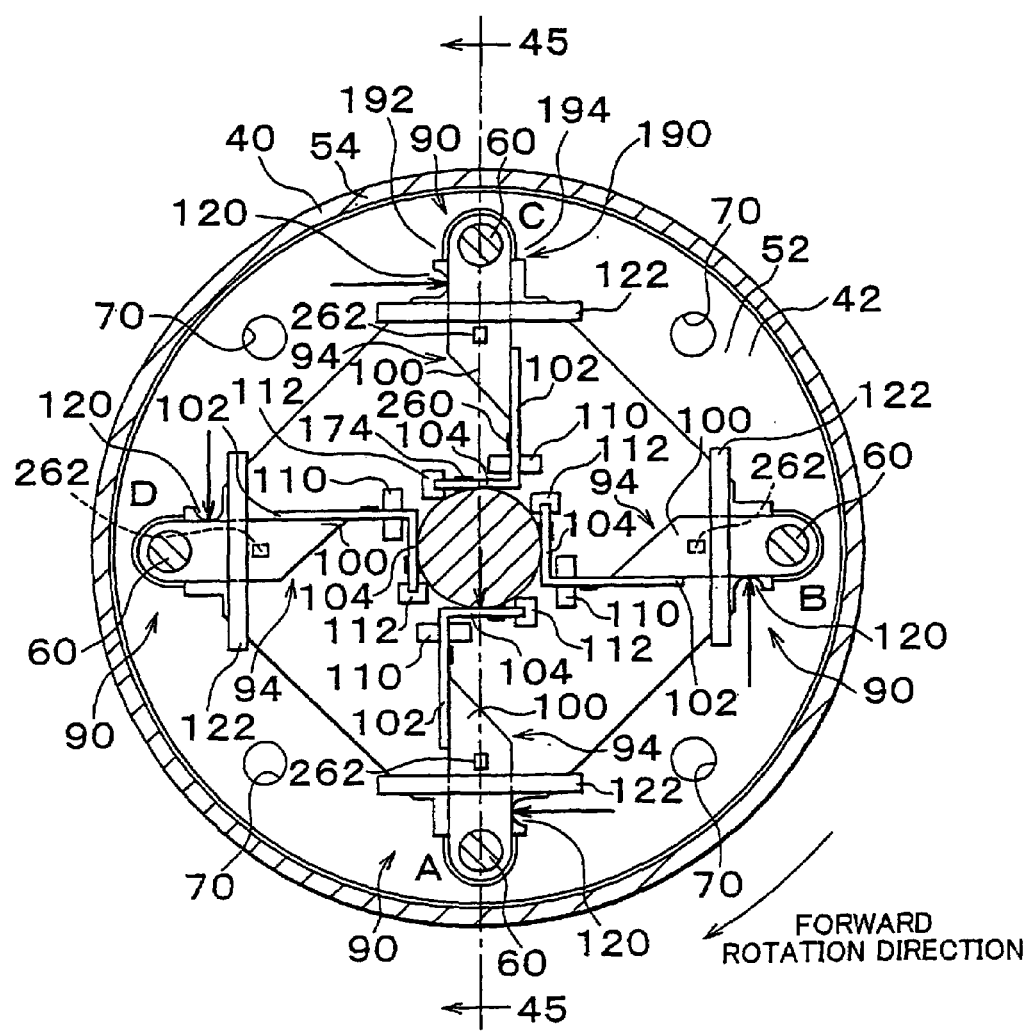
FIG. 44 is a front view showing an internal structure of a detector in a device for detecting force acting on a tire according to a fifth preferred embodiment of the invention.
Figure 45:
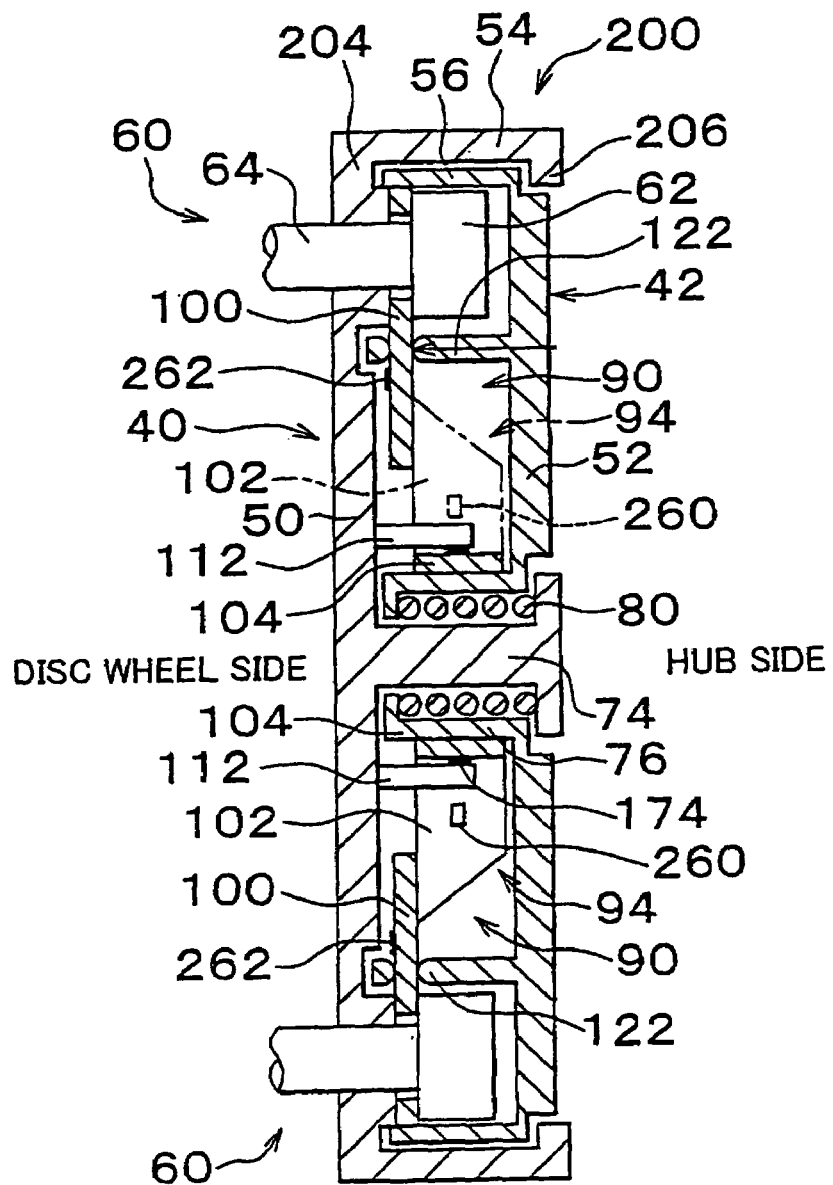
FIG. 45 is a sectional view taken from line 45—45 in FIG. 44.

On the other hand, according to the present preferred embodiment, a strain gauge 260 for detecting longitudinal force, a strain gauge 262 for detecting lateral force, and the strain gauge 174 for detecting vertical force are attached on one side of a plain plate of every detecting portion 90 before bending the plain plate to form the detecting member 94, as shown in FIGS. 44 and 45.

Similar to the first preferred embodiment, the present preferred embodiment also has adopted the premise in which each of the strain gauges 260, 262 and 174 detects necessary force acting on the tire based on tensile strain generated in each of those strain gauges.

In this connection, in the present preferred embodiment, the detecting portion 90 labeled with A in FIG. 44 detects driving force when the vehicle is moving forward, detects braking force when the vehicle is moving backward, and detects lateral force when lateral force is acting on the tire 24 in the direction of the outside of turning, as shown in FIG. 46.

The detecting portion 90, labeled with B and disposed in a position 90 degrees offset from the detecting portion 90 labeled with A in the direction opposite to forward rotation, detects driving force when the vehicle is moving backward, detects braking force when the vehicle is moving forward, and detects lateral force when lateral force is acting on the tire 24 in the direction of the inside of turning.

The detecting portion 90, labeled with C and disposed in a position 90 degrees offset from the detecting portion 90 labeled with B in the direction opposite to forward rotation, detects driving force when the vehicle is moving forward, detects braking force when the vehicle is moving backward, and detects lateral force when lateral force is acting on the tire 24 in the direction of the outside of turning.

The detecting portion 90, labeled with D and disposed in a position 90 degrees offset from the detecting portion 90 labeled with C in the direction opposite to forward rotation, detects driving force when the vehicle is moving backward, detects braking force when the vehicle is moving forward, and detects lateral force when lateral force is acting on the tire 24 in the direction of the inside of turning.

As shown in FIG. 47, in the present preferred embodiment, a zero-point correcting portion 300 is provided instead of the zero-point correcting portion 16 of the first preferred embodiment. The zero-point correcting portion 300 is so designed as to perform zero-point correction with the following programs: a program same as the vertical force detection zero-point correction program, shown in FIG. 19, for zero-point correction of the detector 10 with respect to the vertical force VF, a program same as the lateral force detection zero-point correction program, shown in FIG. 20, for zero-point correction of the detector 10 with respect to the lateral force SF, and the driving force detection zero-point correction program, conceptually shown in the flow chart of FIG. 48, for zero-point correction of the detector 10 with respect to driving force of the longitudinal force LF.

The driving force detection zero-point correction program is performed for zero-point correction with respect to driving force detection by the two detecting portions 90 labeled with A and C. The program is repeatedly performed over the four vehicle wheels 20 in order.

When the driving force detection zero-point correction program is initiated each time, first of all, whether or not the vehicle is moving is determined at S501. This determination can be performed by referring to, for example, a detected value of the vehicle wheel speed sensor. The determination is performed because the two detecting portions 90 labeled with A and C are so designed as to detect driving force only when the vehicle is moving forward.

If the vehicle is assumed not to be moving forward, the determination at S501 becomes "NO", which immediately terminates a single routine of the driving force detection zero-point correction program. In contrast, if the vehicle is assumed to be moving forward, the determination at S501 becomes "YES" to proceed to S502.

At S502, whether or not some of the four vehicle wheels 20, over which the program is performed, are drive wheels is determined. If they are assumed to be the driving wheels, the determination becomes "YES". Then, at S503, whether or not the vehicle is being braked is determined, that is, whether or not driving force is acting on the detector 10, provided in the vehicle wheel over which the program is performed, is determined.

If it is assumed that the vehicle is being braked, the determination at S503 becomes "YES". Then, at S504, the zero points of the two detecting portions 90 mentioned above are set to positions indicating that driving force is 0, which in turn terminates a single routine of the driving force detection zero-point correction program.

In contrast, if it is assumed that the vehicle is not being braked, the determination at S503 becomes "NO", skipping S504 to terminate a single routine of the driving force detection zero-point correction program.

Heretofore, the processes, in the driving force detection zero-point correction program when some of the four vehicle wheels 20, over which the program is performed, are the drive wheels, have been explained. On the other hand, if they are not the drive wheels, the determination at S502 becomes "NO", skipping S503 to proceed to S504. In this case, therefore, whether or not the vehicle is being braked is not determined, then zero-point correction is performed at S504.

Figure 48:
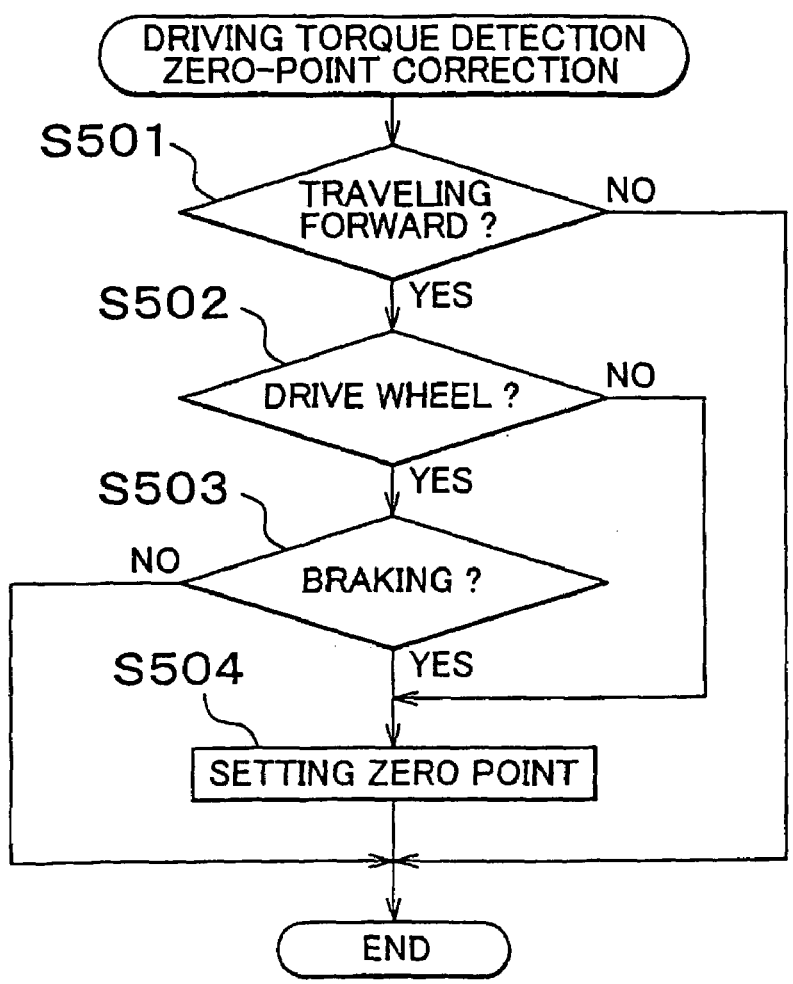
FIG. 48 is a flow chart conceptually showing a driving force detection zero-point correction program performed by a zero-point correcting portion in FIG. 47.

As clear from the explanation above, in the present preferred embodiment, portions of the zero-point correcting portion 300 for performing all steps in FIG. 48 constitute an example of "setting means" in the section (54).

Moreover, in the present preferred embodiment, the detecting portions labeled with A and C respectively constitute an example of "first portion" in the section (60), and the detecting portions labeled with B and D respectively constitute an example of "second portion" in the same section. Furthermore, in the same section, portions of the zero-point correcting portion 300 for performing all steps in FIG. 48 constitute an example of "means".

Next, the following explains the sixth preferred embodiment of the present invention. However, the present preferred embodiment has a lot of elements common to those of the first preferred embodiment, and only elements with respect to the vehicular state variable sensor and the sensor zero-point correcting portion for correcting the zero point of the sensor are different from those of the first preferred embodiment. Therefore, the different elements will be explained in detail, and the explanation of the common elements will be omitted by using the same reference numerals in the first preferred embodiment.

Figure 49:
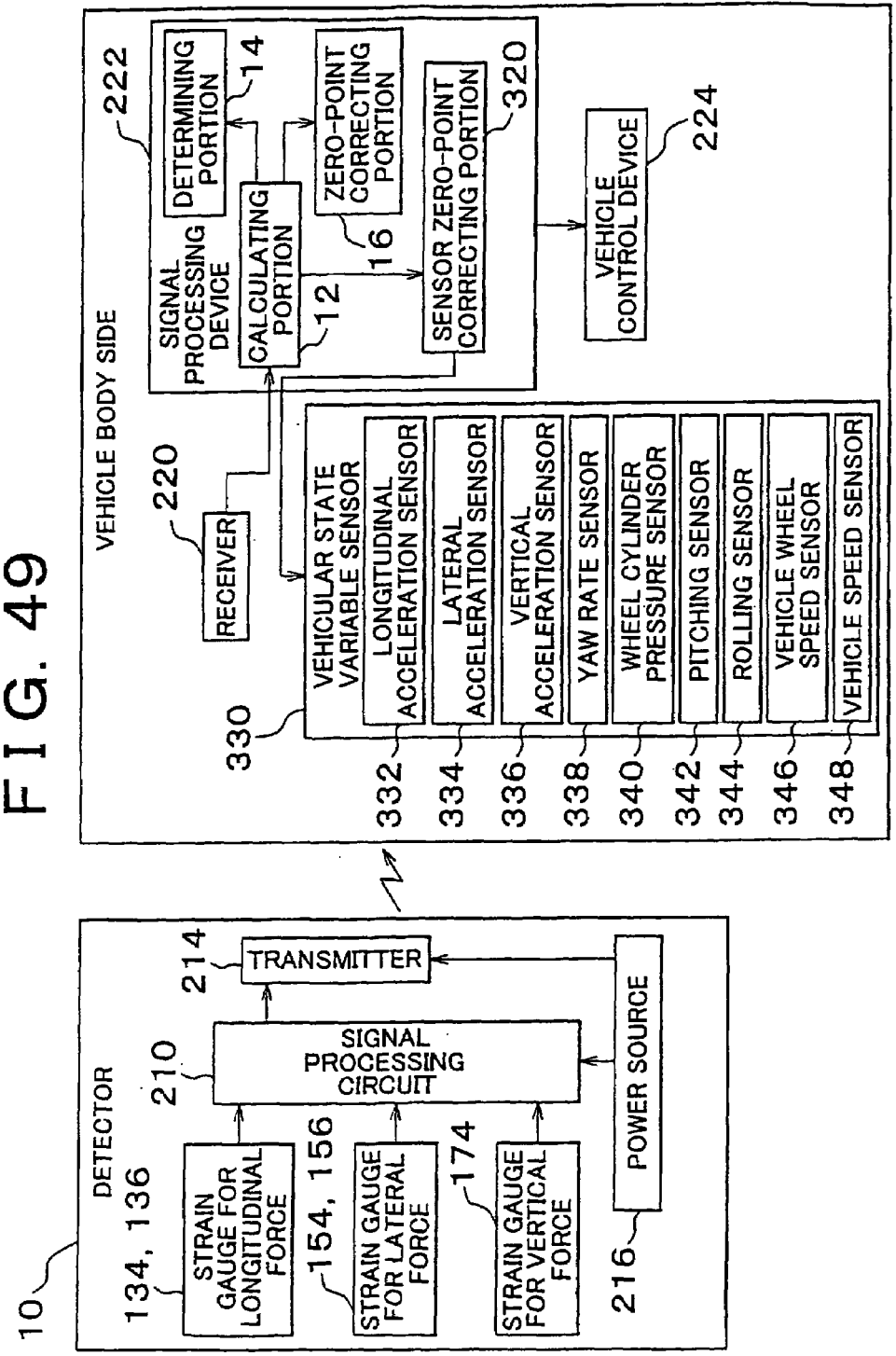
FIG. 49 is a block diagram showing an electrical configuration of a device for detecting force acting on a tire according to a sixth preferred embodiment of the invention.

As shown in FIG. 49, in the present preferred embodiment, the signal processing unit 222 further includes a sensor zero-point correcting portion 320 compared to the signal processing unit 222 in the first preferred embodiment. On the vehicle, a vehicular state variable sensor 330 is mounted, as shown in the same figure.

The vehicular state variable sensor 330 so is configured as to include the following plural sensors:
(1) a longitudinal acceleration sensor 332 detecting the longitudinal acceleration Gx of the vehicle,
(2) a lateral acceleration sensor 334 detecting the lateral acceleration Gy of the vehicle,
(3) a vertical acceleration sensor 336 detecting a vertical acceleration Gz of the vehicle,
(4) a yaw rate sensor 338 detecting the yaw rate of the vehicle,
(5) a wheel cylinder pressure sensor 340 detecting a wheel cylinder pressure of the brake of each vehicle wheel,
(6) a pitching sensor 342 detecting a physical quantity with respect to pitching of the vehicle,
(7) a rolling sensor 344 detecting a physical quantity with respect to rolling of the vehicle,
(8) a vehicle wheel speed sensor 346 detecting a rotating speed of each vehicle wheel as the vehicle wheel speed VW,
(9) a vehicle speed sensor 346 detecting a traveling speed of the vehicle without using the vehicle wheel speed sensor 346.

The zero points of these sensors are corrected by the sensor zero-point correcting portion 320 with the use of the detector 10. The correction is performed when the following two conditions are met: 1) detection of the detector 10 has been determined to be normal by the determining portion 14, and 2) the zero point of the detector 10 has been corrected by the zero-point correcting portion 16.

Figure 50:
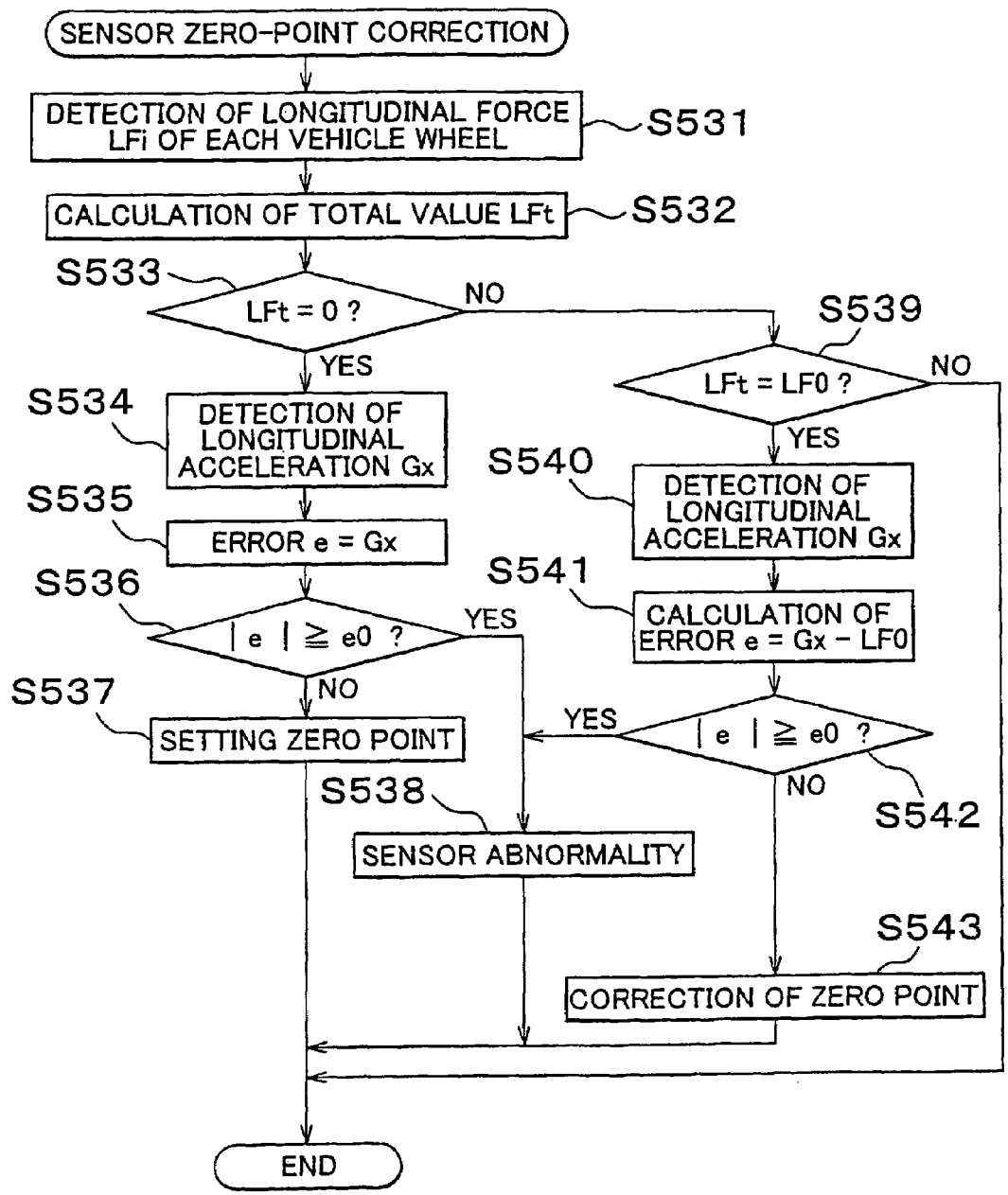
FIG. 50 is a flow chart conceptually showing a sensor zero-point correction program performed by a sensor zero-point correcting portion in FIG. 49.

FIG. 50 conceptually shows the sensor zero-point correction program, performed by the computer of the signal processing unit 222 to realize the correction, in the flow chart. However, only the portion correcting the zero point of the longitudinal acceleration sensor 332 of the program is shown in the same figure. The zero points of the other sensors are corrected according to the same principle of the zero-point correction of the longitudinal acceleration sensor 332. The following explains the sensor zero-point correction program while referring to the same figure.

When the sensor zero-point correction program is initiated each time, first of all, the longitudinal force LFi of each vehicle wheel 20 is detected by the longitudinal detecting portion 130 at S531. Next, at S532, the total value LFt of the four longitudinal forces LFi of the four vehicle wheels 20 is calculated.

Next off, at S533, whether or not the calculated total value LFt is 0, that is, whether or not the vehicle is in the reference vehicular state where the longitudinal acceleration Gx is not acting on the longitudinal acceleration sensor 332.

If the total value LFt is assumed to be 0, the determination at S533 becomes "YES". Then, at S534, the longitudinal acceleration Gx is detected by the longitudinal acceleration sensor 332.

Then, at S535, the detected longitudinal acceleration Gx is determined as an error e of the zero point of the longitudinal acceleration sensor 332. Next off, at S536, whether or not an absolute value of the determined error e is equal to or larger than a permissive value e0 preset.

If the absolute value of the error e is assumed not to be equal to or larger than the permissive value e0, the determination at S536 becomes "NO". Then, at S537, the zero point of the longitudinal acceleration sensor 332 is set to a position indicating that the longitudinal acceleration Gx is 0. In contrast, if the absolute value of the error e is assumed to be equal to or larger than the permissive value e0, the determination at S536 becomes "YES". Then, at S538, the longitudinal acceleration sensor 332 is determined to be abnormal. Any of the cases above, at this time, lead to termination of a single routine of the sensor zero-point correction program.

Heretofore, the processes, in the sensor zero-point correction program when the total value LFt is 0, have been explained. On the other hand, if the total value LFt is not 0, the determination at S533 becomes "NO" to proceed to S539.

At S539, whether or not the total value LFt is equal to a reference value LF0, preset not to 0, is determined. If the total value LFt is assumed not to be equal to the reference value LF0, the determination at S539 becomes "NO", which immediately terminates a single routine of the sensor zero-point correction program.

On the other hand, if the total value LFt is assumed to be equal to the reference value LF0, the determination at S539 becomes "YES". Then, at S540, the longitudinal acceleration Gx is detected by the longitudinal acceleration sensor 332. Next, at S541, the error e of the zero point of the longitudinal acceleration sensor 332 is calculated by subtracting the reference value LF0 from the longitudinal acceleration Gx.

Then, at S542, whether or not the absolute value of the determined error e is equal to or larger than the permissive value e0. If the absolute value of the determined error e is assumed not to be equal to or larger than the permissive value e0, the determination at S539 becomes "NO". Then, at S543, the zero point of the longitudinal acceleration sensor 332 is corrected based on the error e. More specifically, the zero point of the longitudinal acceleration sensor 332 is corrected by the quantity of the error e and in the direction that the error e is eliminated according to the assumption that input/output gradient of the longitudinal acceleration sensor 332 is regular.

To the contrary, if the absolute value of the determined error e is assumed to be equal to or larger than the permissive value e0, the determination at S539 becomes "YES". Then, at S538, the longitudinal acceleration sensor 332 is determined to be abnormal.

Any of the cases above, at this time, lead to termination of a single routine of the sensor zero-point correction program.

As clear from the explanation above, in the present preferred embodiment, portions of the sensor zero-point correcting portion 320 for performing S531 or S534 and S537 in FIG. 50 constitute an example of "setting means" in the section (66).

Moreover, in the present preferred embodiment, portions of the sensor zero-point correcting portion 320 for performing S539 or S541 and S543 in FIG. 50 constitute an example of "means" in the section (67).

Next, the following explains the seventh preferred embodiment of the present invention. However, the present preferred embodiment has a lot of elements common to those of the fourth preferred embodiment, and only elements with respect to abnormality determination of lateral force detection by the detector are different from those of the fourth preferred embodiment. Therefore, the different elements will be explained in detail, and the explanation of the common elements will be omitted by using the same reference numerals.

Figure 51:
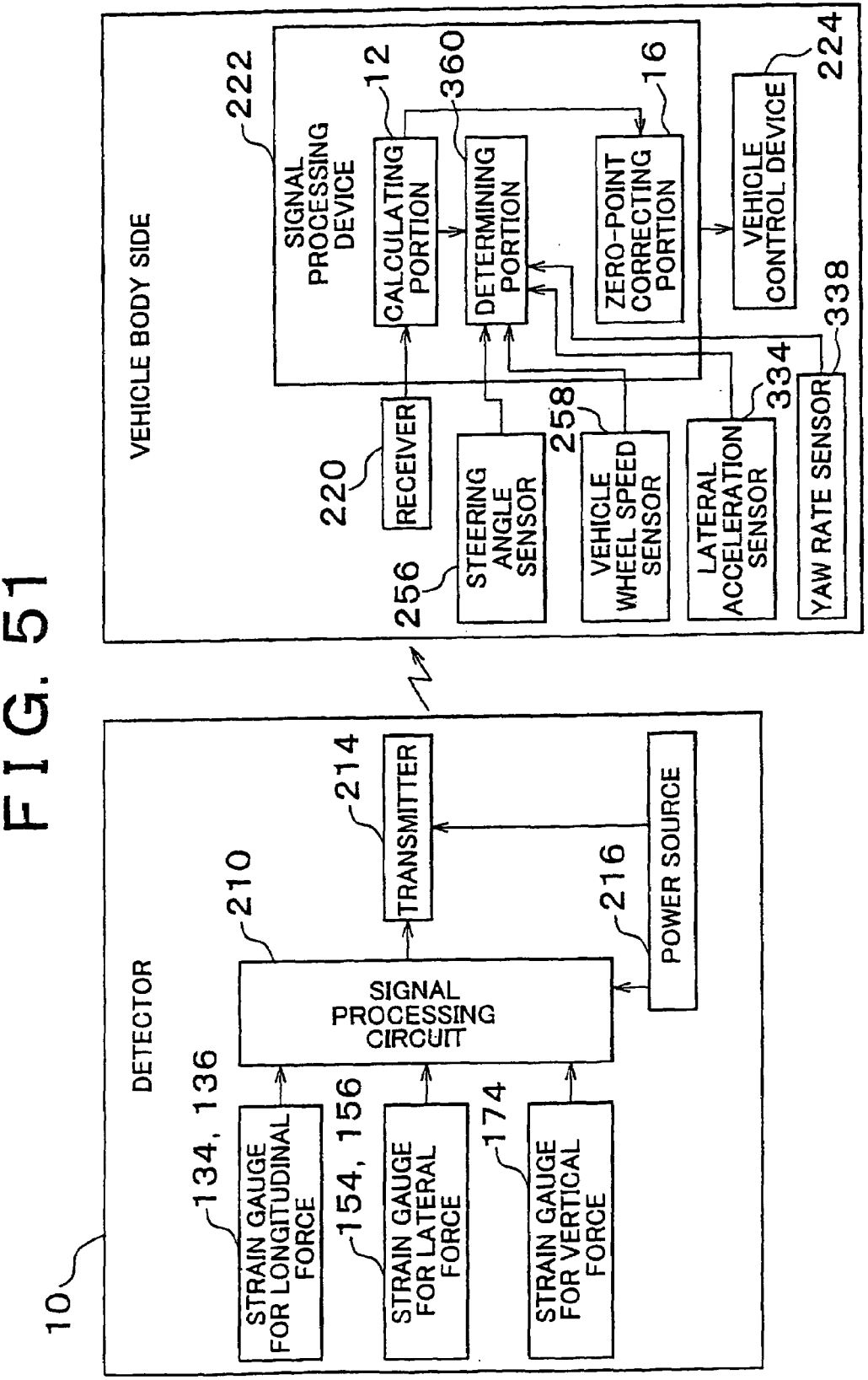
FIG. 51 is a block diagram showing an electrical configuration of a device for detecting force acting on a tire according to a seventh preferred embodiment of the invention.

As shown in FIG. 51, in the present preferred embodiment, a determining portion 360 is provided instead of the determining portion 254 of the fourth preferred embodiment. The determining portion 360 is so configured as to perform abnormality determination with respect to detecting the vertical force VF by the detector 10 with a program same as the vertical force detection abnormality determining program, shown in FIGS. 15 and 16.

Figure 52:
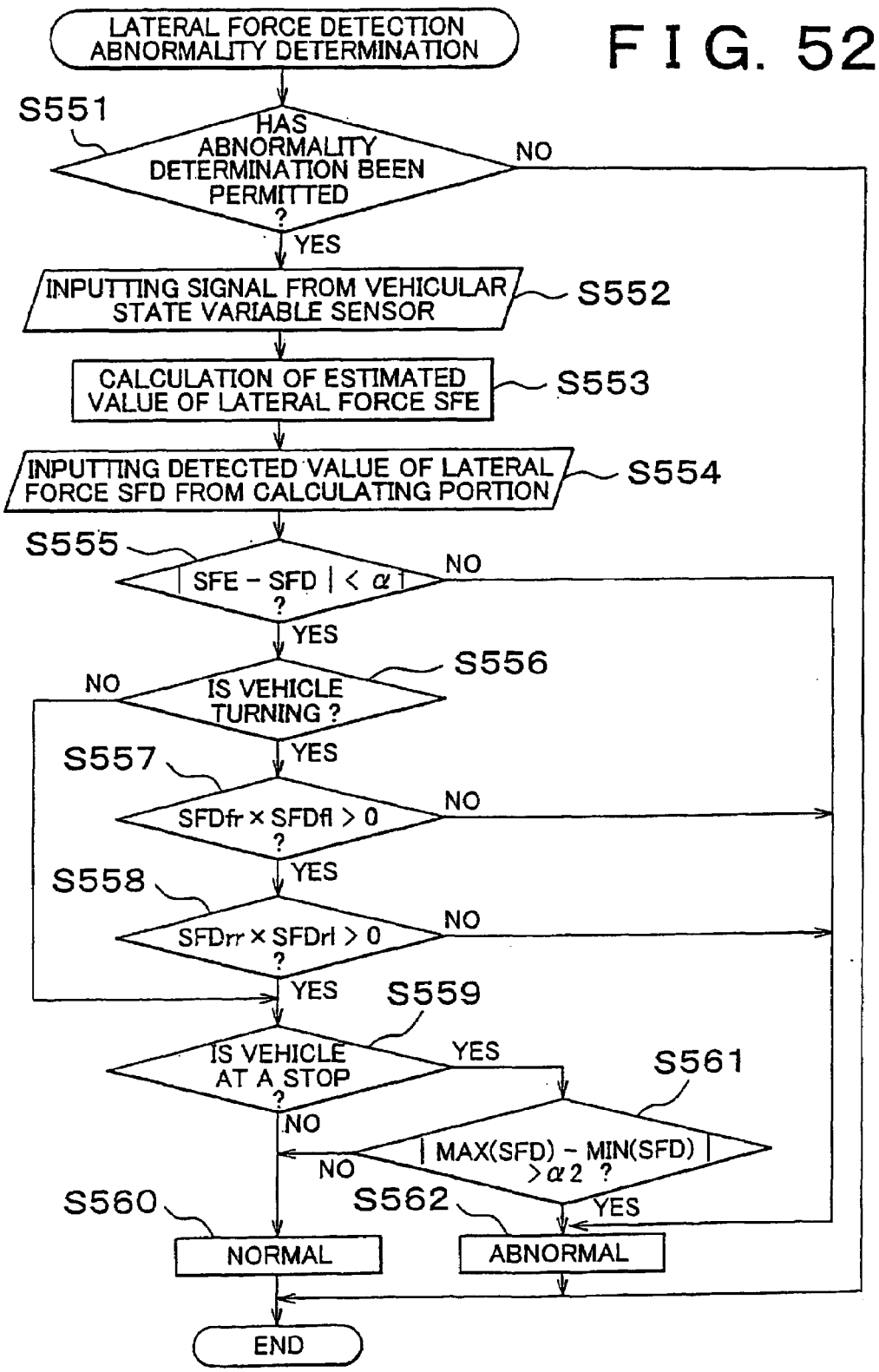
FIG. 52 is a flow chart conceptually showing a lateral force detection abnormity determining program performed by a determining portion in FIG. 51.

In addition, determining portion 360 is so configured as to perform abnormality determination with respect to detecting the lateral force SF by the detector 10 with the lateral force detection abnormality determining program, conceptually shown in the flow chart of FIG. 52.

Furthermore, determining portion 360 is so configured as to perform abnormality determination with respect to detecting the longitudinal force LF by the detector 10 with a program same as the longitudinal force detection abnormality determining program, shown in FIG. 18.

In the present preferred embodiment, as shown in FIG. 51, the lateral acceleration sensor 334 and the yaw rate sensor 338 are further provided in addition to the steering angle sensor 256 and the vehicle wheel speed sensor 258.

In the present preferred embodiment, those sensors 256, 258, 334, and 338 respectively constitute an example of the vehicular state variable sensor, which detects the state variable of the vehicle, independently from the device for detecting force acting on a tire. Moreover, in the present preferred embodiment, the steering angle sensor 256 constitute an example of a manipulation state variable detecting device detecting a state variable of manipulation by the driver for changing the state variable of the vehicle.

The following explains the lateral force detection abnormality determining program while referring to FIG. 52.

Schematically explaining the lateral force detection abnormality determining program, first of all, the determination of whether or not the lateral force detecting portion 150 is abnormal is prohibited when an actual value of the lateral force SF is likely to change frequently as time elapses because of the following two reasons: 1) automatic controls by the vehicle control unit 224 (antilock controls, vehicle stability controls by lateral force controls, and so on) are being performed, and 2) the vehicle is turning irregularly with moving direction of the vehicle changing more frequently than that of the vehicle when moving regularly (i.e., the vehicle is turning in s-shape).

Moreover, in the lateral force detection abnormality determining program, if the estimated lateral force SFE based on a signal from the vehicular state variable sensor and a detected lateral force SFD based on a signal from the lateral force detecting portion 150 do not conform to each other, the lateral force detecting portion 150 is determined to be abnormal.

As described above, in the present preferred embodiment, an estimated value and a detected value of force acting on a tire are compared over each vehicle wheel, so that whether or not each detecting portion is abnormal is determined. The estimated value and the detected value to be compared are obtained virtually at the same time.

In addition, in the present preferred embodiment, the detected value and the estimated value, which are the completely the same type of physical quantities, are compared to determine whether or not each detecting portion is abnormal. However, it is not indispensable to use the same type of physical quantities, that is, physical quantities physically equivalent or physically displaceable may be selected. For example, the detected lateral force SFD can be compared with the steering angle θ of the steering wheel, the yaw rate of the vehicle body, or combination of them for abnormality determination.

Furthermore, with respect to the steering wheel of the vehicle which is manipulated by the driver with a need to turn the vehicle, it may be mechanically connected to a steering mechanism steering a drive wheel, or it may be mechanically isolated, but may be electrically connected, that is, it may be motor driven. In either case above, the present invention can be embodied by giving attention to the steering angle θ.

If the steering wheel is motor driven, known relation can be established between a command value supplied to an electric control portion of the steering mechanism and a turning manipulation angle of the steering wheel, in order words, the steering angle $\theta$. Therefore, the command value instead of the steering angle $\theta$ can be compared with the detected lateral force SFD.

Meanwhile, the estimated lateral force SFE can be calculated by using a lateral acceleration GyD detected by the lateral acceleration sensor 334. Moreover, it can be calculated by using a lateral acceleration GyE estimated from a yaw rate $\gamma$ detected by the yaw rate sensor 338 and the a vehicle speed V (e.g., GyE=V*$\gamma$).

Further, the estimated lateral force SFE can be calculated by using the lateral acceleration GyE estimated from the steering angle $\theta$ detected by the steering angle sensor 256 and the vehicle speed V (e.g., GyE=V2/R, R: turning radius of the vehicle estimated based on the steering angle $\theta$). Furthermore, it can be calculated by using the lateral acceleration GyE estimated from the yaw rate $\gamma$, the vehicle speed V, and the steering angle $\theta$ (e.g., GyE=V2/R–V*$\gamma$).

With respect to determination of whether or not the estimated lateral force SFE and the detected lateral force SFD conform to each other, they are determined not to conform to each other if a difference between them is larger than a set value $\alpha 1$.

However, if a ratio between the estimated lateral force SFE and the detected lateral force SFD exceeds a setting range, they can be determined not to conform to each other.

Meanwhile, the vehicle speed V can be detected by a dedicated sensor such as the vehicle speed sensor 348. Moreover, it can be estimated based on the vehicle wheel speed VW detected by the plural vehicle wheel speed sensor 258 corresponding to the plural vehicle wheels.

Furthermore, if the estimated lateral force SFE is equal to or smaller than a first set value and if the detected lateral force SFD is equal to or larger than a second set value (e.g., the second set value is larger than the first one), these estimated lateral force SFE and detected lateral force SFD can be determined not to conform to each other.

Furthermore, in the lateral force detection abnormality determining program, if the lateral force detecting portion 150 is normal while the vehicle is turning, signs (positive or negative indicating the direction of generated lateral force) of the detected lateral forces SFD of the right front and left front wheels match, and those of the right rear and left rear wheels also match. Therefore, by giving attention to the above-mentioned facts, whether or not the lateral force detecting portion 150 is abnormal is also determined.

In other words, by determining whether or not signs of the detected values of plural detecting portions, mounted on the vehicle, match, whether or not these plural detecting portions are abnormal is determined generally.

Moreover, in the lateral force detection abnormality determining program, whether or not all the lateral force detecting portions 150 are normal is determined by giving attention to the fact that the detected lateral forces SFD of plural vehicle wheels substantially match while the vehicle is at a stop if all the lateral force detecting portions 150 of all the vehicle wheels are normal.

More specifically, in the present preferred embodiment, if the detected lateral forces SFD of plural vehicle wheels vary widely while the vehicle is at a stop, not all the lateral force detecting portions 150 are determined to be normal. Further specifically, if a difference between a maximum value (SFD) and a minimum value (SFD) of the detected lateral forces SFD of the plural vehicle wheels is larger than a set value $\alpha 2$, not all the lateral force detecting portions 150 are determined to be normal.

In addition, in the present preferred embodiment, whether or not the detected lateral force SFD is larger than a set value is not determined over each vehicle wheel. The reason is that if the vehicle is at a stop on an inclined road surface, the detected lateral forces SFD do not become 0 but come close to the set value even though each lateral force detecting portion 150 is normal. As a result, the above-mentioned tendency of the detected lateral forces SFD becomes a factor lowering the reliability of determination results of whether or not the lateral force detecting portions 150 are normal.

Next, the following explains the contents of the lateral force detection abnormality determining program in detail while referring to FIG. 52.

When the lateral force detection abnormality determining program is initiated each time, first of all at S551, whether or not the conditions of permitting abnormality determination have been met is determined, as described previously. If the conditions are assumed not to have been met, the determination becomes "NO", which immediately terminates a single routine of the lateral force detection abnormality determining program.

In contrast, if the conditions are assumed to have been met, the determination at S551 becomes "YES". Then signals from some of the vehicular state variable sensors mentioned previously, which output signals needed to be referred to for calculation of the estimated lateral force SFE, are input at S552.

Then, at S553, based on the input signals, the estimated lateral force SFE is calculated according to the calculation method explained previously. The estimated lateral force SFE is calculated over each vehicle wheel in consideration of positions of each vehicle wheel in the vehicle. Next off, at S554, the calculating portion 12 inputs the detected lateral force SFD of each vehicle wheel.

Then, at S555, whether or not a difference between the calculated estimated lateral force SFE and the input detected lateral force SFD of each vehicle wheel is smaller than the set value $\alpha 1$ is determined. If the difference is assumed to be smaller than the set value $\alpha 1$, the determination becomes "YES". Then, at S556, whether or not the vehicle is turning is determined based on a signal from the steering angle sensor 256.

If the vehicle is assumed to be turning, the determination at S556 becomes "YES". Then, at S557, whether the product of a detected lateral force of the right front wheel SFDfr and a detected lateral force of the left front wheel SFDfl is larger than 0, in order words, whether or not signs of both detected values are the same is determined. If the product is assumed to be larger than 0, the determination becomes "YES" to proceed to S558.

Based on S557, whether the product of a detected lateral force of the right rear wheel SFDrr and a detected lateral force of the left rear wheel SFDrl is larger than 0, in order words, whether or not signs of both detected values are the same is determined at S558. If the product is assumed to be larger than 0, the determination becomes "YES" to proceed to S559.

On the other hand, if the vehicle is assumed not to be turning, the determination at S556 becomes "NO", skipping S557 and S558 to proceed to S559.

At S559 from either case mentioned above, whether or not the vehicle is at a stop is determined based on a signal from the vehicle wheel speed sensor 258. If the vehicle is assumed not to be at a stop, the determination becomes "NO". Then, at S560, all the lateral force detecting portions 150 of all the vehicle wheels are determined to be normal, terminating a single routine of the lateral force detection abnormality determining program.

In contrast, if the vehicle is assumed to be at a stop, the determination at S559 becomes "YES". Then, at S561, whether or not a difference between the maximum value (SFD) and the minimum value (SFD) of all the detected lateral forces SFD of all the vehicle wheels is larger than the set value α2 is determined. If the difference is assumed not to be larger the set value α2, the determination becomes "NO", proceeding to S560 to terminate a single routine of the lateral force detection abnormality determining program.

If the determinations at S555 and S557 or S558 are "NO" or if the determination at S561 is "YES", at least one of the lateral force detecting portions 150 is determined to be abnormal at S562, terminating a single routine of the lateral force detection abnormality determining program.

As clear from the explanation above, in the present preferred embodiment, at least the steering angle sensor 256 constitutes an example of "vehicular state variable sensor" in the section (22), and portions of the determining portion 360 for performing S552 or S555 in FIG. 52 constitute an example of "fourth abnormality determining means" in the same section, an example of "means" in the section (23), and an example of "means" in the section (24).

Moreover, in the present preferred embodiment, the steering angle sensor 256 constitutes an example of "manipulation state variable sensor" in the section (25), and portions of the determining portion 360 for performing S552 or S555 in FIG. 52 constitute an example of "means" in the same section.

Further, in the present preferred embodiment, portions of the determining portion 360 for performing S556 or S558 in FIG. 52 and those for performing S559 or S561 in the same figure respectively constitute an example of "means" in the section (35).

Furthermore, in the present preferred embodiment, portions of the determining portion 360 for performing S556 or S558, S559, and S561 in FIG. 52 constitute an example of "means" in the section (42).

Furthermore, in the present preferred embodiment, a portion of the determining portion 360 for performing S551 in FIG. 52 constitutes an example of "means" in the section (43).

Next, the following explains the eighth preferred embodiment of the present invention. However, the present preferred embodiment has a lot of elements common to those of the fourth preferred embodiment, and only elements with respect to abnormality determination of vertical force detection by the detector are different from those of the fourth preferred embodiment. Therefore, the different elements will be explained in detail, and the explanation of the common elements will be omitted by using the same reference numerals.

Figure 53:
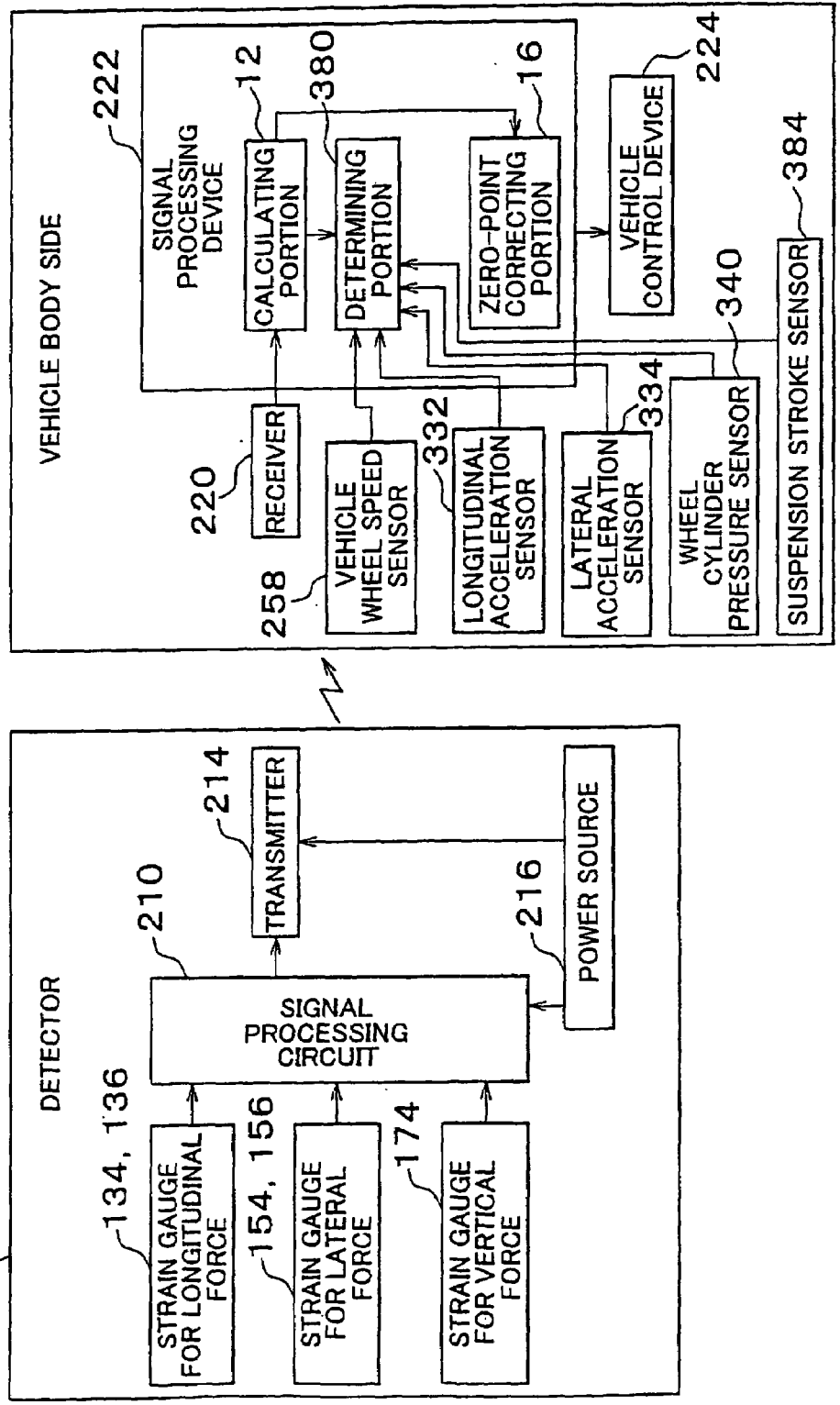
FIG. 53 is a block diagram showing an electrical configuration of a device for detecting force acting on a tire according to a eighth preferred embodiment of the invention.

As shown in FIG. 53, in the present preferred embodiment, a determining portion 380 is provided instead of the determining portion 254 of the fourth preferred embodiment. The determining portion 380 is so configured as to perform abnormality determination with respect to detecting the vertical force VF by the detector 10 with the vertical force detection abnormality determining program, conceptually shown in the flow chart of FIG. 54.

In addition, determining portion 380 is so configured as to perform abnormality determination with respect to detecting the lateral force SF by the detector 10 with a program same as the lateral force detection abnormality determining program, shown in FIG. 17.

Furthermore, determining portion 380 is so configured as to perform abnormality determination with respect to detecting the longitudinal force LF by the detector 10 with a program same as the longitudinal force detection abnormality determining program, shown in FIG. 18.

In the present preferred embodiment, as shown in FIG. 53, the longitudinal acceleration sensor 332, the lateral acceleration sensor 334, the wheel cylinder pressure sensor 340, and a suspension stroke sensor 384 are further provided in addition to the vehicle wheel speed sensor 258, and the steering angle sensor 256 has been omitted.

The suspension stroke sensor 384 detects a stroke of a suspension, which is provided at each vehicle wheel and connects each vehicle wheel to the vehicle body so that each vehicle wheel can be displaced. The stroke reflects a vertical distance between the vehicle body and each vehicle wheel, that is, the vertical force VF of each vehicle wheel.

In addition, the vertical force VF can be estimated by using the vertical acceleration Gz detected by the vertical acceleration sensor 336. Moreover, if the suspension is air type one or hydraulic type one with which a vehicle height or damping force of a shock absorber is changed by a working fluid, the vertical force VF can also be estimated by using a detected value of a working fluid pressure sensor detecting a pressure of the working fluid.

In the present preferred embodiment, those sensors 258, 332, 334, 340, and 384 respectively constitute an example of the vehicular state variable sensor, which detects the state variable of the vehicle, independently from the device for detecting force acting on a tire.

Figure 54:
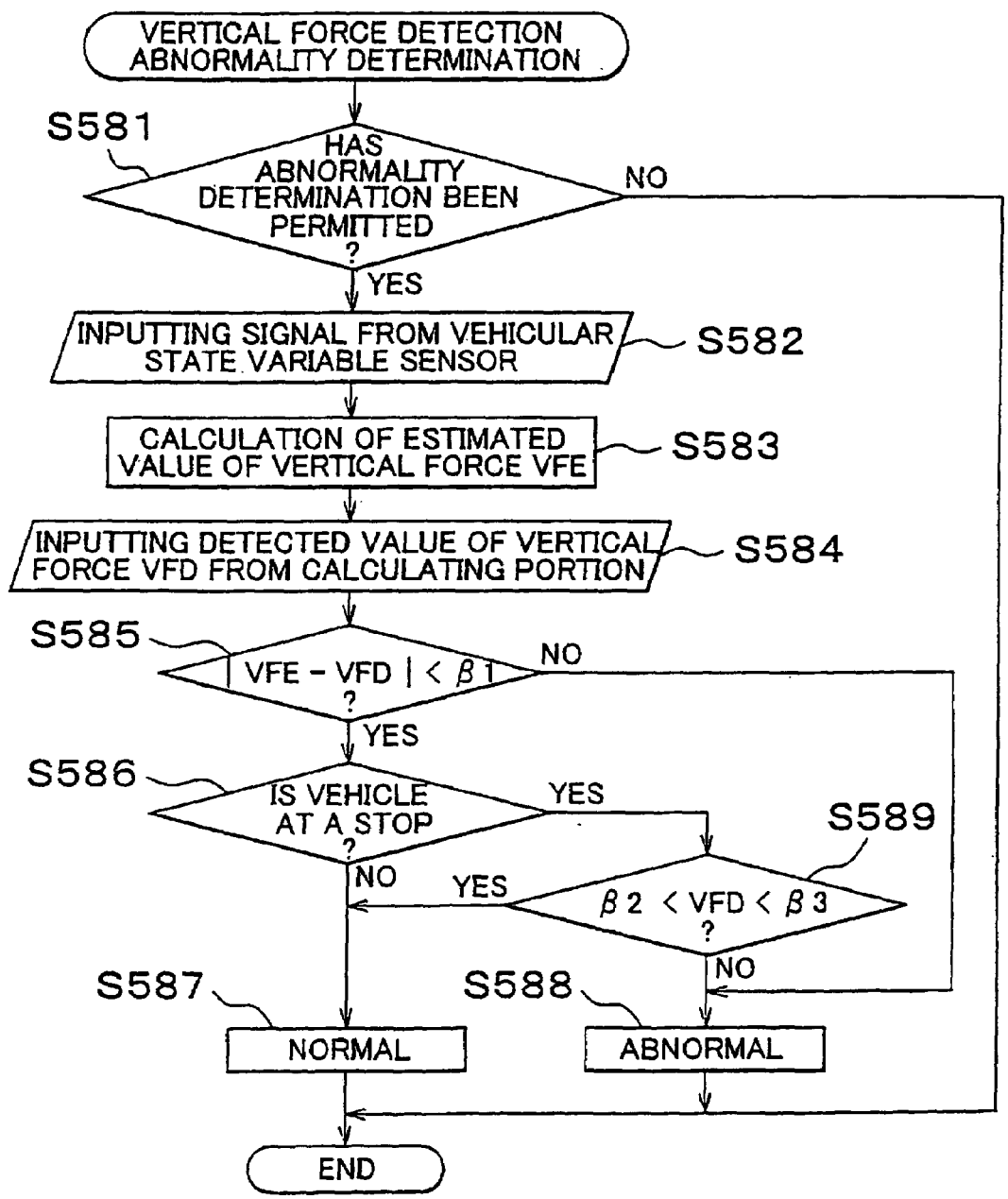
FIG. 54 is a flow chart conceptually showing a vertical force detection abnormity determining program performed by a determining portion in FIG. 53.

The following explains the vertical force detection abnormality determining program while referring to FIG. 54.

Schematically explaining the vertical force detection abnormality determining program, first of all, the determination of whether or not the vertical force detecting portion 170 is abnormal is prohibited when an actual value of the vertical force VF is likely to change frequently as time elapses because the automatic controls are being performed or the vehicle is turning irregularly, similar to the lateral force detection abnormality determining program in the seventh preferred embodiment.

Moreover, in the vertical force detection abnormality determining program, if the estimated vertical force VFE based on the signal from the vehicular state variable sensor and a detected vertical force VFD based on a signal from the vertical force detecting portion 170 do not conform to each other, the vertical force detecting portion 170 is determined to be abnormal. Also in the present preferred embodiment similar to the seventh preferred embodiment, the estimated value and the detected value of force acting on a tire are compared over each vehicle wheel, so that whether or not the vertical force detecting portion 170 is abnormal is determined.

Meanwhile, the estimated vertical force VFE can be estimated by using the longitudinal acceleration Gx and the lateral acceleration Gy in consideration of longitudinal and lateral moving distances of a vertical load acting on the vehicle.

The longitudinal acceleration Gx can be detected by the longitudinal acceleration sensor 332. Further, it can be estimated by using the vehicle speed V, the vehicle wheel speed VW detected by the vehicle wheel speed sensor 258, or a wheel cylinder pressure PW (physical quantity reflecting braking force) detected by the wheel cylinder pressure sensor 340.

On the other hand, the lateral acceleration Gy can be obtained in a way similar to the one in the seventh preferred embodiment.

Furthermore, the estimated vertical force VFE can be estimated by using the suspension stroke of each vehicle wheel detected by the suspension stroke sensor 384.

According to the present preferred embodiment, a detected value of the vertical force detecting portion 170 is directly used as the detected vertical force VFD for determining whether or not the vertical force detecting portion 170 is abnormal, that is, an absolute quantity of the detected vertical force VFD is used for abnormality determination of the vertical force detecting portion 170.

However, a relative quantity of the detected vertical force VFD can also be used for the abnormality determination. For example, the relative quantity of the detected vertical force VFD can be obtained as follows. When the vehicle is at a stop with no load movement, the detected vertical force VFD of each vehicle wheel is obtained to set the obtained value to a reference value (virtual zero point). During the abnormality determination, the detected vertical force VFD of each vehicle wheel is also obtained to calculate a ratio of the obtained value to the reference value (or a difference between them).

Meanwhile, if a difference between the estimated vertical force VFE and the detected vertical force VFD is larger than a set value β1, they can be determined not to conform to each other.

However, if a ratio between the estimated vertical force VFE and the detected vertical force VFD exceeds a setting range, they can be determined not to conform to each other.

In addition, in the vertical force detection abnormality determining program, whether or not each vertical force detecting portions 170 is normal is determined by giving attention to the fact that a range of the detected vertical force VFD of each vehicle wheel is limited while the vehicle is at a stop if each vertical force detecting portion 170 of each vehicle wheel is normal.

More specifically, in the present preferred embodiment, the range of the vertical force VF of each vehicle wheel is set if the vehicle is in a loading state between the lightest loading state (i.g., a loading state where only the driver is on board) and the heaviest loading state (i.g, a loading state where capacity of people and luggage are on board).

Furthermore, in the present preferred embodiment, if the detected vertical force VFD of at least one of the vehicle wheels exceeds its setting value, the vertical force detecting portions 170 of that vehicle wheel is determined to be abnormal.

Next, the following explains the vertical force detection abnormality determining program in detail while referring to FIG. 54.

When the vertical force detection abnormality determining program is initiated each time, first of all at S581, whether or not the conditions of permitting abnormality determination have been met is determined, as described previously. If the conditions are assumed not to have been met, the determination becomes "NO", which immediately terminates a single routine of the vertical force detection abnormality determining program.

In contrast, if the conditions are assumed to have been met, the determination at S581 becomes "YES". Then signals from some of the vehicular state variable sensors mentioned previously, which output signals needed to be referred to for calculation of the estimated vertical force VFE, are input at S582.

Then, at S583, based on the input signals, the estimated vertical force VFE is calculated according to the calculation method explained previously. The estimated vertical force VFE is calculated over each vehicle wheel. Next off, at S584, the calculating portion 12 inputs the detected vertical force VFD of each vehicle wheel.

Then, at S585, whether or not a difference between the calculated estimated vertical force VFE and the input detected vertical force VFD of each vehicle wheel is smaller than the set value β1 is determined. If the difference is assumed to be smaller than the set value β1, the determination becomes "YES" to proceed to S586.

At S586, whether or not the vehicle is at a stop is determined based on a signal from the vehicle wheel speed sensor 258. If the vehicle is assumed not to be at a stop, the determination becomes "NO". Then, at S587, all the vertical force detecting portions 170 of all the vehicle wheels are determined to be normal to terminate a single routine of the vertical force detection abnormality determining program.

In contrast, if the vehicle is assumed to be at a stop, the determination becomes "YES". Then, at S589, whether or not all the detected vertical forces VFD of all the vehicle wheels are within the setting range, in other words, whether or not all of them are between a lower limit β2 and an upper limit β3 is determined. If all of them are assumed to be within the setting range, the determination becomes "YES", proceeding to S587 to terminate a single routine of the vertical force detection abnormality determining program.

If the determination at S585 or S589 is "NO", at least one of the vertical force detecting portions 170 is determined to be abnormal at S588, which in turn terminates a single routine of the vertical force detection abnormality determining program.

As clear from the explanation above, in the present preferred embodiment, the vehicle wheel speed sensor 258, the longitudinal acceleration sensor 332, the lateral acceleration sensor 334, the wheel cylinder pressure sensor 340, and the suspension stroke sensor 384 respectively constitute an example of "vehicular state variable sensor" in the section (22). Moreover, portions of the determining portion 380 for performing S582 or S585, S587, and S588 in FIG. 54 constitute an example of "fourth abnormality determining means" in the same section, an example of "means" in the section (23), and an example of "means" in the section (24).

Next, the following explains the ninth preferred embodiment of the present invention. However, the present preferred embodiment has a lot of elements common to those of the first preferred embodiment, and only elements with respect to abnormality determination of longitudinal, lateral, and vertical force detection by the detector are different from those of the first preferred embodiment. Therefore, the different elements will be explained in detail, and the explanation of the common elements will be omitted by using the same reference numerals.

Figure 55:
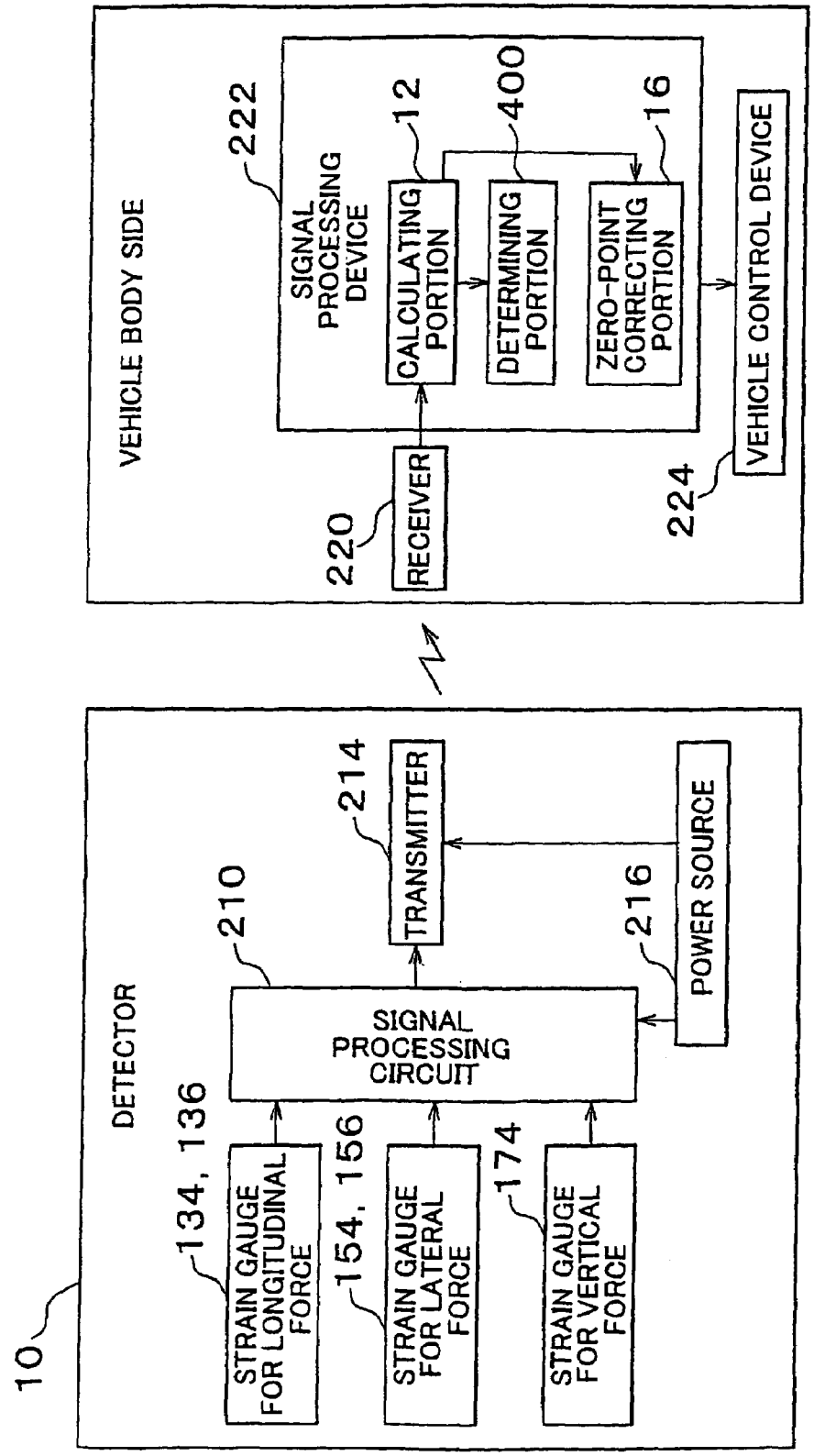
FIG. 55 is a block diagram showing an electrical configuration of a device for detecting force acting on a tire according to a ninth preferred embodiment of the invention.

As shown in FIG. 55, in the present preferred embodiment, a determining portion 400 is provided instead of the determining portion 14 of the first preferred embodiment. The determining portion 400 is so configured as to generally perform abnormality determination with respect to detecting the longitudinal force LF, the lateral force SF, and the vertical force VF by the detector 10 with the general abnormality determining program conceptually shown in the flow chart of FIG. 56.

Figure 56:
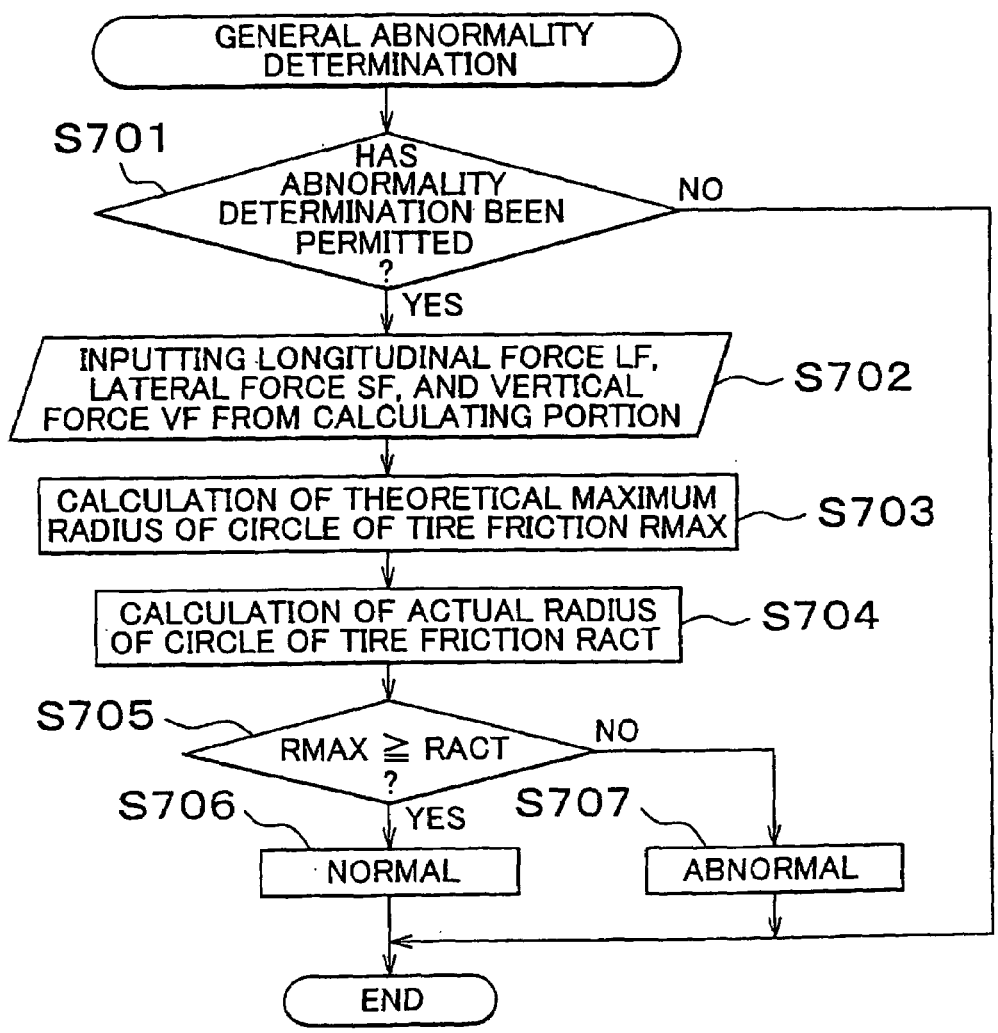
FIG. 56 is a flow chart conceptually showing a general abnormality determining program performed by a determining portion in FIG. 55.

The following explains the general abnormality determining program while referring to FIG. 56.

Schematically explaining the general abnormality determining program, first of all, the determination of whether or not the longitudinal force detecting portion 130, the lateral force detecting portion 150, and the vertical force detecting portion 170 are abnormal is prohibited when actual values of the longitudinal force LF, the lateral force SF, and the vertical force VF are likely to change frequently as time elapses because the automatic controls are being performed or the vehicle is turning irregularly, similar to the lateral force detection abnormality determining program in the seventh preferred embodiment.

Further, in general abnormality determining program, if the entire detector 10 of each vehicle wheel is normal, constant relation with respect to a circle of friction of the tire can be established between the longitudinal force LF, the lateral force SF, and the vertical force VF detected by the detector 10. Therefore, by giving attention to the above-mentioned relation, abnormality determination is performed over plural detectors 10 individually, and is performed over the longitudinal force detecting portion 130, the lateral force detecting portion 150, and the vertical force detecting portion 170 generally.

More specifically, in the present preferred embodiment, if the entire detector 10 of each vehicle wheel is normal, the fact that resultant force (vectorial force) of the longitudinal force LF and the lateral force SF, which are detected by the detector 10, does not exceed the product of the detected vertical force VF and a maximum friction coefficient μMAX between a road surface and the tire is given attention to. The resultant force is equivalent to an actual radius of the circle of tire friction RACT. On the other hand, the product of the vertical force VF and the maximum friction coefficient μMAX is equivalent to a theoretical maximum radius of the circle of tire friction RMAX.

The following explains the contents of the general abnormality determining program in detail while referring to FIG. 56.

When the general abnormality determining program is initiated each time, first of all at S701, whether or not the conditions of permitting abnormality determination have been met is determined, as described previously. If the conditions are assumed not to have been met, the determination becomes "NO", which immediately terminates a single routine of the general abnormality determining program.

In contrast, if the conditions are assumed to have been met, the determination at S701 becomes "YES". Then, at S702, the calculating portion 12 of each vehicle wheel inputs the longitudinal force LF, the lateral force SF, and the vertical force VF detected by corresponding detector 10.

Then, at S703, a ROM of the computer of the signal processing unit 222 inputs the maximum friction coefficient μMAX of each vehicle wheel. Further, the theoretical maximum radius of the circle of tire friction RMAX of each vehicle wheel is calculated by multiplying the input maximum friction coefficient μMAX by the input vertical force VF of the same vehicle wheel.

Next off, at S704, the actual radius of the circle of tire friction RACT of each vehicle wheel is calculated as the resultant force of the longitudinal force LF and the lateral force SF which have been input.

Then, at S705, whether or not the theoretical maximum radius of the circle of tire friction RMAX of each vehicle wheel is equal to or larger than the calculated actual radius RACT. If the theoretical maximum radius of the circle of tire friction RMAX of one vehicle wheel is assumed to be equal to or larger than the calculated actual radius RACT, the determination becomes "YES". Then, at S706, the detector 10 of that vehicle wheel is determined to be normal, and the longitudinal force detecting portion 130, the lateral force detecting portion 150, and the vertical force detecting portion 170 of that detector 10 are also determined to be normal, terminating a single routine of the general abnormality determining program.

To the contrary, if the theoretical maximum radius of the circle of tire friction RMAX of one vehicle wheel is assumed not to be equal to or larger than the calculated actual radius RACT, the determination at S705 becomes "NO". Then, at S707, the detector 10 of that vehicle wheel is determined to be abnormal, and at least one of the longitudinal force detecting portion 130, the lateral force detecting portion 150, and the vertical force detecting portion 170 of that detector 10 is determined to be abnormal, terminating a single routine of the general abnormality determining program.

As clear from the explanation above, a portion of the determining portion 400 for performing S702 or S707 in FIG. 56 constitutes an example of "means" in the section (46) and an example of "means" in the section (47).

The following explains the tenth preferred embodiment of the present invention. The present preferred embodiment, which relates to an abnormality detecting device of a braking torque detecting device of the vehicle, includes a hydraulic brake device, which will be explained in detail based on drawings, provided with the abnormality detecting device and the braking torque detecting device.

Figure 57:
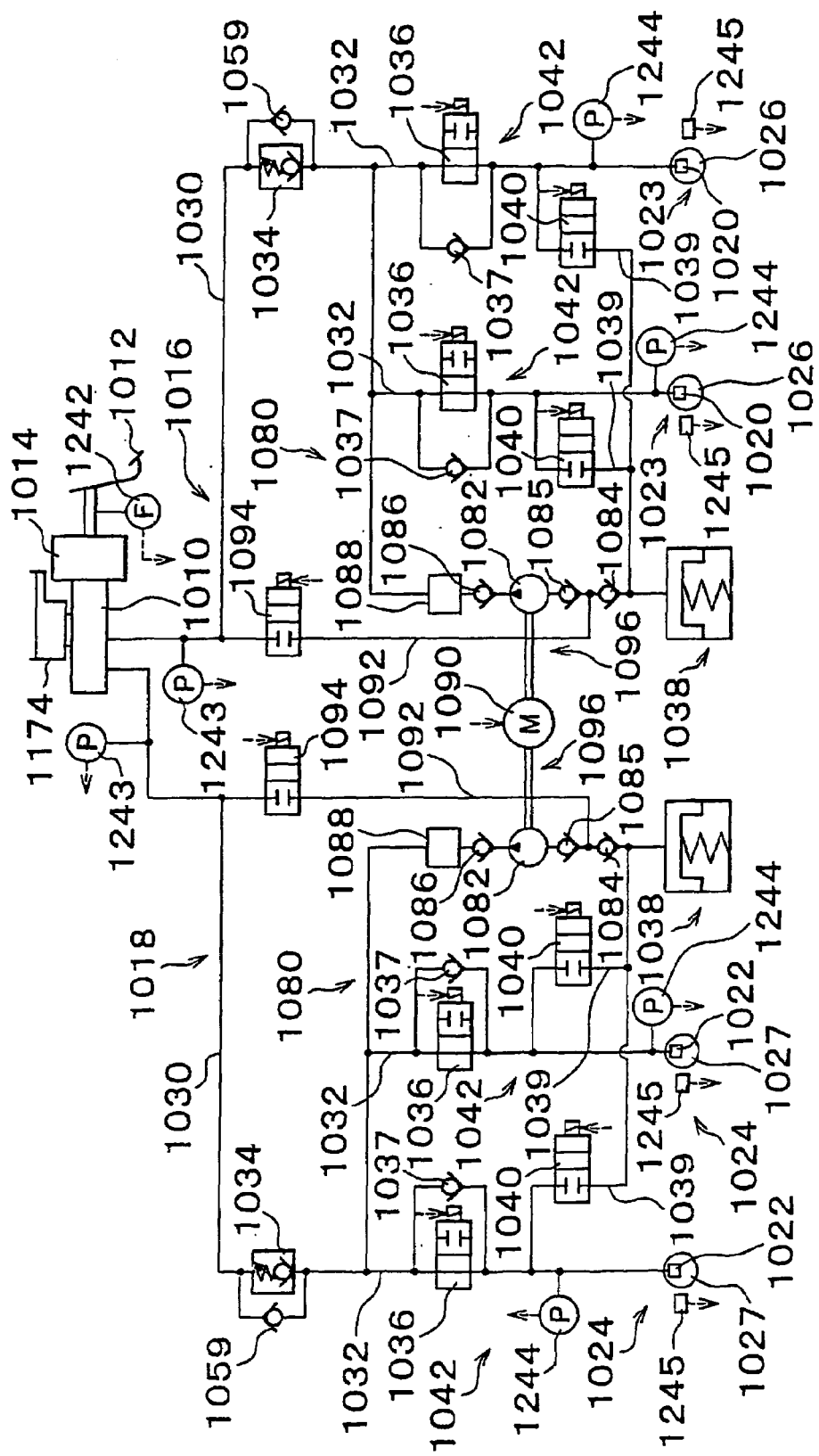
FIG. 57 is a system diagram showing a hydraulic brake device including a brake controlling device which has a braking torque detecting device abnormality detecting device according to a tenth preferred embodiment of the invention.
Figure 58:
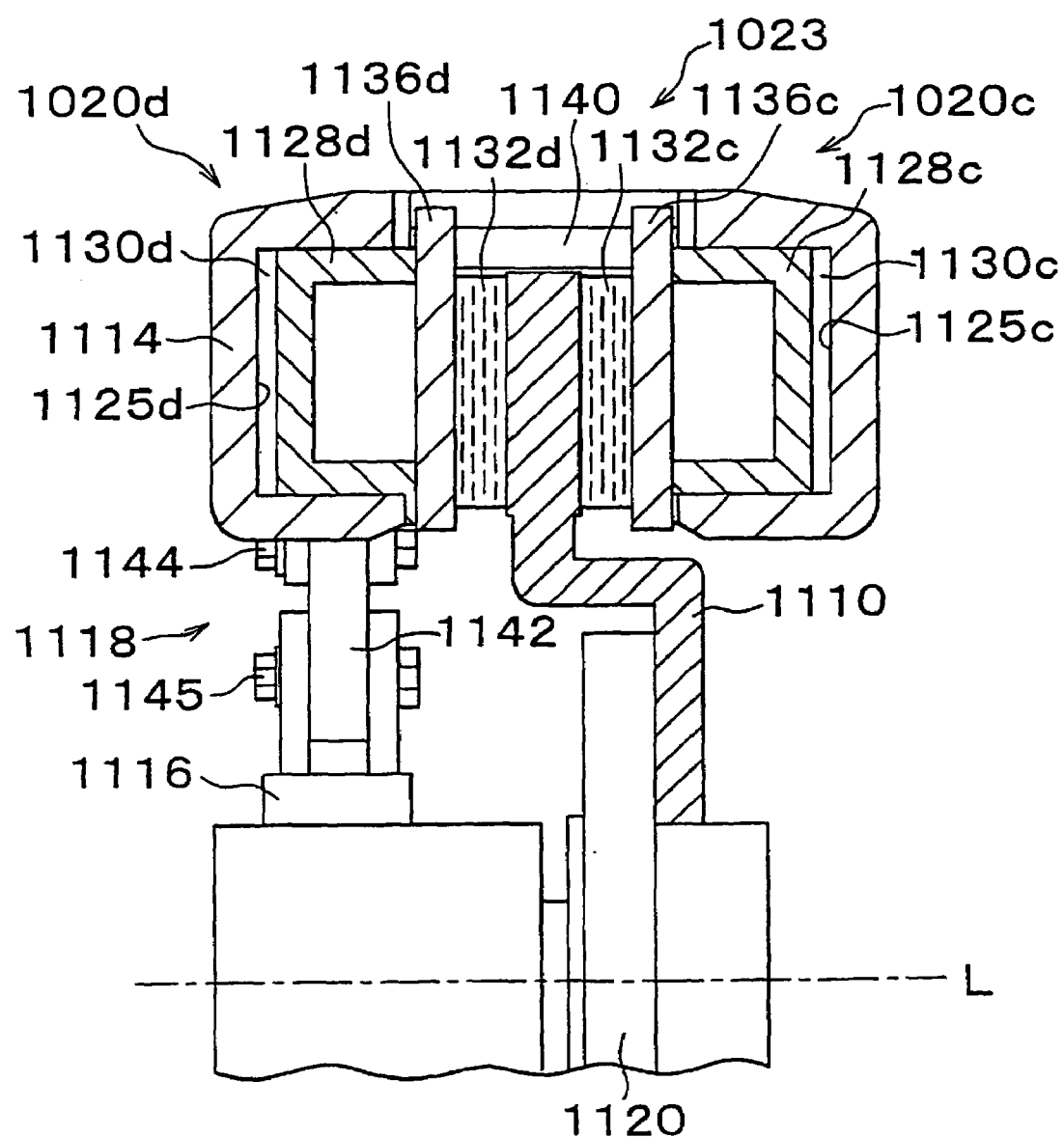
FIG. 58 is a front sectional view showing a brake in the hydraulic brake device in FIG. 57.

FIG. 57 is a system diagram showing the hydraulic brake device. In the same figure, reference numeral 1010 denotes a master cylinder, reference numeral 1012 denotes a brake manipulating member as a brake pedal, and reference numeral 1014 denotes a booster.

Master cylinder 1010 is a tandem type cylinder including two pressure pistons. Two pressure chambers in front of the pressure pistons are connected to brake cylinders 1020 on the front wheel side and brake cylinders 1022 on the rear wheel side via a fluid channel 1016 and a fluid channel 1018 respectively.

When a brake pedal 1012 is depressed, the booster 1014 is actuated, causing each pressure piston of the master cylinder 1010 to move forward. As a result, a hydraulic pressure, which is brake manipulating force multiplied by the booster 1014, is generated in each pressure chamber. Then the hydraulic pressure of the brake cylinders 1020 and 1022 actuate brakes 1023 and 1024, inhibiting rotation of front wheels 1026 and rear wheels 1027. In other words, the brakes 1023 and 1024 are hydraulic brakes actuated by the hydraulic pressure of the brake cylinders 1020 and 1022.

According to the present preferred embodiment, the hydraulic brake device is so configured as to include two systems: a brake system on the front wheel side and a brake system on the rear wheel side. The two systems have a common structure, so that only the brake system on the front wheel side will be explained, which means the brake system on the rear wheel side will be omitted The fluid channel 1016 comprises a main fluid channel 1030 and two branched channels 1032. The main fluid channel 1030 is provided with a hydraulic pressure control valve 1034, and the branched channels 1032 are provided with retain valves 1036 respectively.

Non-return valves 1037, which allow a working fluid to flow from the brake cylinder side to the master cylinder side and prevent it from flowing reversely, are provided in parallel with each retain valve 1036. The non-return valves 1037 promote the flow of the working fluid of the brake cylinders 1020 toward the master cylinder 1010 when the brakes 1023 are released.

The brake cylinders 1020 and a reservoir for pressure reduction 1038 are connected to each other via pressure reduction channels 1039 provided with pressure reducing valves 1040. In addition, an individual hydraulic pressure control valve device 1042 comprises the retain valves 1036 and the pressure reducing valves 1040.

The retain valves 1036 and the pressure reducing valves 1040 are electromagnetic valves opened and closed based on the presence or absence of supply current to their coils. The retain valves 1036 are constantly open when the current is not supplied. On the other hand, the pressure reducing valves 1040 are kept closed under the same condition.

As shown in FIG. 57, non-return valve 1059, which allows the working fluid to flow from the master cylinder side to the brake cylinder side and prevent it from flowing reversely, are provided in parallel with the hydraulic pressure control valve 1034. This allows the working fluid to flow from the mater cylinder 1010 to the brake cylinder 1020 when hydraulic pressure of the master cylinder 1010 becomes higher than the hydraulic pressure of the brake cylinders 1020 even though the hydraulic pressure control valve 1034 has been kept closed.

A pump channel 1080 extends from the reservoir for reducing pressure 1038 and connects to the main fluid channel 1030 at a point on the brake cylinder side from the hydraulic pressure control valve 1034. A pump 1082, non-return valves 1084, 1085, and 1086, and a dumper 1088 are provided at points midway of the pump channel 1080. The pump 1082 is driven by a pump motor 1090.

A working fluid supplying channel 1092, which extends from the mater cylinder 1010, is connected to a point between the two non-return valves 1084 and 1085 on the pump channel 1080. In the present preferred embodiment, the working fluid supplying channel 1092 extend from a point of the main fluid channel 1030 on the master cylinder side from the hydraulic pressure control valve 1034.

The working fluid supplying channel 1092 is provided with an inflow control valve 1094. The inflow control valve 1094 is an electromagnetic valve opened and closed based on the presence or absence of supply current to its coil, and is kept closed when the current is not supplied.

If the inflow control valve 1094 is opened while the pump 1082 is being driven, the working fluid is drawn from the master cylinder 1010 by the pump 1082. In this case, a discharge pressure as high as that when the working fluid is drawn from the reservoir for pressure reduction 1038 can be obtained, which easily reduces energy consumption of the pump motor 1090.

A pressurizing device 1096 is configured by the pump 1082, the pump motor 1090, and so on. Each brake system is provided with the pump 1082. However, in the present preferred embodiment, the pump motor 1090 is shared by the two pressurizing devices 1096.

Figure 59:
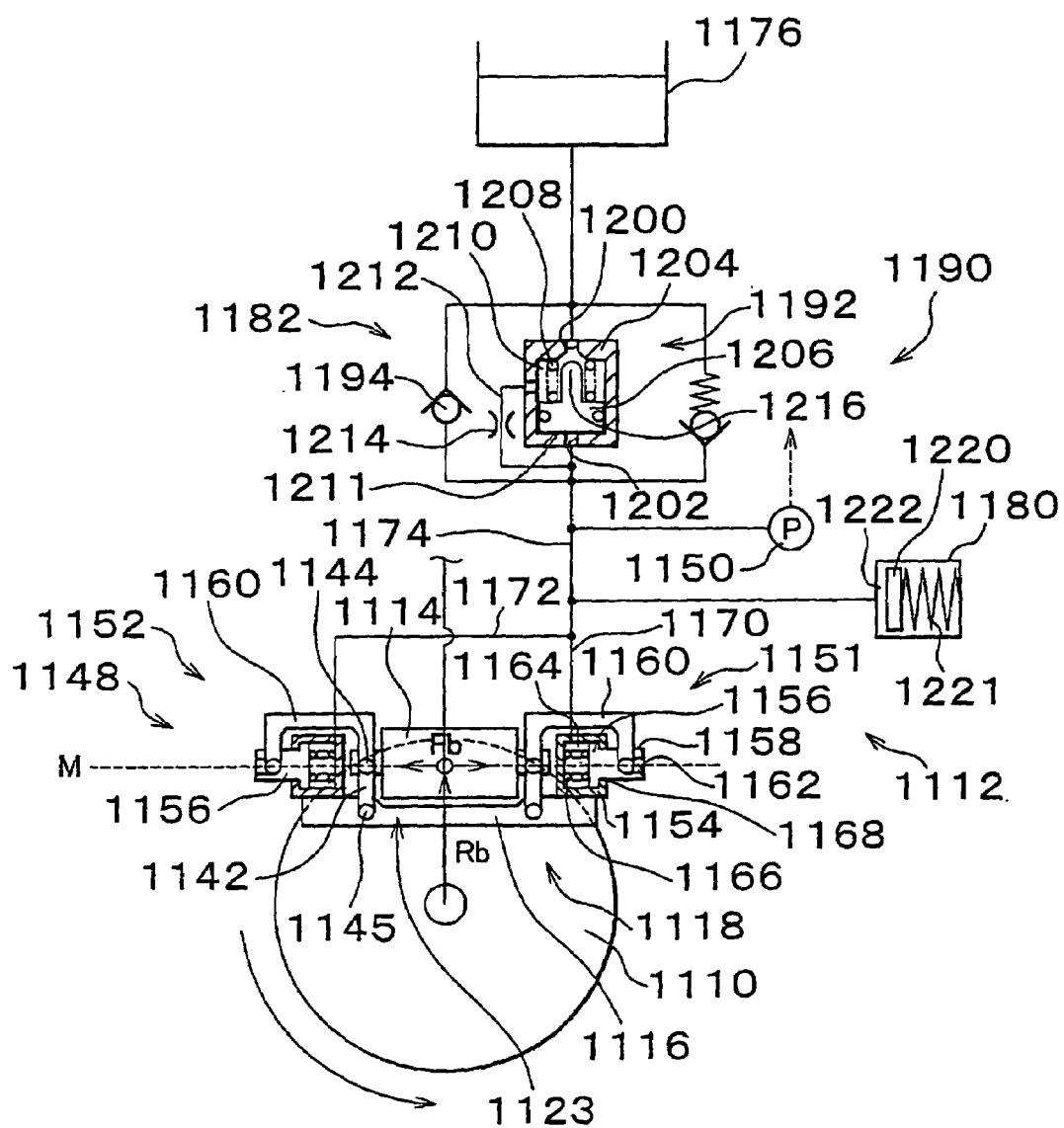
FIG. 59 is a front sectional view and a hydraulic pressure circuit diagram for explaining a braking torque detecting device in the hydraulic brake device in FIG. 57.
Figure 60:
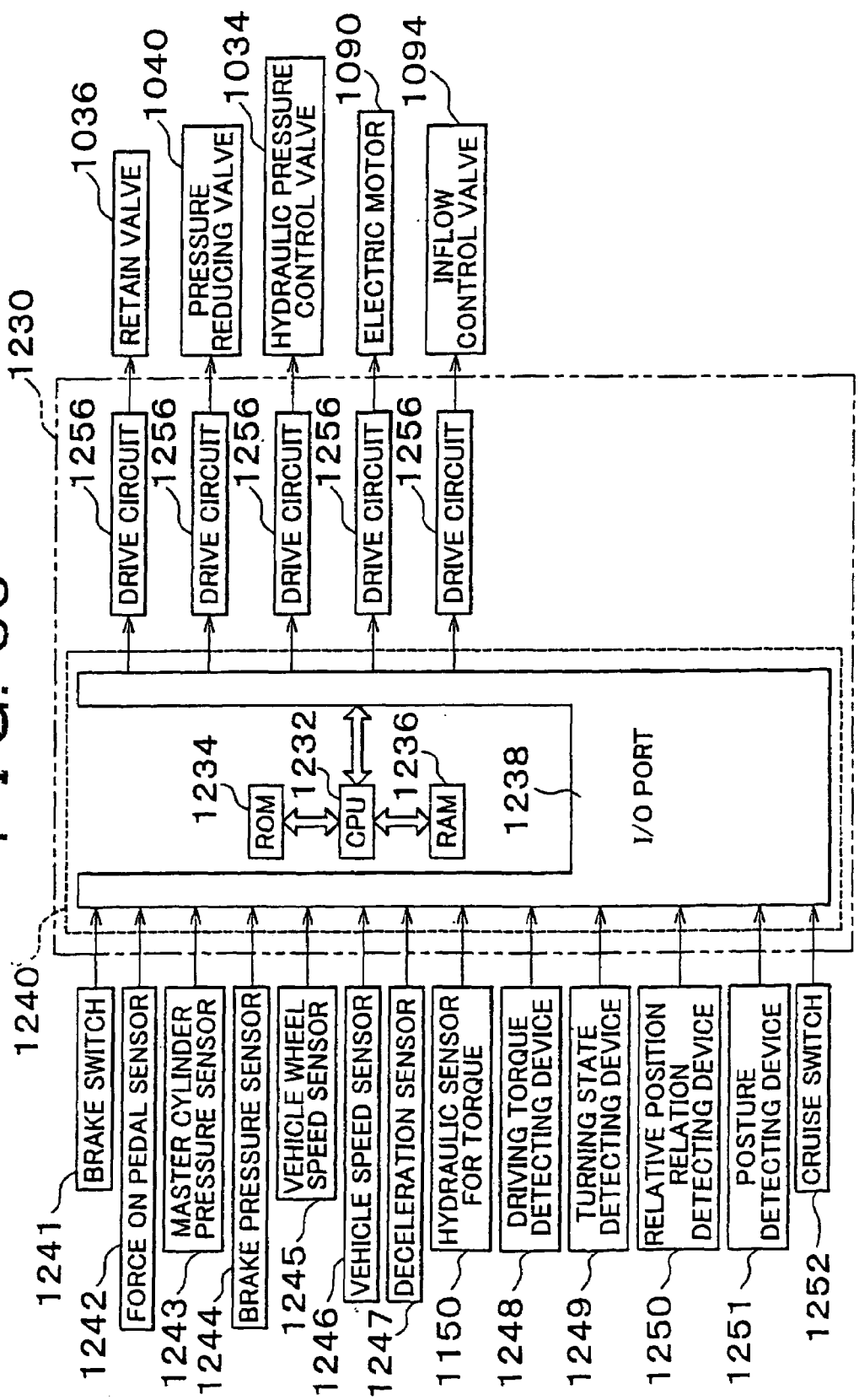
FIG. 60 is a block diagram showing an electrical configuration of the brake controlling device and each element connected thereto.

As shown in FIGS. 59 and 60, in the present preferred embodiment, the brakes 1023 of the front wheels and the brakes 1024 of the rear wheels are disc brakes whose turning bodies are disc rotors 1110 (In FIGS. 59 and 60, only the brakes 1023 of the front wheels are shown). Each of the brakes 1023 and 1024 is provided with a braking torque detecting device 1112. Hereafter, the structure of the braking torque detecting device 1112 of the brake 1023 provided to each front wheel will be explained to omit explanation of that of the brake 1024 provided to each rear wheel.

In the disc brake 1023, a brake body 1114 is supported by a vehicle body side fixing member 1116 so that it can rotate, in other words, it can move substantially along the circumference of the disc rotor 1110. In the present preferred embodiment, the disc brake 1023 is opposed type and caliper fixing type. A caliper is directly supported by the vehicle body side fixing member 1116 and constitutes the brake body 1114.

The disc rotor 1110 is fixed by an axle hub 1120 so that it cannot rotate relatively to the axle hub 1120 capable of rotating together with the vehicle wheel. In contrast, the brake body 1114 is attached to the vehicle body side fixing member 1116, which is a member fixed by a steering knuckle so that it cannot rotate relatively to the steering knuckle capable of rotating relatively to the axle hub 1120, via a link mechanism 1118.

Meanwhile, the vehicle body side fixing member 1116 for the front wheels may be a member, which is attached to the steering knuckle so that it cannot rotate relatively to the steering knuckle. On the other hand, the vehicle body side fixing member 1116 for the rear wheels may be a member, which is attached to a rear axle housing so that that it cannot rotate relatively to the rear axle housing.

The disc brake 1023 includes a pair of brake cylinders 1020c and 1020d (Hereinafter, when it is not necessary to distinguish between the brake cylinders 1020c and 1020d, they are simply referred to "brake cylinder 1020") provided on both sides of the disc rotor 1110. Pistons 1128c and 1128d are fitted to cylinder bores 1125c and 1125d of the brake cylinders 1020c and 1020d respectively so that they slide in the cylinder bores 1125c and 1125d without leakage of the working fluid. As a result, hydraulic pressure chambers 1130c and 1130d are formed.

Between the pistons 1128c and 1128d and the disc rotor 1110, pads 1132c and 1132d are provided as friction engaging members. The pads 1132c and 1132d are supported by back plates 1136c and 1136d respectively. A pin 1140, which is fixed to the caliper 1114 and extends in the direction of the axis of the caliper 1114, penetrates the back plates 1136c and 1136d. Accordingly, the back plates is supported so that they can move in the direction of the axis of the caliper 1114 and they cannot move in the direction of the radius of the caliper 1114.

The link mechanism 1118 is so configured as to include a link member 1142 and pins 1144 and 1145. The pins 1144 and 1145 connect the link member 1142 to the caliper 1114 and the vehicle body side fixing member 1116 so that the link member 1142 can rotate around an axis L of the disc rotor 1110. As explained previously, the caliper 1114 is supported so that it can relatively move substantially around the circumference of the vehicle body side fixing member 1116.

As shown in FIG. 59, the braking torque detecting device 1112 includes a hydraulic pressure generating device 1148, a hydraulic sensor for torque detecting the hydraulic pressure generated in the hydraulic pressure generating device 1148, a calculation processing portion, and so on.

The hydraulic pressure generating device 1148 includes hydraulic cylinders 1151 and 1152 provided on both sides of the caliper 1114. In FIG. 59, the hydraulic cylinder 1151 on the right is actuated as the caliper 1114 is rotated in the forward direction as a result of rotation of the disc rotor 1110 in the direction of the arch-shaped arrow (forward direction). On the other hand, the hydraulic cylinder 1152 on the left is actuated as the caliper 1114 is rotated in the backward direction as a result of rotation of the disc rotor 1110 in the backward direction. In other words, both the hydraulic cylinders 1151 and 1152 are actuated in one direction, that is, they are one-way actuation type.

In the present preferred embodiment, the hydraulic cylinders 1151 and 1152 are disposed so that the following two lines become parallel to each other: an axis M of the hydraulic cylinders 1151 and 1152, and a tangent line with respect to the axis L of the disc rotor 1110 when the pads 1132c and 1132d are pushed against the disc rotor 1110 by the brake cylinders 1020c and 1020d.

Each of the hydraulic cylinders 1151 and 1152 is provided with a cylinder body 1154, fixed to the vehicle body side fixing member 1116, and a piston 1156. The piston 1156 is fitted to the cylinder body 1154 so that it can slide in the cylinder body 1154 without leakage of the working fluid. To realize the one-way actuation previously mentioned, the caliper 1114 and a piston rod 1158 of the piston 1156 are liked by a link member 1160. When the caliper is moving in one certain direction, the link member 1160 transmits force to the piston 1156 of each of the hydraulic cylinders 1151 and 1152 from the caliper 1114. In contrast, when the caliper is moving in the direction opposite to that one certain direction, it does not transmit force.

In general, the link member 1160 is C-shaped. One end thereof is supported by the caliper 1114 to enable its rotation and the other end thereof is engaged with an engaging portion 1162 formed at the piston rod 1158. According to the present preferred embodiment, the engaging portion 1162 has a groove which extends in parallel with the axis M and is closed at a point midway thereof.

A return spring 1166 is provided at a hydraulic chamber 1164 in front of the piston 1156, and urges the piston 1156 to its backward end position determined by a stopper 1168.

The following explains the actuation of the hydraulic cylinders 1151 and 1152 by giving an example of the hydraulic cylinder 1151.

When the link member 1160 moves leftward (forward) relatively to the piston 1156 at the backward end position from a reference position thereof shown in FIG. 59, it engages with closed portion of the groove formed at the engaging portion 1162. Then, when the link member 1160 further moves forward, the piston moves forward while it pressurize the hydraulic chamber 1164. A hydraulic pressure corresponding to force transmitted to the piston 1156 via the link member 1160 from the caliper 1114 is generated in the hydraulic chamber 1164.

On the other hand, when the link member 1160 moves rightward (backward) relatively to the piston 1156 at the backward end position from the reference position thereof shown in FIG. 59, it is released from the closed portion of the groove formed at the engaging portion 1162. As a result, the link member 1160 moves backward with the piston 1156 remained at the backward position.

Accordingly, in this case, transmission of force to the piston 1156 via the link member 1160 from the caliper 1114 is ceased, eliminating an unnecessary load applied to the hydraulic cylinder 1151 from the caliper 1114.

Meanwhile, a forward end position of the piston 1156 is determined by bringing the piston 1156 into contact with the bottom portion of the cylinder body 1154 or a stopper not shown.

Individual channels 1170 and 1172 extend from each hydraulic chamber 1164 of the hydraulic cylinders 1151 and 1152, and they merge into a merged channel 1174.

The merged channel 1174 is provided with a hydraulic sensor for torque 1150, dumper 1180, and a circulation control device 1182.

The hydraulic sensor for torque 1150, which is provided at each of the hydraulic cylinders 1151 and 1152, detects the hydraulic pressure of each hydraulic chamber 1164 of the hydraulic cylinders 1151 and 1152. In the present preferred embodiment, the hydraulic pressure generated in both the hydraulic cylinders 1151 and 1152 are detected by the hydraulic sensor for torque 1150.

In the circulation control device 1182 between the hydraulic chamber 1164 and the reservoir 1176, a relief valve 1190, an outflow preventing valve 1192, and a non-return valve 1194 are provided in parallel to each other.

The relief valve 1190 allows the flow of the working fluid from the hydraulic chamber 1164 to the reservoir 1176 when the hydraulic pressure of the hydraulic chamber 1164 is about to exceed a set pressure, eliminating an overload to the hydraulic sensor for torque 1150.

The outflow preventing valve 1192 together with an orifice 1214 is provided to limit a flow rate of the working fluid discharged from the hydraulic chamber 1164.

Meanwhile, detecting the hydraulic pressure in the merged channel 1174 is possible even though the merged channel 1174 is connected to the reservoir 1176 by the outflow preventing valve 1192.

In addition, the outflow preventing valve 1192 includes a housing 1204 in which a low-pressure port 1200 on the reservoir 1076 side and a high-pressure port 1202 on the hydraulic chamber 1164. The outflow preventing valve 1192 further includes a tiered piston 1206 having a large-diameter portion and a small-diameter portion with the tiered piston 1206 being fitted to be capable of sliding in the housing 1204 without leakage of the working fluid from the housing 1024.

A spring 1208 is provided between the tiered piston 1206 and the housing 1204, urging the tiered piston 1206 backward (downward in FIG. 59).

A fluid chamber 1210 is formed between the small-diameter portion of the tiered piston 1206 and the housing 1204. The fluid chamber 1210 and the merged channel 1174 are connected to a bypass channel 1212 bypassing a fluid chamber 1211 connected to the high-pressure port 1202. Further, this bypass channel 1212 is provided with the orifice 1214.

In the outflow preventing valve 1192, an opening and closing valve portion which is constantly open. The opening and closing valve portion comprises a valve body 1216 formed at the end of the small-diameter portion of the piston 1206, a valve seat formed on the edge of a penetration hole forming the low-pressure port 1200 of housing 1204.

When the flow rate of the working fluid flowing out of the hydraulic cylinders 1151 and 1152 is lower than a set value, a circulation resistance of the orifice 1214 is small and a differential pressure in front of and behind the orifice 1214 is also small, keeping open the opening and closing valve portion of the outflow preventing valve 1192. In this case, the working fluid of the hydraulic chamber 1164 flows out of the reservoir 1176 after flowing through the merged channel 1174, the bypass channel 1212, the hydraulic chamber 1210, and the low-pressure port 1200 in this order.

Because the outflow described above is allowed, the hydraulic pressure of the hydraulic chamber 1164 does not increase and an overload is not applied to the hydraulic cylinders 1151 and 1152 even if a volume of the working fluid in the hydraulic chamber 1164 increases because of a rise in temperature.

In contrast, when the flow rate of the working fluid flowing out of the hydraulic cylinders 1151 and 1152 is about to exceed a set value, the differential pressure in front of and behind the orifice 1214 increase, generating a difference in hydraulic pressure between the hydraulic chambers 1210 and 1211.

Based on the difference in hydraulic pressure, axial force is generated in a direction that the tiered piston 1206 moves forward from the original position shown in the figure.

When the axial force becomes larger than the urging force of the spring 1208, the piston 1206 moves forward against the urging force, seating the valve body 1216 in the valve seat 1200 to open the outflow preventing valve 1192.

Once the outflow preventing valve 1192 is opened, it is kept open until a difference in hydraulic pressure between the hydraulic cylinders and the reservoir becomes equal to or lower than a set value, which becomes bases of determining the urging force of the spring 1208 and of designing the valve body 1216 (the piston 1206), the valve seat 1200, and so on.

The non-return valve 1194 allows the flow of the working fluid from the reservoir 1176 to the hydraulic chamber 1164 and prevents that of the working fluid in the opposite direction, eliminating a negative pressure of the hydraulic chamber 1164.

The dumper 1180 is so configured as to include a piston 1220 and a spring 1221. The piston 1220 is fitted to the housing so that it can slide in the housing without leakage of the working fluid. In the housing, a volume chamber 1222 is formed in front of the piston 1220.

When the hydraulic pressure of the volume chamber 1222 becomes higher than a set load of the spring 1221, the piston 1220 moves in a direction that a volume of the volume chamber 1222 increases, storing the working fluid with the hydraulic pressure corresponding to the urging force of the spring 1221.

According to the dumper 1180 configured as described above, it can eliminate an over load to the hydraulic sensor for torque 1150.

In the present preferred embodiment, a hydraulic pressure corresponding to the set load of the spring 1221 is set to be lower than a relief pressure of the relief valve 1190. Under normal circumstances, the relief valve 1190 is not opened, that is, the relief valve 1190 is provided for the safety of the hydraulic circuit.

When the hydraulic pressure of the hydraulic chamber 1164 is about to exceed the hydraulic pressure corresponding to the set load of the spring 1221 as a result of a pulse-like increase in hydraulic pressure of the hydraulic chamber 1164, the working fluid is so stored in the dumper 1180 as to offset the hydraulic pressure. Therefore, pulsation of the hydraulic pressure, to be detected by the hydraulic sensor for torque 1150, can be decreased by the dumper 1180.

Heretofore, the structures and actuations of the hydraulic pressure generating device 1148 and the circulation control device 1182. However, comprehensive and time-based explanation with respect to the actuations of the two devices will be described later.

As shown in FIG. 60, a brake control device 1230 of the hydraulic brake device is so configured as to include a computer having a CPU 1232, ROM 1234, and RAM 1236, a control portion 1240 having an I/O port 1238, and plural drive circuits 1256.

The I/O port 1238 connects the following sensors, switches, and so on:
(1) the hydraulic sensor for torque 1150,
(2) a brake switch 1241 detecting depression of a brake pedal 1012,
(3) a force on pedal sensor 1242 detecting force on pedal applied to the brake pedal 1012,
(4) a master cylinder pressure sensor 1243 detecting a hydraulic pressure of the master cylinder 1010,
(5) plural brake pressure sensors 1244 detecting a hydraulic pressure of each of the brake cylinders 1020 and 1022,
(6) plural vehicle wheel speed sensors 1245 detecting a rotating speed of each of the vehicle wheels 1026 and 1027,
(7) a vehicle speed sensor 1246 detecting a vehicle speed, i.e., a traveling speed of the vehicle,
(8) a deceleration sensor 1247 detecting deceleration of the vehicle,
(9) a drive torque detecting device 1248,
(10) a turning state detecting device 1249 detecting a turning state of the vehicle,
(11) a relative position relation detecting device 1250 detecting relation of relative positions of the vehicle and a preceding vehicle,
(12) a posture detecting device 1251 detecting posture of the vehicle, and
(13) a cruise switch 1252.

The drive torque detecting device 1248 detects original drive torque acting on the vehicle wheels from a drive source of the vehicle and apparent drive torque attributed to the gravity. With respect to specific relation between the original drive torque and the apparent drive torque, when drive torque is not acting on the vehicle wheels, the original drive torque is 0. In contrast, when the vehicle is moving on a substantially flat road surface, the apparent drive torque is 0.

The original drive force can be detected based on an accelerator opening, a throttle opening, a fuel injection quantity, and so on if the drive source of the vehicle includes an engine. If the drive source includes an electric motor, it can be detected based on supply current to the electric motor. If these physical quantities need to be obtained, it is preferable to consider a change gear ratio transmitting drive force of the vehicle to each vehicle wheel from the drive source.

On the other hand, the apparent drive torque attributed to the gravity can be detected based on an angle of inclination of the road surface on which the vehicle is moving. The angle of inclination can be detected based on at least either posture of the vehicle (longitudinal inclination) or the deceleration of the vehicle. For example, when the vehicle is moving on a downslope, the smaller a forward tilting angle of the vehicle is, the smaller the angle of inclination of the downslope. When the vehicle is braked while it is moving on the downslope, the larger the diminution of the deceleration of the vehicle from the deceleration of the vehicle expected to be generated when the vehicle is braked with the same strength of force while it is moving on a flat road, the larger the angle of inclination of the downslope.

By utilizing these facts, the apparent drive force can be detected.

The turning state detecting device 1249 is so configured as to include at least one of the following sensors: a yaw rate sensor, a lateral acceleration sensor, and a steering angle sensor. The turning state detecting device 1249 can detect whether the vehicle shows a tendency to spin or a tendency to drifting out based on an output value of a necessary sensor. Further, it can detect strength of the state of spin or of the state of drifting out, both of which are generated on the vehicle.

The relative position relation detecting device 1250 is so configured as to include, for example, a laser radar device, and it detects relative position relation of the vehicle to the preceding vehicle such as a distance between the two vehicles by detecting the preceding vehicle. Moreover, it can detect an approaching speed of the vehicle toward the preceding vehicle based on a change in distance between the two vehicles, and so on.

The posture detecting device 1251 is so configured as to include at least one of the following sensors: a vehicle height sensor, a yaw rate sensor, a pitch rate sensor, and a roll rate sensor. It detects a change in posture of the vehicle (e.g., around the vertical line, around a horizontal line extending in the longitudinal direction, and around a horizontal line extending in the lateral direction) base on output value of a necessary sensor.

By giving attention to a change in posture of the vehicle, a load moving distance of in the vehicle can be obtained. The load moving distance can be detected as, for example, fluctuation of a ground load of each vehicle wheel from a reference load.

The cruise switch 1252 is an ON/OFF switch manipulated by the driver desiring cruise controls, which is performed when the switch is ON.

The I/O port 1238 connects the retain valves 1036, the pressure reducing valves 1040, the hydraulic pressure control valve 1034, the electric motor 1090, the inflow control valve 1094, and so on via each drive circuit 1256.

The following explains the control of the hydraulic pressure control valve 1034 when the vehicle is being braked under normal circumstances.

The hydraulic pressure control valve 1034 is not supplied with current below an assisting limit of the booster 1014 being driven under normal circumstances, keeping the hydraulic pressure control valve 1034 open, which connects the brake cylinders 1020 and 1022 to the master cylinder 1010. This causes the hydraulic pressure of the master cylinder 1010 to be transmitted to the brake cylinders 1020 and 1022.

When a detected hydraulic pressure of the master cylinder pressure sensor 1243 reaches a hydraulic pressure corresponding to the assisting limit of the booster 1014, the inflow control valves 1094 are opened to actuate the pressurizing device 1096, that is, the hydraulic pressure of the pressurizing device 1096 is supplied to the brake cylinders 1020 and 1022, and is controlled by the hydraulic pressure control valves 1034. The hydraulic pressure of each of the brake cylinders 1020 and 1022 is so controlled as to come close to target value (target value of pushing force pursing the brake pads 1136c and 1136d against the disc rotor 1110) determined based on force on pedal (hereafter, also referred to "brake manipulating force") detected by the force on pedal sensor 1242.

In the present preferred embodiment, the target value is determined and the hydraulic pressure control valves 1034 are controlled so that relation between the force on pedal and the brake cylinder pressure (servo ratio) is kept constant regardless of the assisting limit of the booster 1014.

In the cruise controls, the brake cylinder pressure is controlled so that relative relation between the vehicle and the preceding vehicle is maintained at predetermined relation. For example, if the distance between the two vehicles becomes shorter than a set distance, in order words, if a tendency to approach becomes stronger than a set tendency, the brake are actuated automatically even though the brakes have not been operated by the driver.

In the cruise controls, the hydraulic pressure of the brake cylinders 1020 and 1022 of the vehicle wheels 1026 and 1027 are commonly controlled by controlling the hydraulic pressure valves 1034 with the retain valves 1036 and the pressure reducing valves 1040 located in the original positions in FIG. 57 and with the pressurizing device 1096 operating. This decelerates the vehicle and allows the relative relation to be maintained at the predetermined relation.

These cruise controls are also performed even though the driver has not manipulated the brake pedal 1012.

Braking torque of the vehicle wheel can be calculated from the following formula and based on the detected hydraulic pressure of the hydraulic sensor for torque 1150.

$$TB=(Ac*Pc)*Rb$$

TB: braking torque

Ac: area where each piston 1154 of hydraulic pressure cylinders 1151 and 1152 receive pressure Pc: detected hydraulic pressure of hydraulic sensor for torque 1150

Rb: distance from center of disc rotor 1110 to centers of brake cylinders 1020 and 1022, i.e., equivalent radius (effective radius)

In the present preferred embodiment, the axis M of the hydraulic cylinders 1151 and 1152 and a tangent line including a point where pushing force is acting on the disc rotor 1110 match. Therefore, a proportional coefficient between friction force between the disc rotor 1110 and the pads 1132c and 1132d, and force which the hydraulic pressure cylinders 1151 and 1152 receive from the caliper 1114 (=Ac*Pc) becomes 1. Accordingly the braking torque TB can be determined by multiplying the force by the equivalent radius.

As clear from the explanation above, in the present preferred embodiment, a portion of the brake control device 1230, which detects the braking torque TB according to the detected hydraulic pressure of hydraulic sensor for torque 1150, constitutes the calculation processing portion.

The following explains the actuation of the hydraulic pressure generating device 1148.

The hydraulic cylinders 1151 and 1152 are in the original positions shown in FIG. 59 when the brakes are not acting. In this state, the hydraulic pressure is not generated in hydraulic chamber 1164.

When the disc brake 1023 acts while the disc rotor 1110 is rotating forward, the caliper rotates forward, actuating the hydraulic cylinder 1151. More specifically, the link member 1160 moves the piston 1156 forward against urging force of the spring 1166 so that the volume of the hydraulic chamber 1164 decreases. As a result, a hydraulic pressure, which corresponds to tensile force of the link member 1160 applied to the piston 1156, is generated.

In the hydraulic cylinder 1152, at the engaging portion 1162, the link member 1160 relatively moves along the groove in a direction that it moves away from the piston 1156, that is, the piston 1156 does not move. Accordingly, the hydraulic cylinder 1152 remains not to be in action.

When the hydraulic pressure is generated in the hydraulic chamber 1164 of the hydraulic cylinder 1151, the flow rate of the working fluid from the hydraulic chamber 1164 to the reservoir 1176 becomes higher than a set value, closing the outflow preventing valve 1192.

When the hydraulic pressure of the hydraulic chamber 1164 of the hydraulic cylinder 1152 increases, the hydraulic pressure of the hydraulic cylinder 1151 also increases to be the equal to the hydraulic pressure of the hydraulic chamber 1164. In this case, the piston 1156 of the hydraulic cylinder 1151 is in the backward end position, that is, the piston 1156 does not move further backward. The hydraulic pressure of the fluid channels between the two hydraulic cylinders 1151 and 1152 and the outflow preventing valve 1192 is detected by the hydraulic sensor for torque 1150.

When the hydraulic pressure of the hydraulic cylinder 1151 is about to become higher than a hydraulic pressure corresponding to a set load of the spring 1221 of the dumper 1180 as a result of an increase in hydraulic pressure of the brake cylinder 1020, the working fluid is stored in the volume chamber 1222. This prevents a load, applied to the hydraulic sensor for torque 1150, from becoming excessive. In addition, pulsation of the hydraulic pressure, to be detected by the hydraulic sensor for torque 1150, can be decreased, enabling constantly accurate detection of the braking torque and braking force of each vehicle wheel.

When the pushing force of the brake pads 1132c and 1132d, which pushes the disc rotor 1110, becomes small, the return spring 1166 moves the piston 1156 of the hydraulic cylinder 1151 backward, increasing the volume of the hydraulic chamber 1164. The hydraulic chamber 1164 is supplied with the working fluid from the dumper 1180 and the reservoir 1176, which prevent the pressure in the chamber 1164 from becoming negative.

When the hydraulic pressure of the hydraulic chamber 1164 returns to atmospheric pressure, the outflow preventing valve 1192 is opened.

Heretofore, the actuation of the hydraulic pressure generating device 1148 when the disc brake 1023 is actuated while the disc rotor 1110 is rotating forward has been explained. On the other hand, when the disc brake 1023 is actuated while the disc rotor 1110 is rotating backward, the caliper 1114 rotates backward, causing the hydraulic cylinder 1152 to be in action.

As clear from the explanation above, both the braking force and the braking torque can be calculated based on the hydraulic pressure by providing the hydraulic cylinders 1151 and 1152. In the present preferred embodiment, the braking force or the braking torque is not mechanically detected but is detected as the converted hydraulic pressure, easily enabling reliability of detected values of the braking torque to be improved.

Further, the braking torque can be detected no matter whether the vehicle is moving forward or backward (no matter whether the vehicle wheels are rotating forward or backward).

As described above, the braking torque corresponds to the pushing force, and the vehicle is decelerated according to the braking torque. On the other hand, relation between a detected value of the braking torque detecting device 1112 (corresponding to the detected hydraulic pressure of the hydraulic sensor for torque 1150) and the pushing force is constant. An estimated braking torque based on the pushing force (referred to "braking torque corresponding to pushing force" hereafter) and the detected value of the braking torque detecting device 1112 should essentially match, and a difference between them should be considerably small as long as the braking torque detecting device 1112 is normal.

However, when the driving torque is applied to the vehicle wheels while the vehicle is being braked, the deceleration of the vehicle does not correspond to the pushing force.

For example, if the cruise controls are performed while the accelerator is being manipulated, the driving torque is transmitted to the drive wheels from the drive source, and pushing force of the cruise controls is applied to each vehicle wheel. In this case, the detected value of the braking torque detecting device 1112 corresponds to the pushing force. On the other hand, the deceleration of the vehicle corresponds to a value calculated by subtracting the driving torque from the drive source corresponding to the accelerator opening, from the braking torque corresponding to the pushing force of the braking torque detecting device 1112.

In other words, the deceleration of the vehicle and a value calculated by subtracting the driving torque from the detected value of the braking torque detecting device 1112 correspond to each other. Meanwhile, the value calculated by subtracting the driving torque from the braking torque detected by the braking torque detecting device 1112 is referred to a braking torque corresponding to deceleration or an effective braking torque.

If the brake pedal 1012 is manipulated while traveling on a slope, an apparent driving torque attributed to the gravity is applied to the vehicle wheels. Accordingly, as in the case where the cruise controls are performed while the accelerator is being manipulated, the deceleration of the vehicle and a resultant value of the detected value of the braking torque detecting device 1112 and the apparent driving torque correspond to each other.

More specifically, if the vehicle is moving on a downslope, the apparent driving torque is applied in a direction opposite to that of the braking torque. Accordingly, the deceleration of the vehicle and a value calculated by subtracting the apparent driving torque from the detected value of the braking torque correspond to each other. In contrast, if the vehicle is moving on an upslope, the apparent driving torque is applied in the same direction as the braking torque. Accordingly, the deceleration of the vehicle and the sum of the detected value of the braking torque and the driving torque correspond to each other.

The braking torque is affected not only by the pushing force but also the road friction μ and the ground load (both are examples of a braking environmental variable). Comparing a case where the road friction μ is low and a case where the road friction μ is normal, that is, the road friction μ is high, as shown in FIG. 65, an area, in which the pushing force and the braking torque are proportional, is smaller in the case of low road friction μ. This applies to comparison of cases with respect to the ground load, that is, the smaller the ground load, the smaller the pushing force. Accordingly, the braking torque deviates from the proportional area, proceeding to a state where the vehicle wheels easily slip.

In the present preferred embodiment, relation between the braking torque and a brake hydraulic pressure (also referred to "brake cylinder pressure" equivalent to the pushing force) when the road friction μ is high and the ground load is normal is prestored as optimum relation. Further, in a vehicle traveling state where the optimum relation is met, abnormality detection of the braking torque detecting device 1112 is performed.

As explained above, in the present preferred embodiment, abnormality detection of the braking torque detecting device 1112 is performed in a state where an effect from the braking environmental variable has been avoided as much as possible by the temporal limitation on the abnormality detection. More specifically, the abnormality detection is performed if predetermined abnormality detection permitting conditions are met.

The following is the abnormality detection permitting conditions: 1) the brakes are being manipulated, and 2) controls such as the antilock controls (the pushing force is controlled regardless of a brake manipulating state by the driver) are not being performed. If the antilock controls or the vehicle stability controls are not being performed, it can be considered that a road surface does not have a low road friction μ. In this case, it is not necessary to consider the road friction μ or a difference in ground load of each vehicle wheel.

Figure 61:
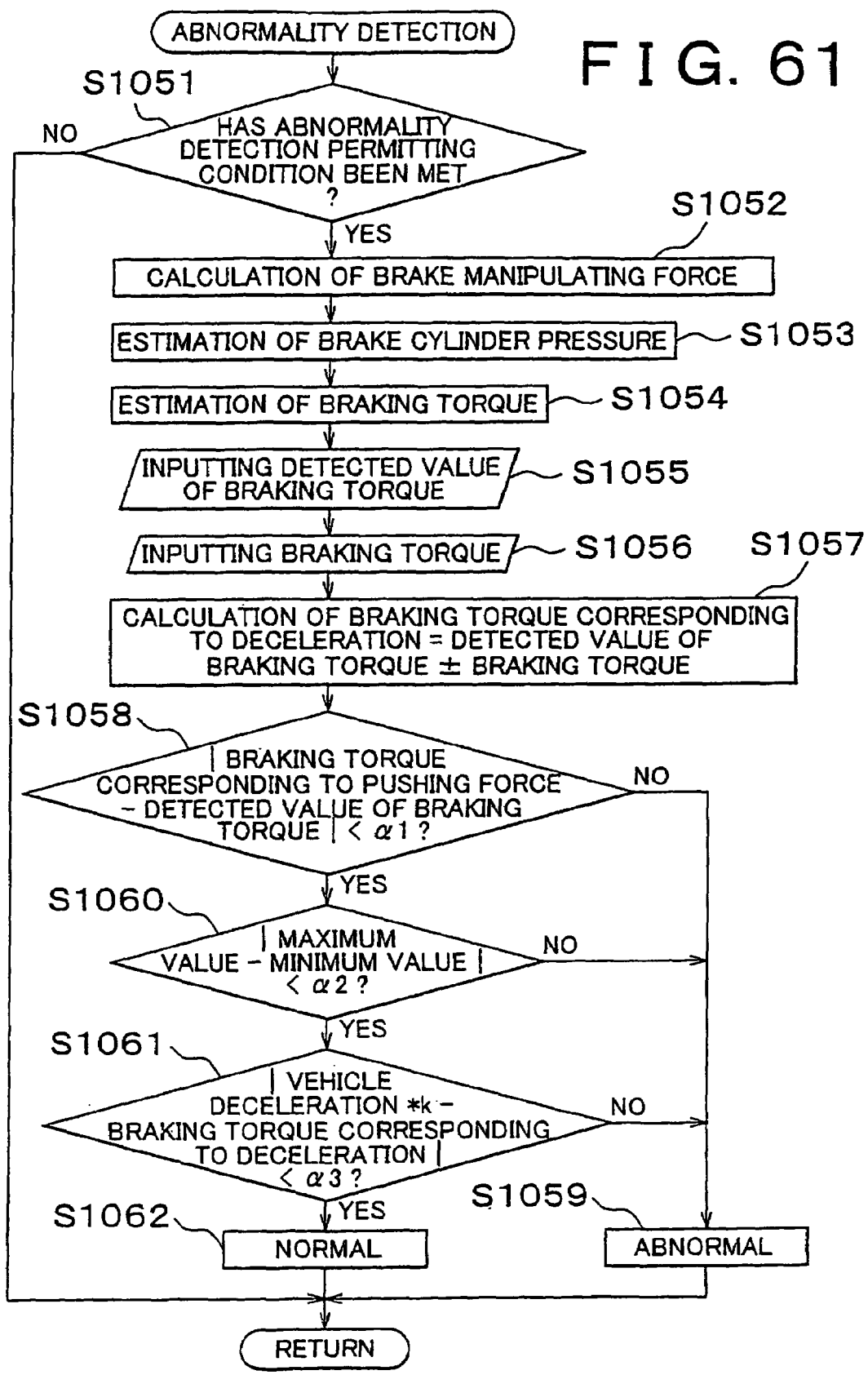
FIG. 61 is a flow chart conceptually showing the contents of an abnormality detecting program stored in the ROM in FIG. 60.

To perform the abnormality detection, the abnormality detecting program, conceptually shown in the flow chart of FIG. 61, is repeatedly performed (e.g, performed every after a set time).

When the program is initiated each time, first of all, whether the abnormality detection permitting conditions have been met is determined at S1051. If the abnormality detection permitting conditions have not been met, a single routine of the abnormality detecting program is terminated immediately.

On the other hand, if the abnormality detection permitting conditions have been met, the brake manipulating force or the force on pedal, applied by the driver to the brake pedal 1012, is calculated based on a detected value of the force on pedal sensor 1242 at S1052. In the present preferred embodiment, the servo ratio is kept constant regardless of the assisting limit of the booster 1014. Therefore, relation between the brake manipulating force and the brake cylinder pressure does not change regardless of the assisting limit of the booster 1014.

Then, at S1053, the brake cylinder pressure of each vehicle wheel is estimated based on the calculated brake manipulating force. Next off, at S11054, the braking torque of each vehicle wheel is estimated by using the estimated brake cylinder pressure as an equivalent value of the pushing force. More specifically, an estimated value of the braking torque, which corresponds to the pushing force, is calculated according to the previously mentioned optimum relation between the braking torque and the pushing force.

Then, at S1055, a detected braking torque of braking torque detecting device 1112 of each vehicle wheel is input. Next, at S1056, a detected driving torque of the drive torque detecting device 1248 of each vehicle wheel is input. The detected driving torque may be 0.

As explained previously, the driving torque can be divided to the original driving torque from the drive source and the apparent torque attributed to the gravity. When the vehicle is being braked under normal circumstances, it is rare for the driver to manipulate an accelerator manipulating member, and the original driving torque from the drive source is almost never applied to the drive wheels. Meanwhile, when the vehicle is traveling on a slope (upslope or downslope), the apparent torque attributed to the gravity is applied to each vehicle wheel.

Then, at S1057, a braking torque corresponding to deceleration is calculated. The braking torque corresponding to deceleration when the vehicle is being driven corresponds to a value calculated by subtracting the original driving torque from the drive source, from the detected braking torque. Moreover, to calculate the braking torque corresponding to deceleration when driving on a slope, the apparent torque attributed to the gravity is added to the detected braking torque in case of an upslope, and it is subtracted from the detected braking torque in case of a downslope. In any cases above, the braking torque corresponding to deceleration is calculated based on the detected braking torque and the driving torque.

Next off, at S1058, whether or not a difference between a braking torque corresponding to pushing force, which is the braking torque estimated from the brake cylinder pressure at S1054, and the detected braking torque is smaller than the set value $\alpha 1$ is determined. If the difference is equal to or larger than the set value $\alpha 1$, the braking torque detecting device 1112 is determined to be abnormal at S1059. Some of the conceivable causes of the abnormality are: 1) abnormality of hydraulic pressure generating device 1148, 2) abnormality of hydraulic sensor for torque 1150, and 3) abnormality of the calculation processing portion.

If the difference is smaller than the set value $\alpha 1$, whether or not a difference between a maximum value MAX and a minimum value MIN of the detected braking torque of the braking torque detecting device 1112 is smaller than the set value $\alpha 2$ is determined at S1060. If the difference is equal to or larger than the set value $\alpha 2$, the braking torque detecting device 1112 is determined to be abnormal at S1059.

S1060 has been provided to determine that the braking torque detecting device 1112 is abnormal if fluctuation of the detected braking torque is large. At S1060, for example, plural detected braking torques, obtained during a certain period in the past, have been stored, and then the maximum value MAX and the minimum value MIN are selected out of them.

If the difference between the maximum value MAX and the minimum value MIN of the detected braking torque is smaller than the set value $\alpha 2$, then whether or not a difference between a value, calculated by multiplying the deceleration of the vehicle by a coefficient k, and the braking torque corresponding to deceleration is smaller than a set value $\alpha 3$ is determined at S1061. If the difference is equal to or larger than the set value $\alpha 3$, the braking torque detecting device 1112 is determined to be abnormal at S1059.

According to the present preferred embodiment, the abnormality detection is performed based on the relation between the deceleration of the vehicle and the braking torque corresponding to deceleration. However, the present invention can be embodied with an aspect in which abnormality detection is performed according to whether or not an estimated braking torque corresponding to deceleration based on the deceleration of the vehicle and a resultant value (sum or difference) of the detected braking torque and the detected driving torque substantially match to each other. This aspect can be considered to be an aspect in which an abnormality of the braking torque detecting device 1112 is detected based on relation between the estimated value and a detected value of the braking torque corresponding to deceleration. In any cases, an abnormality of the braking torque detecting device 1112 is detected based on the relation between the deceleration of the vehicle and the braking torque and in consideration of the driving torque.

If the determinations at S1058, S1060, and S1061 are YES, the braking torque detecting device 1112 is determined to be normal at S1062.

As described above, in the present preferred embodiment, an abnormality of the braking torque detecting device 1112 is detected with the braking environmental variable, which affects detection of the braking torque, being considerably small, enabling an easy improvement of detection accuracy.

Moreover, in the present preferred embodiment, if the relation between the deceleration of the vehicle and the braking torque and the relation between the pushing force and the braking torque are both predetermined, the braking torque detecting device 1112 is determined to be normal, which enables an easy improvement of the detection accuracy.

As clear from the explanation above, in the present preferred embodiment, the force on pedal sensor 1242 and a portion of the brake control device 1230 for performing S1052 or S1054 in FIG. 61 constitute an example of "brake action-related quantity obtaining device" in the section (26). In addition, portions of the brake control device 1230 for performing S1055 or S1059, S1060, and S1061 in same figure constitute an example of "braking torque detecting device abnormality determining means" in the same figure and an example of "means" in the section (27).

Further, in the present preferred embodiment, the force on pedal sensor 1242 and a portion of the brake control device

1230 for performing S1052 or S1054 in FIG. 61 constitute an example of "brake action-related quantity obtaining device" in the section (71) which is also an example of "pushing-related quantity obtaining device" in the section (78).

Moreover, in the present preferred embodiment, portions of the brake control device 1230 for performing S1051 and S1055 or S1062 constitute an example of "abnormality detecting portion" in the section (71).

Furthermore, in the present preferred embodiment, the example of "brake action-related quantity obtaining device" can be considered to be an example of "manipulation state variable detecting device" in the section of (79). In this case, portions of the brake control device 1230 for performing S1052 or S1055 and S1058 can be considered to be an example of "manipulation state-based abnormality detecting portion" in the same section.

Furthermore, in the present preferred embodiment, the drive torque detecting device 1248 constitutes an example of "driving torque-related quantity obtaining device" in the section (82), and portions of the brake control device 1230 for performing S1056, S1057, and S1061 constitute an example of "driving torque-considered abnormality detecting portion".

Furthermore, in the present preferred embodiment, a portion of the brake control device 1230 for performing S1051 constitutes an example of "abnormality detecting portion upon traveling straight" in the section (84).

Furthermore, in the present preferred embodiment, the example of "brake action-related quantity obtaining device" and the example of "abnormality detecting portion" constitute an example of "abnormality detecting device" in the section (71).

Meanwhile, in the present preferred embodiment, if the relation as a brake action-related quantity between the deceleration of the vehicle and the braking torque corresponding to deceleration and the relation as a brake action-related quantity between the braking torque corresponding to pushing force and the detected braking torque are both normal, the braking torque detecting device 1112 is determined to be normal. However, the present invention can be embodied with an aspect in which the braking torque detecting device 1112 is determined to be normal if either one of the relations is normal.

In addition, in the present preferred embodiment, the abnormality detection of the braking torque detecting device 1112 is performed if the previously explained abnormality detection permitting conditions have been met. However, the contents of the abnormality detection permitting conditions can be altered as needed.

For example, a condition in which the braking slip is equal to or lower than a set value can be added, enabling further improvement of reliability of the abnormality detection. Moreover, a condition in which the vehicle is traveling on a flat road surface can also be added, eliminating the need for consideration of the driving torque attributed to the gravity.

Furthermore, when embodying the present invention, the brake manipulating force or the brake cylinder pressure can be selected as an example of the brake action-related quantity. In this case, similar to S1061, the braking torque detecting device 1112 can be determined to be normal if the brake manipulating force or the brake cylinder pressure and the detected braking toque adequately conform to each other, i.e., a difference between a corresponding value of the brake manipulating force or a corresponding value of the brake cylinder pressure and the detected braking torque is equal to or lower than a set value.

Further, when embodying the present invention, the brake cylinder pressure (pushing force) estimated based on the force on pedal can be considered to be the brake action-related quantity, and the force on pedal can also be considered to be the brake action-related quantity. Moreover, when the brake cylinders 1020 and 1022 are connected to the master cylinder 1010, the hydraulic pressure of the master cylinder 1010 and that of the brake cylinders 1020 and 1022 are substantially equal. Therefore, the master cylinder pressure can be considered to be the brake action-related quantity as well.

Moreover, when embodying the present invention, an abnormality of the braking torque detecting device 1112 can be detected by using the detected hydraulic pressure of the hydraulic sensor for torque 1150, not the braking torque calculated from the detected braking torque of the braking torque detecting device 1112. In this case, an abnormality of the hydraulic sensor for torque 1150 can directly be detected.

Next, the following explains the eleventh preferred embodiment of the present invention. However, the present preferred embodiment has a hardware configuration common to that of the tenth preferred embodiment. Also, the present preferred embodiment has a software configuration common to that of the tenth preferred embodiment excluding an abnormality detecting program. Therefore, the abnormality detecting program will be explained in detail, and a detailed explanation of the common elements will be omitted by using the same names or the same reference numerals.

According to the present preferred embodiment, similar to the tenth preferred embodiment, the hydraulic pressure control valves 1034 are controlled so that an actual brake cylinder pressure comes close to a target brake hydraulic pressure corresponding to the force on pedal after reaching the assisting limit of the booster 1014. Therefore, in the present preferred embodiment, the braking torque can be estimated based on the supply current to the hydraulic pressure control valves 1034.

Schematically explaining the present preferred embodiment, the brake cylinder pressure is estimated based on the master cylinder pressure and a supply current quantity by giving attention to the fact that increment of the master cylinder pressure is so controlled as to correspond to the supply current to the hydraulic pressure control valves 1034. Then, based on the estimated value, the braking torque is estimated. In addition, an abnormality of the braking torque detecting device 1112 is detected based on relation between the estimated braking torque (braking torque based on a controlled variable, and so on) and the actual braking torque.

Figure 62:
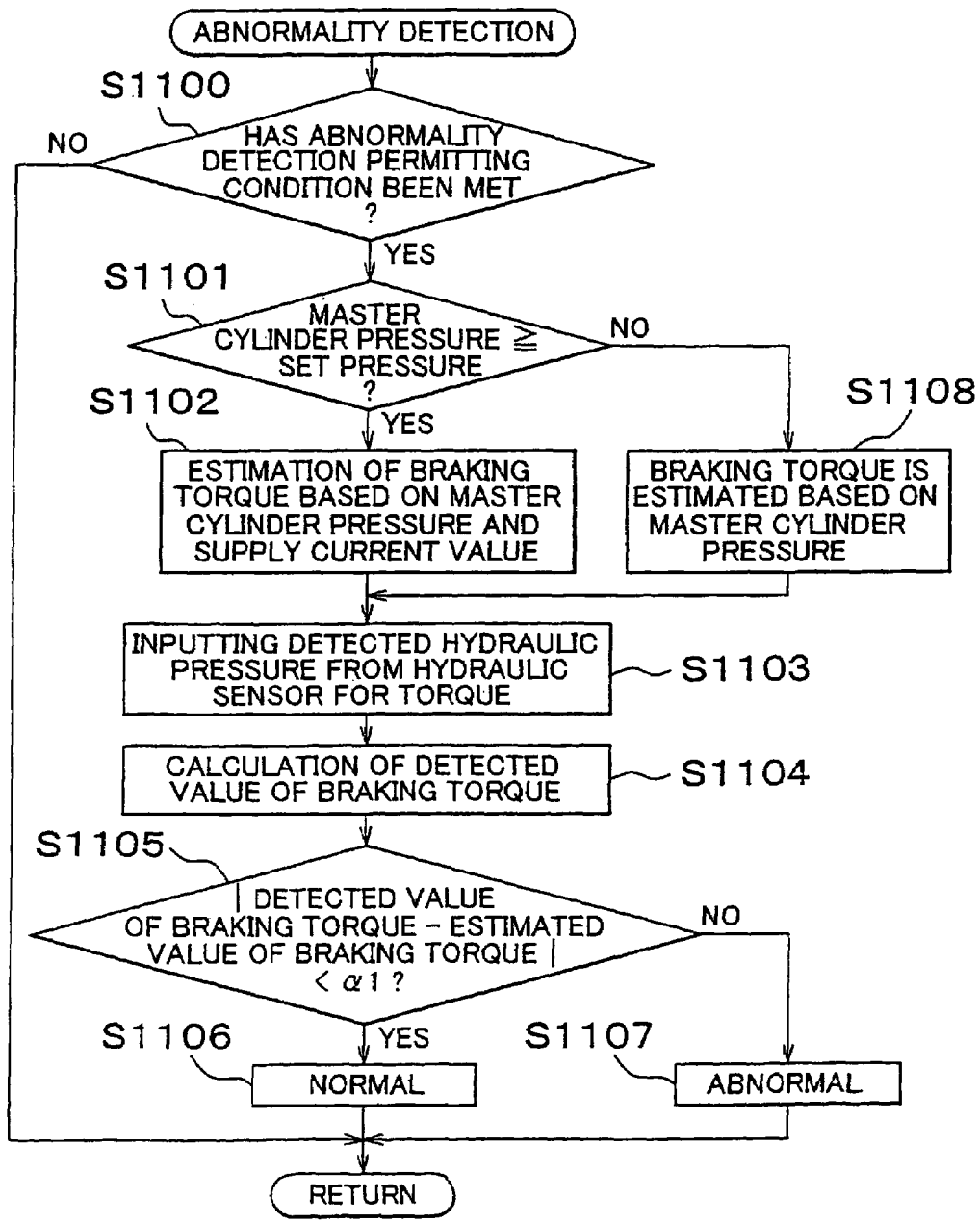
FIG. 62 is a flow chart conceptually showing the contents of an abnormality detecting program stored in a ROM of a brake controlling device including a braking torque detecting device abnormality detecting device according to an eleventh preferred embodiment of the invention.

The contents of the abnormality detecting program of the present preferred embodiment is conceptually shown in the flow chart of FIG. 62. As in the case of the abnormality detecting program of the tenth preferred embodiment, this abnormality detecting program is also repeatedly performed.

When the program is initiated each time, first of all, whether or not abnormality detection permitting conditions similar to those in the tenth preferred embodiment have been met is determined at S100. If the conditions have been met, whether or not the master cylinder pressure detected by the master cylinder sensor 1243 is equal to or higher than a set pressure is determined at S1101. If the master cylinder pressure is equal to or higher than the set pressure, the brake cylinder pressure of each vehicle wheel is estimated based on the master cylinder pressure and the supply current I, and the braking torque (a braking torque corresponding to the controlled variable, and so on) of each vehicle wheel is estimated at S1102.

In contrast, if the master cylinder pressure is lower than the set pressure, the braking torque (a braking torque corresponding to master cylinder pressure) is estimated based on the detected hydraulic pressure of the master cylinder pressure sensor 1243 at S1108, that is, an estimated value of the braking torque based on the master cylinder pressure is obtained since the master cylinder pressure is equal to the brake cylinder pressure.

After any cases above, the detected hydraulic pressure Pc of hydraulic sensor for torque 1150 is input at S1103. Next off, at S1104, based on the input detected hydraulic pressure Pc, the braking torque TB is calculated as the detected braking torque by using the formula previously explained.

Next, at S105, whether or not a difference between an estimated value of the braking torque (the braking torque corresponding to the controlled variable or the braking torque corresponding to master cylinder pressure) and the detected braking torque is smaller that the set value $\alpha1$ is determined. If the difference is smaller than the set value $\alpha1$, the braking torque detecting device 1112 is determined to be normal at S1106.

In contrast, if the difference is not smaller than the set value $\alpha1$, the braking torque detecting device 1112 is determined to be abnormal at S1107. Either case above at this point terminates a single routine of the abnormality detecting program.

As explained above, in the present preferred embodiment, if the master cylinder pressure is lower than the set pressure, the estimated value of the braking torque based on the master cylinder pressure is considered to be the brake action-related quantity. If the master cylinder pressure is equal to or higher than the set pressure, on the other hand, the estimate value of the braking torque based on the master cylinder pressure and the supply current (controlled variable) to the hydraulic pressure valves 1034 is considered to be the brake action-related quantity to detect an abnormality of the braking torque detecting device 1112.

In either case above, the brake cylinder pressure corresponds to the force on pedal. Accordingly, it can be considered that the estimated braking torque can be calculated based on the brake manipulating force.

Therefore, in the present preferred embodiment, the master cylinder pressure sensor 1243 constitutes an example of "manipulation state variable detecting device". In addition, a portion of the brake control device 1230 for performing the abnormality detecting program in FIG. 62 constitutes an example of "manipulation state-based abnormality detecting portion".

Meanwhile, in the abnormality detecting program in FIG. 62, the driving torque, fluctuation range of the detected driving torque, and the deceleration of the vehicle are not considered. However, by considering these, the present invention can be embodied with an aspect in which an abnormality of the braking torque detecting device 1112 is detected with a program similar to the abnormality detecting program in FIG. 61.

Next, the following explains the twelfth preferred embodiment of the present invention. However, the present preferred embodiment has a hardware configuration common to that of the tenth preferred embodiment. Also, the present preferred embodiment has a software configuration common to that of the tenth preferred embodiment excluding an abnormality detecting program. Therefore, the abnormality detecting program will be explained in detail, and a detailed explanation of the common elements will be omitted by using the same names or the same reference numerals.

According to the present preferred embodiment, similar to the tenth preferred embodiment, an abnormality of the braking torque detecting device 1112 is detected when the brakes are actuated by the cruise controls.

In the present preferred embodiment, it is determined that the brakes have been automatically actuated by the cruise controls if either a detected value of the force on pedal sensor 1242 is approximately 0 or the brake switch 1241 is OFF and the brakes have been actuated.

When the cruise controls are being preformed, the master cylinder pressure has not been generated. Therefore, the estimated value of the braking torque corresponding to the pushing force can be obtained by using the estimated brake cylinder pressure based on the supply current to the hydraulic pressure control valves 1034.

Figure 63:
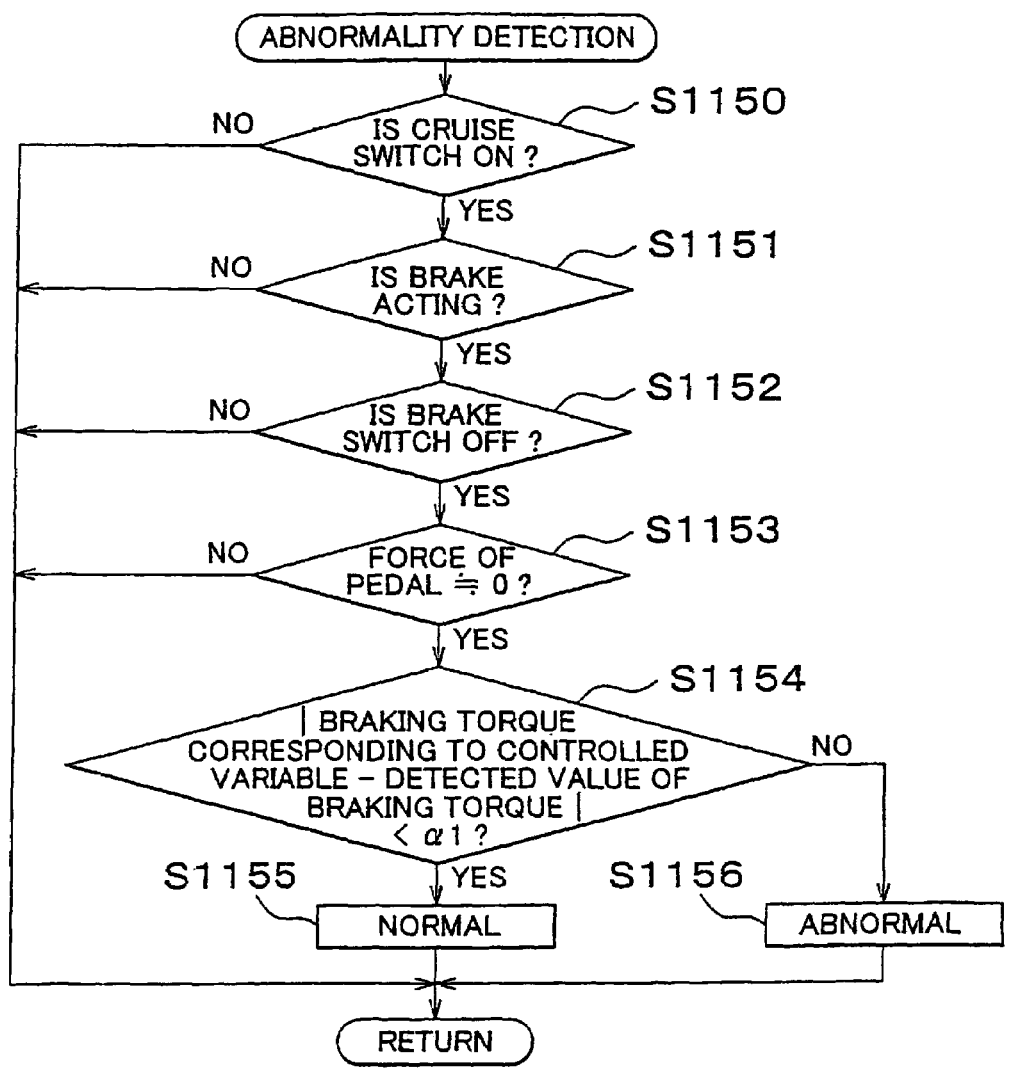
FIG. 63 is a flow chart conceptually showing the contents an abnormality detecting program stored in a ROM of a brake controlling device including a braking torque detecting device abnormality detecting device according to a twelfth preferred embodiment of the invention.

FIG. 63 conceptually shows the contents of the abnormality detecting program of the present preferred embodiment in the flow chart. As in the case of the abnormality detecting program of the tenth preferred embodiment, this abnormality detecting program is repeatedly performed.

When the program is initiated each time, first of all, whether or not the cruise switch 1252 is ON is determined at S1150. If the switch is ON, whether or not the brakes are acting is determined at S1151.

If the brakes are acting, whether or not the brake switch 1241 is OFF is determined at S1152. If the switch is OFF, whether or not the force on pedal, detected by the force on pedal sensor 1242, is approximately 0 is determined at S1153.

If the force on pedal is approximately 0, the braking torque is estimated as the braking torque corresponding to the controlled variable based on the supply current I to the hydraulic pressure control valves 1034 to be compared with the detected braking torque. If a difference between the estimated braking torque and the detected braking torque is smaller than the set value $\alpha1$, the braking torque detecting device 1112 is determined to be normal at S1155. On the other hand, if the difference is equal to or larger than the set value $\alpha1$, the braking torque detecting device 1112 is determined to be abnormal at S1156.

As explained above, in the present preferred embodiment, an abnormality of the braking torque detecting device 1112 is detected by determining the brake action-related quantity based on the controlled variable of the hydraulic pressure control valves 1034 or the supply current I as a command value.

Therefore, in the present preferred embodiment, a portion of the brake control device 1230 for performing S1154 or S1156 constitutes an example of "controlled variable-based abnormality detecting portion" in the section (80).

Next, the following explains the thirteenth preferred embodiment of the present invention. However, the present preferred embodiment has a hardware configuration common to that of the tenth preferred embodiment. Also, the present preferred embodiment has a software configuration common to that of the tenth preferred embodiment excluding an abnormality detecting program. Therefore, the abnormality detecting program will be explained in detail, and a detailed explanation of the common elements will be omitted by using the same names or the same reference numerals.

In a vehicle over which the antilock controls as the automatic braking torque controls can be performed, not performing the antilock controls indicates that the brake cylinder pressure of a vehicle wheel is not excessive to the road friction μ. This state can be referred to the normal braking state. In the normal braking state, the relation between the actual braking pressure (equivalent to the pushing force) and the actual braking torque corresponds to linear relation.

Further, in the normal braking state, relation between an actual value of the braking torque of a front wheel and that of a rear wheel can be predicted since relation between the braking torque of the front wheel and that of the rear wheel is preset in a vehicle specification when designing the brakes. Therefore, if a ratio between the detected values over the front and rear wheels has deviated from a certain range, the braking torque detecting device 1112 can be determined to be abnormal.

Based on the information above, if the abnormality detection permitting conditions have been met in the present preferred embodiment, that is, if the antilock controls are not performed, the braking torque detecting device 1112 is determined to be abnormal provided that the relation between the detected torques of the front and rear wheels does not correspond to the preset relation.

Figure 64:
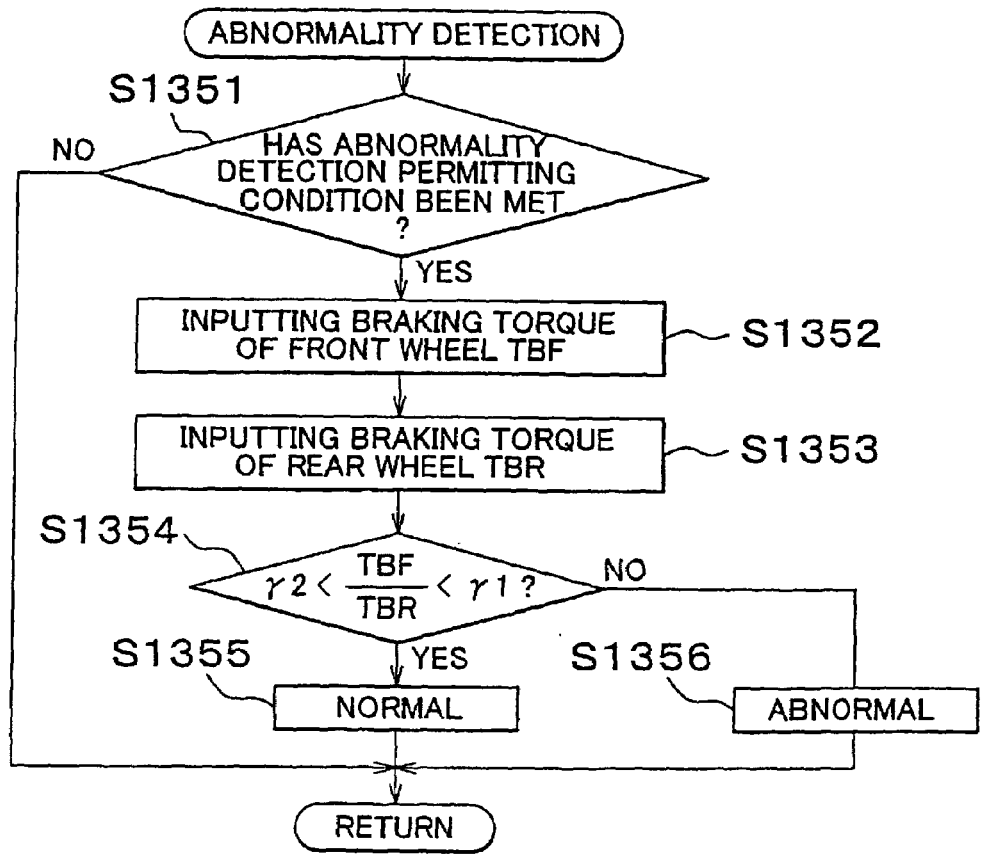
FIG. 64 is a flow chart conceptually showing the contents an abnormality detecting program stored in a ROM of a brake controlling device including a braking torque detecting device abnormality detecting device according to a thirteenth preferred embodiment of the invention.

To realize the determination method in the present preferred embodiment, the abnormality detecting program, conceptually shown in the flow chart of FIG. 64, is repeatedly performed.

When the program is initiated each time, first of all, whether or not the abnormality detection permitting conditions in the tenth preferred embodiment have been met is determined at S1351. If they have not been met, a single routine of the abnormality detecting program is immediately terminated.

In contrast, if the abnormality detection permitting conditions have been met, a braking torque of the front wheel TBF is detected by the braking torque detecting device 1112 corresponding to the front wheel at S1352. Then, at S1353, a braking torque of the rear wheel TBR is detected by the braking torque detecting device 1112 corresponding to the rear wheel.

Next off, at S1354, whether or not a ratio of the braking torque of the front wheel TBF to the braking torque of the rear wheel TBR is within a set range from a lower limit $\gamma 2$ to an upper limit is $\gamma 1$ is determined.

If the ratio is within the set range, both the braking torque detecting devices 1112 for the front and rear wheels are determined to be normal at S1355. On the other hand, if the ratio is not within the set range, at least one of the braking torque detecting devices 1112 is determined to be abnormal at S1356. After either case above, a single routine of the abnormality detecting program is terminated.

Meanwhile, in the tenth and thirteenth preferred embodiments, the braking torque of a vehicle wheel can be detected by the braking torque detecting device 1112 when a brake acts no matter whether the vehicle is moving forward or backward. Therefore, an abnormality of the braking torque detecting device 1112 can be detected when the vehicle is moving forward and backward.

However, the present invention can be embodied with an aspect in which the braking torque is detected by the braking torque detecting device 1112 only when the vehicle is moving in one selected direction which is a direction of moving forward or backward. In this case, an abnormality of the braking torque detecting device is detected when the vehicle is moving in the selected one direction.

This type of braking torque detection can be embodied, for example, with an aspect in which the hydraulic pressure generating device 1148 in the tenth preferred embodiment includes the hydraulic cylinder 1151 and not the hydraulic cylinder 1152. In this case, an abnormality of the braking torque detecting device as well as the braking torque is detected only when the vehicle is moving forward.

Further, the present invention can be embodied with an aspect in which an abnormality of the braking torque detecting device is detected when the brake is not acting. In this aspect, the braking torque detecting device is determined to be abnormal if the detected value of the braking torque detecting device is 0 or if it does not correspond to a value of brake drag Furthermore, the brake generating the braking torque, detected by the braking torque detecting device applied to the present invention, is not required to be a hydraulic brake. For example, it may be a motor-driven brake or a regenerative brake, that is, a type of the brake is not limited.

In the explained tenth to thirteenth preferred embodiments, the disc brake 1023 is provided with the fixed caliper. However, the present invention can be embodied with an aspect including a disc brake provided with a mobile caliper.

In this aspect, a mounting bracket as a brake body retains the caliper so that the caliper moves in the direction of the axis of the disc rotor 1110. The brake body is so retained by the vehicle body side fixing member 1116 via the link mechanism 1118 as to move in the direction of the circumference of the disc rotor 1110. In this aspect, the brake cylinder is provided only on one side of the disc rotor 1110 not on both sides thereof. The actuation of the brake cylinder moves the caliper in the direction of the axis of disc rotor 1110, pushing inner and outer pads provided on both sides of the disc rotor 1110 against the disc rotor 1110.

Moreover, the present invention can be embodied with an aspect in which the braking torque detecting device includes an associated rotating force detecting portion mechanically detecting associated rotating force based on friction force between the disc rotor 1110 and the a friction engaging member.

Further, when embodying the present invention, a structure of the hydraulic brake device is not limited to the ones in the tenth and thirteenth preferred embodiments. For example, a hydraulic brake device, with a structure in which the brake cylinder pressure is so controlled as to correspond to the controlled variable of the pressurizing device with the brake cylinder shut off from the master cylinder in the normal braking state, can be adopted.

Next, the following explains the fourteenth preferred embodiment of the present invention. However, the present preferred embodiment has a lot of elements common to those of the fourth preferred embodiment, and only elements with respect to abnormality determination of lateral force detection by the detector are different from those of the fourth preferred embodiment. Therefore, the different elements will be explained in detail, and the explanation of the common elements will be omitted by using the same reference numerals.

Figure 66:
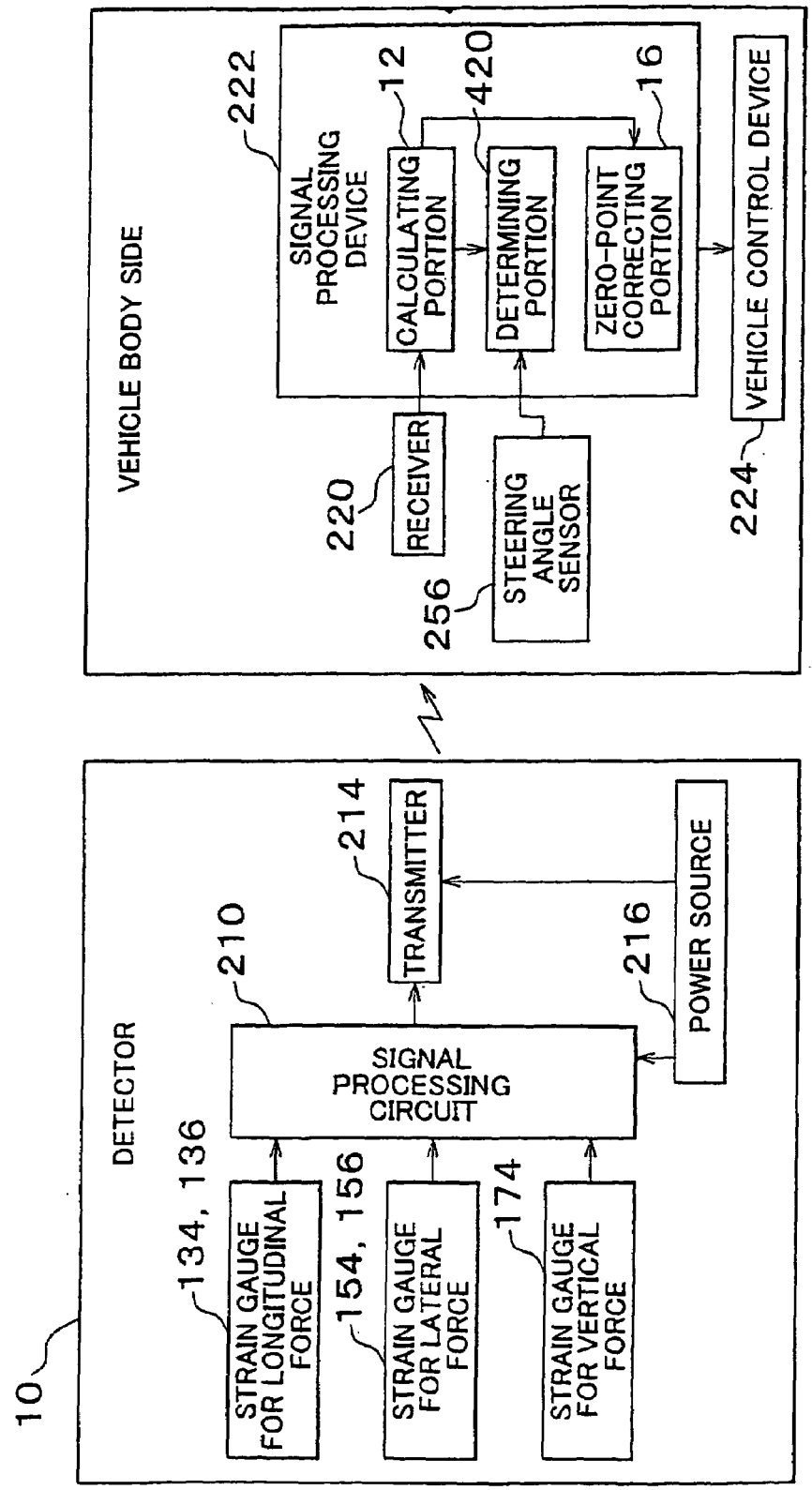
FIG. 66 is a block diagram showing an electrical configuration of a device for detecting force acting on a tire according to a fourteenth preferred embodiment of the invention.

As shown in FIG. 66, in the present preferred embodiment, a determining portion 420 is provided instead of the determining portion 254 of the fourth preferred embodiment. The determining portion 420 is so configured as to perform abnormality determination with respect to detecting the vertical force VF by the detector 10 with a program same as the vertical force detection abnormality determining program, shown in FIGS. 15 and 16.

Figure 67:
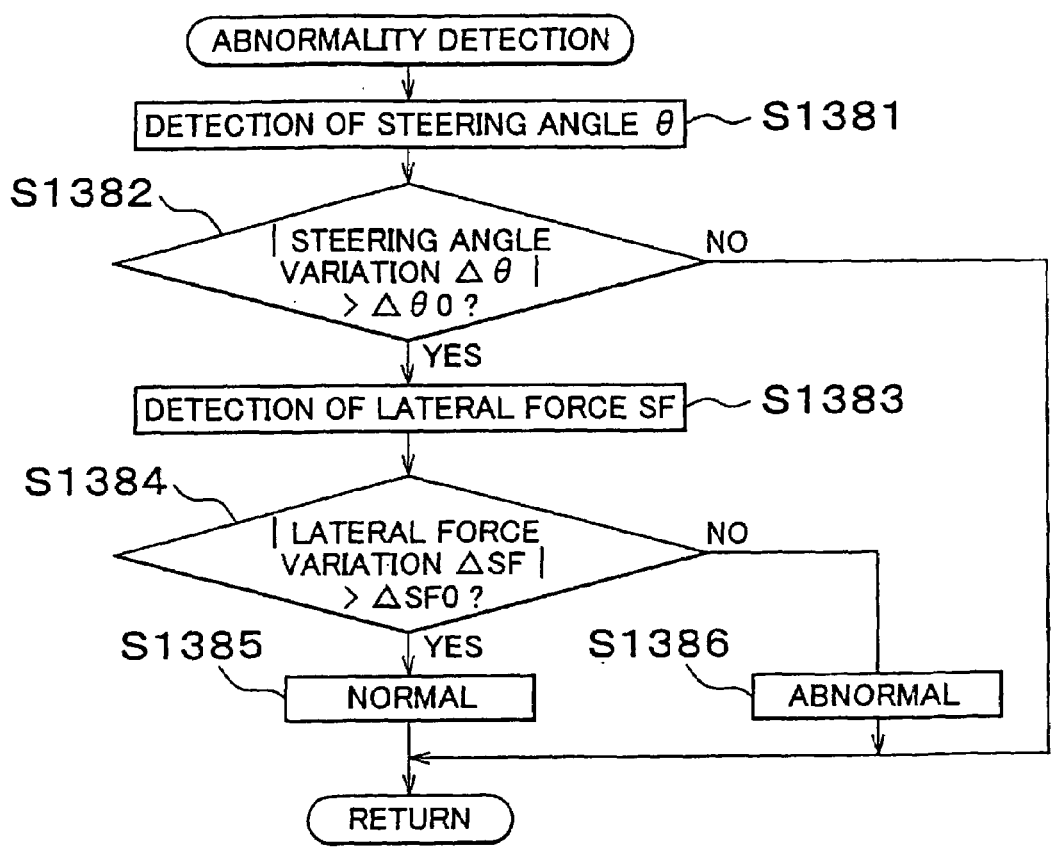
FIG. 67 is a flow chart conceptually showing a lateral force detection abnormality determining program performed by a determining portion in FIG. 66.

In addition, determining portion 420 is so configured as to perform abnormality determination with respect to detecting the lateral force SF by the detector 10 with the lateral force detection abnormality determining program, conceptually shown in the flow chart of FIG. 67.

Furthermore, determining portion 420 is so configured as to perform abnormality determination with respect to detecting the longitudinal force LF by the detector 10 with a program same as the longitudinal force detection abnormality determining program, shown in FIG. 18.

According to the present preferred embodiment, the vehicle wheel speed sensor 258 of the fourth preferred embodiment has been omitted, as shown in FIG. 66.

The following explains the lateral force detection abnormality determining program while referring to FIG. 66.

When the lateral force detection abnormality determining program is initiated each time, first of all, the current value of the steering angle θ is detected at S1381. Next off, at S1382, a variation of the detected current value of the steering angle θ from the previous value is calculated as a steering angle variation Δθ. Further, at S1382, whether or not an absolute value of the calculated steering angle variation Δθ is larger than a threshold value Δθ0 is determined, that is, whether or not the steering angle θ has changed to the extent equal to or more than a set state is determined.

If the absolute value of the calculated steering angle variation Δθ is assumed not to be larger than the threshold value Δθ0, the determination at S1382 becomes "NO", terminating a single routine of the lateral force detection abnormality determining program.

On the other hand, if the absolute value of the calculated steering angle variation Δθ is assumed to be larger than the threshold value Δθ0, the determination at S1382 becomes "YES". Then, at S1383, a current value of the lateral force SF over each of drive vehicle wheels of plural vehicle wheels is detected by the lateral force portion 150.

Then, at S1384, a variation of the current value of the detected lateral force SF from the previous value is calculated as a lateral force variation ΔSF. Further, at S1384, whether or not an absolute value of the calculated lateral force variation ΔSF is larger than a threshold value ΔSF0 is determined, that is, whether or not the lateral force SF has changed to the extent equal to or more than a set state is determined.

If the absolute value of the calculated lateral force variation ΔSF is assumed to be larger than the threshold value ΔSF0, the determination at S1384 becomes "YES". Then, at S1385, the lateral force detecting portion 150 over each drive vehicle wheel is determined to be normal.

In contrast, if the absolute value of the calculated lateral force variation ΔSF is assumed not to be larger than the threshold value ΔSF0, the determination at S1384 becomes "NO". Then, at S1386, the lateral force detecting portion 150 over each drive vehicle wheel is determined to be abnormal. After either case above, a single routine of the lateral force detection abnormality program is terminated.

As clear from the explanation above, in the present preferred embodiment, the steering angle sensor 256 constitutes an example of "vehicular state variable sensor" in the section (22). In addition, a portion of the determining portion 420 for performing S1381 or S1386 in FIG. 67 constitutes an example of "fourth abnormality determining means" in the same section, an example of "means" in the section (23), and an example of "means" in the section (24).

Moreover, in the present preferred embodiment, the steering angle sensor 256 constitutes an example of "manipulation state variable sensor" in the section (25). In addition, a portion of the determining portion 420 for performing S1381 or S1386 in FIG. 67 constitutes an example of "means" in the same section.

Furthermore, in the present preferred embodiment, a portion of the determining portion 420 for performing S1381 or S1386 in FIG. 67 constitutes an example of "means" in the section (36).

Next, the following explains the fifteenth preferred embodiment of the present invention. However, the present preferred embodiment has a lot of elements common to those of the first preferred embodiment, and only elements with respect to abnormality determination of vertical force detection by the detector are different from those of the first preferred embodiment. Therefore, the different elements will be explained in detail, and the explanation of the common elements will be omitted by using the same reference numerals.

Figure 68:
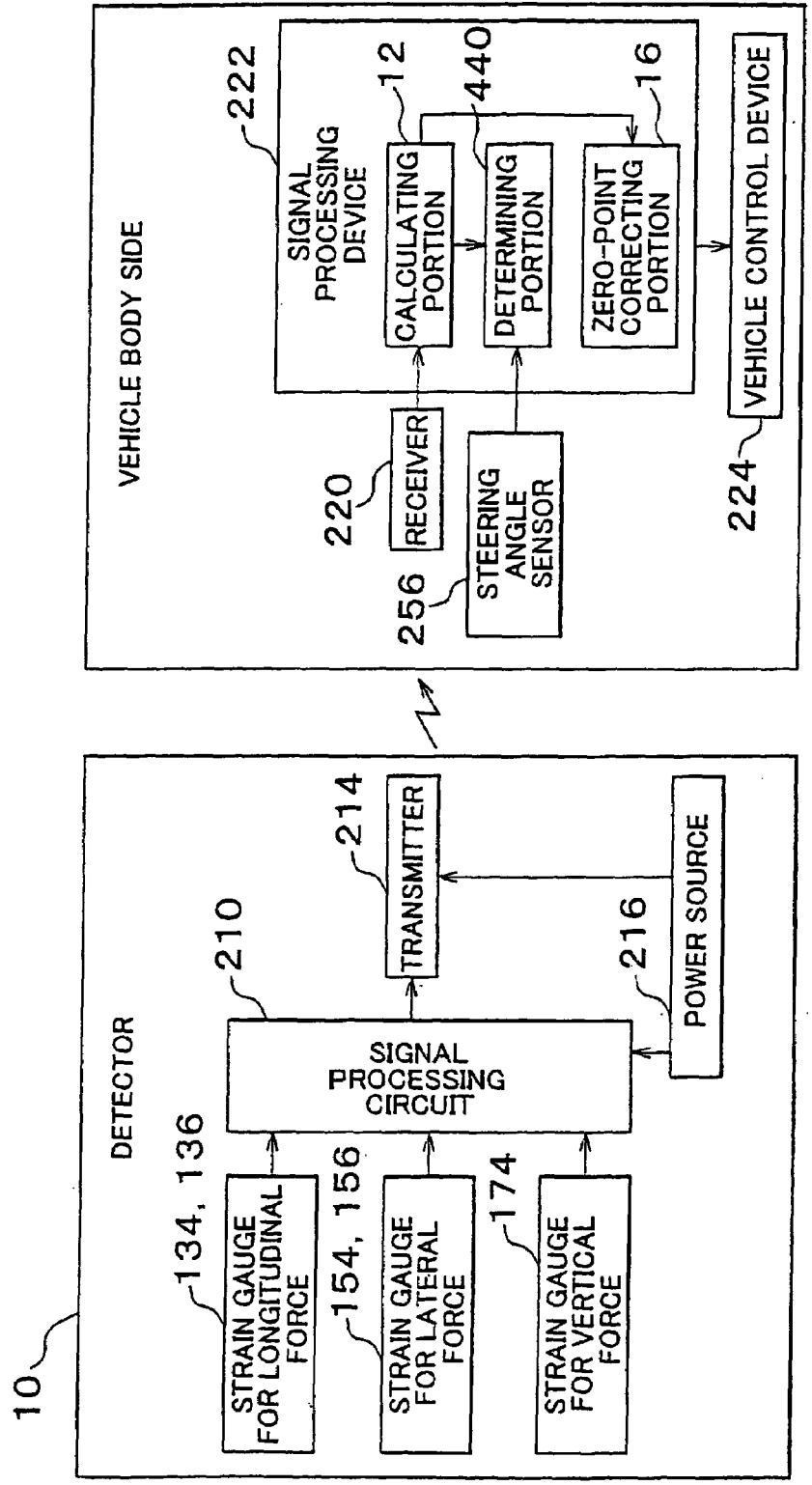
FIG. 68 is a block diagram showing an electrical configuration of a device for detecting force acting on a tire according to a fifteenth preferred embodiment of the invention.

As shown in FIG. 68, in the present preferred embodiment, a determining portion 440 is provided instead of the determining portion 14 of the first preferred embodiment. The determining portion 440 is so configured as to perform abnormality determination with respect to detecting the vertical force VF by the detector 10 with the vertical force detection abnormality determining program, conceptually shown in the flow chart of FIG. 69.

In addition, determining portion 440 is so configured as to perform abnormality determination with respect to detecting the lateral force SF by the detector 10 with a program same as the lateral force detection abnormality determining program, shown in FIG. 17.

Furthermore, determining portion 440 is so configured as to perform abnormality determination with respect to detecting the longitudinal force LF by the detector 10 with a program same as the longitudinal force detection abnormality determining program, shown in FIG. 18.

Figure 69:
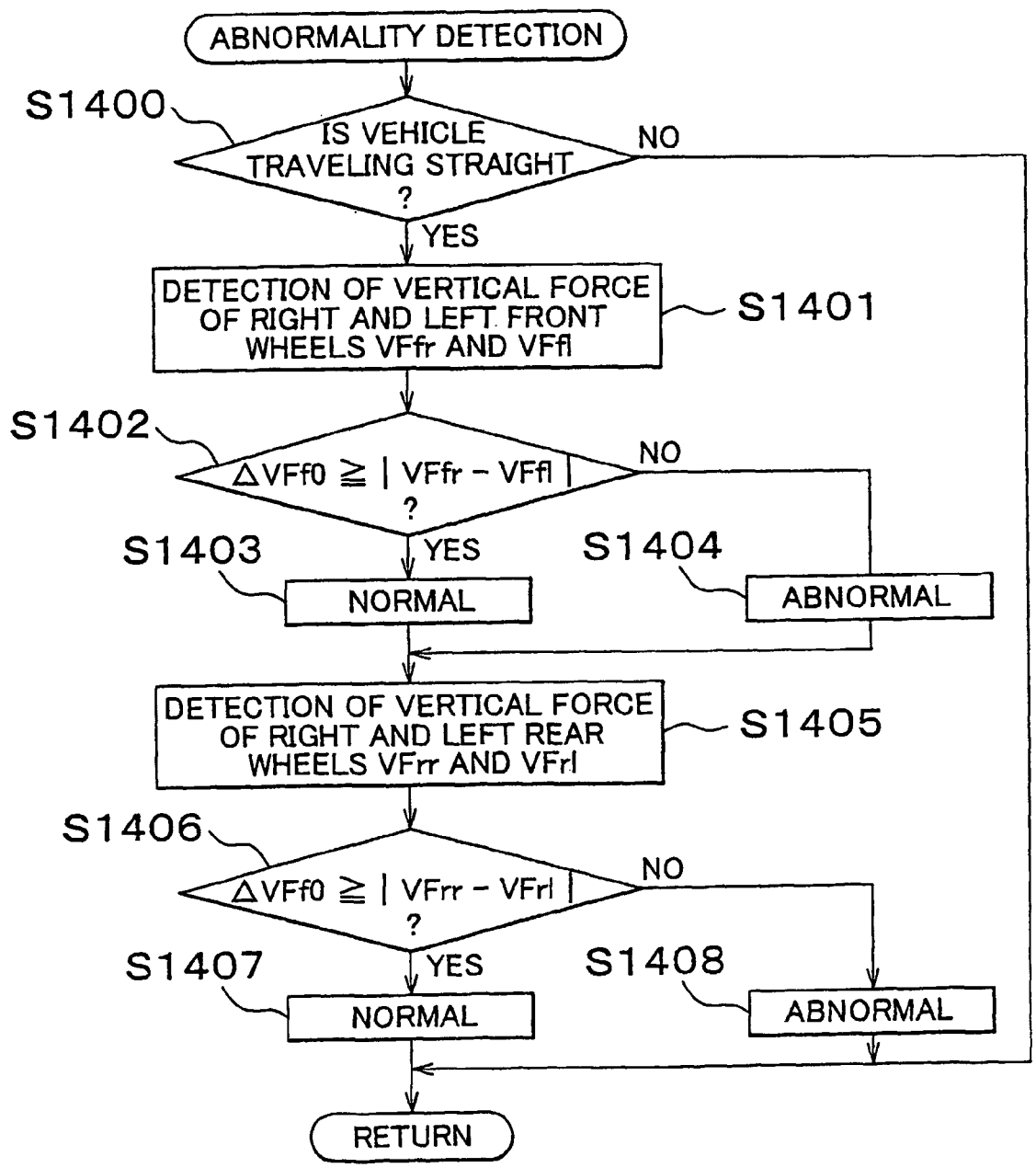
FIG. 69 is a flow chart conceptually showing a vertical force detection abnormality determining program performed by a determining portion in FIG. 68.

The following explains the vertical force detection abnormality determining program while referring to FIG. 69.

When the vertical force detection abnormality determining program is initiated each time, first of all, whether or not the vehicle is traveling straight is determined based on the signal from the steering angle sensor 256 at S1400. This determination is performed to determine whether or not the actual value of the vertical force VF over a left vehicle wheel corresponds to that of vertical force VF over a right vehicle wheel when a load does not move laterally in the vehicle.

If the vehicle is not traveling straight, this terminates a single routine of the vertical force detection abnormality determining program. If the vehicle is traveling straight, on the other hand, S1401 is performed.

At S1401, vertical forces VFfr and VFfl are detected by the vertical force detecting portions 170 of the right front and left front wheels respectively. Next off, at S1402, whether or not a difference between the detected vertical forces VFfr and VFfl is equal to or smaller than a threshold value ΔVFf0 is determined.

If the difference is equal to or smaller than the threshold value ΔVFf0, the vertical force detecting portions 170 of the right front and left front wheels are determined to be normal at S1403. On the other hand, if the difference is larger than the threshold value ΔVFF0, at least one of the vertical force detecting portions 170 of the right front and left front wheels is determined to be abnormal at S1404.

Next, at S1405 or S1408 over the right rear and left rear wheels is performed according to S1401 or S1404.

More specifically, vertical forces VFrr and VFrl are detected by the vertical force detecting portions 170 of the right rear and left rear wheels respectively at S1405. Next off, at S1406, whether or not a difference between the detected vertical forces VFrr and VFrl is equal to or smaller than a threshold value ΔVFr0 is determined.

If the difference is equal to or smaller than the threshold value ΔVFr0, the vertical force detecting portions 170 of the right rear and left rear wheels are determined to be normal at S1407. On the other hand, if the difference is larger than the threshold value ΔVFr0, at least one of the vertical force detecting portions 170 of the right rear and left rear wheels is determined to be abnormal at S1408. After either case above, a single routine of the vertical force detection abnormality determining program is terminated.

As clear from the explanation above, in the present preferred embodiment, a portion of the determining portion 440 for performing S1401 or S1404 in FIG. 69 and that for performing S1405 or S1408 in the same figure respectively constitute an example of "means" in the section (35).

Heretofore, some of the preferred embodiments of the present invention have been explained in detail based on the drawings. However, they are simply examples, so that the present invention can be embodied with other aspects transformed or improved based on knowledge of those skilled in the art as well as with the aspects described in the column "means to resolve problems and effects of invention".

The invention claimed is:

1. A device for detecting force acting on a tire, which is mounted in a vehicle with plural vehicle wheels in which each vehicle wheel is configured by mounting the tire on the periphery of a disc wheel, comprising:
   at least one detector for detecting the force acting on a tire, which is provided on at least one of the plural vehicle wheels; and
   at least either a determining portion determining a detection abnormality of force acting on the tire by the detector with the use of a detected value of the detector or a zero-point correcting portion correcting a zero point of the detector with the use of the detected value of the detector,
   wherein it is determined that detection of the force acting on a tire is abnormal if the detected force on a tire disconforms to a load movement generation state where the load movement is being generated in the vehicle based on movement of the vehicle.

2. The device for detecting force acting on a tire according to claim 1, wherein:
   the determining portion performs the determination based on at least either the detected value or a temporal changing tendency of the detected value.

3. The device for detecting force acting on a tire according to claim 2, wherein:
   the determining portion includes a first abnormality determining portion determining that detection of the force acting on a tire is abnormal if the detected value has deviated from a limit value of the detected value that can be detectable under normal detection of the force acting on a tire.

4. The device for detecting force acting on a tire according to claim 3, wherein:
   the detector is provided with respect to all or some of the plural vehicle wheels, and the first abnormality determining portion includes a portion determining that detection of force acting on a tire by at least one of the plural detectors is abnormal if a total value of the plural detected values has deviated from a limit value of the total value that is detectable under normal detection of force acting on a tire by all the plural detectors.

5. The device for detecting force acting on a tire according to claim 2, wherein:
   the determining portion includes a second abnormality determining portion determining that detection of the force acting on a tire is abnormal if the temporal changing tendency disconforms to generated load movement in a load movement generation state where the load movement is being generated in the vehicle based on movement of the vehicle.

6. The device for detecting force acting on a tire according to claim 5, wherein:
   the detector is provided with respect to all or some of the plural vehicle wheels and has a function of detecting vertical force acting on the tire in the vertical direction as the force acting on a tire, and
   the second abnormality determining portion includes a portion determining that detection of vertical force by at least one of the plural detectors is abnormal if a total value of plural vertical forces detected by the plural detectors temporally changes in the load movement generation state.

7. The device for detecting force acting on a tire according to claim 5, wherein:
   the detector is provided with respect to all or some of the plural vehicle wheels and has a function of detecting vertical force acting on the tire in the vertical direction as the force acting on a tire, and
   the determining portion includes a portion determining the load movement generation state based on relation among the plural detected values of the plural detectors.

8. The device for detecting force acting on a tire according to claim 2, wherein:
   the determining portion includes an abnormality mode identifying portion identifying the mode of detection abnormality of the force acting on a tire by determining a zero point to be abnormal if the detected value has deviated from the limit value that is detectable under normal detection of the force acting on a tire by the detector and if the temporal changing tendency conforms to generated load movement in the load movement generation state where the load movement is being generated in the vehicle based on movement of the vehicle, and by determining a graph gradient indicating input/output characteristics of the detector to be abnormal if the detected value has deviated from the limit value and if the temporal changing tendency disconforms to the generated load movement in the load movement generation state.

9. The device for detecting force acting on a tire according to claim 8, wherein:
   the detector is provided with respect to all or some of the plural vehicle wheels and has a function of detecting vertical force acting on the tire in the vertical direction as the force acting on a tire, and
   the determining portion includes a portion determining the load movement generation state based on relation among the plural detected values of the plural detectors.

10. The device for detecting force acting on a tire according to claim 9, wherein:
   the detector is provided with respect to all or some of the plural vehicle wheels and has a function of detecting vertical force acting on the tire in the vertical direction as the force acting on a tire, and
   the determining portion includes a portion determining the load movement generation state based on relation among the plural detected values of the plural detectors.

11. The device for detecting force acting on a tire according to claim 2, wherein:

the detector is provided with respect to all or some of the plural vehicle wheels and has a function of detecting vertical force acting on the tire in the vertical direction as the force acting on a tire, plural forces acting on a tire to be detected by the plural detectors are affected by load movement in the opposite direction to each other in the load movement generation state where the load movement is being generated in the vehicle based on movement of the vehicle, and the determining portion includes an abnormal detector identifying portion identifying a particular detector with abnormal vertical force detection out of the plural detectors based on a direction of load movement and the temporal changing tendency of the total value of plural vertical forces detected by the plural detectors if the total value has deviated from a limit value that is detectable under normal detection of the force acting on a tire and if the temporal changing tendency of the total value disconforms to the generated load movement in the load movement generation state.

12. The device for detecting force acting on a tire according to claim 2, wherein:

the detector has a function of detecting horizontal force acting on the tire in the horizontal direction as the force acting on a tire, and the determining portion includes a third abnormality determining portion determining whether detection of the horizontal force is abnormal with the use of the quotient of the horizontal force, detected by the detector, divided by vertical force acting on the tire in the vertical direction.

13. The device for detecting force acting on a tire according to claim 12, wherein:

the detector is provided with respect to all or some of the plural vehicle wheels, and the third abnormality determining portion includes a portion determining whether horizontal force detection of the detector with respect to at least one vehicle wheel is abnormal based on an individual value equivalent to road friction coefficient $\mu$ with respect to each of the vehicle wheels which is the quotient of horizontal force, detected by each of the detector of each of the vehicle wheels, divided by individual vertical force with respect to each of the vehicle wheels, and based on a general value equivalent to road friction coefficient $\mu$ with respect to the entire vehicle which is the quotient of a total value of the plural horizontal forces, detected by the plural detectors, divided by general vertical force with respect to the entire vehicle.

14. The device for detecting force acting on a tire according to claim 13, wherein:

the portion includes a portion determining that horizontal force detection by the detector with respect to at least one of the vehicle wheels is abnormal if a graph gradient indicating corresponding relation between the individual value equivalent to road friction coefficient $\mu$ with respect to each of the vehicle wheels and the general value equivalent to road friction coefficient $\mu$ with respect to the entire vehicle has deviated from a normal gradient with respect to at least that one of the vehicle wheels.

15. The device for detecting force acting on a tire according to claim 12, wherein:

the vehicle includes an acceleration sensor detecting acceleration acting on the vehicle in the same direction as the horizontal force, the detector is provided with respect to all or some of the plural vehicle wheels, and the third abnormality determining portion includes a portion determining that detection of the horizontal force is abnormal if the general value equivalent to road friction coefficient $\mu$ with respect to the entire vehicle, which is the quotient of a total value of the plural horizontal forces detected by the plural detectors divided by the general vertical force with respect to the entire vehicle, and the acceleration detected by the acceleration sensor disconform to each other.

16. The device for detecting force acting on a tire according to claim 15, wherein:

the determining portion further includes an acceleration sensor abnormality determining portion determining that detection of the acceleration sensor is abnormal if the general value equivalent to road friction coefficient $\mu$ and the acceleration detected by the acceleration sensor disconform to each other and if a graph gradient indicating corresponding relation between the individual value equivalent to road friction coefficient $\mu$ with respect to each of the vehicle wheels, which is the quotient of horizontal force detected by each of the detectors of each of the vehicle wheels divided by the individual vertical force with respect to each of the vehicle wheels, and the acceleration detected by the acceleration sensor has deviated from a normal gradient in the same direction with respect to all the vehicle wheels.

17. The device for detecting force acting on a tire according to claim 15, wherein:

the determining portion further includes a tire abnormality determining portion determining that a particular tire, which is a part of a particular vehicle wheel out of the plural vehicle wheels, is abnormal if a graph gradient indicating corresponding relation between the individual value equivalent to road friction coefficient $\mu$, which is the quotient of horizontal force detected by each of the detectors of each of the vehicle wheels divided by the individual vertical force with respect that particular vehicle wheel, and the general value equivalent to road friction coefficient $\mu$, has deviated from a normal gradient and if the general value equivalent to road friction coefficient $\mu$ and the acceleration detected by the acceleration sensor conform to each other.

18. The device for detecting force acting on a tire according to claim 1, wherein:

the detector is provided with respect to all or some of the plural vehicle wheels, and based on at least either plural detected values of the plural detectors or temporal changing tendencies of the plural detected values, the determining portion performs at least one of the following steps: 1) a determination of whether detection of force acting on a tire by at least one of plural detectors is abnormal, 2) identification of a mode of the abnormality if the detection is determined to be abnormal, and 3) identification of a particular detector with a detection abnormality of force acting on a tire out of the plural detectors if the detection is determined to be abnormal.

19. The device for detecting force acting on a tire according to claim 18, wherein:
the determining portion includes a first abnormality determining portion determining that detection of the force acting on a tire is abnormal if the detected value has deviated from a limit value of the detected value that can be detectable under normal detection of the force acting on a tire.

20. The device for detecting force acting on a tire according to claim 19, wherein:
the detector is provided with respect to all or some of the plural vehicle wheels, and the first abnormality determining portion includes a portion determining that detection of force acting on a tire by at least one of the plural detectors is abnormal if a total value of the plural detected values has deviated from a limit value of the total value that can be detectable under normal detection of force acting on a tire by all the plural detectors.

21. The device for detecting force acting on a tire according to claim 18, wherein:
the determining portion includes a second abnormality determining portion determining that detection of the force acting on a tire is abnormal if the temporal changing tendency disconforms to generated load movement in a load movement generation state where the load movement is being generated in the vehicle based on movement of the vehicle.

22. The device for detecting force acting on a tire according to claim 21, wherein:
the detector is provided with respect to all or some of the plural vehicle wheels and has a function of detecting vertical force acting on the tire in the vertical direction as the force acting on a tire, and
the second abnormality determining portion includes a portion determining that detection of vertical force by at least one of the plural detectors is abnormal if a total value of plural vertical forces detected by the plural detectors temporally changes in the load movement generation state.

23. The device for detecting force acting on a tire according to claim 21, wherein:
the detector is provided with respect to all or some of the plural vehicle wheels and has a function of detecting vertical force acting on the tire in the vertical direction as the force acting on a tire, and
the determining portion includes a portion determining the load movement generation state based on relation among the plural detected values of the plural detectors.

24. The device for detecting force acting on a tire according to claim 18, wherein:
the determining portion includes an abnormality mode identifying portion identifying the mode of detection abnormality of the force acting on a tire by determining a zero point to be abnormal if the detected value has deviated from the limit value that can be detectable under normal detection of the force acting on a tire by the detector and if the temporal changing tendency conforms to generated load movement in the load movement generation state where the load movement is being generated in the vehicle based on movement of the vehicle, and by determining a graph gradient indicating input/output characteristics of the detector to be abnormal if the detected value has deviated from the limit value and if the temporal changing tendency disconforms to the generated load movement in the load movement generation state.

25. The device for detecting force acting on a tire according to claim 24, wherein:
the detector is provided with respect to all or some of the plural vehicle wheels and has a function of detecting vertical force acting on the tire in the vertical direction as the force acting on a tire, and
the determining portion includes a portion determining the load movement generation state based on relation among the plural detected values of the plural detectors.

26. The device for detecting force acting on a tire according to claim 18, wherein:
the detector is provided with respect to all or some of the plural vehicle wheels and has a function of detecting vertical force acting on the tire in the vertical direction as the force acting on a tire,
plural forces acting on a tire to be detected by the plural detectors are affected by load movement in the opposite direction to each other in the load movement generation state where the load movement is being generated in the vehicle based on movement of the vehicle, and
the determining portion includes an abnormal detector identifying portion identifying a particular detector with abnormal vertical force detection out of the plural detectors based on a direction of load movement and the temporal changing tendency of the total value of plural vertical forces detected by the plural detectors if the total value has deviated from a limit value that can be detectable under normal detection of the force acting on a tire and if the temporal changing tendency of the total value disconforms to the generated load movement in the load movement generation state.

27. The device for detecting force acting on a tire according to claim 26, wherein:
the detector is provided with respect to all or some of the plural vehicle wheels and has a function of detecting vertical force acting on the tire in the vertical direction as the force acting on a tire, and
the determining portion includes a portion determining the load movement generation state based on relation among the plural detected values of the plural detectors.

28. The device for detecting force acting on a tire according to claim 18, wherein:
the detector has a function of detecting horizontal force acting on the tire in the horizontal direction as the force acting on a tire, and
the determining portion includes a third abnormality determining portion determining whether detection of the horizontal force is abnormal with the use of the quotient of the horizontal force, detected by the detector, divided by vertical force acting on the tire in the vertical direction.

29. The device for detecting force acting on a tire according to claim 28, wherein:
the detector is provided with respect to all or some of the plural vehicle wheels, and the third abnormality determining portion includes a portion determining whether horizontal force detection of the detector with respect to at least one vehicle wheel is abnormal based on an individual value equivalent to road friction coefficient μ with respect to each of the vehicle wheels which is the quotient of horizontal force, detected by each of the detector of each of the vehicle wheels, divided by individual vertical force with respect to each of the vehicle wheels, and based on a general value equivalent to road friction coefficient μ with respect to the entire vehicle which is the quotient of a total value of the plural horizontal forces, detected by the plural detectors, divided by general vertical force with respect to the entire vehicle.

30. The device for detecting force acting on a tire according to claim 29, wherein:
the portion includes a portion determining that horizontal force detection by the detector with respect to at least one of the vehicle wheels is abnormal if a graph gradient indicating corresponding relation between the individual value equivalent to road friction coefficient μ with respect to each of the vehicle wheels and the general value equivalent to road friction coefficient μ with respect to the entire vehicle has deviated from a normal gradient with respect to at least that one of the vehicle wheels.

31. The device for detecting force acting on a tire according to claim 28, wherein:
the vehicle includes an acceleration sensor detecting acceleration acting on the vehicle in the same direction as the horizontal force,
the detector is provided with respect to all or some of the plural vehicle wheels, and the third abnormality determining portion includes a portion determining that detection of the horizontal force is abnormal if the general value equivalent to road friction coefficient μ with respect to the entire vehicle, which is the quotient of a total value of the plural horizontal forces detected by the plural detectors divided by the general vertical force with respect to the entire vehicle, and the acceleration detected by the acceleration sensor disconform to each other.

32. The device for detecting force acting on a tire according to claim 31, wherein:
the determining portion further includes an acceleration sensor abnormality determining portion determining that detection of the acceleration sensor is abnormal if the general value equivalent to road friction coefficient μ and the acceleration detected by the acceleration sensor disconform to each other and if a graph gradient indicating corresponding relation between the individual value equivalent to road friction coefficient μ with respect to each of the vehicle wheels, which is the quotient of horizontal force detected by each of the detectors of each of the vehicle wheels divided by the individual vertical force with respect to each of the vehicle wheels, and the acceleration detected by the acceleration sensor has deviated from a normal gradient in the same direction with respect to all the vehicle wheels.

33. The device for detecting force acting on a tire according to claim 31, wherein:
the determining portion further includes a tire abnormality determining portion determining that a particular tire, which is a part of a particular vehicle wheel out of the plural vehicle wheels, is abnormal if a graph gradient indicating corresponding relation between the individual value equivalent to road friction coefficient μ, which is the quotient of horizontal force detected by each of the detectors of each of the vehicle wheels divided by the individual vertical force with respect that particular vehicle wheel, and the general value equivalent to road friction coefficient μ has deviated from a normal gradient and if the general value equivalent to road friction coefficient μ and the acceleration detected by the acceleration sensor conform to each other.

34. The device for detecting force acting on a tire according to claim 1, wherein:
the vehicle includes a vehicular state variable sensor detecting a state variable of the vehicle besides the device for detecting force acting on a tire, and
the determining portion includes a fourth abnormality determining portion determining whether detection of the detector is abnormal based on a detected value of the vehicular state variable sensor and that of the detector.

35. The device for detecting force acting on a tire according to claim 34, wherein:
the fourth abnormality determining portion includes a portion determining whether detection of the detector is abnormal based on relation between the detected value of the vehicular state variable sensor and that of the detector.

36. The device for detecting force acting on a tire according to claim 34, wherein:
the fourth abnormality determining portion includes a portion determining that the detector is abnormal if the detected value of the vehicular state variable sensor and that of the detector disconform to each other.

37. The device for detecting force acting on a tire according to claim 34, wherein:
the vehicular state variable sensor includes a manipulation state variable sensor detecting a state variable of manipulation carried out by a driver for changing the vehicular state, and
the fourth abnormality determining portion includes a portion determining whether detection of the detector is abnormal based on the detected value of the vehicular state variable sensor and that of the detector.

38. The device for detecting force acting on a tire according to claim 34, wherein:
the vehicle includes a brake actuated for inhibiting rotation of at least one of the plural vehicle wheels,
the manipulation state variable sensor includes a brake action-related quantity obtaining device obtaining a quantity relating to action of the brake,
the detector includes a braking torque detecting device detecting a braking torque generated in a vehicle wheel corresponding to the actuated brake as a physical quantity relating to the force acting on a tire, and
the fourth abnormality determining portion includes a braking torque detecting device abnormality determining portion determining whether detection of the braking torque detecting device is abnormal based on the, brake action-related quantity obtained by the brake action-related quantity obtaining device and the braking torque detected by the braking torque detecting device.

39. The device for detecting force acting on a tire according to claim 38, wherein:
the braking torque detecting device abnormality determining portion includes a portion determining whether detection of the braking torque detecting device is abnormal based on relation between the brake action-related quantity obtained by the brake action-related quantity obtaining device and the braking torque detected by the braking torque detecting device.

40. The device for detecting force acting on a tire according to claim 38, wherein:
the brake includes a friction brake inhibiting rotation of a corresponding vehicle wheel by pushing a friction engaging member against a brake rotating body rotating with the corresponding vehicle wheel, the brake action-related quantity obtaining device includes a pushing force-related quantity obtaining device obtaining a pushing force-related quantity relating to pushing force of the friction engaging member against the brake rotating body, and the braking torque detecting device abnormality determining portion includes a portion determining whether detection of the braking torque detecting device is abnormal with the use of the pushing force-related quantity obtained by the pushing force-related quantity obtaining device as the brake action-related quantity.

41. The device for detecting force acting on a tire according to claim 38, wherein:
the brake includes a pushing device pushing the friction engaging member against the brake rotating body through actuation of the brake based on manipulation of a brake manipulating member by the driver,
the brake action-related quantity obtaining device includes a manipulation state variable detecting device detecting a manipulation state variable indicating a manipulation state of the brake manipulating member by the driver, and the braking torque detecting device abnormality determining portion includes a portion determining whether detection of the braking torque detecting device is abnormal with the use of the manipulation state variable detected by the manipulation state variable detecting device as the brake action-related quantity.

42. The device for detecting force acting on a tire according to claim 38, wherein:
the vehicle includes a pushing force control device controlling the pushing force of the friction engaging member against the brake rotating body,
the brake includes a pushing device pushing the friction engaging member against the brake rotating body through actuation of the brake based on controls of the pushing force control device regardless of manipulation of the brake manipulating member by the driver, and
the braking torque detecting device abnormality determining portion includes a portion determining whether detection of the braking torque detecting device is abnormal with the use of a control-related quantity relating to the controls of the pushing force control device as the brake action-related quantity.

43. The device for detecting force acting on a tire according to claim 38, wherein:
the brake action-related quantity obtaining device includes an acceleration state detecting device detecting an acceleration state of the vehicle, and
the braking torque detecting device abnormality determining portion includes a portion determining whether detection of the braking torque detecting device is abnormal with the use of an acceleration state variable indicating the acceleration state detected by the acceleration state detecting device as the brake action-related quantity.

44. The device for detecting force acting on a tire according to claim 38, wherein:
the vehicle includes a driving torque-related quantity obtaining device obtaining a driving torque-related quantity relating to a driving torque applied to at least one of the plural vehicle wheels, and
the braking torque detecting device abnormality determining portion includes a portion determining whether detection of the braking torque detecting device is abnormal in consideration of the driving torque-related quantity detected by the driving torque-related quantity obtaining device.

45. The device for detecting force acting on a tire according to claim 38, wherein:
the vehicle includes a braking environmental variable detecting device detecting a braking environmental variable indicating an environment under which a particular vehicle wheel out of the plural vehicle wheels are being braked, and
the braking torque detecting device abnormality determining portion includes a portion determining whether detection of the braking torque detecting device is abnormal based on relation between an obtained value of the brake action-related quantity and the detected value of the braking torque and the braking environmental variable detected by the braking environmental variable detecting device.

46. The device for detecting force acting on a tire according to claim 38, wherein:
the braking torque detecting device abnormality determining portion includes a portion determining whether detection of the braking torque detecting device is abnormal if the brake is acting while the vehicle is traveling straight.

47. The device for detecting force acting on a tire according to claim 1, wherein:
the detector is provided with respect to all or some of the plural vehicle wheels, and
the determining portion includes a portion determining whether detection of at least one of the plural detectors is abnormal based on relation among detected values of the force acting on a tire with respect to the plural detectors.

48. The device for detecting force acting on a tire according to claim 1, wherein:
the determining portion includes a portion determining whether detection of the detector is abnormal provided that a set condition, which has been so set as to be met in order to change the vehicular state, is met.

49. The device for detecting force acting on a tire according to claim 48, wherein:
the set condition is a condition which is so set as to be met if the driver has changed the manipulation state of at least one of the following members: 1) an accelerator manipulating member, 2) the brake manipulating member, 3) a steering manipulating member, 4) a changing gear member manipulated by the driver in order to change gears of a driving force transmitting device of the vehicle, and 5) a direction switching member manipulated by the driver in order to change a traveling direction of the vehicle from forward to backward and vice versa.

50. The device for detecting force acting on a tire according to claim 1, wherein:
the detector is provided in a position close to a corresponding vehicle wheel where the force acting on a tire to be detected is dynamically transmitted.

51. The device for detecting force acting on a tire according to claim 1, wherein:
the force acting on a tire includes tire ground force acting on a tire at a contact point where the tire is in contact with a road surface.

52. The device for detecting force acting on a tire according to claim 1, wherein:
the detector has a function of detecting at least either one of the following forces: 1) at least one of the following forces; longitudinal force acting on the tire in the longitudinal direction, lateral force acting on the tire in the lateral direction, and vertical force acting on the tire in the vertical direction, 2) at least one of resultant forces of any two of the above-mentioned three forces: longitudinal force, lateral force, and vertical force.

53. The device for detecting force acting on a tire according to claim 52, wherein:
the detector has a function of detecting the longitudinal force, the lateral force, and the vertical force as the force acting on a tire respectively.

54. The device for detecting force acting on a tire according to claim 53, wherein:
the determining portion includes a portion determining whether detection of the detector is abnormal based on dynamic relation among the longitudinal force, the lateral force, and the vertical force which have been detected by the detector virtually at the same time.

55. The device for detecting force acting on a tire according to claim 54, wherein:
the portion includes a portion determining that detection of the detector is abnormal if set relation, which is so preset as to be met if horizontal force as resultant force of the longitudinal force and the lateral force and the vertical force with respect to a tire corresponding to the detector share the same circle of friction, and the dynamic relation virtually unmatch each other.

56. The device for detecting force acting on a tire according to claim 1, wherein:
the vehicle includes the vehicular state variable sensor detecting the state variable of the vehicle besides the device for detecting force acting on a tire, and the determining portion includes a fifth abnormality determining portion obtaining the same physical quantity as a physical quantity detected by the detector as a comparison physical quantity and determining that detection of the detector is abnormal if the obtained comparison physical quantity and the detected value of the detector disconform to each other.

57. The device for detecting force acting on a tire according to claim 1, wherein:
the zero-point correcting portion includes a setting portion setting the zero point of the detector to a position indicating that the force acting on a tire is 0 in a reference vehicular state where an actual value of the force acting on a tire is expected to be 0.

58. The device for detecting force acting on a tire according to claim 57, wherein:
the detector has a function of detecting horizontal force acting on the tire in the horizontal direction as the force acting on a tire, and
the setting portion includes a reference vehicular state determining portion determining that the vehicle is in the reference vehicular state if the vehicle is at a stop with horizontal posture.

59. The device for detecting force acting on a tire according to claim 58, wherein:
the detector is provided with respect to a front wheel and a rear wheel of the plural vehicle wheels,
each detector has a function of detecting vertical force acting on the tire in the vertical direction as the force acting on a tire, and
the reference vehicular state determining portion includes a portion determining whether the vehicle is in the reference vehicular state where posture of the vehicle is horizontal with respect to the longitudinal direction thereof based on relative relation between the vertical forces detected with respect to the front and rear vehicle wheels.

60. The device for detecting force acting on a tire according to claim 58, wherein:
the detector is provided with respect to a right wheel and a left wheel of the plural vehicle wheels,
each detector has a function of detecting vertical force acting on the tire in the vertical direction as the force acting on a tire, and
the reference vehicular state determining portion includes a portion determining whether the vehicle is in the reference vehicular state where posture of the vehicle is horizontal with respect to the lateral direction thereof based on relative relation between the vertical forces detected with respect to the right and left vehicle wheels.

61. The device for detecting force acting on a tire according to claim 57, wherein:
the vehicle includes plural brakes provided to the plural vehicle wheels respectively and actuated for inhibiting rotation of the plural vehicle wheels individually, each of the detectors is provided to each of the plural vehicle wheels and has a function of detecting braking force acting on the tire as the force acting on a tire, and
the setting portion includes a portion setting the zero points of some of the plural detectors in order when the vehicle is at a stop and causing a state where braking force is absent on a vehicle wheel provided with a particular detector subject to zero-point correction as the reference vehicular state by keeping the brake at a rest on the vehicle wheel provided with the particular detector subject to zero-point correction and by actuating the brake on at least one of the other vehicle wheels except the vehicle wheel provided with the particular detector at each zero-point correction.

62. The device for detecting force acting on a tire according to claim 57, wherein:
the detector has a function of detecting lateral force acting on the tire in the lateral direction as the force acting on a tire, and
the setting portion includes a portion setting the zero point when the vehicle is traveling straight.

63. The device for detecting force acting on a tire according to claim 57, wherein:
the detector has a first portion detecting driving force rather than braking force and a second portion detecting braking force rather than driving force,
the two portions are provided independently to each other to detect driving force and braking force acting on the tire as the force acting on a tire, and
the setting portion includes portion setting the zero point with respect to the first portion when the vehicle is traveling and braking force is being generated in a vehicle wheel provided with the detector.

64. A device for detecting force acting on a tire, which is mounted in a vehicle with plural vehicle wheels in which each vehicle wheel is configured by mounting the tire on the periphery of a disc wheel, comprising:
at least one detector for detecting the force acting on a tire, which is provided on at least one of the plural vehicle wheels; and
at least either a determining portion determining a detection abnormality of force acting on the tire by the detector with the use of a detected value of the detector or a zero-point correcting portion correcting a zero point of the detector with the use of the detected value of the detector, wherein:

the detector has a function of separately detecting each of plural types of forces acting on a corresponding tire as the force acting on a tire, and the determining portion includes a portion determining whether detection of the force acting on a tire by the detector is abnormal based on relation among the plural types of forces detected by the detector.

65. A device for detecting force acting on a tire, which is mounted in a vehicle with plural vehicle wheels in which each vehicle wheel is configured by mounting the tire on the periphery of a disc wheel, comprising:

at least one detector for detecting the force acting on a tire, which is provided on at least one of the plural vehicle wheels; and at least either a determining portion determining a detection abnormality of force acting on the tire by the detector with the use of a detected value of the detector or a zero-point correcting portion correcting a zero point of the detector with the use of the detected value of the detector, wherein:

the determining portion includes a portion determining whether detection of the force acting on a tire by the detector is abnormal based on the detected value of the detector and according to different rules depending on whether the vehicle is moving or it is at a stop.

66. The device for detecting force acting on a tire according to claim 65, wherein:

the determining portion includes a portion determining whether detection of the force acting on a tire by the detector is abnormal provided that an abnormality determination permitting condition, preset with respect to a traveling state of the vehicle when at least the vehicle is moving, is met.

* * * * *